US006399724B1

(12) United States Patent
Matsui et al.

(10) Patent No.: US 6,399,724 B1
(45) Date of Patent: Jun. 4, 2002

(54) CATALYST FOR OLEFIN POLYMERIZATION AND METHOD OF POLYMERIZING OLEFIN

(75) Inventors: Shigekazu Matsui; Masatoshi Nitabaru; Kazutaka Tsuru; Terunori Fujita; Yasuhiko Suzuki; Yukihiro Takagi; Hidetsugu Tanaka, all of Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/424,971

(22) PCT Filed: Apr. 15, 1999

(86) PCT No.: PCT/JP99/02018

§ 371 (c)(1),
(2), (4) Date: Dec. 3, 1999

(87) PCT Pub. No.: WO99/54364

PCT Pub. Date: Oct. 28, 1999

(30) Foreign Application Priority Data

| | | |
|---|---|---|
| Apr. 16, 1998 | (JP) | 10/106439 |
| Jun. 23, 1998 | (JP) | 10/176270 |
| Jul. 23, 1998 | (JP) | 10/208375 |
| Sep. 4, 1998 | (JP) | 10/250670 |

(51) Int. Cl.[7] .............................. C08F 4/44; B01J 31/38

(52) U.S. Cl. ....................... 526/161; 526/172; 502/117; 502/162; 502/168

(58) Field of Search ................................. 526/161, 172; 502/162, 168, 104, 117

(56) References Cited

FOREIGN PATENT DOCUMENTS

| | | | |
|---|---|---|---|
| EP | 0874005 | A1 | 10/1998 |
| EP | 0 874 005 | A2 * | 10/1998 |
| JP | 241306 | A | 2/1990 |
| WO | 9623010 | A2 | 8/1992 |
| WO | 98/42664 | | 10/1998 |
| WO | 98/42665 | | 10/1998 |

OTHER PUBLICATIONS

Timo Repo et al.; Macromolecules (1997), 30(2), pp. 171–175, XP–002073729.

Robbert Duchateau et al.; Organometallics (1997), 16(25), pp. 5506–5516 XP–000965566.

* cited by examiner

*Primary Examiner*—David W. Wu
*Assistant Examiner*—R. Harlan
(74) *Attorney, Agent, or Firm*—Birch, Stewart, Kolasch & Birch, LLP

(57) ABSTRACT

The present invention is intended to provide an olefin polymerization catalyst comprising a novel transition metal compound and having an excellent olefin polymerization activity and to provide a process for olefin polymerization.

11 Claims, 2 Drawing Sheets

CATALYST FOR OLEFIN POLYMERIZATION AND METHOD OF POLYMERIZING OLEFIN

This application is the national phase under 35 U.S.C. §371 of PCT International Application No. PCT/JP99/02018 which has an International filing date of Apr. 15, 1999, which designated the United States of America.

TECHNICAL FIELD

The present invention relates to olefin polymerization catalysts comprising a novel transition metal compound and to a process for olefin polymerization using the olefin polymerization catalysts.

BACKGROUND ART

As olefin polymerization catalysts, "Kaminsky catalysts" are well known. The Kaminsky catalysts have extremely high polymerization activities, and by the use of them, polymers of narrow molecular weight distribution can be obtained. Transition metal compounds known as employable for the Kaminsky catalysts are, for example, bis(cyclopentadienyl)zirconium dichloride (see Japanese Patent Laid-Open Publication No. 19309/1983) and ethylenebis(4,5,6,7-tetrahydroindenyl)zirconium dichloride (see Japanese Patent Laid-Open Publication No. 130314/1986). It is also known that the olefin polymerization activities and the properties of the resulting polyolefins greatly vary when different transition metal compounds are used in the polymerization. Recently, transition metal compounds having a ligand of diimine structure have been proposed as novel olefin polymerization catalysts (see International Patent Publication No. 9623010).

By the way, polyolefins generally have excellent mechanical properties, so that they are used in many fields such as fields of various molded products. However, with various requirements for the polyolefins, polyolefins of various properties have been desired in recent years. Moreover, increase of productivity has been also desired.

Under such circumstances as mentioned above, there has been desired development of olefin polymerization catalysts having excellent olefin polymerization activities and capable of producing polyolefins of excellent properties.

The present invention has been made in view of such prior art as described above. It is an object of the invention to provide an olefin polymerization catalyst comprising a novel transition metal compound and having an excellent olefin polymerization activity. It is another object of the invention to provide a process for olefin polymerization using the catalyst.

DISCLOSURE OF THE INVENTION

The first embodiment of the olefin polymerization catalyst according to the invention comprises a transition metal compound (A-1) represented by the following formula (I):

(I)

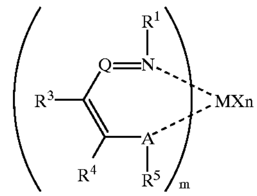

wherein

M is a transition metal atom of Group 3 to Group 11 of the periodic table, m is an integer of 1 to 3, Q is a nitrogen atom or a carbon atom having a substituent $R^2$, A is an oxygen atom, a sulfur atom, a selenium atom or a nitrogen atom having a substituent $R^6$, $R^1$ to $R^6$ may be the same or different, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, two or more of them may be bonded to each other to form a ring, and when m is 2 or greater, $R^1$s, $R^2$s, $R^3$s, $R^4$s, $R^5$s, or $R^6$s may be the same or different, and one group of $R^1$ to $R^6$ contained in one ligand and one group of $R^1$ to $R^6$ contained in other ligands may be bonded, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, Xs may be the same or different, and Xs may be bonded to each other to form a ring.

The transition metal compound (A-1) represented by the formula (I) wherein Q is a carbon atom having a substituent $R^2$ is represented by the following formula (I-a):

(I-a)

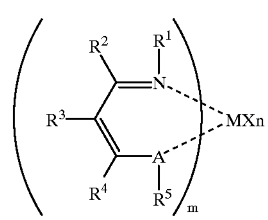

wherein M, m, A, $R^1$ to $R^6$, n and X have the same meanings as those of M, m, A, $R^1$ to $R^6$, n and X in the formula (I).

The transition metal compound (A-1) represented by the formula (I-a) is preferably a compound of the formula (I-a) wherein M is a transition metal atom selected from Group 8 to Group 10 of the periodic table. Also preferable is a compound of the formula (I-a) wherein A is a nitrogen atom having a substituent $R^6$ and $R^6$ is a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group. Further, a compound of the formula (I-a) wherein A is an oxygen atom is also preferable. Furthermore, a compound of the formula (I-a) wherein A is a sulfur atom is also preferable. Moreover, a compound of the formula (I-a) wherein A is a selenium atom is also preferable.

The transition metal compound (A-1) represented by the formula (I-a) wherein $R^3$ and $R^4$ are bonded to form an aromatic ring is represented by the following formula (I-b):

(I-b)

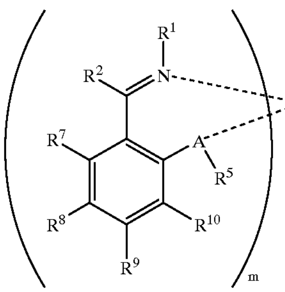

wherein M, m, A, $R^1$, $R^2$, $R^5$, $R^6$, n and X have the same meanings as those of M, m, A, $R^1$, $R^2$, $R^5$, $R^6$, n and X in the formula (I), $R^7$ to $R^{10}$ have the same meanings as those of $R^1$ to $R^6$ in the formula (I), and $R^1$, $R^2$ and $R^5$ to $R^{10}$ may be the same or different, two or more of them may be bonded to each other to form a ring, and when m is 2 or greater, $R^1$s, $R^2$s, $R^5$s, $R^6$s, $R^7$s, $R^8$s, $R^9$s, or $R^{10}$s may be the same or different, and one group of $R^1$, $R^2$ and $R^5$ to $R^{10}$ contained in one ligand and one group of $R^1$, $R^2$ and $R^5$ to $R^{10}$ contained in other ligands may be bonded.

The transition metal compound (A-1) represented by the formula (I-b) is preferably a compound of the formula (I-b) wherein M is a transition metal atom selected from Group 8 to Group 10 of the periodic table. Also preferable is a compound of the formula (I-b) wherein A is a nitrogen atom having a substituent $R^6$ and $R^6$ is a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group. Further, a compound of the formula (I-b) wherein A is an oxygen atom is also preferable. Furthermore, a compound of the formula (I-b) wherein A is a sulfur atom is also preferable. Moreover, a compound of the formula (I-b) wherein A is a selenium atom is also preferable.

The transition metal compound (A-1) represented by the formula (I) wherein Q is a nitrogen atom and $R^3$ and $R^4$ are bonded to form an aromatic ring is represented by the following formula (I-c):

(I-c)

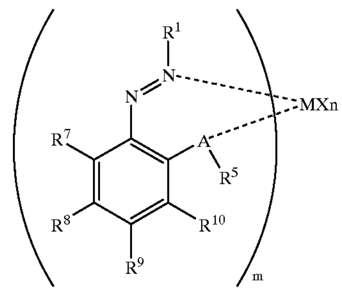

wherein M, m, A, $R^1$, $R^5$, $R^6$, n and X have the same meanings as those of M, m, A, $R^1$, $R^5$, $R^6$, n and X in the formula (I), $R^7$ to $R^{10}$ have the same meanings as those of $R^1$ to $R^6$ in the formula (I), and $R^1$ and $R^5$ to $R^{10}$ may be the same or different, two or more of them may be bonded to each other to form a ring, and when m is 2 or greater, $R^1$s, $R^5$s, $R^6$s, $R^7$s, $R^8$s, $R^9$s, or $R^{10}$s may be the same or different, and one group of $R^1$ and $R^5$ to $R^{10}$ contained in one ligand and one group of $R^1$ and $R^5$ to $R^{10}$ contained in other ligands may be bonded.

The transition metal compound (A-1) represented by the formula (I-c) is preferably a compound of the formula (I-c) wherein M is a transition metal atom selected from Group 3 to Group 5 and Group 8 to Group 10 of the periodic table. Also preferable is a compound of the formula (I-c) wherein A is a nitrogen atom having a substituent $R^6$. Further, a compound of the formula (I-c) wherein A is an oxygen atom is also preferable. Furthermore, a compound of the formula (I-c) wherein A is a sulfur atom is also preferable. Moreover, a compound of the formula (I-c) wherein A is a selenium atom is also preferable.

The other embodiment of the olefin polymerization catalyst according to the invention comprises a transition metal compound (A-2) represented by the following formula (II):

(II)

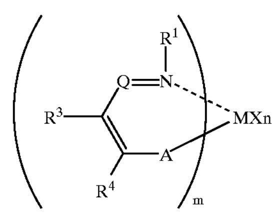

wherein

M is a transition metal atom of Group 3 to Group 11 of the periodic table, m is an integer of 1 to 6, Q is a nitrogen atom or a carbon atom having a substituent $R^2$, A is an oxygen atom, a sulfur atom, a selenium atom or a nitrogen atom having a substituent $R^6$, $R^1$ to $R^4$ and $R^6$ may be the same or different, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, two or more of them may be bonded to each other to form a ring, and when m is 2 or greater, $R^1$s, $R^2$s, $R^3$s, $R^4$s, or $R^6$s may be the same or different, and one group of $R^1$ to $R^4$ and $R^6$ contained in one ligand and one group of $R^1$ to $R^4$ and $R^6$ contained in other ligands may be bonded, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, Xs may be the same or different, and Xs may be bonded to each other to form a ring.

The transition metal compound (A-2) represented by the formula (II) wherein Q is a carbon atom having a substituent $R^2$ is represented by the following formula (II-a):

(II-a)

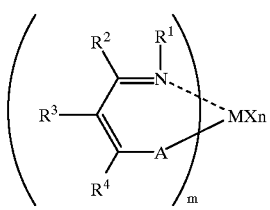

wherein M, m, A, $R^1$ to $R^4$, $R^6$, n and X have the same meanings as those of M, m, A, $R^1$ to $R^4$, $R^6$, n and X in the formula (II).

The transition metal compound (A-2) represented by the formula (II-a) is preferably a compound of the formula (II-a) wherein M is a transition metal atom selected from the group consisting of titanium, zirconium and hafnium. Also preferable is a compound of the formula (II-a) wherein A is a nitrogen atom having a substituent $R^6$ and $R^6$ is a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group. Further, a compound of the formula (II-a) wherein A is an oxygen atom is also preferable. Furthermore, a compound of the formula (II-a) wherein A is a sulfur atom is also preferable. Moreover, a compound of the formula (II-a) wherein A is a selenium atom is also preferable.

The transition metal compound (A-2) represented by the formula (II-a) wherein $R^3$ and $R^4$ are bonded to form an aromatic ring is represented by the following formula (II-b):

(II-b)

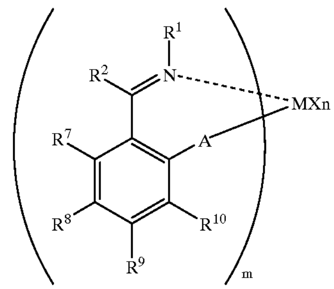

wherein M, m, A, $R^1$, $R^2$, $R^6$, n and X have the same meanings as those of M, m, A, $R^1$, $R^2$, $R^6$, n and X in the formula (II), when m is 1, A is a sulfur atom, a selenium atom or a nitrogen atom having a substituent $R^6$, and when m is 2 or greater, As may be the same or different, they are each an oxygen atom, a sulfur atom, a selenium atom or a nitrogen atom having a substituent $R^6$, and at least one A is a sulfur atom, a selenium atom or a nitrogen atom having a substituent $R^6$, $R^7$ to $R^{10}$ have the same meanings as those of $R^1$ to $R^4$ and $R^6$ in the formula (II), and $R^1$, $R^2$ and $R^6$ to $R^{10}$ may be the same or different, two or more of them may be bonded to each other to form a ring, and when m is 2 or greater, $R^1$s, $R^2$s, $R^6$s, $R^7$s, $R^8$s, $R^9$s, or $R^{10}$s may be the same or different, and one group of $R^1$, $R^2$ and $R^6$ to $R^{10}$ contained in one ligand and one group of $R^1$, $R^2$ and $R^6$ to $R^{10}$ contained in other ligands may be bonded.

The transition metal compound (A-2) represented by the formula (II-b) is preferably a compound of the formula (II-b) wherein M is a transition metal atom selected from the group consisting of titanium, zirconium and hafnium. Also preferable is a compound of the formula (II-b) wherein A is a nitrogen atom having a substituent $R^6$ and $R^6$ is a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group. Further, a compound of the formula (II-b) wherein A is an oxygen atom is also preferable. Furthermore, a compound of the formula (II-b) wherein A is a sulfur atom is also preferable. Moreover, a compound of the formula (II-b) wherein A is a selenium atom is also preferable.

The transition metal compound (A-2) represented by the formula (II) wherein Q is a nitrogen atom and $R^3$ and $R^4$ are bonded to form an aromatic ring is represented by the following formula (II-c):

(II-c)

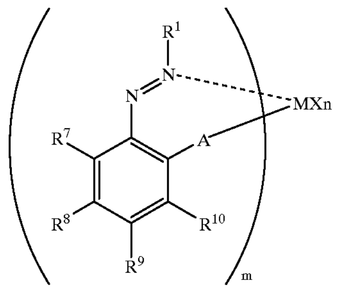

wherein M, m, A, $R^1$, $R^6$, n and X have the same meanings as those of M, m, A, $R^1$, $R^6$, n and X in the formula (II), $R^7$ to $R^{10}$ have the same meanings as those of $R^1$ to $R^4$ and $R^6$ in the formula (II), and $R^1$ and $R^6$ to $R^{10}$ may be the same or different, two or more of them may be bonded to each other to form a ring, and when m is 2 or greater, $R^1$s, $R^6$s, $R^7$s, $R^8$s, $R^9$s, or $R^{10}$s may be the same or different, and one group of $R^1$ and $R^6$ to $R^{10}$ contained in one ligand and one group of $R^1$ and $R^6$ to $R^{10}$ contained in other ligands may be bonded.

The transition metal compound (A-2) represented by the formula (II-c) is preferably a compound of the formula (II-c) wherein M is a transition metal atom selected from Group 3 to Group 5 and Group 8 to Group 10 of the periodic table. Also preferable is a compound of the formula (II-c) wherein A is a nitrogen atom having a substituent $R^6$. Further, a compound of the formula (II-c) wherein A is an oxygen atom is also preferable. Furthermore, a compound of the formula (II-c) wherein A is a sulfur atom is also preferable. Moreover, a compound of the formula (II-c) wherein A is a selenium atom is also preferable.

The olefin polymerization catalyst according to the invention can further comprise, in addition to the transition metal compound (A-1) or (A-2), at least one compound (B) selected from the group consisting of:

(B-1) an organometallic compound, (B-2) an organoaluminum oxy-compound, and (B-3) a compound which reacts with the transition metal compound (A-1) or (A-2) to form an ion pair.

The olefin polymerization catalyst according to the invention can further comprise a carrier (C) in addition to the transition metal compound (A-1) or A-2) and the compound (B).

BEST MODE FOR CARRYING OUT THE INVENTION

Figure 1:
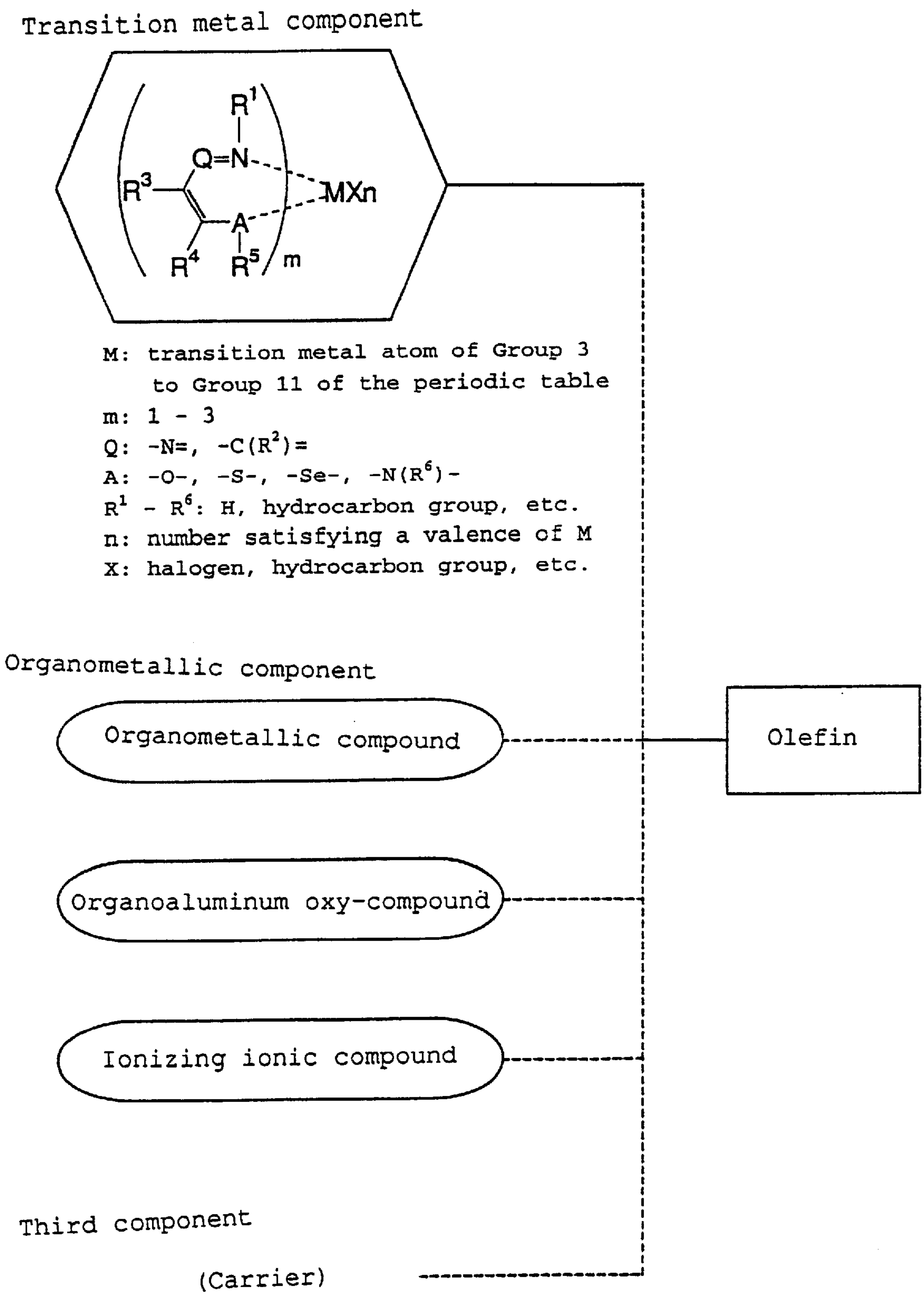
FIG. 1 and FIG. 2 are each an explanatory view showing an example of a process for preparing the olefin polymerization catalyst according to the invention.

The first embodiment of the olefin polymerization catalyst according to the invention comprises a transition metal compound (A-1) represented by the following formula (I).

(I)

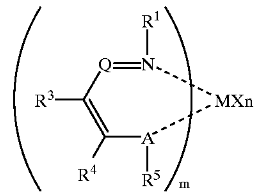

In the formula (I), each of the dotted lines (— — —) of N— — —M and A— — —M means that a coordinate bond is formed or is not formed, but it is preferable that at least one of them is a coordinate bond.

The coordinate bond can be confirmed by NMR, IR, X-ray crystal structure analysis or the like.

In the formula (I), M is a transition metal atom of Group 3 (including lanthanoid) to Group 11 of the periodic table. Examples of such metal atoms include scandium, yttrium, lanthanoid, titanium, zirconium, hafnium, vanadium, niobium, tantalum, chromium, molybdenum, tungsten, manganese, rhenium, iron, ruthenium, cobalt, rhodium, nickel and palladium. Of these, preferable are metal atoms of Group 3 to Group 5 and Group 8 to Group 10, such as scandium, lanthanoid, titanium, zirconium, hafnium, vanadium, niobium, tantalum, iron, cobalt, rhodium, nickel and palladium. More preferable are metal atoms of Group 4, Group 5 and Group 8 to Group 10, such as titanium, zirconium, hafnium, vanadium, niobium, tantalum, iron, cobalt, rhodium, nickel and palladium. Particularly preferable are metal atoms of Group 8 to Group 10, such as iron, cobalt, rhodium, nickel and palladium.

m is an integer of 1 to 3, preferably an integer of 1 to 2.

Q is a nitrogen atom (—N═) or a carbon atom having a substituent $R^2$ (—C($R^2$)═).

A is an oxygen atom (—O—), a sulfur atom (—S—), a selenium atom (—Se—) or a nitrogen atom having a substituent $R^6$ (—N($R^6$)—).

$R^1$ to $R^6$ may be the same or different, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring.

$R^1$ to $R^6$ are each preferably a hydrogen atom, a halogen atom, a hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonato ester group, a sulfonamido group, a cyano group, a nitro group, a carboxyl group, a sulfo group, a mercapto group or a hydroxyl group.

The halogen atoms include fluorine, chlorine, bromine and iodine.

Examples of the hydrocarbon groups include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; straight-chain or branched alkenyl groups of 2 to 30 carbon atoms, preferably 2 to 20 carbon atoms, such as vinyl, allyl and isopropenyl; straight-chain or branched alkynyl groups of 2 to 30 carbon atoms, preferably 2 to 20 carbon atoms, such as ethynyl and propargyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; cyclic unsaturated hydrocarbon groups of 5 to 30 carbon atoms, such as cyclopentadienyl, indenyl and fluorenyl; aryl groups of 6 to 30 carbon atoms, preferably 6 to 20 carbon atoms, such as phenyl, benzyl, naphthyl, biphenyl, terphenyl, phenanthryl and anthracenyl; and alkyl-substituted aryl groups, such as tolyl, isopropylphenyl, t-butylphenyl, dimethylphenyl and di-t-butylphenyl.

In the above hydrocarbon groups, the hydrogen atom may be replaced with a halogen atom, and examples of these halogenated hydrocarbon groups of 1 to 30 carbon atoms, preferably 1 to 20 carbon atoms, include trifluoromethyl, pentafluorophenyl and chlorophenyl.

In the above hydrocarbon groups, the hydrogen atom may also be replaced with another hydrocarbon group, and examples of these aryl-substituted alkyl groups include benzyl and cumyl.

Further, the above hydrocarbon groups may have heterocyclic compound residual groups; oxygen-containing groups, such as an alkoxy group, an aryloxy group, an ester group, an ether group, an acyl group, a carboxyl group, a carbonato group, a hydroxyl group, a peroxy group and a carboxylic anhydride group; nitrogen-containing groups, such as an amino group, an imino group, an amido group, an imido group, a hydrazino group, a hydrazono group, a nitro group, a nitroso group, a cyano group, an isocyano group, a cyanato group, an amidino group, a diazo group and ammonium salts derived from an amino group; boron-containing groups, such as a boranediyl group, a boranetriyl group and a diboranyl group; sulfur-containing groups, such as a mercapto group, a thioester group, a dithioester group, an alkylthio group, an arylthio group, a thioacyl group, a thioether group, a thiocyanato group, an isothiocyanato group, a sulfonato ester group, a sulfonamido group, a thiocarboxyl group, a dithiocarboxyl group, a sulfo group, a sulfonyl group, a sulfinyl group and a sulfenyl group; phosphorus-containing groups, such as a phosphido group, a phosphoryl group, a thiophosphoryl group and a phosphato group; silicon-containing groups; germanium-containing groups; or tin-containing groups.

Of the above groups, preferable are straight-chain or branched alkyl groups of 1 to 30 carbon atoms, preferably 1 to 20 carbon atoms, such as methyl, ethyl, n-propyl, isopropyl, n-butyl, isobutyl, sec-butyl, t-butyl, neopentyl and n-hexyl; aryl groups of 6 to 30 carbon atoms, preferably 6 to 20 carbon atoms, such as phenyl, naphthyl, biphenyl, terphenyl, phenanthryl and anthryl; and substituted aryl groups such as the above aryl groups which are substituted with 1 to 5 substituents such as halogen atoms, alkyl or alkoxy groups of 1 to 30 carbon atoms, preferably 1 to 20 carbon atoms, and aryl or aryloxy groups of 6 to 30 carbon atom, preferably 6 to 20 carbon atoms.

Examples of the heterocyclic compound residual groups include residual groups of nitrogen-containing compounds (e.g., pyrrole, pyridine, pyrimidine, quinoline and triazine), oxygen-containing compounds (e.g., furan and pyran) and sulfur-containing compounds (e.g., thiophene), and these heterocyclic compound residual groups which are substituted with substituents such as alkyl or alkoxy groups of 1 to 30 carbon atoms, preferably 1 to 20. carbon atoms.

Examples of the oxygen-containing groups, nitrogen-containing groups, sulfur-containing groups and phosphorus-containing groups indicated by $R^1$ to $R^{16}$ include those previously described as substituents which may be contained in the hydrocarbon groups.

Examples of the silicon-containing groups include a silyl group, a siloxy group, a hydrocarbon-substituted silyl group and a hydrocarbon-substituted siloxy group. Particular examples of the hydrocarbon-substituted silyl groups include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl(pentafluorophenyl)silyl. Of these, preferable are methylsilyl, dimethylsilyl, trimethylsilyl, ethylsilyl, diethylsilyl, triethylsilyl, dimethylphenylsilyl and triphenylsilyl. Particularly preferable are trimethylsilyl, triethylsilyl, triphenylsilyl and dimethylphenylsilyl. Particular examples of the hydrocarbon-substituted siloxy groups include trimethylsiloxy.

Examples of the germanium-containing groups or the tin-containing groups include groups wherein silicon is replaced with germanium or tin in the above-mentioned silicon-containing groups.

The above examples of the groups indicated by $R^1$ to $R^6$ are more specifically described below.

Of the oxygen-containing groups, preferred examples of the alkoxy. groups include methoxy, ethoxy, n-propoxy, isopropoxy, n-butoxy, isobutoxy and tert-butoxy; preferred examples of the aryloxy groups include phenoxy, 2,6-dimethylphenoxy and 2,4,6-trimethylphenoxy; preferred examples of the acyl groups include formyl, acetyl, benzoyl, p-chlorobenzoyl and p-methoxybenzoyl; and preferred examples of the ester groups include acetyloxy, benzoyloxy, methoxycarbonyl, phenoxycarbonyl and p-chlorophenoxycarbonyl.

Of the nitrogen-containing groups, preferred examples of the amido groups include acetamido, N-methylacetamido and N-methylbenzamido; preferred examples of the amino groups include dimethylamino, ethylmethylamino and diphenylamino; preferred examples of the imido groups include acetimido and benzimido; and preferred examples of the imino groups include methylimino, ethylimino, propylimino, butylimino and phenylimino.

Of the sulfur containing groups, preferred examples of the alkylthio groups include methylthio and ethylthio; preferred examples of the arylthio groups include phenylthio, methylphenylthio and naphthylthio; preferred examples of the thioester groups include acetylthio, benzoylthio, methylthiocarbonyl and phenylthiocarbonyl; preferred examples of sulfonato ester groups include methylsulfonato, ethylsulfonato and phenylsulfonato; and preferred examples of the sulfonamido groups include phenylsulfonamido, N-methylsulfonamido and N-methyl-p-toluenesulfonamido.

Two or more groups of $R^1$ to $R^6$, preferably adjacent groups, may be bonded to each other to form an aliphatic ring, an aromatic ring or a hydrocarbon ring containing a hetero atom such as a nitrogen atom. These rings may further have a substituent.

In the formula (I), when m is 2 or greater, $R^1$s, $R^2$s, $R^3$s, $R^4$s, $R^5$s, or $R^6$s may be the same or different.

When m is 2 or greater, one group of $R^1$ to $R^6$ contained in one ligand and one group of $R^1$ to $R^6$ contained in other ligands may be linked together. In this case, it is preferable that the main chain of the bonding group formed by linking together such groups of $R^1$ to $R^6$ is constituted of 3 or more atoms.

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group.

n is a number satisfying a valence of M, specifically an integer of 0 to 5, preferably an integer of 1 to 4, more preferably an integer of 1 to 3.

When n is 2 or greater, plural groups X may be the same or different, and X may be bonded to each other to form a ring.

The halogen atoms include fluorine, chlorine, bromine and iodine.

Examples of the hydrocarbon groups include the same groups as previously described with respect to $R^1$ to $R^6$. Specifically, there can be mentioned alkyl groups, such as methyl, ethyl, propyl, butyl, hexyl, octyl, nonyl, dodecyl and eicosyl; cycloalkyl groups of 3 to 30 carbon atoms, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthol, methylnaphthyl, anthryl and phenanthryl, but not limited thereto. The hydrocarbon groups may also include halogenated hydrocarbon groups, specifically, those of 1 to 30 carbon atoms in which at least one hydrogen is replaced with halogen. Of these, preferable are hydrocarbon groups of 1 to 20 carbon atoms.

Examples of the heterocyclic compound residual groups include the same groups as previously described with respect to $R^1$ to $R^6$.

Examples of the oxygen-containing groups include the same groups as previously described with respect to $R^1$ to $R^6$. Specifically, there can be mentioned a hydroxyl group; alkoxy groups, such as methoxy, ethoxy, propoxy and butoxy; aryloxy groups, such as phenoxy, methylphenoxy, dimethylphenoxy and naphthoxy; arylalkoxy groups, such as phenylmethoxy and phenylethoxy; an acetoxy group; and a carbonyl group, but not limited thereto.

Examples of the sulfur-containing groups include the same groups as previously described with respect to $R^1$ to $R^6$. Specifically, there can be mentioned sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; sulfinato groups, such as methylsulfinato, phenylsulfinato, benzylsulfinato, p-toluenesulfinato, trimethylbenzenesulfinato and pentafluorobenzenesulfinato; alkylthio groups; and arylthio groups, but not limited thereto.

Examples of the nitrogen-containing groups include the same groups as previously described with respect to $R^1$ to $R^6$. Specifically, there can be mentioned an amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino, but not limited thereto.

Examples of the boron-containing groups include $BR_4$ (R is hydrogen, an alkyl group, an aryl group which may have a substituent, a halogen atom or the like).

Examples of the phosphorus-containing groups include trialkylphosphine groups, such as trimethylphosphine, tributylphosphine and tricyclohexylphosphine; triarylphosphine groups, such as triphenylphosphine and tritolylphosphine; phosphite groups (phosphido groups), such as methylphosphite, ethylphosphite and phenylphosphite; a phosphonic acid group; and a phosphinic acid group, but not limited thereto.

Examples of the silicon-containing groups include the same groups as previously described with respect to $R^1$ to $R^6$. Specifically, there can be mentioned hydrocarbon-substituted silyl groups, such as phenylsilyl, diphenylsilyl, trimethylsilyl, triethylsilyl, tripropylsilyl, tricyclohexylsilyl, triphenylsilyl, methyldiphenylsilyl, tritolylsilyl and trinaphthylsilyl; hydrocarbon-substituted silyl ether groups, such as trimethylsilyl ether; silicon-substituted alkyl groups, such as trimethylsilylmethyl; and silicon-substituted aryl groups, such as trimethylsilylphenyl.

Examples of the germanium-containing groups include the same groups as previously described with respect to $R^1$ to $R^6$. Specifically, there can be mentioned groups wherein silicon is replaced with germanium in the aforesaid silicon-containing groups.

Examples of the tin-containing groups include the same groups as previously described with respect to $R^1$ to $R^6$. Specifically, there can be mentioned groups wherein silicon is replaced with tin in the aforesaid silicon-containing groups.

Examples of the halogen-containing groups include fluorine-containing groups, such as $PF_6$ and $BR_4$; chlorine-containing groups, such as $ClO_4$ and $SbCl_6$; and iodine-containing groups, such as $IO_4$, but not limited to thereto.

Examples of the aluminum-containing groups include $AlR_4$ (R is hydrogen, an alkyl group, an aryl group which may have a substituent, a halogen atom or the like), but not limited thereto.

The transition metal compound (A-1) represented by the formula (I) wherein Q is a carbon atom having a substituent $R^2$ is represented by the following formula (I-a):

(I-a)

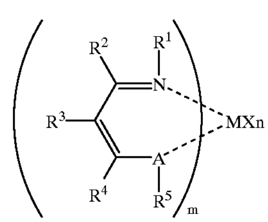

wherein M, m, A, $R^1$ to $R^6$, n and X have the same meanings as those of M, m, A, $R^1$ to $R^6$ n and X in the formula (I).

In the transition metal compound (A-1) represented by the formula (I-a), two or more groups of $R^1$ to $R^6$ may be bonded to form a ring. The compound wherein two or more groups of $R^1$ to $R^6$, e.g., $R^3$ and $R^4$, are bonded to form an aromatic ring is, for example, a compound represented by the following formula (I-b).

(I-b)

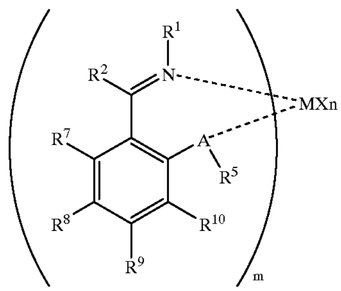

In the above formula, M, m, A, $R^1$, $R^2$, $R^5$, $R^6$, n and X have the same meanings as those of M, m, A, $R^1$, $R^2$, $R^5$, $R^6$, n and X in the formula (I).

$R^7$ to $R^{10}$ have the same meanings as those of $R^1$ to $R^6$ in the formula (I).

$R^1$, $R^2$ and $R^5$ to $R^{10}$ may be the same or different, two or more of them may be bonded to each other to form a ring, and when m is 2 or greater, $R^1$s, $R^2$s, $R^5$s, $R^6$s, $R^7$s, $R^8$s, $R^9$s, or $R^{10}$s may be the same or different, and one group of $R^1$, $R^2$ and $R^5$ to $R^{10}$ contained in one ligand and one group of $R^1$, $R^2$ and $R^5$ to $R^{10}$ contained in other ligands may be bonded.

The transition metal compound (A-1) represented by the formula (I-a) wherein m is 2 and one group of $R^1$ to $R^6$ contained in one ligand and one group of $R^1$ to $R^6$ contained in the other ligand are bonded is, for example, a compound represented by the following formula (I-a').

(I-a')

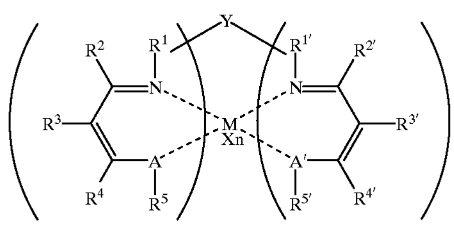

In the above formula, M, A, $R^1$ to $R^6$, n and X have the same meanings as those of M, A, $R^1$ to $R^6$, n and X in the formula (I).

A' may be the same as or different from A and is an oxygen atom, a sulfur atom, a selenium atom or a nitrogen atom having a substituent $R^{6'}$.

$R^{1'}$ to $R^{6'}$ may be the same or different and have the same meanings as those of $R^1$ to $R^6$.

Two or more groups of $R^{1'}$ to $R^{6'}$, preferably adjacent groups, may be bonded to each other to form an aliphatic ring, an aromatic ring or a hydrocarbon ring containing a hetero atom such as a nitrogen atom.

Y is a bonding group or a single bond for linking at least one group selected from $R^1$ to $R^6$ to at least one group selected from $R^{1'}$ to $R^{6'}$. Although the bonding group is not specifically limited, it preferably has a structure wherein the main chain is constituted of 3 or more atoms, preferably 4 to 20 atoms, particularly preferably 4 to 10 atoms. The bonding group may have a substituent.

The bonding group Y is specifically a group containing at least one element selected from oxygen, sulfur, carbon, nitrogen, phosphorus, silicon, selenium, tin, boron and the like. Examples of such groups include groups containing chalcogen atoms such as —O—, —S— and —Se—; nitrogen- or phosphorus-containing groups, such as —NH—, —$N(CH_3)_2$, —PH— and —$P(CH_3)_2$—; hydrocarbon groups of 1 to 20 carbon atoms, such as —$CH_2$—, —$CH_2$—$CH_2$— and —$C(CH_3)_2$—; residual groups of cyclic unsaturated hydrocarbons of 6 to 20 carbon atoms, such as benzene, naphthalene and anthracene; residual groups of heterocyclic compounds having 3 to 20 carbon atoms and containing hetero atoms, such as pyridine, quinoline, thiophene and furan; silicon atom-containing groups, such as —$SiH_2$— and —$Si(CH_3)_2$—; tin atom-containing groups, such as —$SnH_2$— and —$Sn(CH_3)_2$—; and boron atom-containing groups, such as —BH—, —$B(CH_3)$— and —BF—. Y can also be a single bond.

An example of a compound employable as the olefin polymerization catalyst in the invention is a compound obtained by allowing a compound represented by the following formula (L) to react with a compound represented by MXk (M and X have the same meanings as those of M and X in the formula (I), and k is a number satisfying a valence of M).

(L)

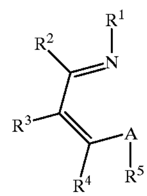

wherein A and $R^1$ to $R^6$ have the same meanings as those of A and $R^1$ to $R^6$ in the formula (I).

Preferred examples of the compounds represented by MXk include $TiCl_3$, $TiCl_4$, $TiBr_3$, $TiBr_4$, $Ti(benzyl)_4$, $Ti(NiMe_2)_4$, $ZrCl_4$, $Zr(NiMe_2)_4$, $Zr(benzyl)_4$, $ZrBr_4$, $HfCl_4$, $HfBr_4$, $VCl_4$, $VCl_5$, $VBr_4$, $VBr_5$, $Ti(acac)_3$, and complexes of these compounds and THF (tetrahydrofuran), acetonitrile or diethyl ether but not limited thereto.

Examples of the transition metal compounds represented by the formula (I-a) are given below, but not limited thereto.

In the following examples, M has the same meaning as that of M in the formula (I-a).

X has the same meaning as that of X in the formula (I-a), and is for example halogen such as Cl or Br, or an alkyl group such as methyl, but not limited thereto. When plural X are present, they may be the same or different.

n has the same meaning as that of n in the formula (I-a), and is decided by a valence of the metal M. For example, when two monoanions are bonded to the metal, there can be mentioned n=0 in case of a divalent metal, n=1 in case of a trivalent metal, n=2 in case of a tetravalent metal, and n=3 in case of a pentavalent metal. More specifically, there can be mentioned n=2 in case of Ti(IV), n=2 in case of Zr(IV), and n=2 in case of Hf(IV).

In the following examples, Me denotes methyl, Et denotes ethyl, iPr denotes i-propyl, tBu denotes tert-butyl, and Ph denotes phenyl.

Examples of the transition metal compounds represented by the formula (I-a) wherein two or more groups of $R^1$ to $R^6$ are boned to form a ring are those wherein $R^3$ and $R^4$ are bonded to form a ring, ie., the compounds represented by the formula (I-b), and particular examples thereof are described first.

Examples of the compounds represented by the formula (I-b) wherein A is an oxygen atom include the following compounds.

-continued
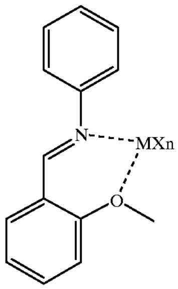
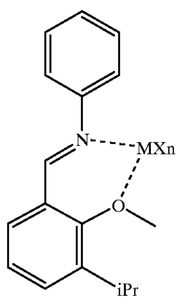
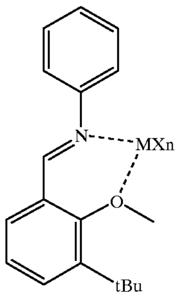
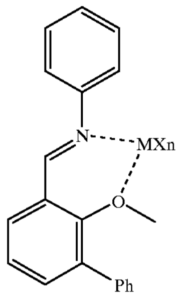
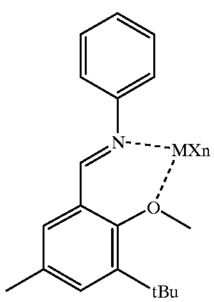
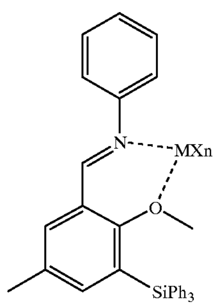
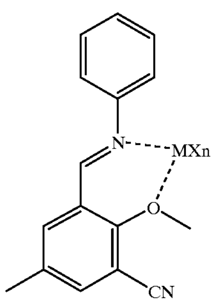
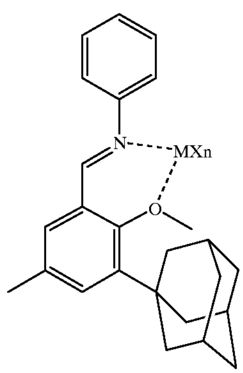
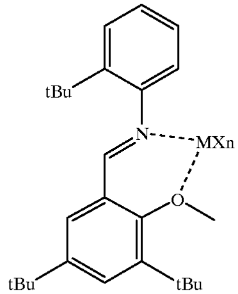
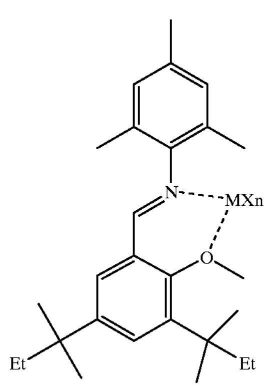
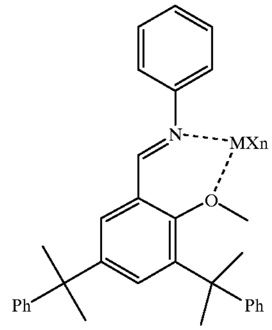
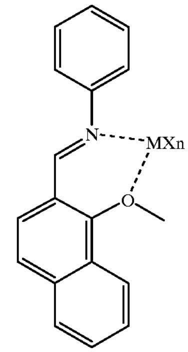
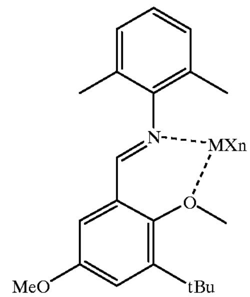
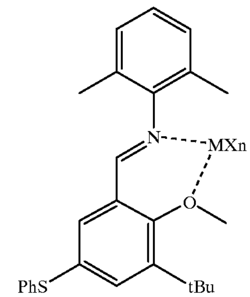
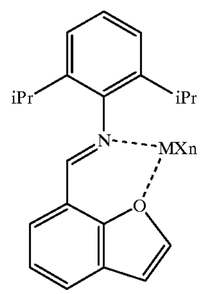
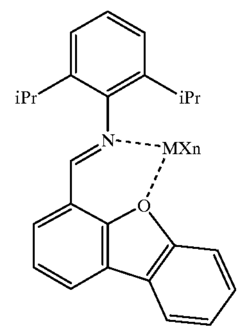
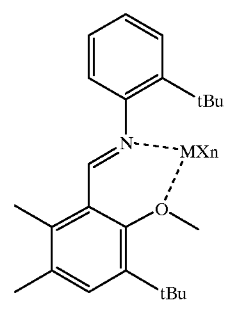
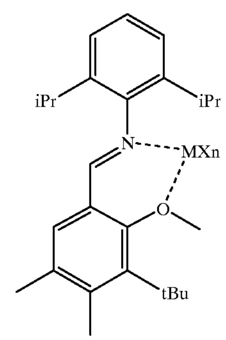
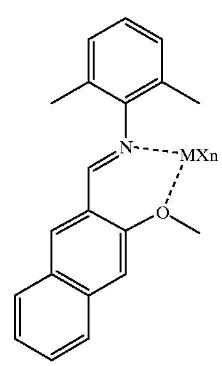
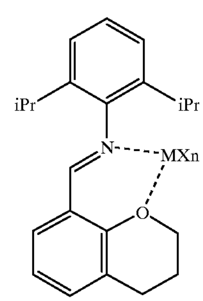

-continued
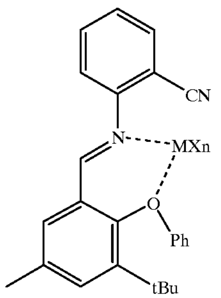
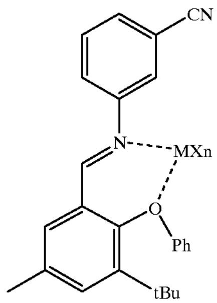
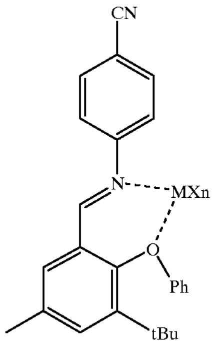
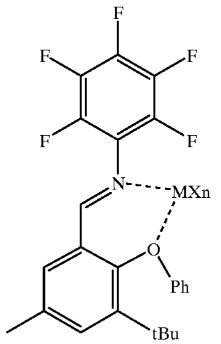
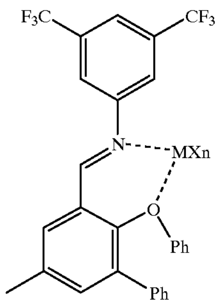
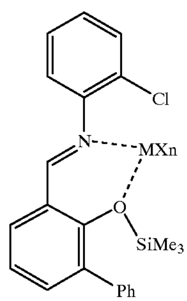
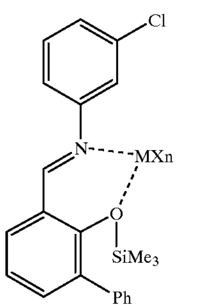
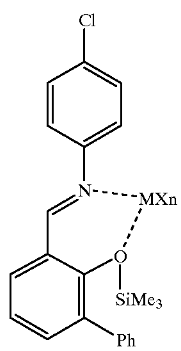
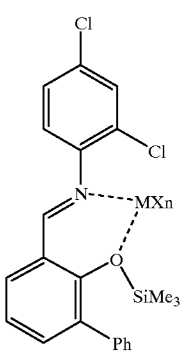
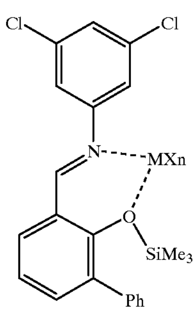
-continued
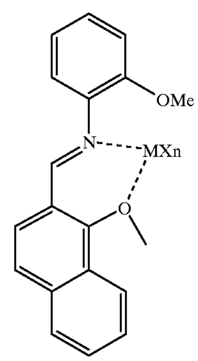
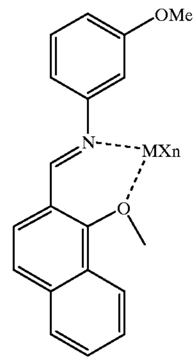
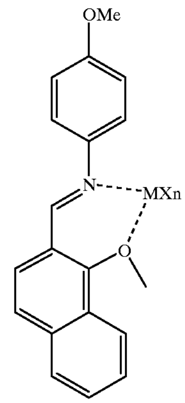
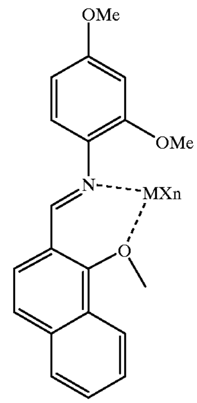
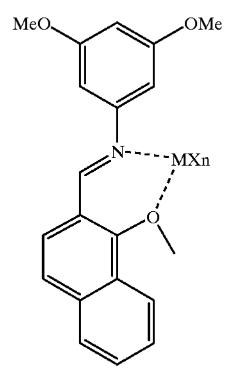
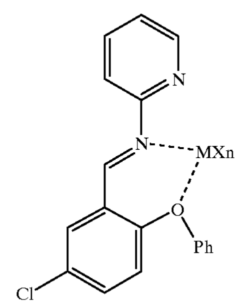
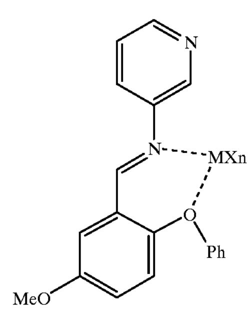
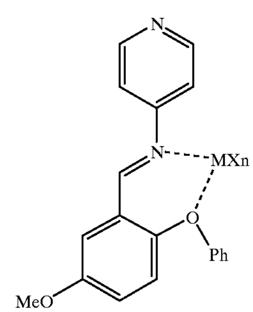

-continued

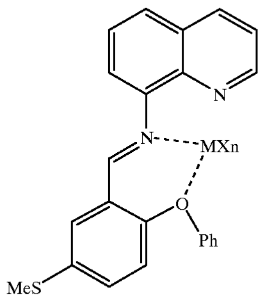

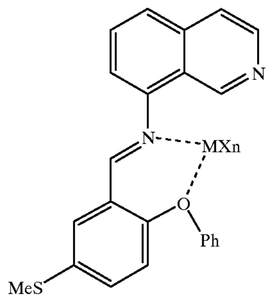

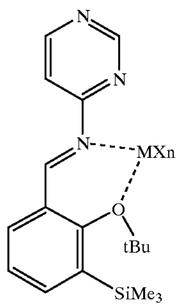

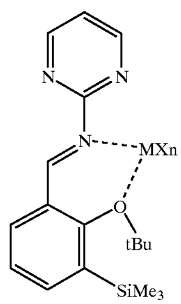

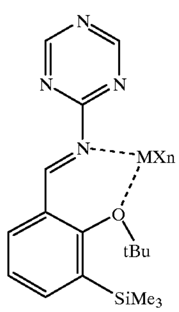

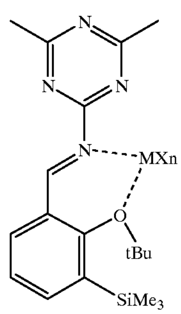

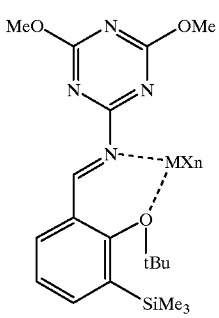

In the above examples, M and n have the same meanings as those of M and n in the formula (I-b). By appropriately selecting M and n, specific compounds are obtained.

For example, consider compounds of the following formula.

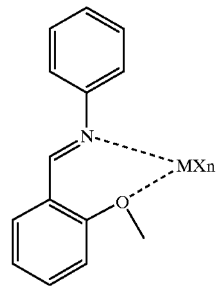

When X in the above formula is chlorine, the following compounds are given according to the selection of M.

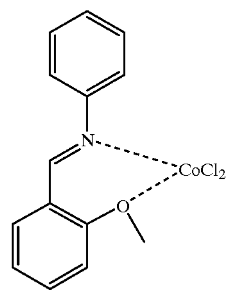

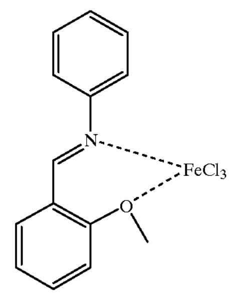

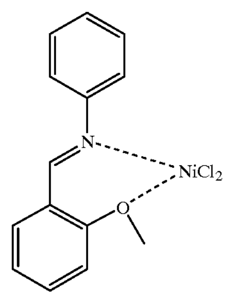

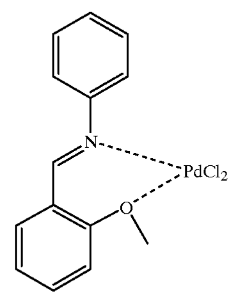

When X in the above formula is bromine, the following compounds are given according to the selection of M.

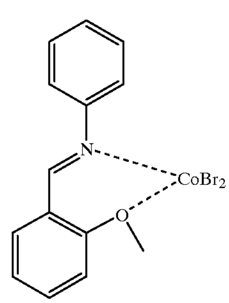

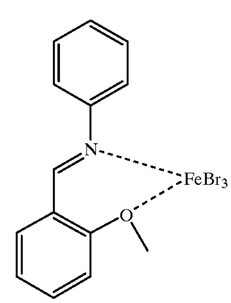

-continued
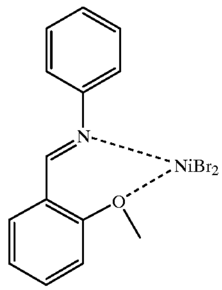
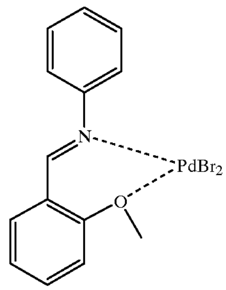
Therefore, from the above-mentioned formulas and the later-described formulas, specific compounds can be easily determined by the selection of M and n.
Examples of the compounds represented by the formula (I-b) wherein A is a sulfur atom include the following compounds.
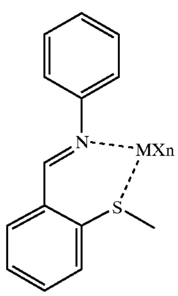
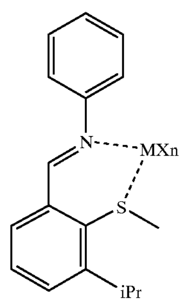
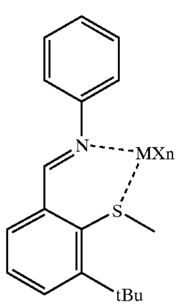
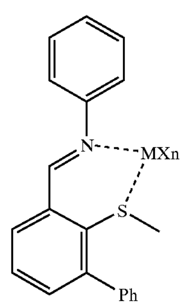
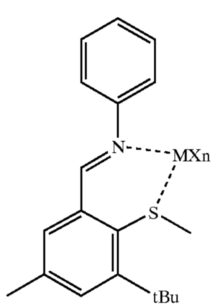
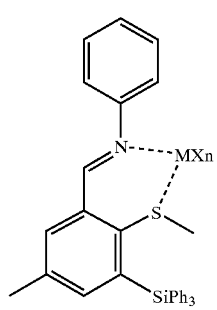
-continued
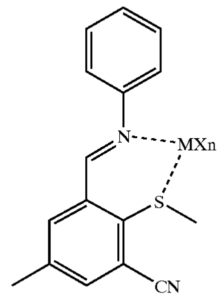
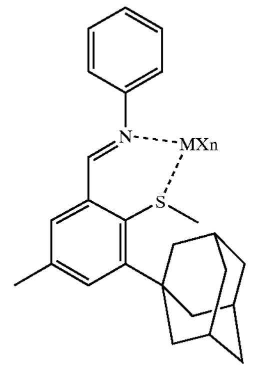
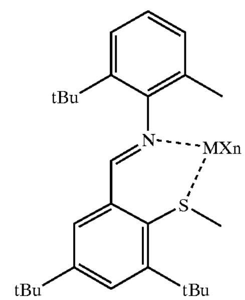
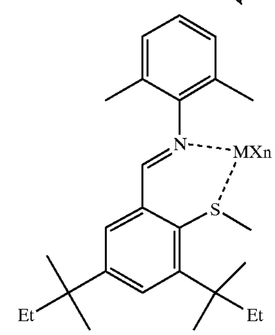
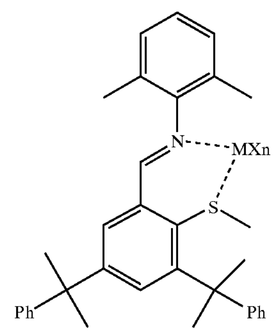
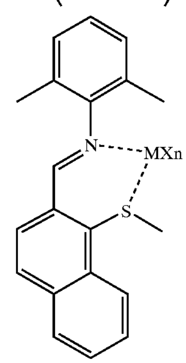
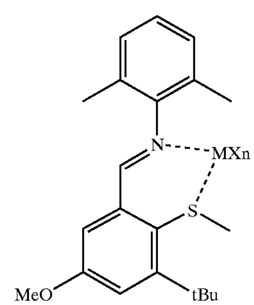
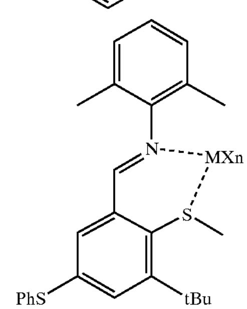
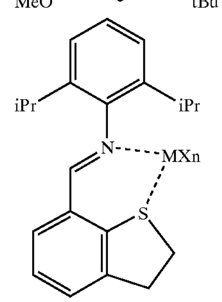
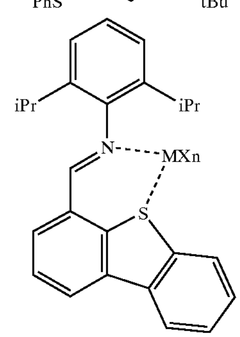

-continued
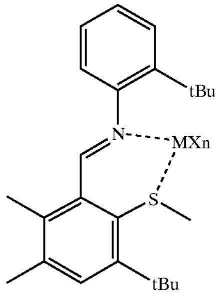
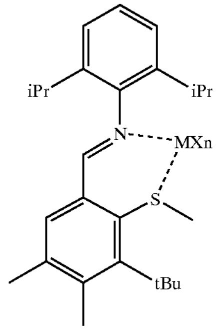
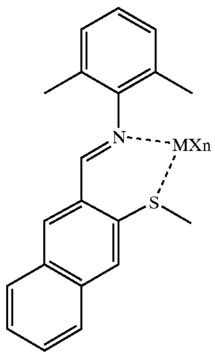
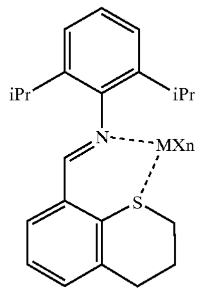
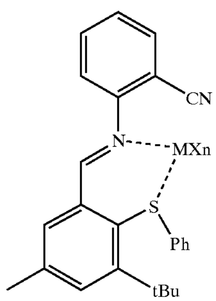
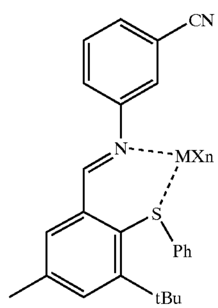
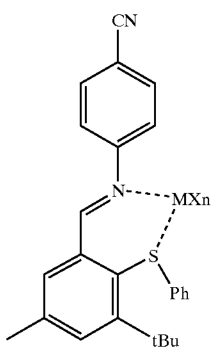
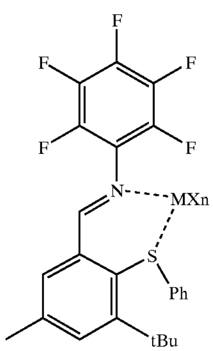
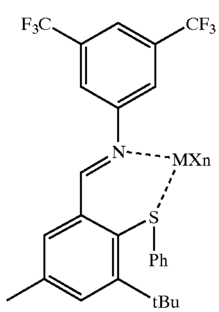
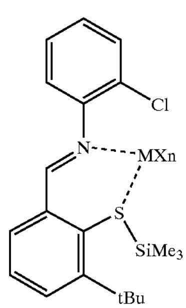
-continued
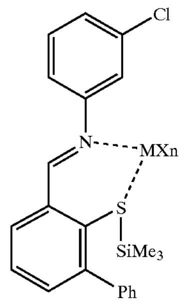
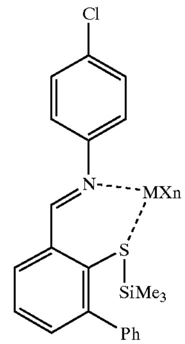
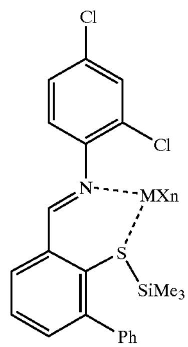
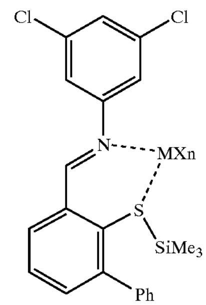
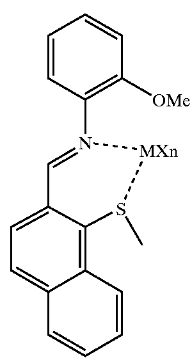
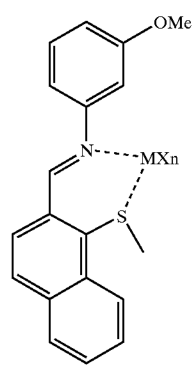
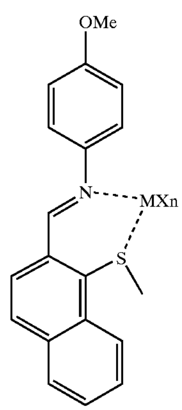
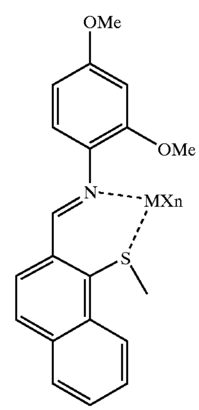

-continued
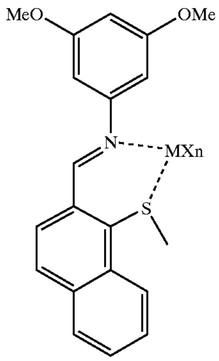
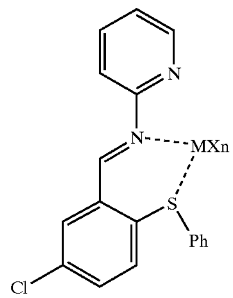
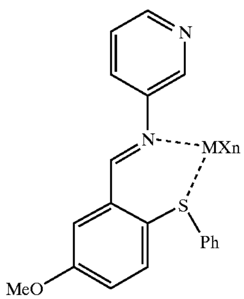
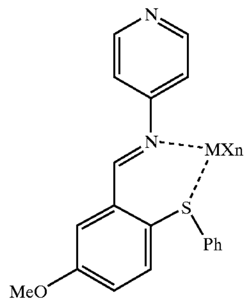
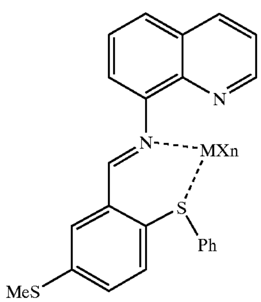
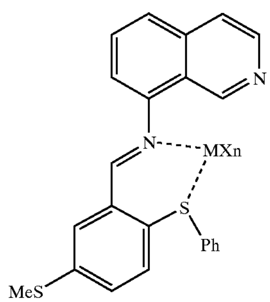
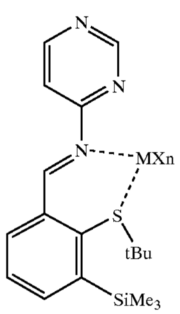
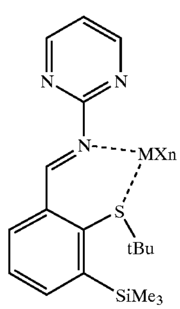
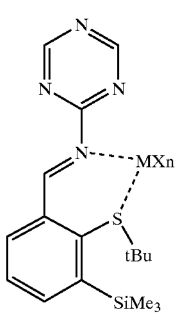
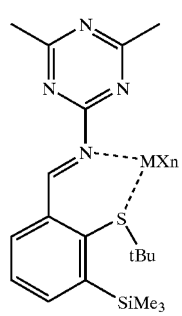
-continued
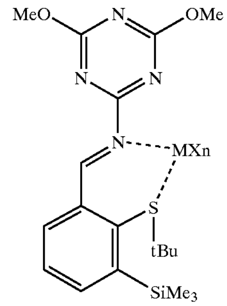
Examples of the compounds represented by the formula (I-b) wherein A is a nitrogen atom having a substituent $R^6$ include the following compounds.
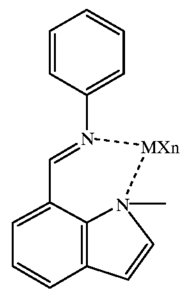
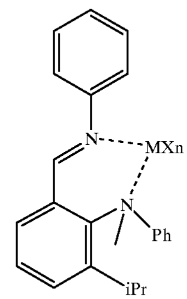
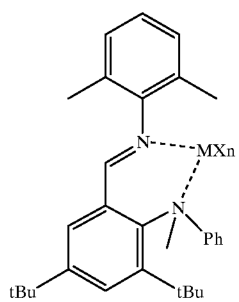
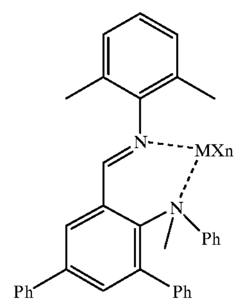
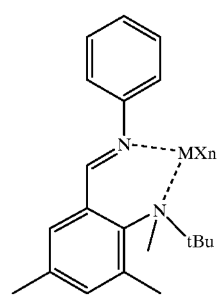
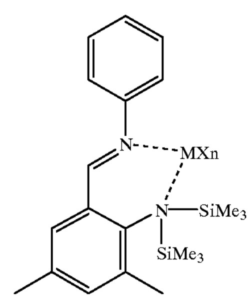
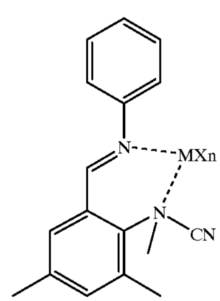
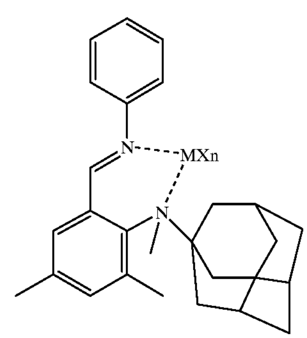

-continued
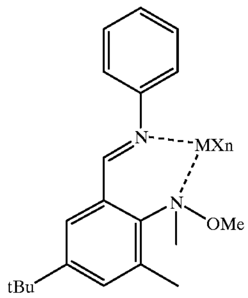
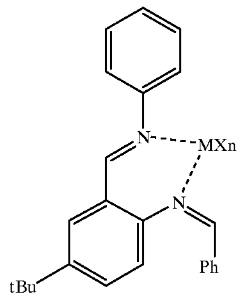
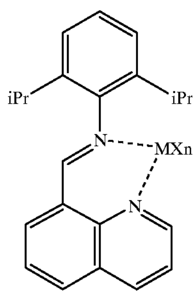
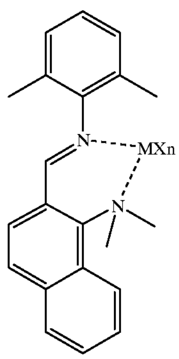
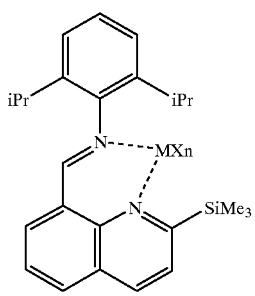
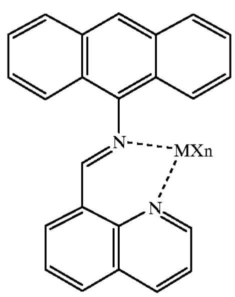
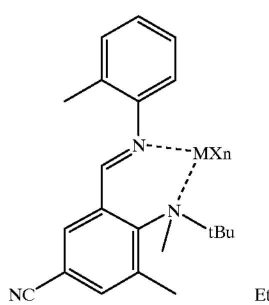
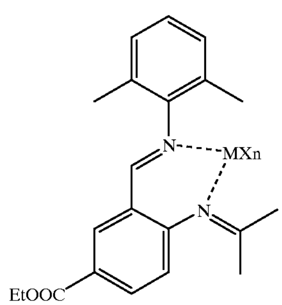
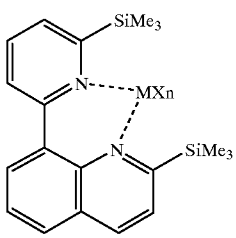
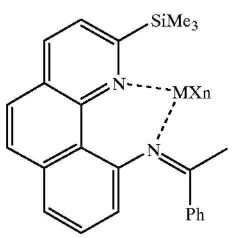
-continued
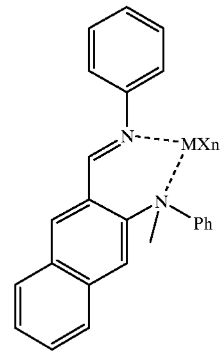
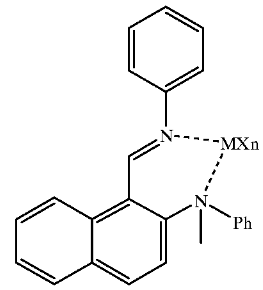
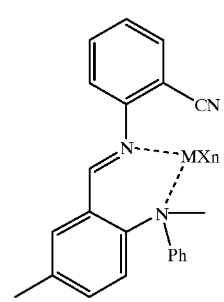
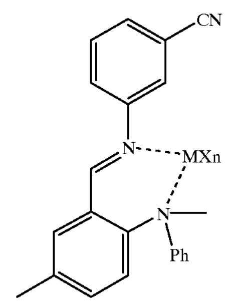
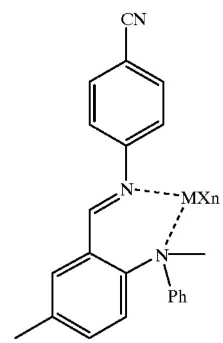
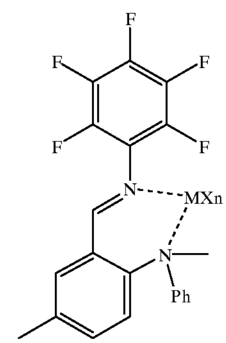
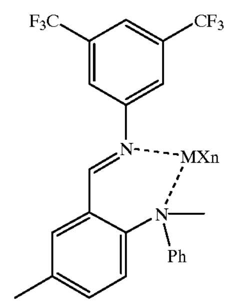
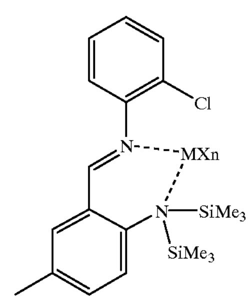
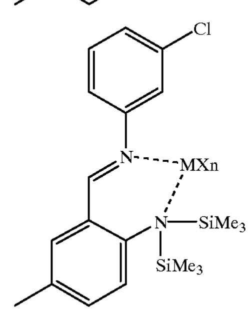
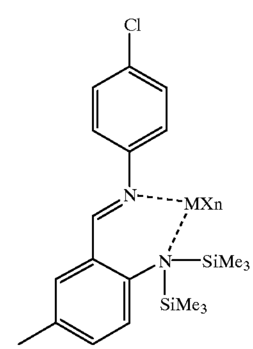

-continued
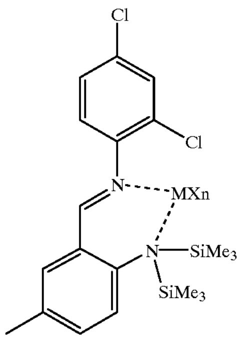
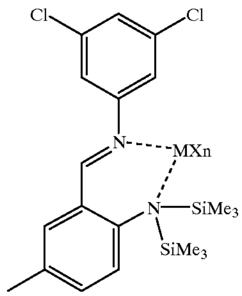
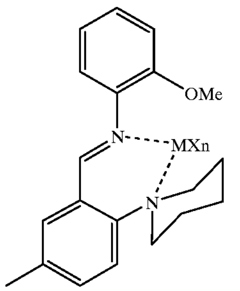
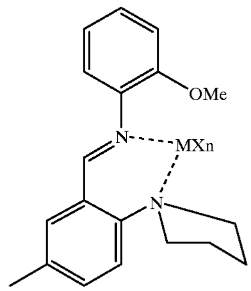
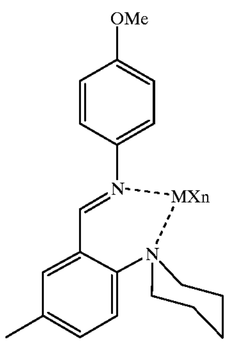
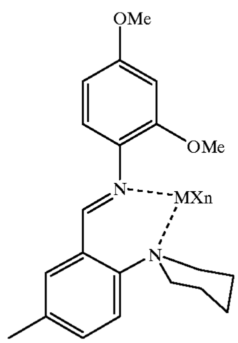
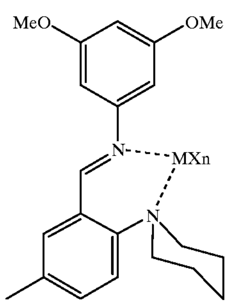
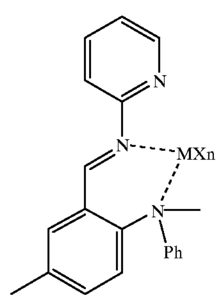
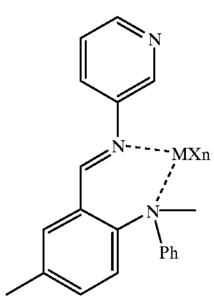
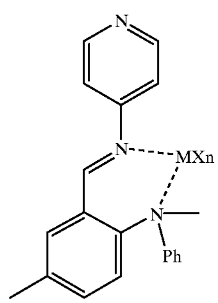
-continued
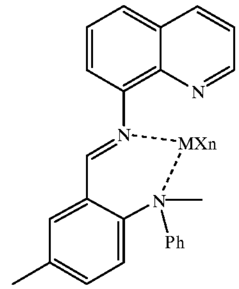
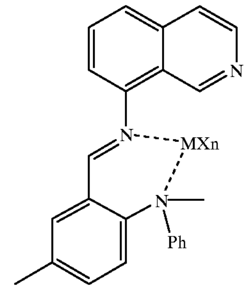
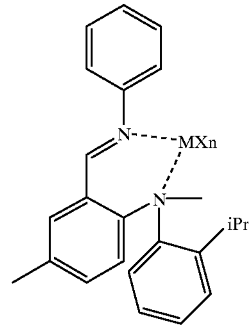
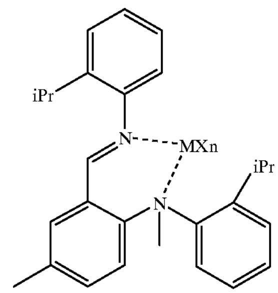
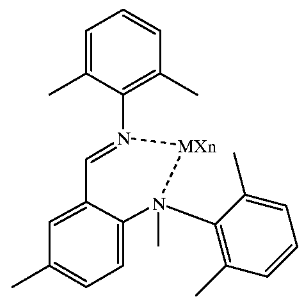
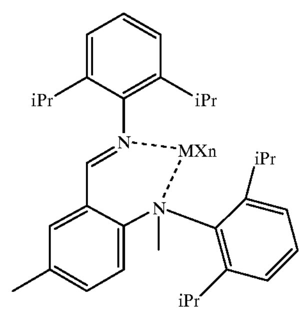
Examples of the compounds represented by the formula (I-b) wherein $R^1$ and $R^2$ are bonded to form an aromatic ring include the following compounds.
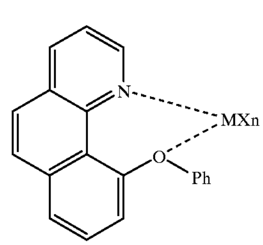
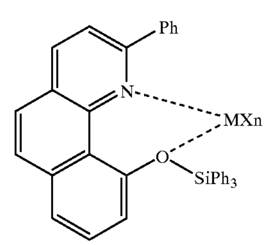

-continued
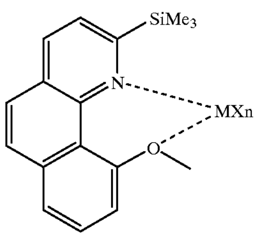
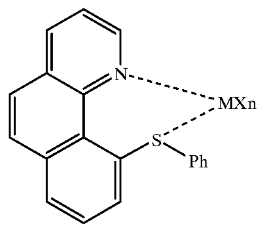
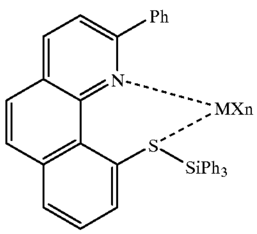
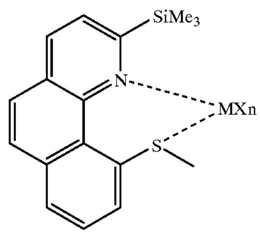
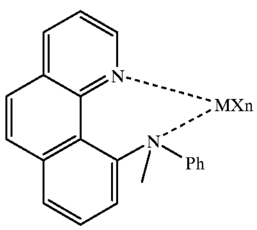
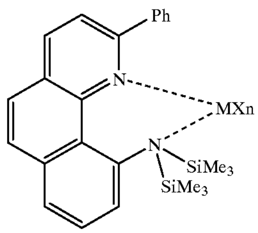
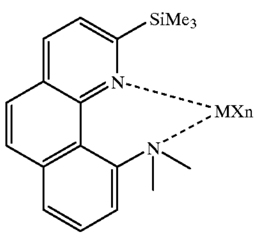
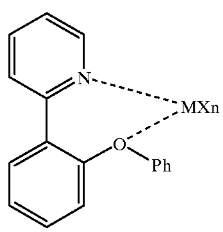
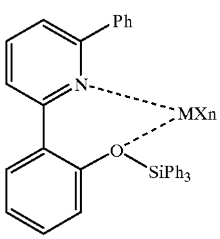
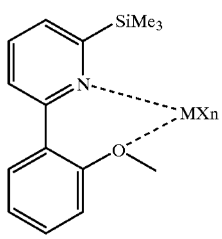
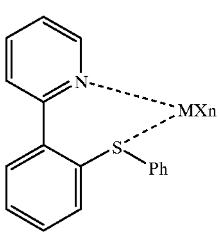
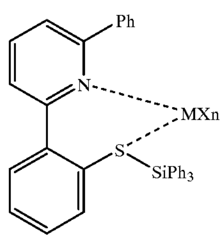
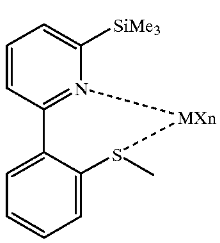
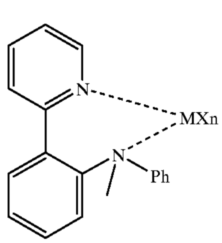
-continued
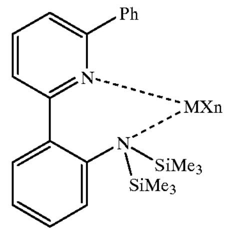
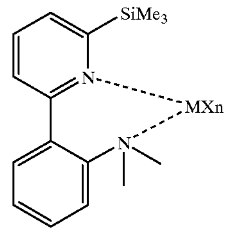
Other examples of the compounds represented by the formula (I-b) are given below.
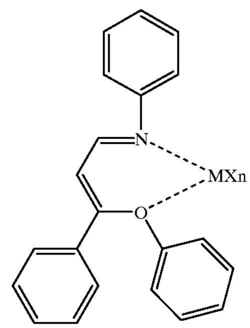
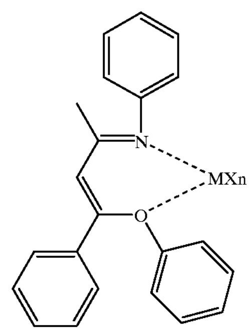
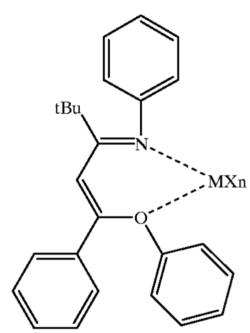
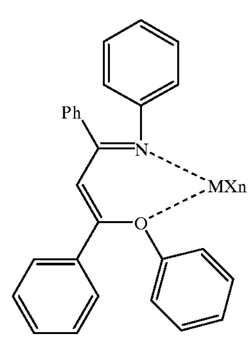

-continued
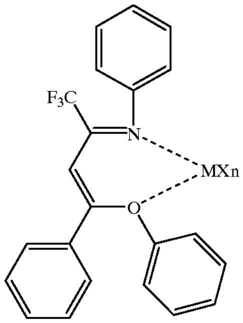
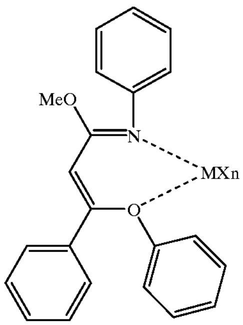
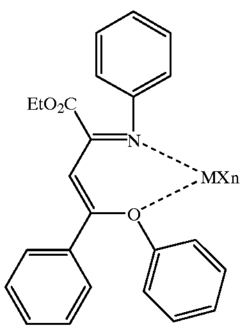
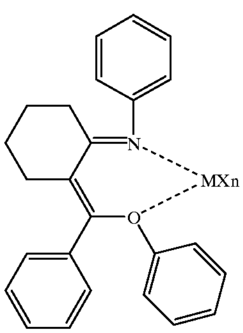
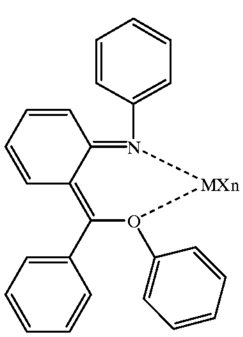
-continued
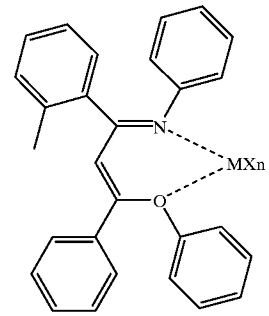
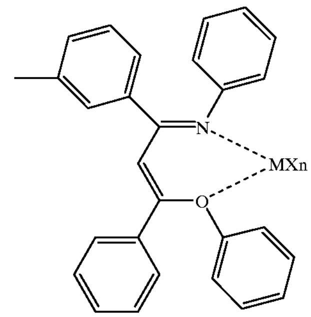
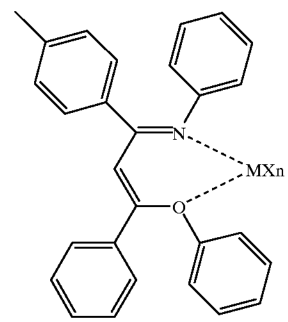
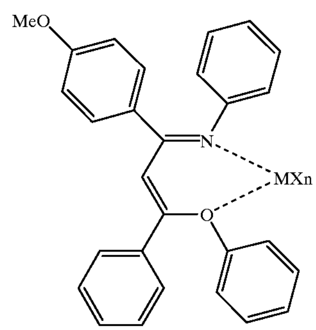
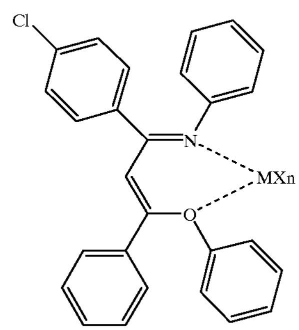

-continued
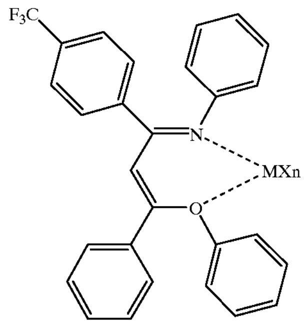
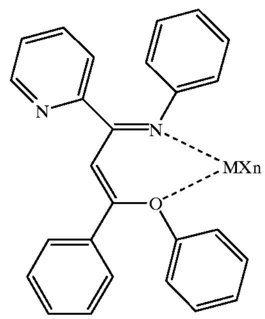
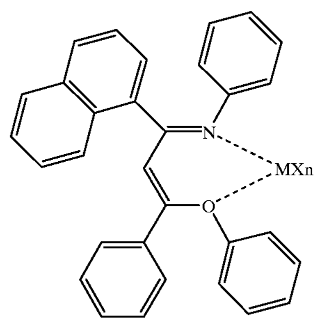
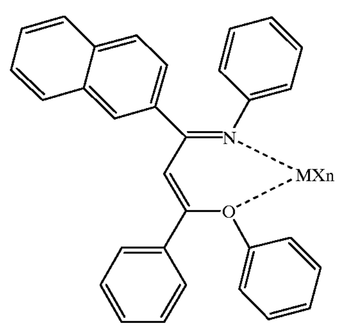
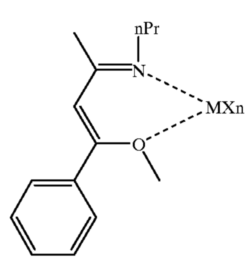
-continued
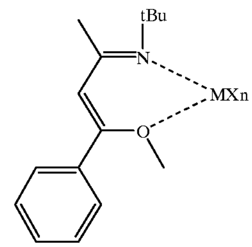
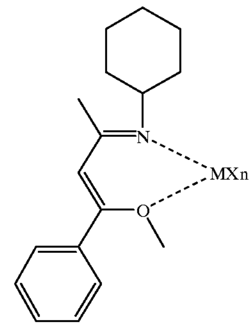
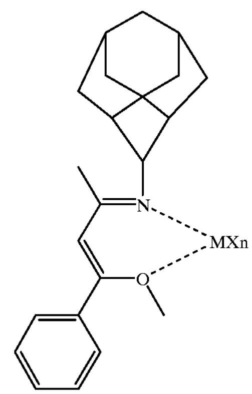
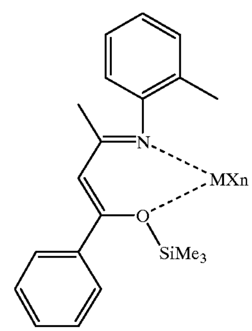
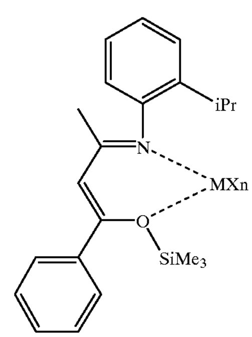

-continued
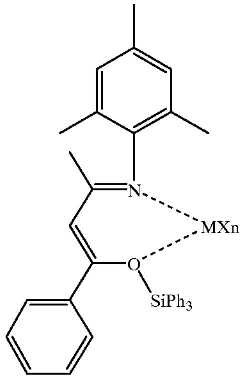
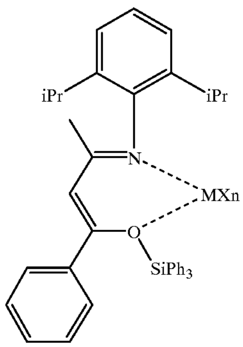
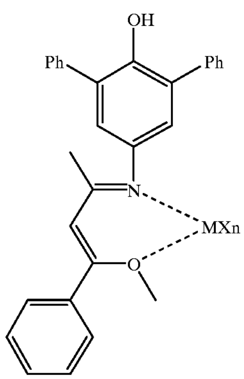
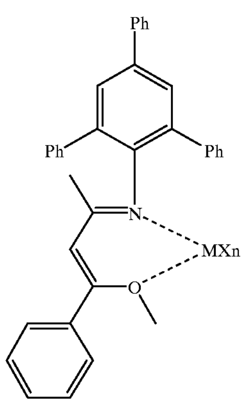
-continued
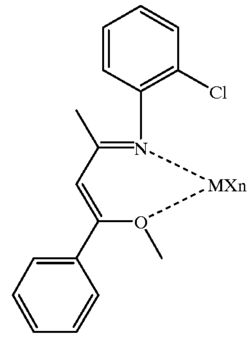
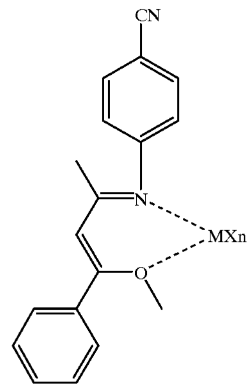
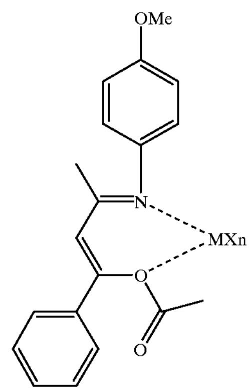
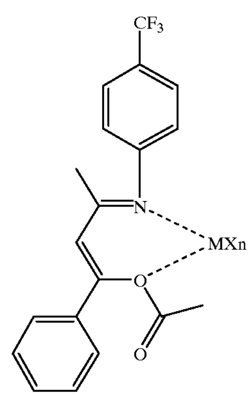

-continued
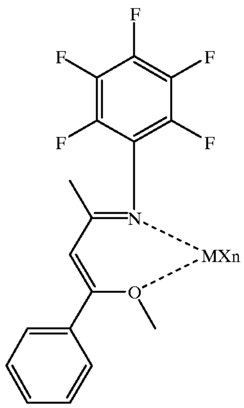
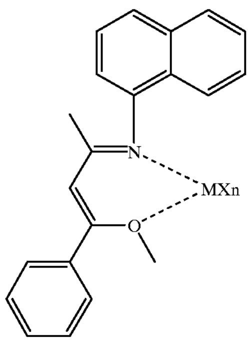
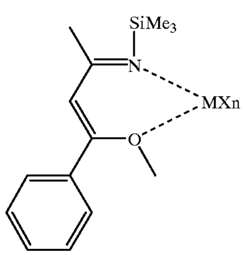
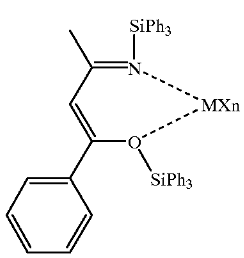
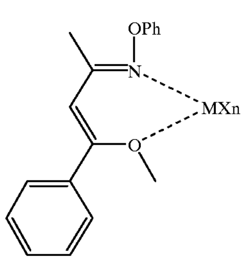
-continued
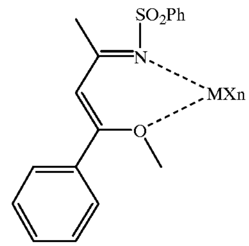
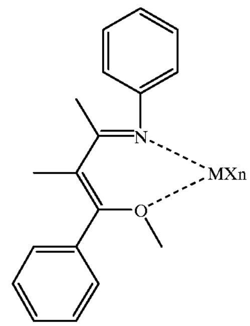
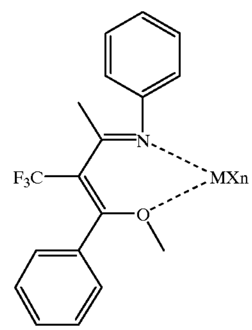
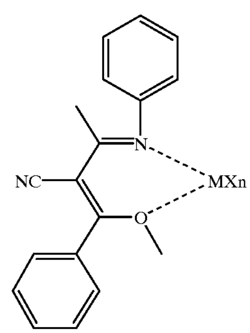
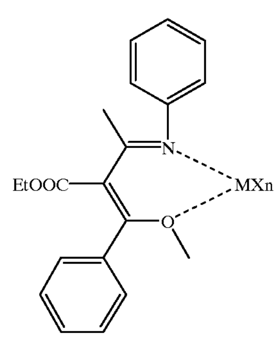

-continued
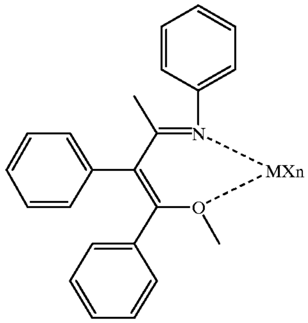
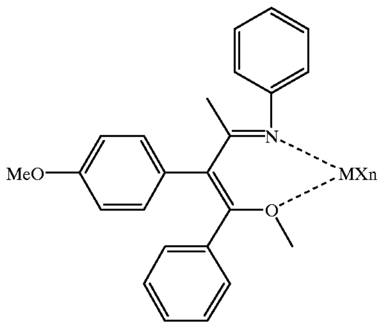
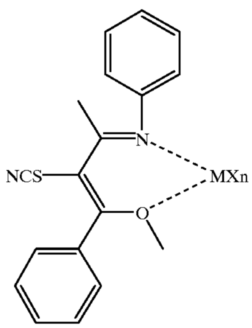
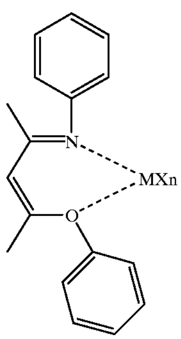
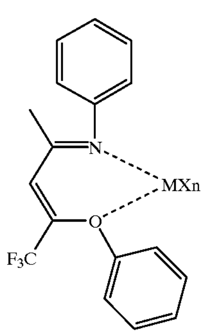
-continued
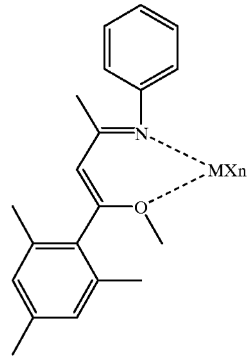
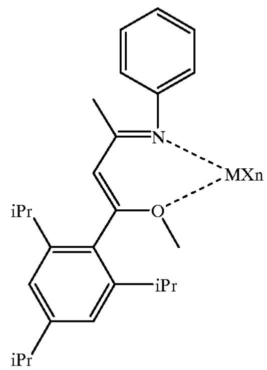
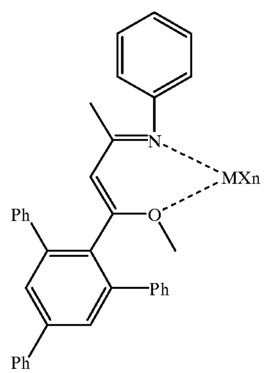
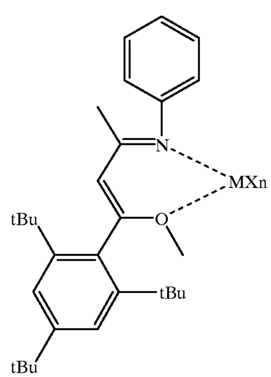

-continued
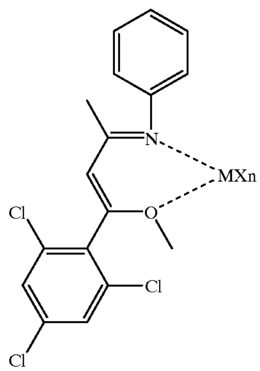
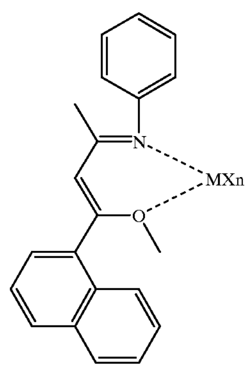
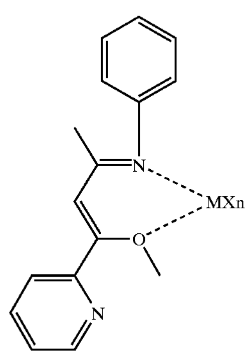
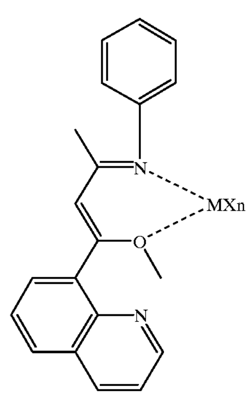
-continued
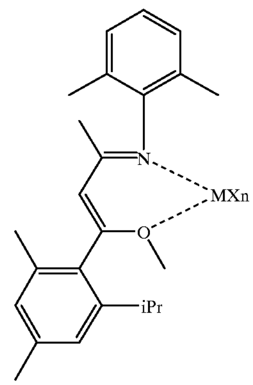
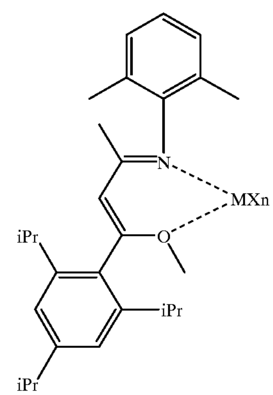
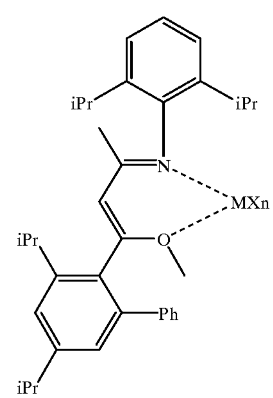
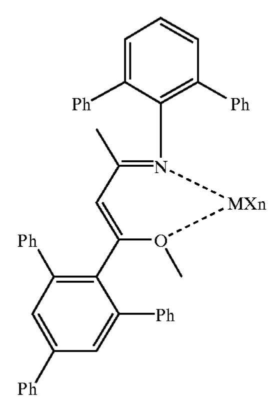

-continued
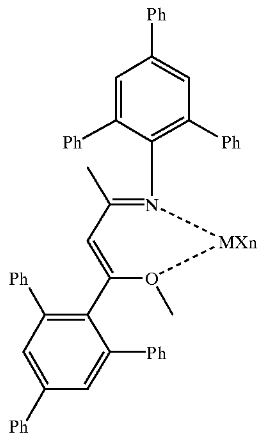
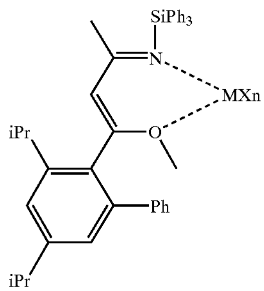
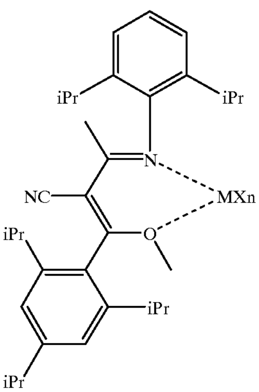
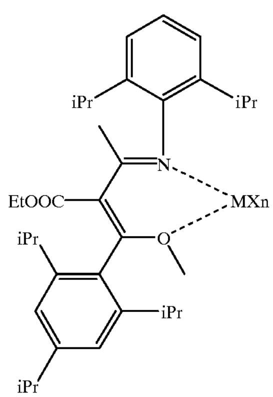
Examples of the compounds represented by the formula (I-a) wherein m is 2 or greater include the following compounds.
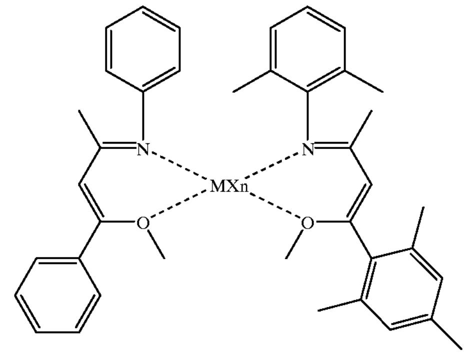
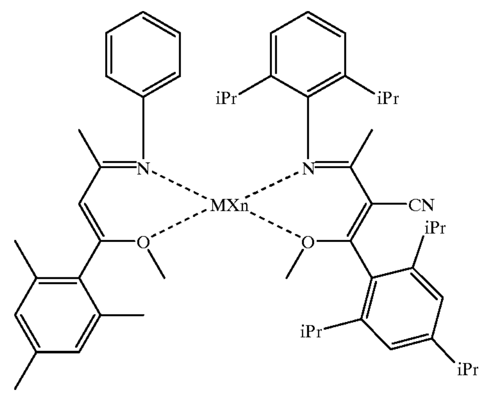
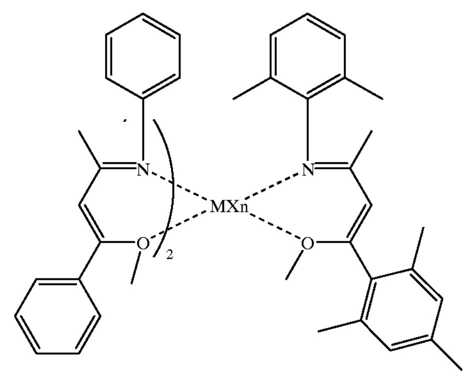
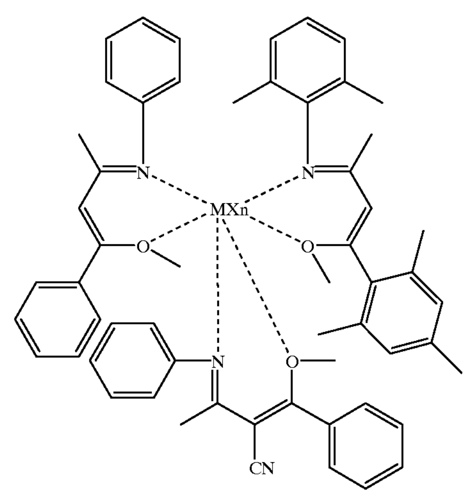

-continued
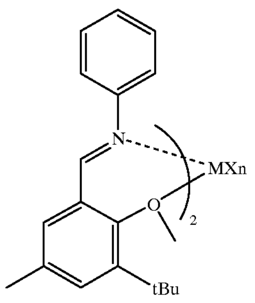
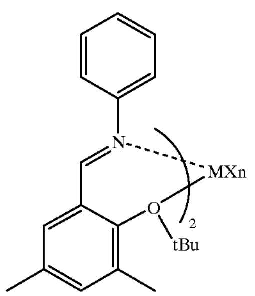
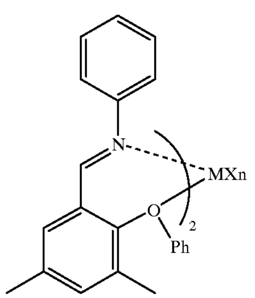
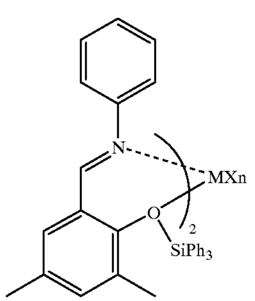
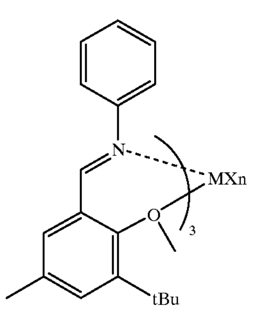
-continued
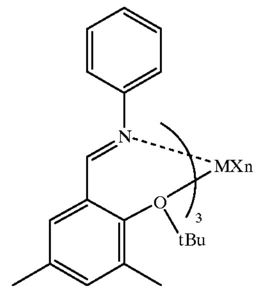
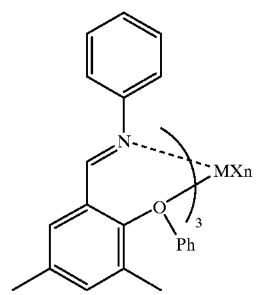
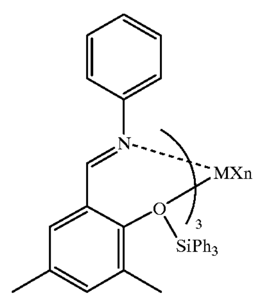
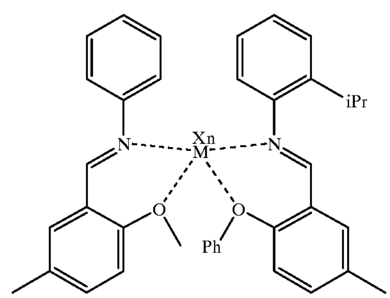
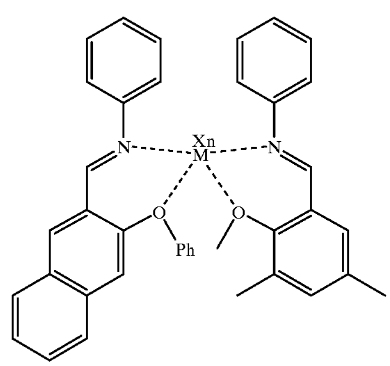

-continued
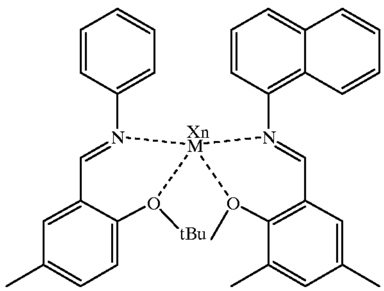
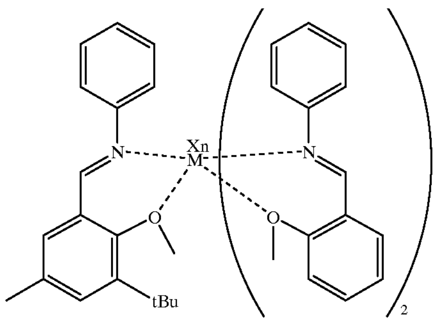
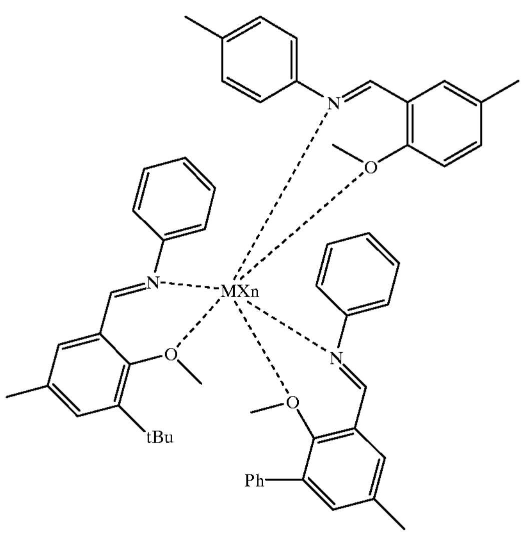
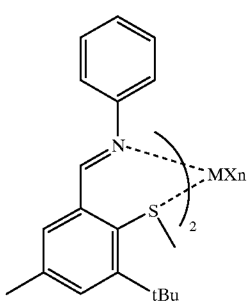
-continued
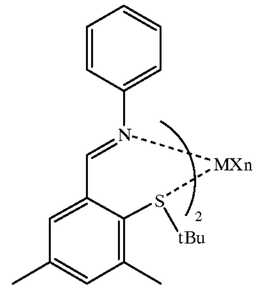
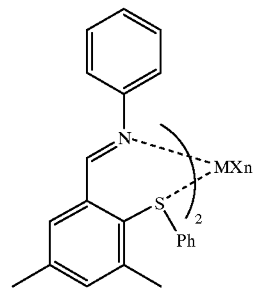
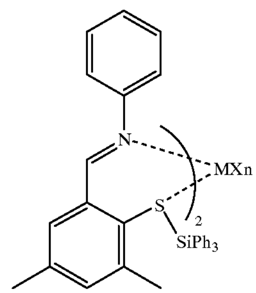
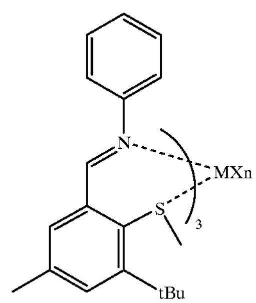
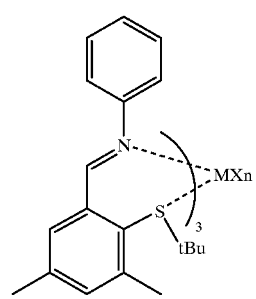

-continued
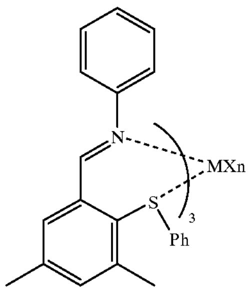
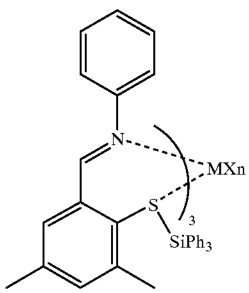
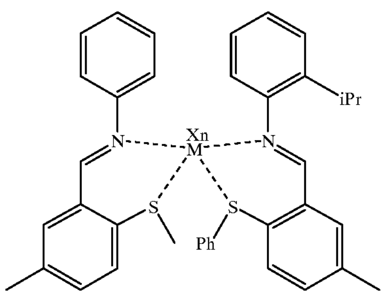
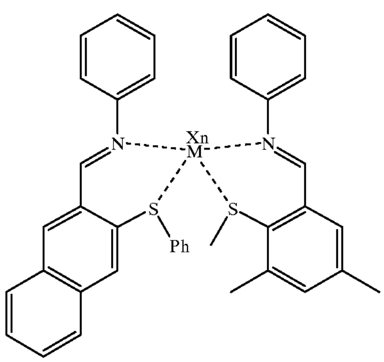
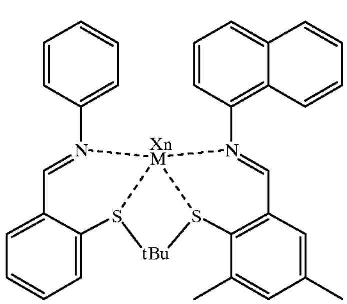
-continued
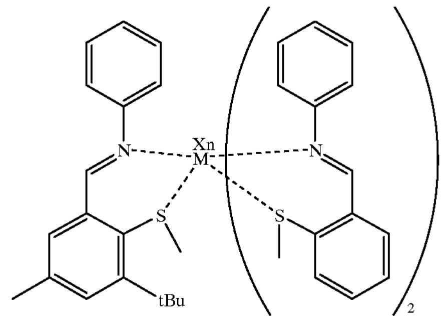
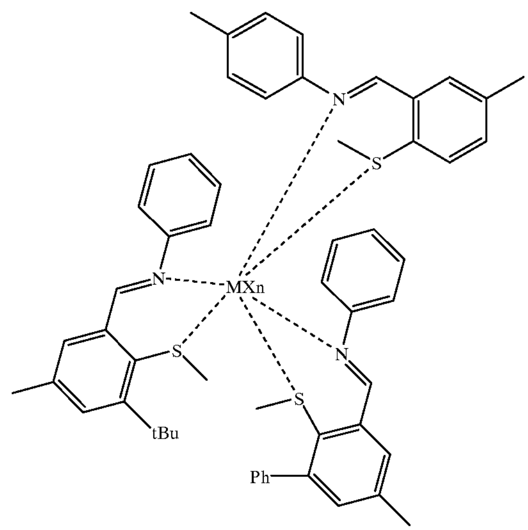
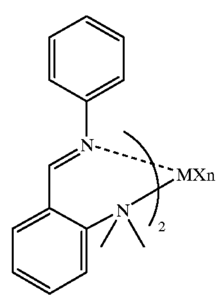
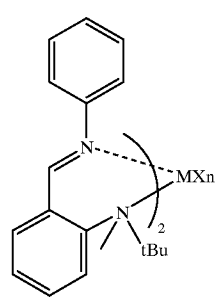

-continued
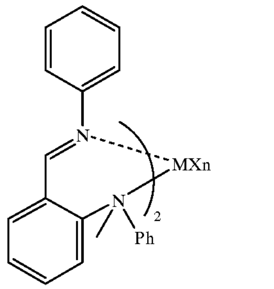
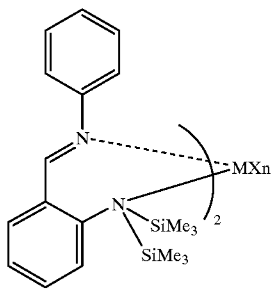
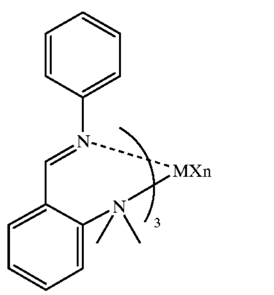
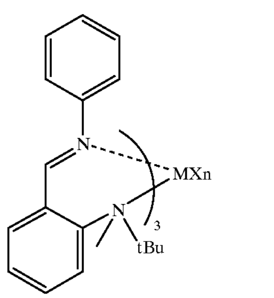
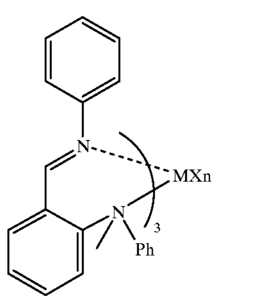
-continued
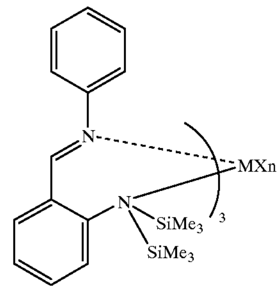
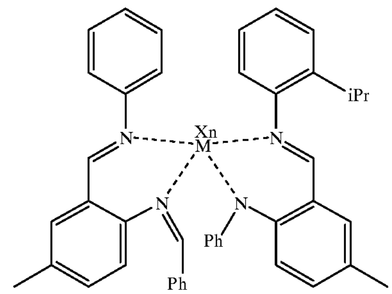
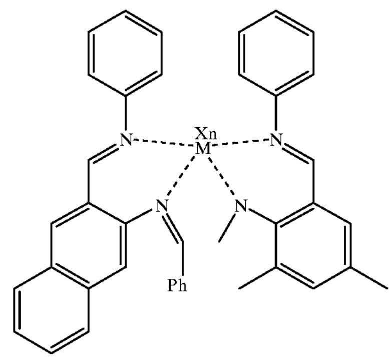
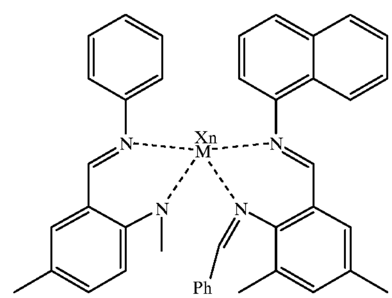
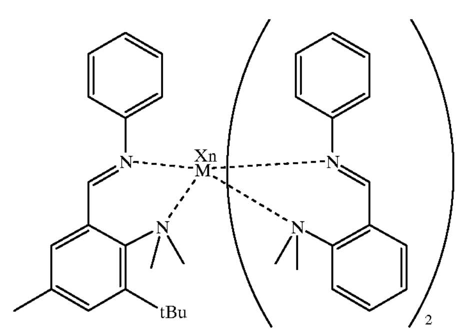

-continued

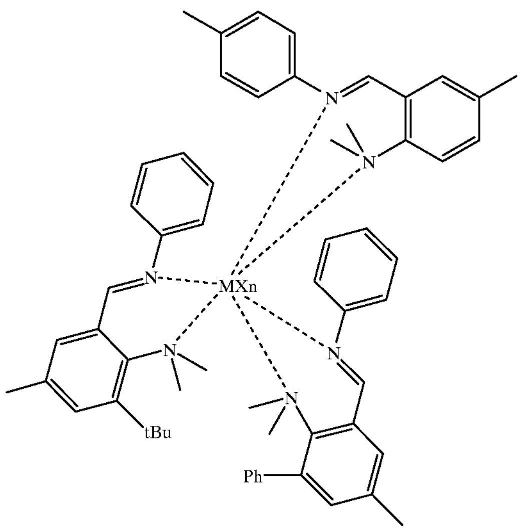

Examples of the transition metal compounds represented by the formula (I-a) wherein m is 2 or greater and one group of $R^1$ to $R^6$ contained in one ligand and one group of $R^1$ to $R^6$ contained in the other ligand are bonded include the following compounds.

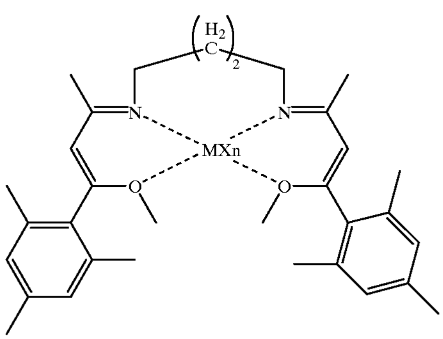

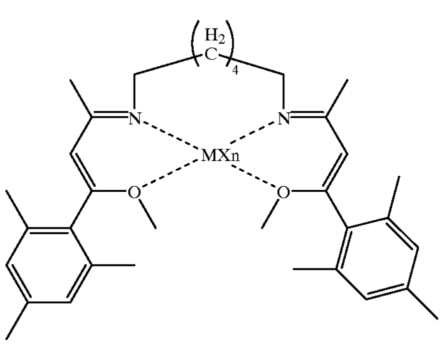

-continued

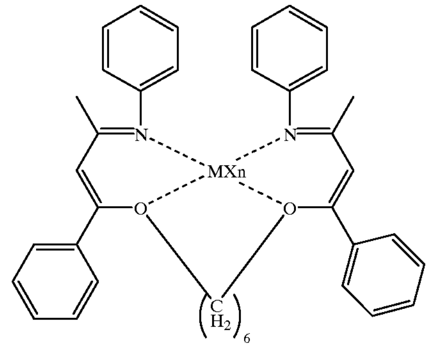

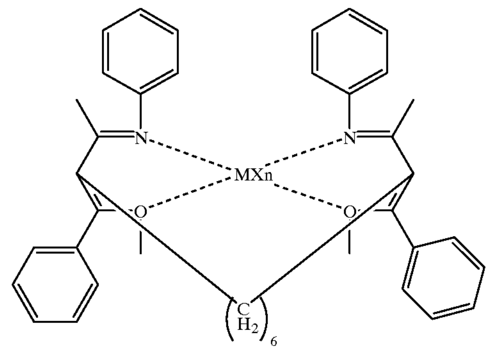

In the present invention, the compound represented by the formula (I-a) may be a compound further having groups corresponding to ligands, said groups being bonded through an ionic bond or a covalent bond, for example, a compound represented by the following formula (I-a"):

(I-a")

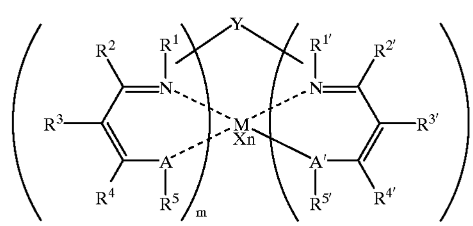

wherein M, A, $R^1$ to $R^6$ and X have the same meanings as those of M, A, $R^1$ to $R^6$ and X in the formula (I), and A' may be the same as or different from A and is an oxygen atom, a sulfur atom, a selenium atom or a nitrogen atom having a substituent $R^{6'}$.

Examples of the compounds represented by the formula (I-a") include the following compounds.

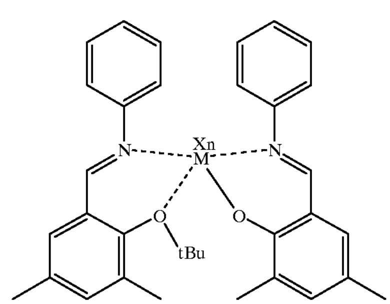

-continued

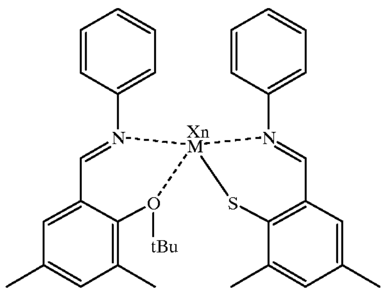

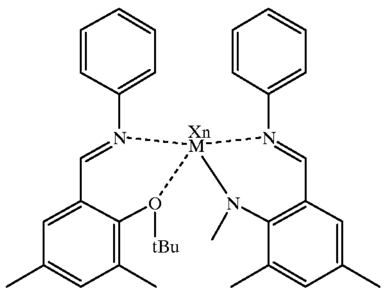

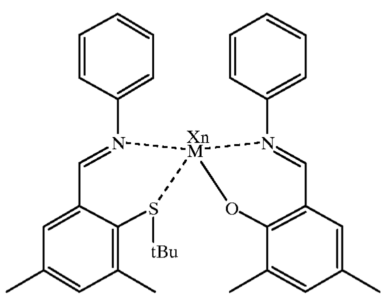

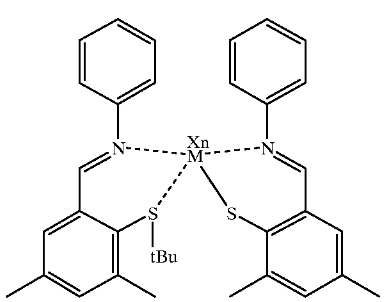

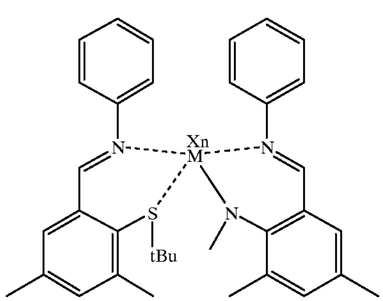

-continued

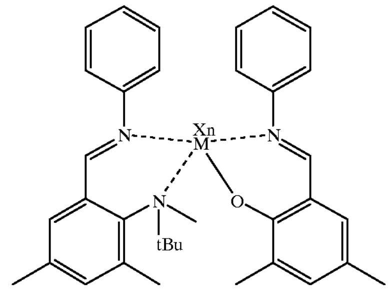

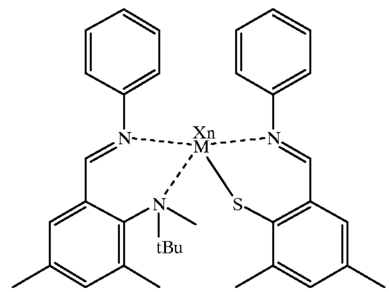

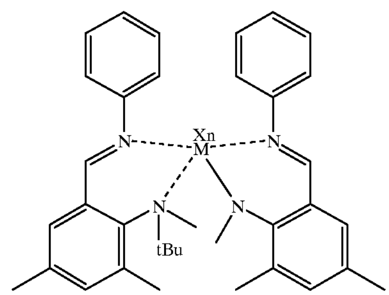

The transition metal compound represented by the formula (I-a) can be prepared without. any restriction, for example, by the following process.

A compound represented by the following formula (L)

(L)

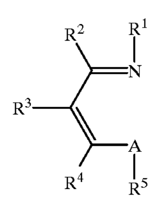

wherein A and $R^1$ to $R^6$ have the same meanings as those of A and $R^1$ to $R^6$ in the formula (I), is allowed to react with a compound represented by the formula MXk (M and X have the same meanings as those of M and X in the formula (I), and k is a number satisfying a valence of M).

Preferred examples of the compounds represented by MXk include $TiCl_3$, $TiCl_4$, $TiBr_3$, $TiBr_4$, Ti(benzyl)$_4$, Ti(NiMe$_2$)$_4$, $ZrCl_4$, Zr(NiMe$_2$)$_4$, Zr(benzyl)$_4$, $ZrBr_4$, $HfCl_4$, $HfBr_4$, $VCl_4$, $VCl_5$, $VBr_4$, $VBr_5$, Ti(acac)$_3$, and complexes of these compounds and THF (tetrahydrofuran), acetonitrile or diethyl ether, but not limited thereto.

The process for preparing the transition metal compound represented by the formula (I-a) is more specifically described below.

In the first place, an acylacetone compound or a thioacylacetone compound can be allowed to react with a primary amine compound of the formula $R^1$—$NH_2$ ($R^1$ has the same meaning as that of $R^1$ in the formula (I-a)), e.g., an aniline compound or an alkylamine compound, to obtain a compound (ligand precursor) which becomes a ligand for constituting the transition metal compound. More specifically, both of the starting compounds are dissolved in a solvent. As the solvent, any solvent generally used for such reaction is employable. Above all, an alcohol solvent such as methanol or ethanol or a hydrocarbon solvent such as toluene is preferable.

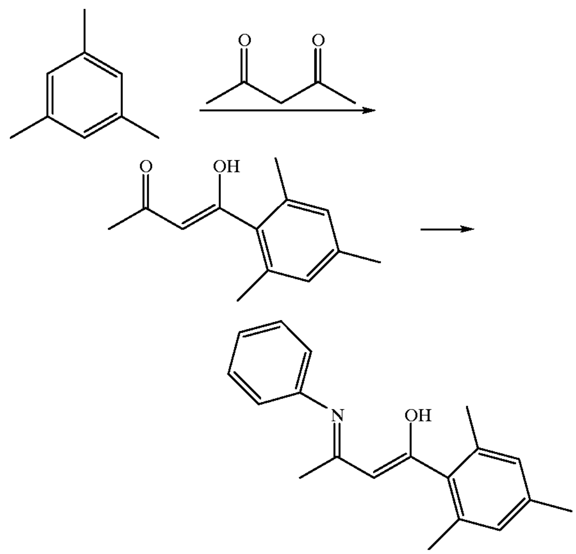

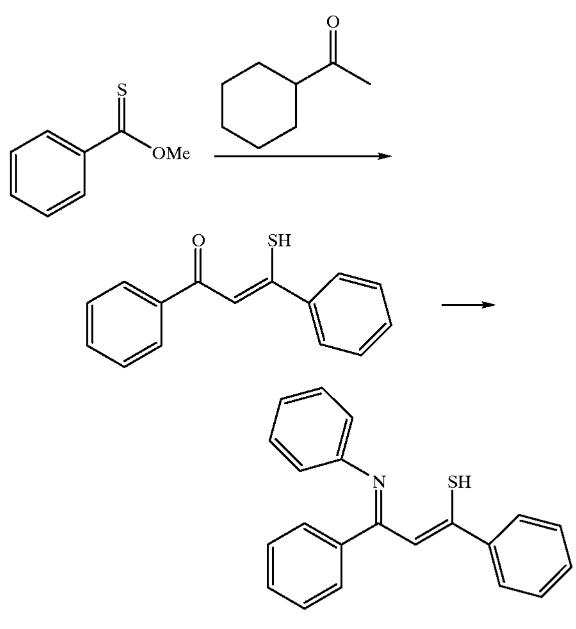

Then, the resulting solution is stirred under the conditions of room temperature to reflux for about 1 to 48 hours to introduce the substituent into the A part, whereby the corresponding ligand precursor is obtained in a high yield.

The ligand precursor can also be obtained by allowing an o-acylphenol, o-acylthiophenol or o-acylaniline wherein the substituent has been introduced into the A part of the formula (I-a) to react with a primary amine compound of the formula $R^1$—$NH_2$ ($R^1$ has the same meaning as that of $R^1$ in the formula (I-a)), e.g., an aniline compound or an alkylamine compound.

In the synthesis of the ligand precursor, an acid catalyst such as formic acid, acetic acid or toluenesulfonic acid may be used as a catalyst. It is effective for the progress of the reaction to use dehydrating agents such as molecular sieves, magnesium sulfate and sodium sulfate or to perform dehydration by means of Dean and Stark method.

Then, the thus obtained ligand precursor can be allowed to react with a compound containing a transition metal M to synthesize the corresponding transition metal compound. More specifically, the synthesized ligand is dissolved in a solvent, then mixed with a metallic compound such as a metallic halide or a metallic alkylate and stirred for about 1 to 48 hours at a temperature of −78° C. to room temperature, preferably under reflux. As the solvent, any solvent generally used for such reaction is employable. Above all, a polar solvent such as ethyl ether or THF or a hydrocarbon solvent such as toluene is preferably employed.

It is also possible to exchange the metal M in the synthesized transition metal compound with another transition metal in a conventional way. For example, when any of $R^1$ to $R^6$ is H, a substituent other than H can be introduced in any stage of the synthesis process.

The transition metal compound (A-1) represented by the formula (I-a) wherein Q is a nitrogen atom and $R^3$ and $R^4$ are bonded to form an aromatic ring is represented by the following formula (I-c).

(I-c)

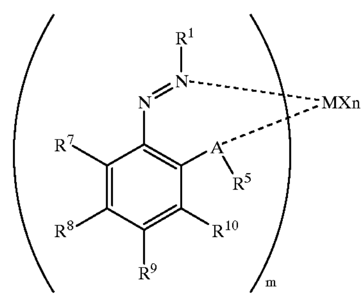

In the above formula, M, m,. A, $R^1$, $R^5$, $R^6$, n and X have the same meanings as those of M, m, A, $R^1$, $R^5$, $R^6$, n and X in the formula (I). Each of N— — —M and A— — —M indicates a coordinate bond.

$R^7$ to $R^{10}$ have the same meanings as those of $R^1$ to $R^6$ in the formula (I).

$R^1$ and $R^5$ to $R^{10}$ may be the same or different, and two or more of them may be bonded to each other to form a ring.

When m is 2 or greater, $R^1$s, $R^5$s, $R^6$s, $R^7$s, $R^8$s, $R^9$s, or $R^{10}$s may be the same or different, and one group of $R^1$ and $R^5$ to $R^{10}$ contained in one ligand and one group of $R^1$ and $R^5$ to $R^{10}$ contained in other ligands may be bonded.

The transition metal compound represented by the formula (I-c) wherein m is 2 and one group of $R^1$ and $R^5$ to $R^{10}$ contained in one ligand and one group of $R^1$ and $R^5$ to $R^{10}$ contained in the other ligand are bonded is, for example, a compound represented by the following formula (I-c').

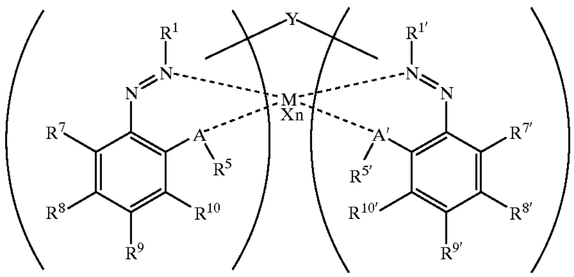
(I-c')

In the above formula, M, A, $R^1$, $R^5$ to $R^{10}$ and the same meanings as those of M, A, $R^1$, $R^5$ to $R^{10}$ and X in the formula (I), and $R^{1'}$ and $R^{5'}$ to $R^{10'}$ have the same meanings as those of $R^1$ and $R^5$ to $R^{10}$.

A' may be the same as or different from A and is an oxygen atom, a sulfur atom, a selenium atom or a nitrogen atom having a substituent $R^{6'}$.

Y is a bonding group or a single bond for linking at least one group selected from $R^1$ and $R^5$ to $R^{10}$ to at least one group selected from $R^{1'}$ and $R^{5'}$ to $R^{10'}$, and has the same meaning as that of Y in the formula (I-a').

Examples of the transition metal compounds represented by the formula (I-c) are given below, but not limited thereto.

In the following examples, M has the same meaning as that of M in the formula (I-c).

X has the same meaning as that of X in the formula (I-c), and is for example halogen such as Cl or Br, or an alkyl group such as methyl, but not limited thereto. When plural X are present, they may be the same or different.

n has the same meaning as that of n in the formula (I-c), and is decided by a valence of the metal M. For example, when one ligand is coordinated to the metal, there can be mentioned n=2 in case of a divalent metal, n=3 in case of a trivalent metal, n=4 in case of a tetravalent metal, and n=5 in case of a pentavalent metal. More specifically, there can be mentioned n=4 in case of Ti(IV), n=4 in case of Zr(IV), n=4 in case of Hf(IV), n=2 in case of Co(II), n=2 in case of Fe(II), n=2 in case of Rh(II), n=2 in case of Ni(II), and n=2 in case of Pd(II).

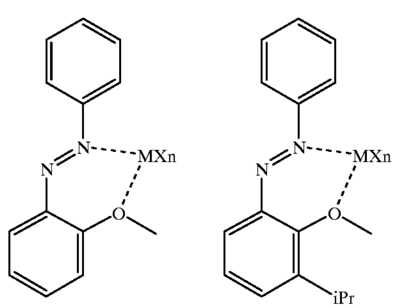

-continued

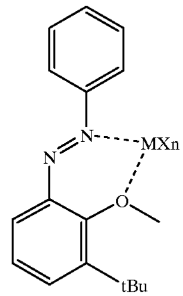

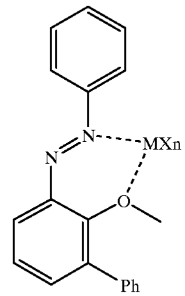

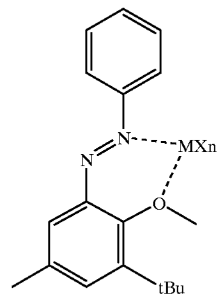

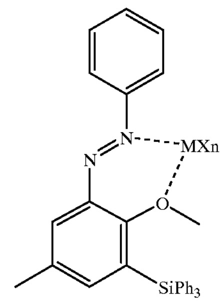

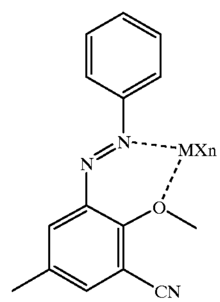

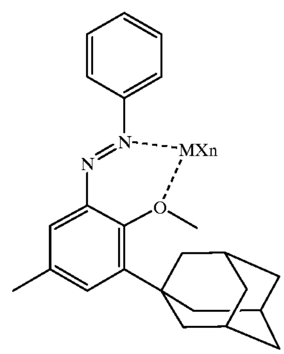

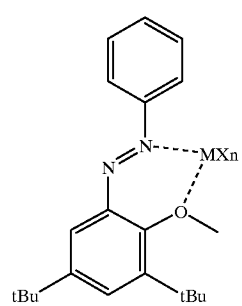

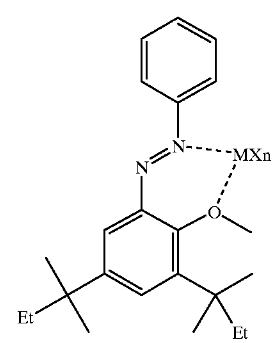

-continued
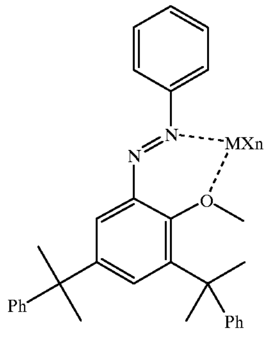
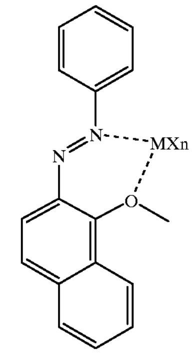
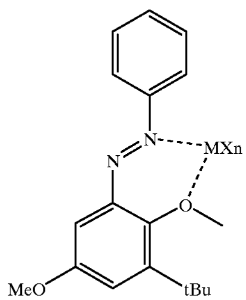
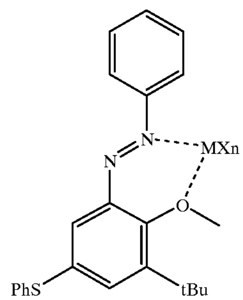
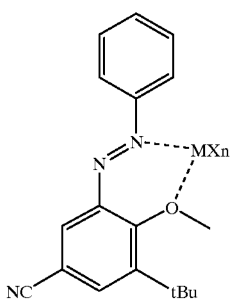
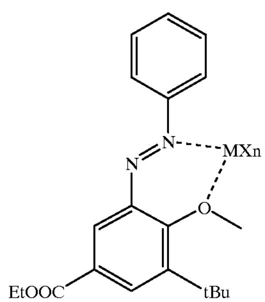
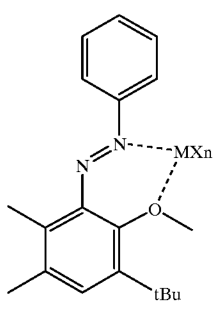
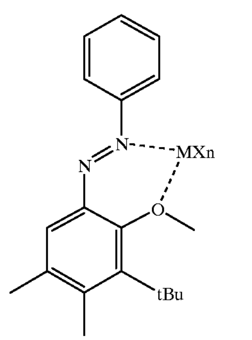
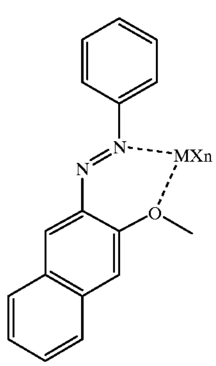
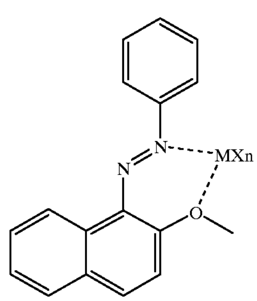
-continued
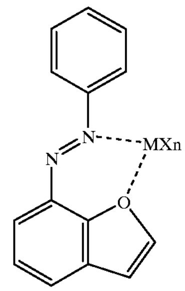
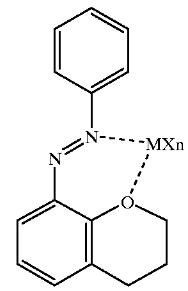
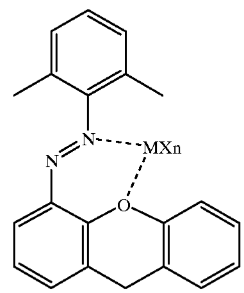
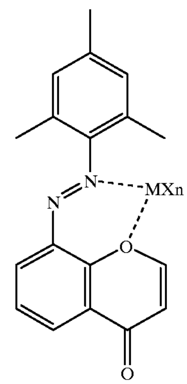
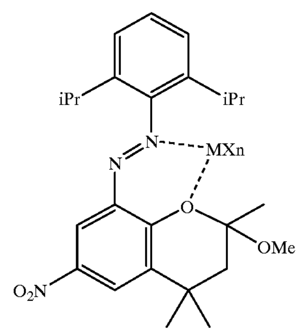
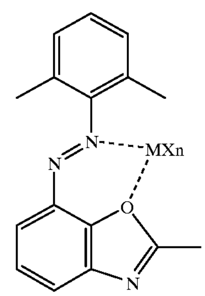
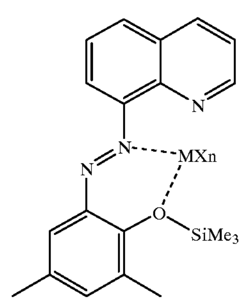
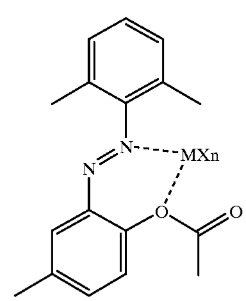
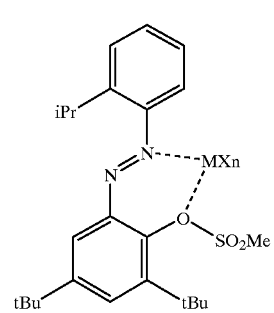
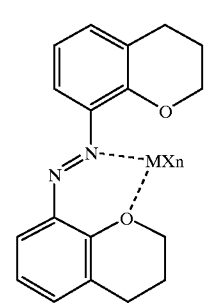

-continued
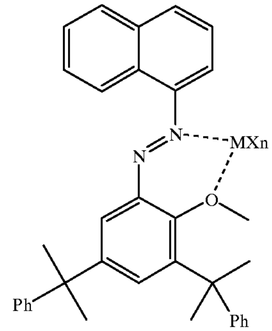
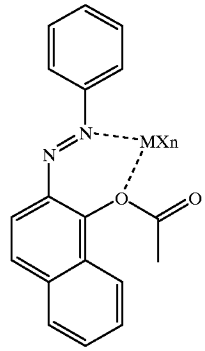
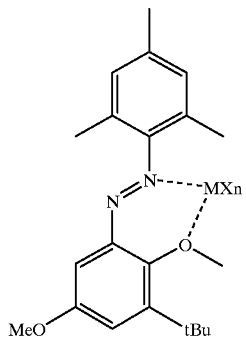
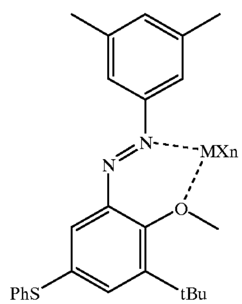
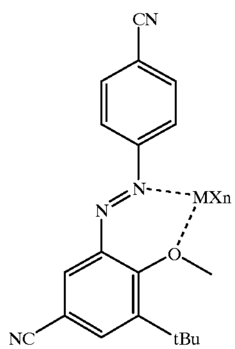
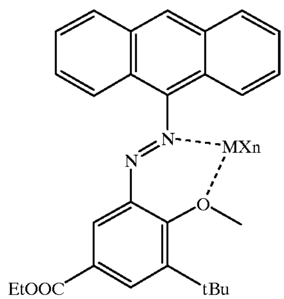
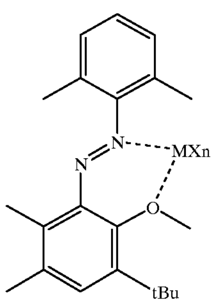
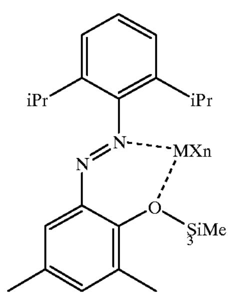
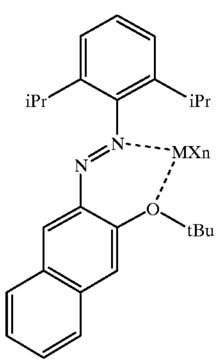
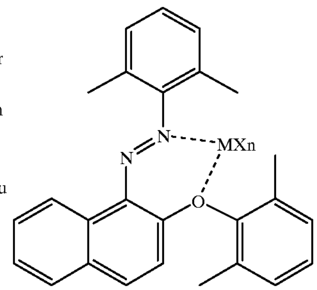
-continued
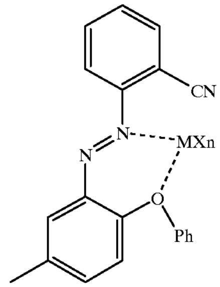
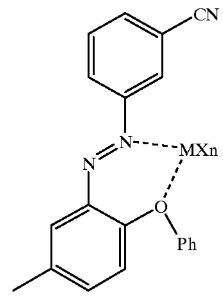
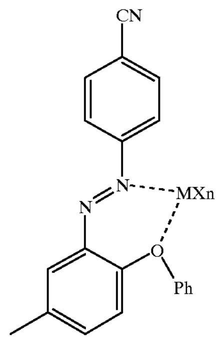
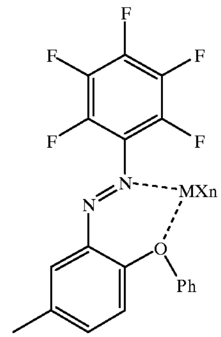
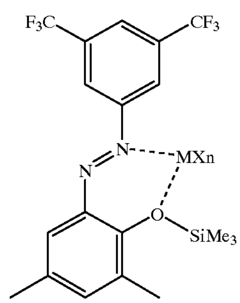
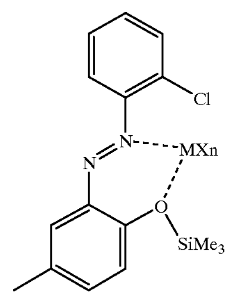
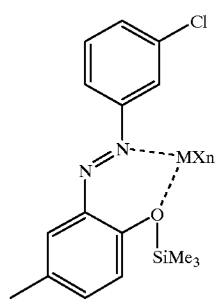
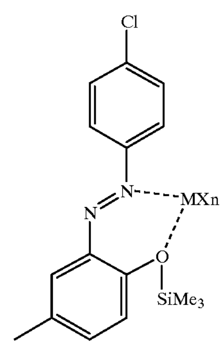
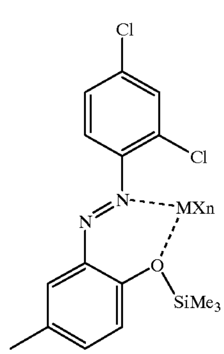
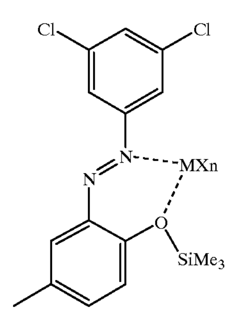

-continued
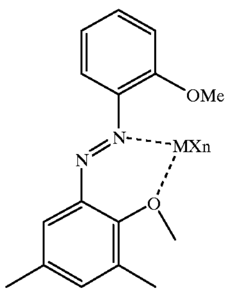
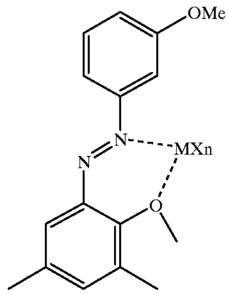
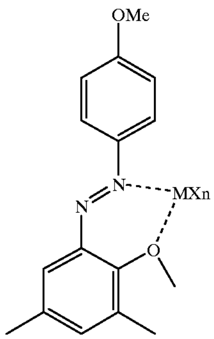
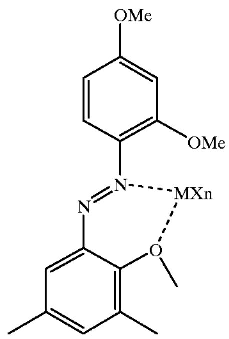
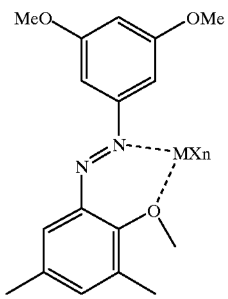
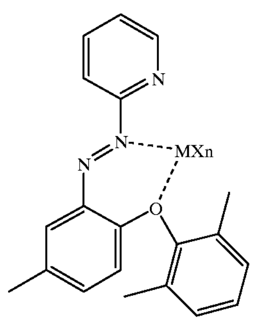
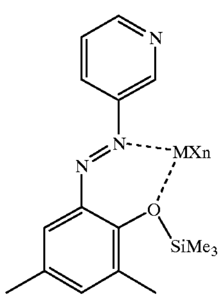
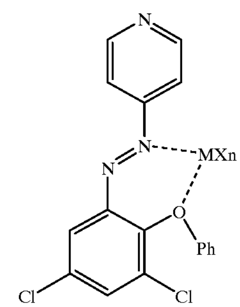
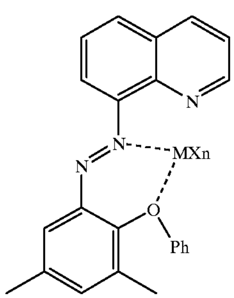
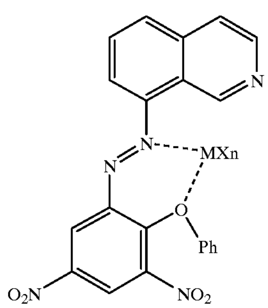
-continued
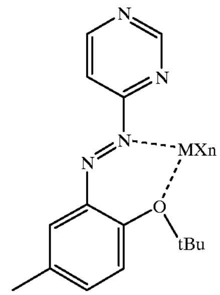
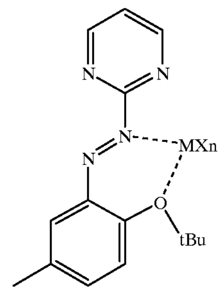
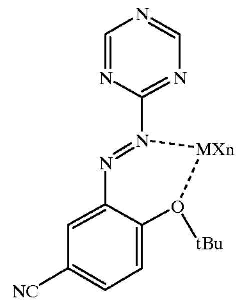
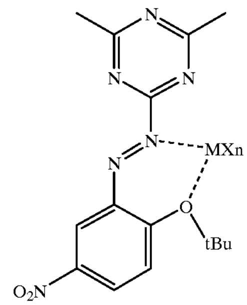
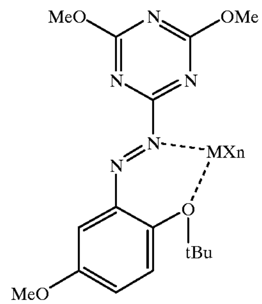
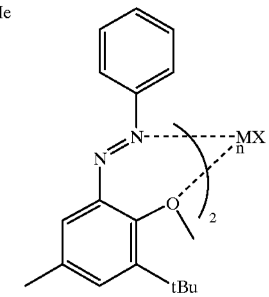
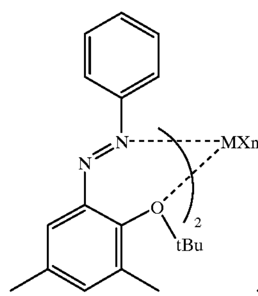
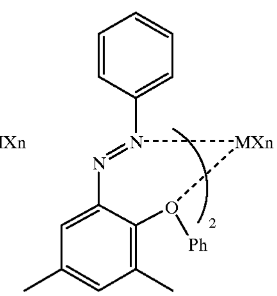
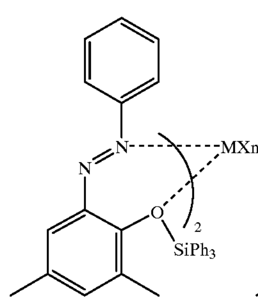
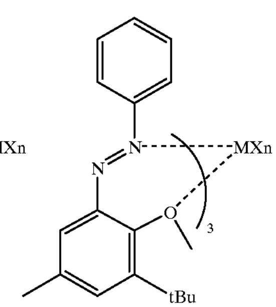

-continued
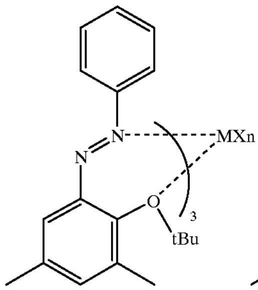
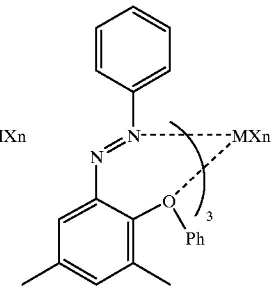
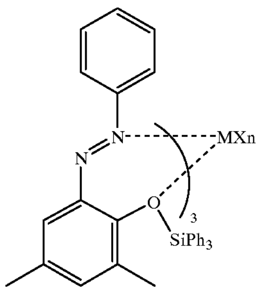
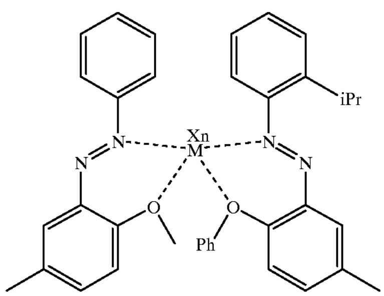
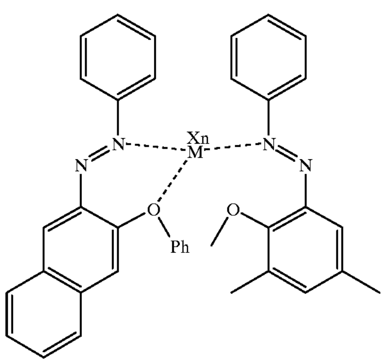
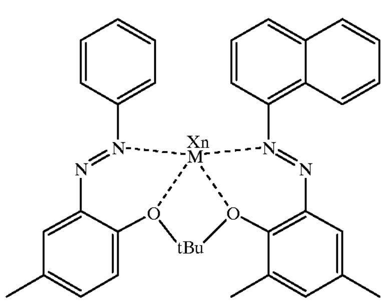
-continued
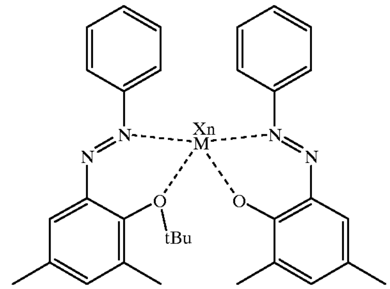
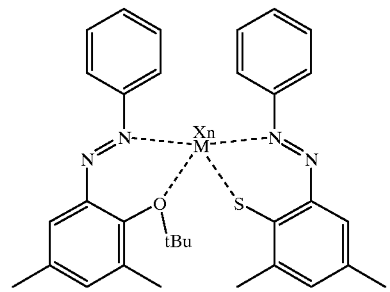
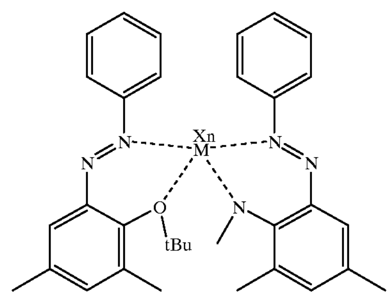
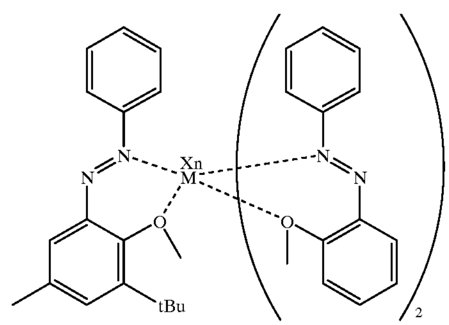
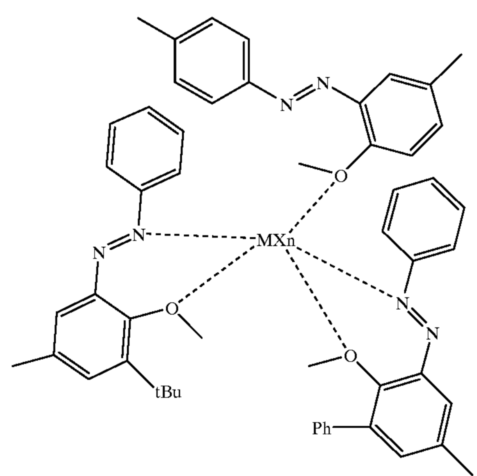

-continued
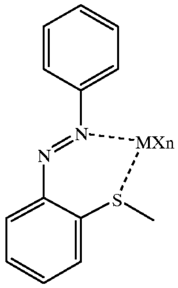
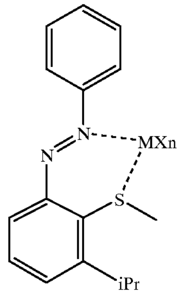
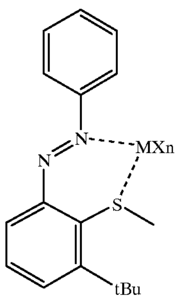
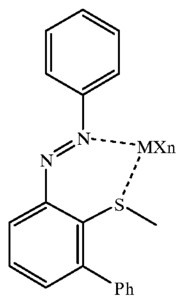
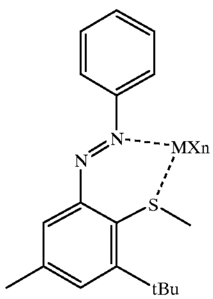
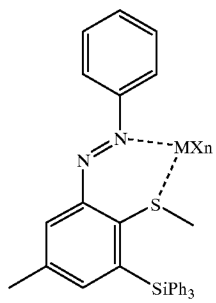
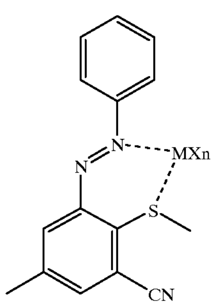
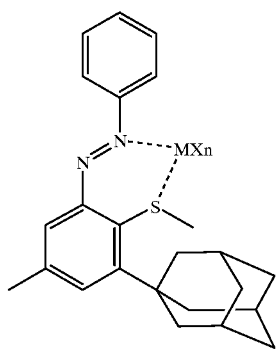
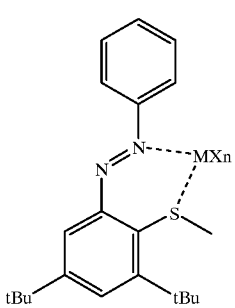
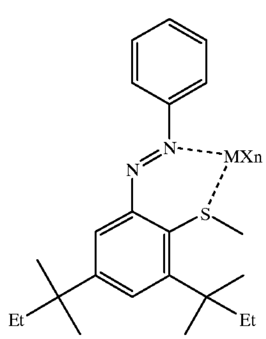
-continued
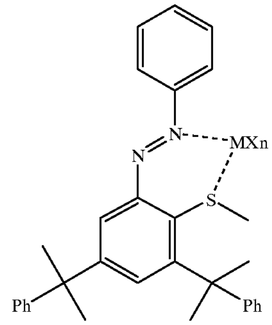
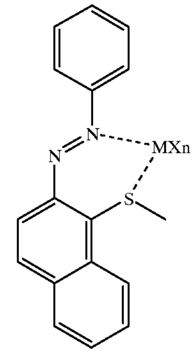
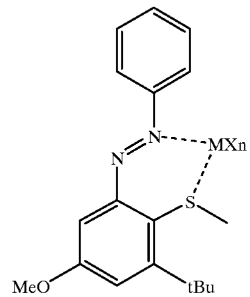
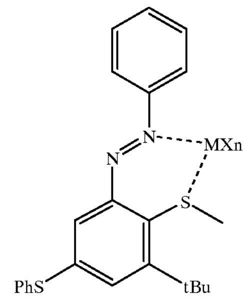
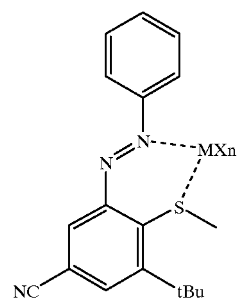
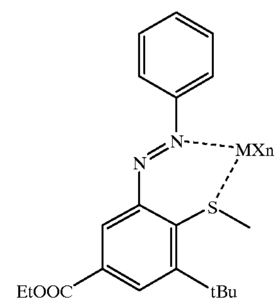
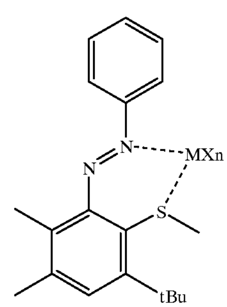
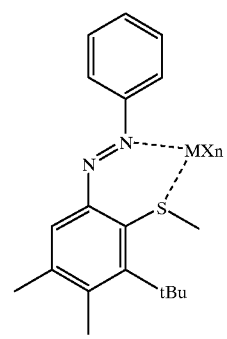
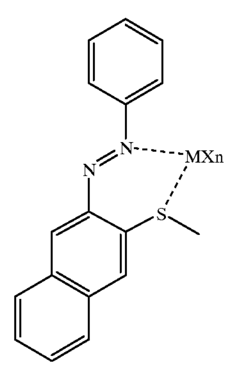
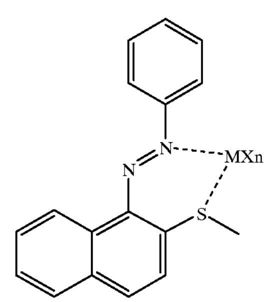

-continued
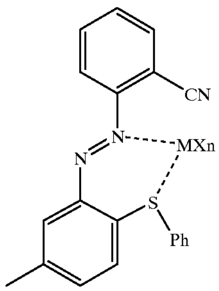
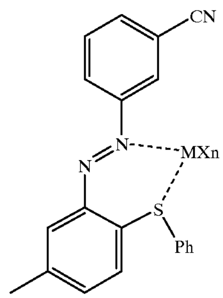
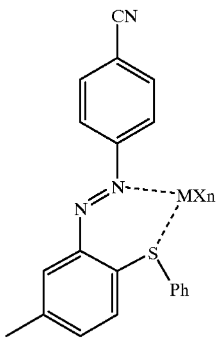
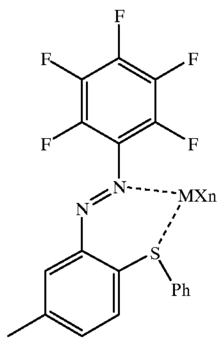
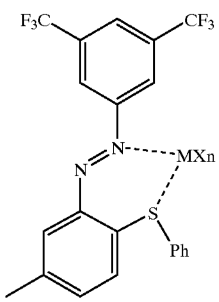
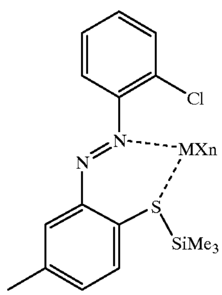
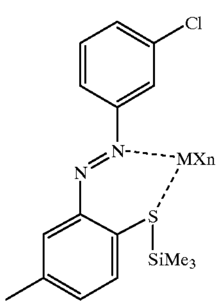
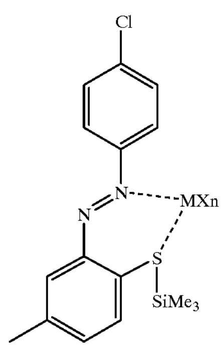
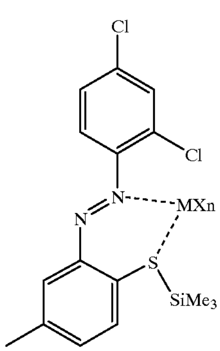
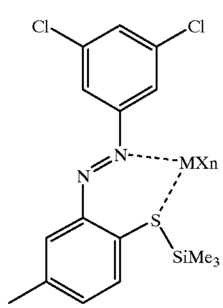
-continued
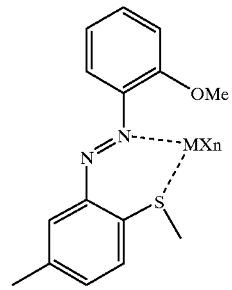
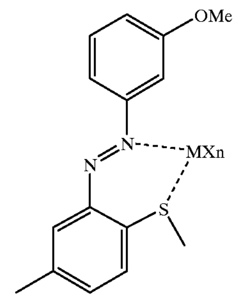
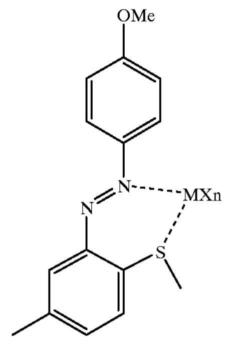
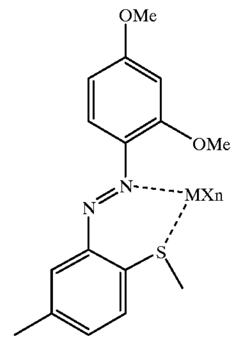
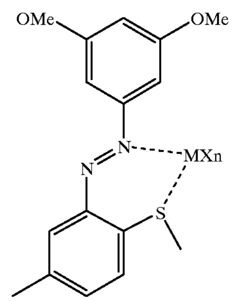
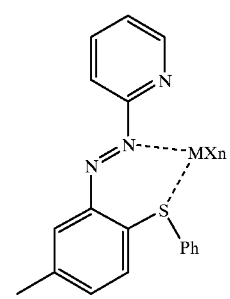
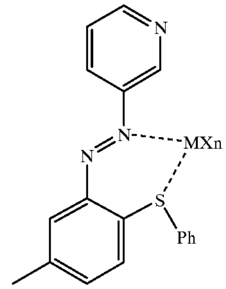
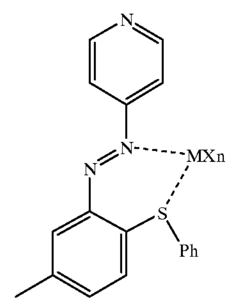
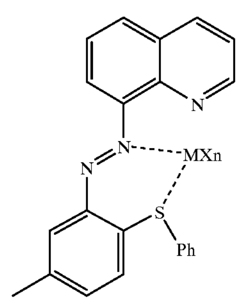
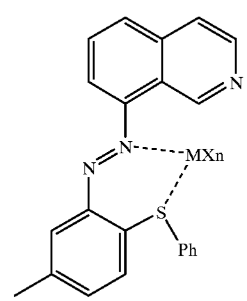

-continued
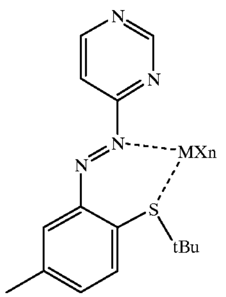
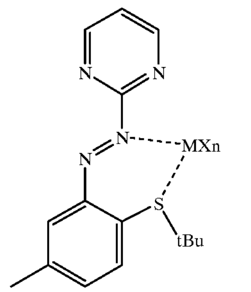
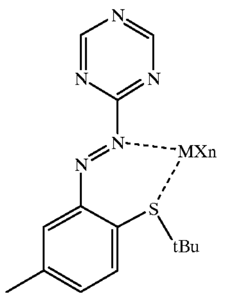
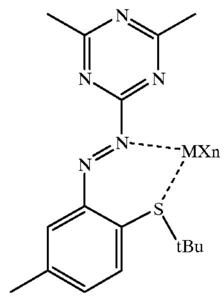
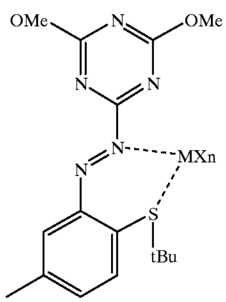
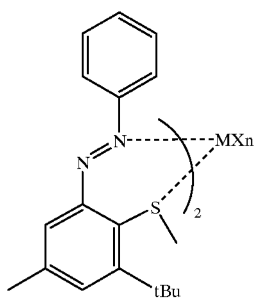
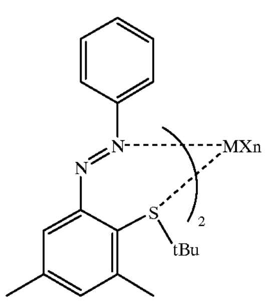
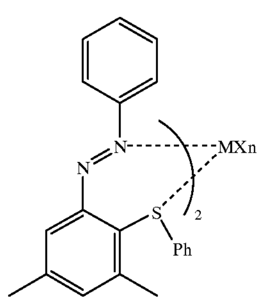
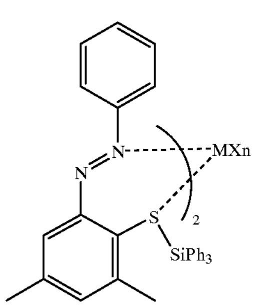
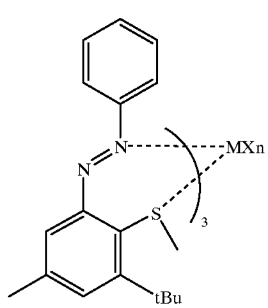
-continued
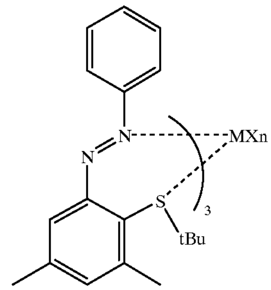
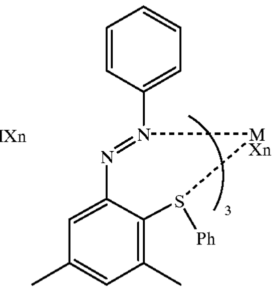
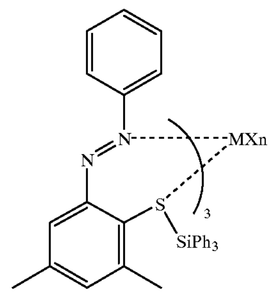
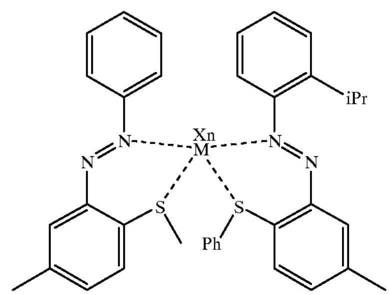
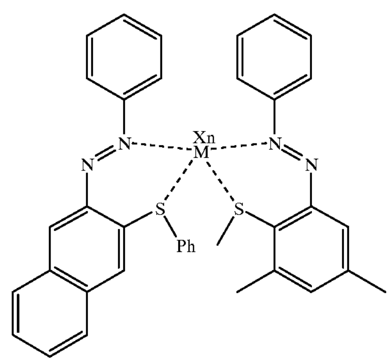
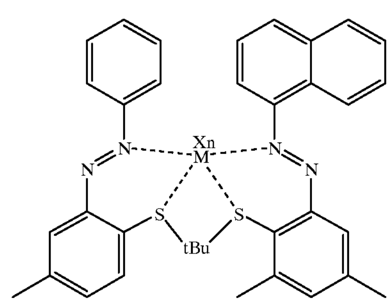

-continued
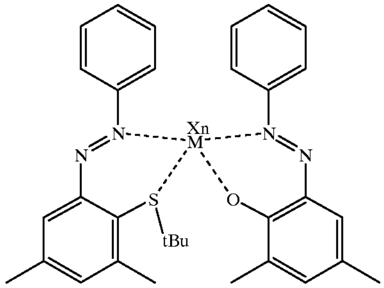
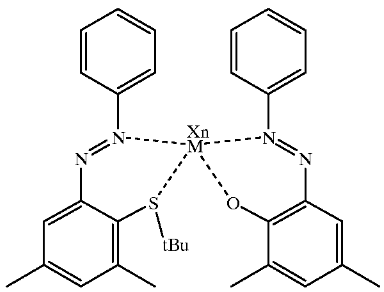
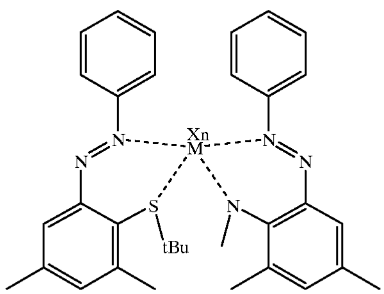
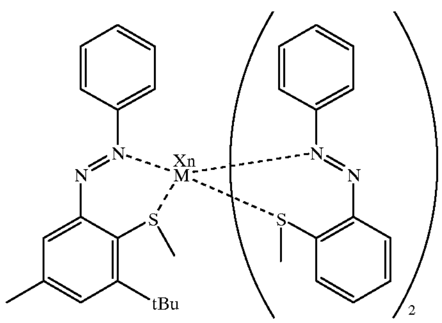
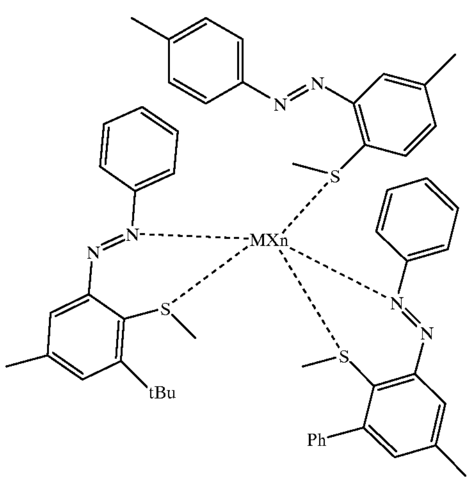
-continued
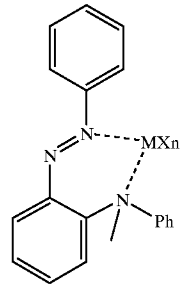
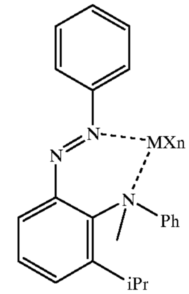
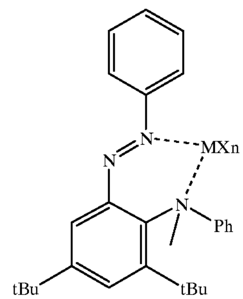
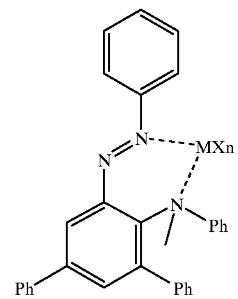
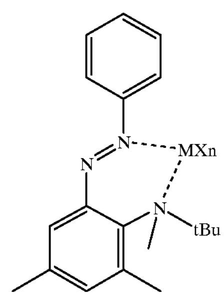
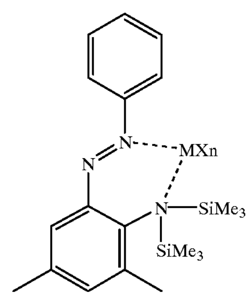
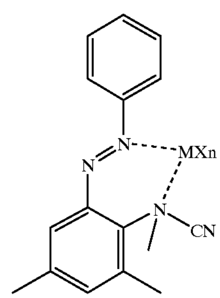
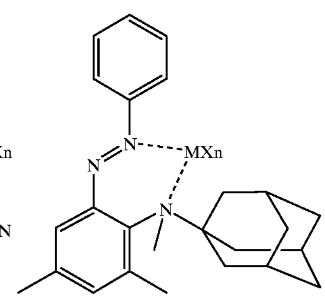
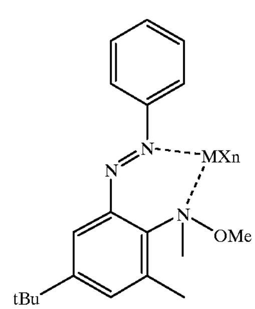
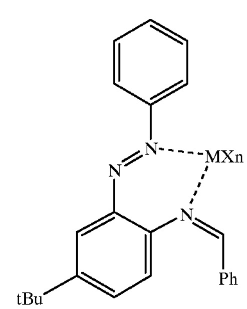

-continued
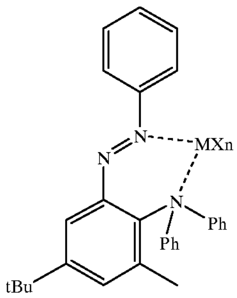
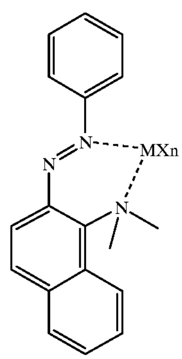
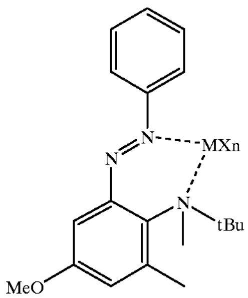
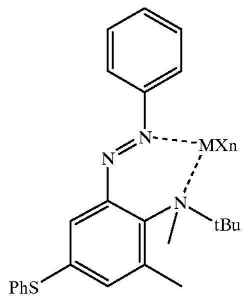
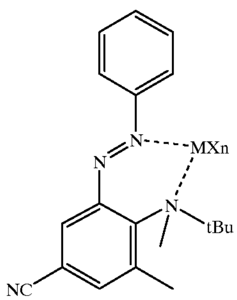
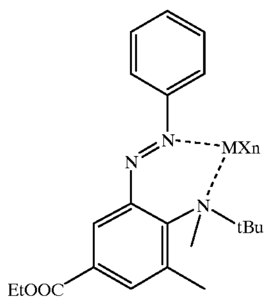
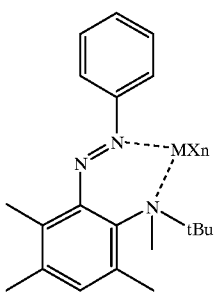
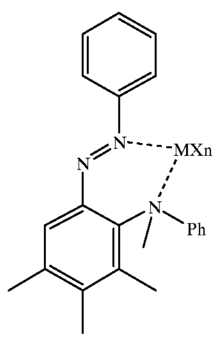
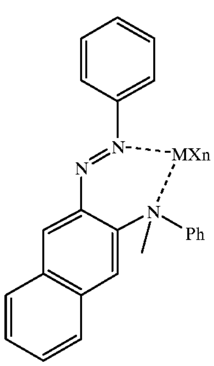
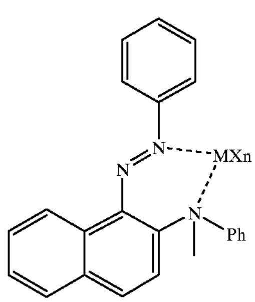
-continued
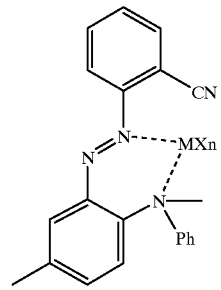
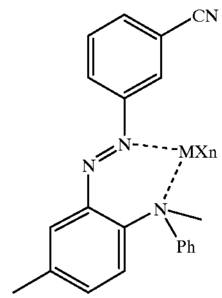
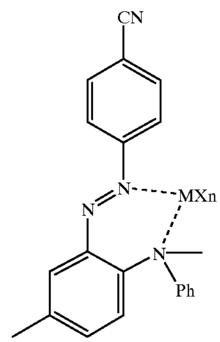
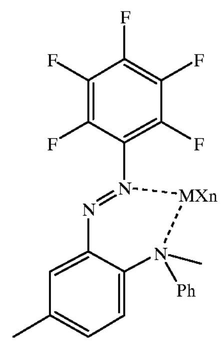
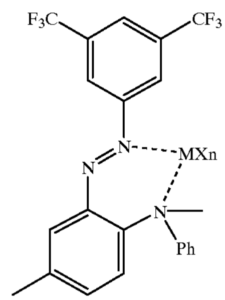
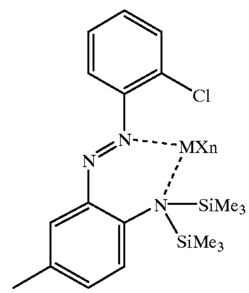
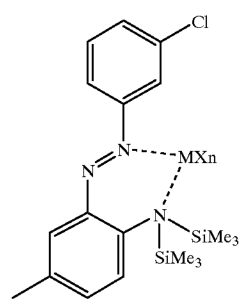
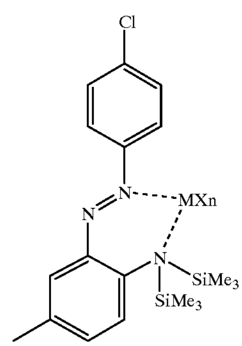
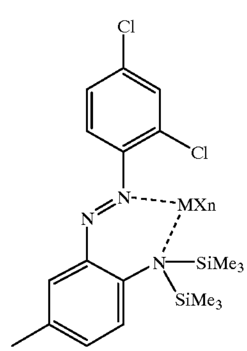
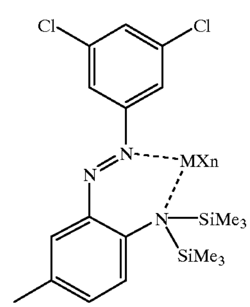

-continued
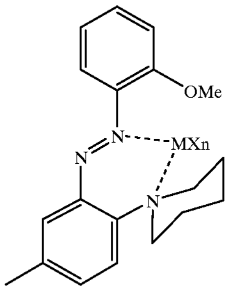
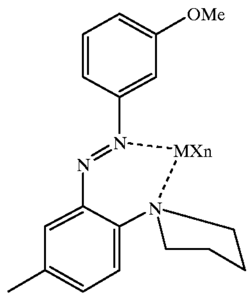
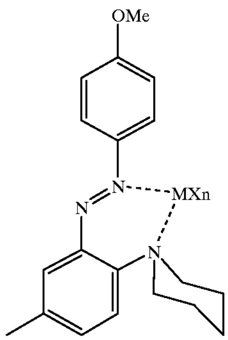
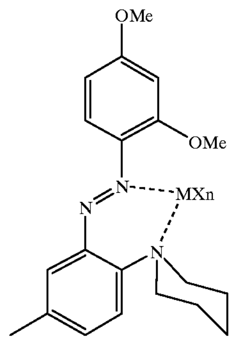
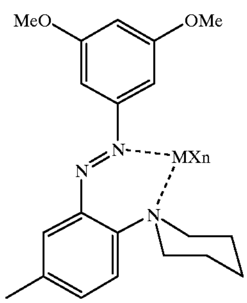
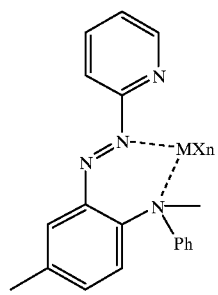
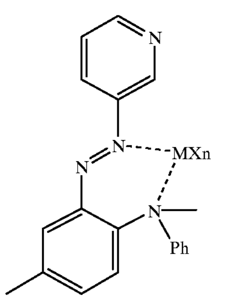
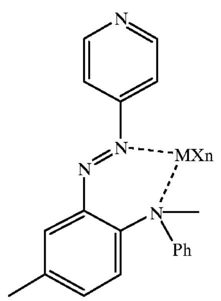
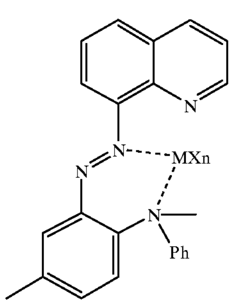
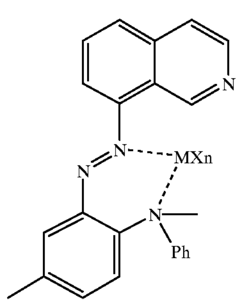
-continued
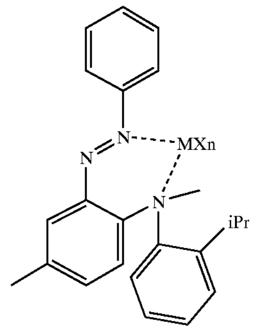
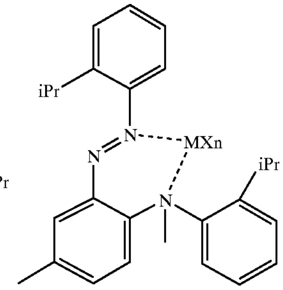
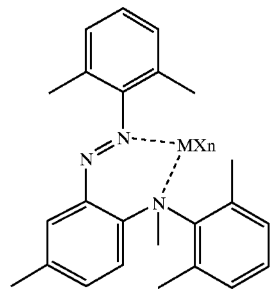
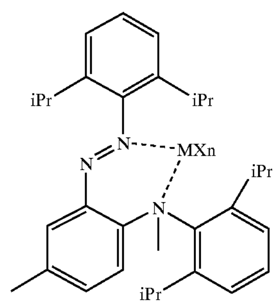
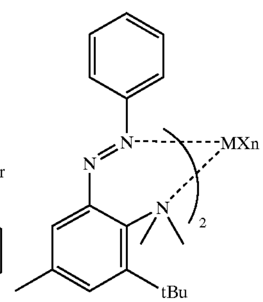
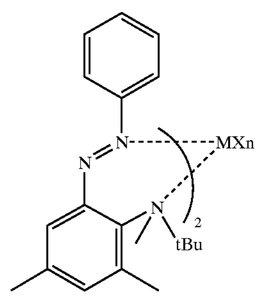
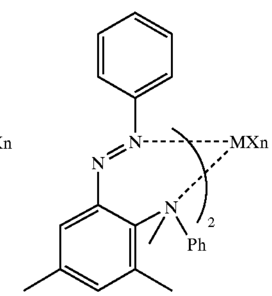
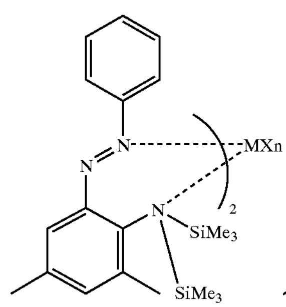
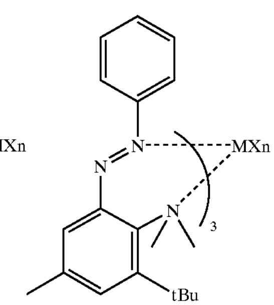

-continued
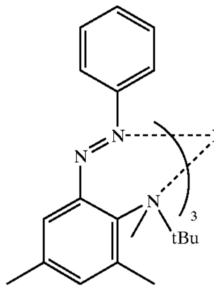
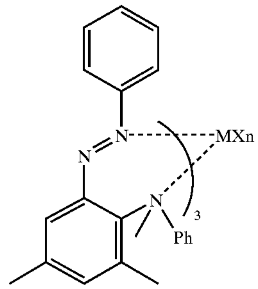
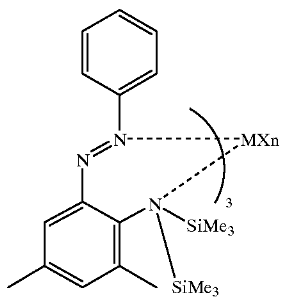
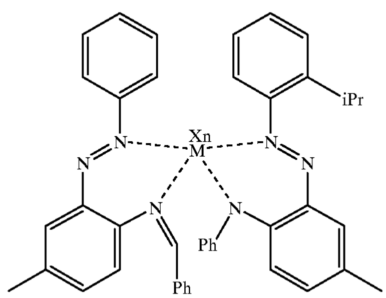
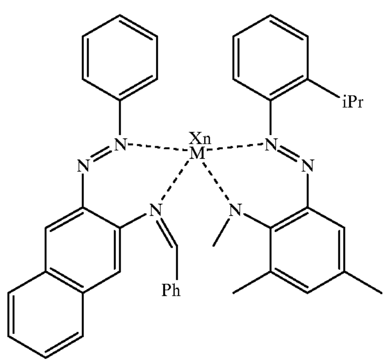
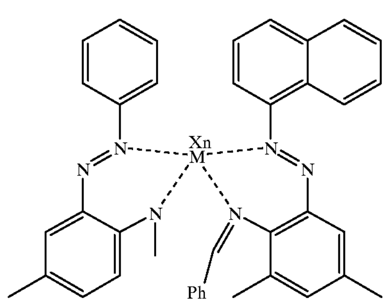
-continued
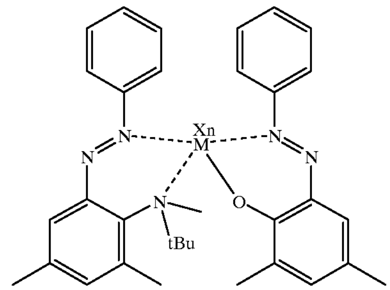
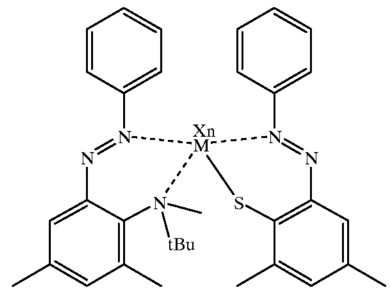
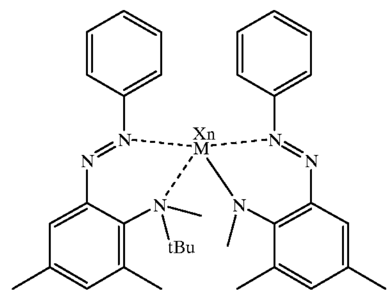
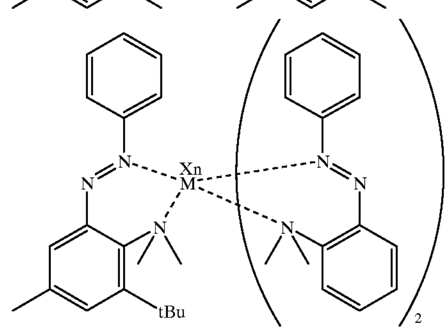
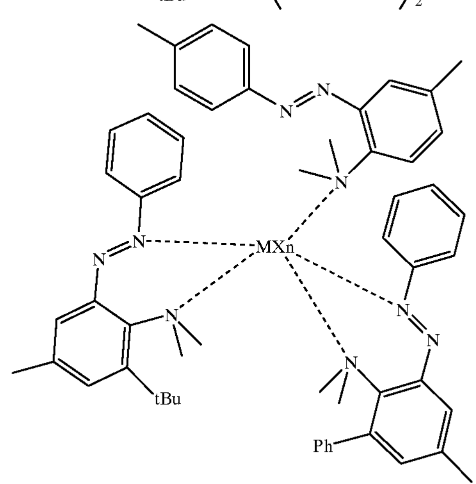

The transition metal compound represented by the formula (I-c) can be prepared without any restriction, for example, by the following process.

The transition metal compound represented by the formula (I-c) can be prepared by allowing a compound (ligand precursor) which becomes a ligand for constituting the transition metal compound to react with a compound containing a transition metal M.

For example, the ligand precursor can be obtained by allowing a phenol or phenol derivative compound when A in the formula (I-c) is an oxygen atom; a thiophenol or thiophenol derivative compound when A is a sulfur atom; or an aniline or aniline derivative compound when A is a nitrogen atom having $R^6$ to react with a diazonium compound synthesized from a primary amine compound of the formula $R^1$—$NH_2$ ($R^1$ has the same meaning as that of $R^6$ in the formula (I-c)) such as an aniline compound or an alkylamine compound. More specifically, both of the starting compounds are dissolved in a solvent. As the solvent, any solvent generally used for such reaction is employable. Above all, a water solvent is preferable. Then, the resulting solution is stirred under the conditions of a temperature of 0° C. to reflux for about 1 to 48 hours, whereby the corresponding ligand is obtained in a high yield.

The diazonium compound can be obtained by allowing a primary amine compound to react with sodium nitrite, alkyl nitrite or the like and a strong acid such as hydrochloric acid, but the synthesis process is not limited to this process.

Then, the thus obtained ligand can be allowed to react with a compound containing a transition metal M to synthesize the corresponding transition metal compound. More specifically, the synthesized ligand is dissolved in a solvent. The resulting solution may be contacted with a base to prepare a phenoxide salt, if necessary. Then, the solution or the phenoxide salt is mixed with a metallic compound such as a metallic halide or a metallic alkylate at a low temperature and stirred at a temperature of −78° C. to room temperature or under reflux for about 1 to 48 hours. As the solvent, any solvent generally used for such reaction is employable. Above all, a polar solvent such as ethyl ether or THF or a hydrocarbon solvent such as toluene is preferably employed. Preferable examples of the bases used for preparing a phenoxide salt include metallic salts such as lithium salts (e.g., n-butyllithium) and sodium salts (e.g., sodium hydride) and organic bases such as triethylamine and pyridine, but not limited thereto. The number of ligands to be reacted can be adjusted by changing the charge ratio between the transition metal M-containing compound and the ligand.

According to properties of the compound, the ligand can be directly reacted with the metallic compound without producing a phenoxide salt, whereby the corresponding transition metal compound can be synthesized. For example, the following compound can be prepared by directly reacting the ligand with the transition metal halide.

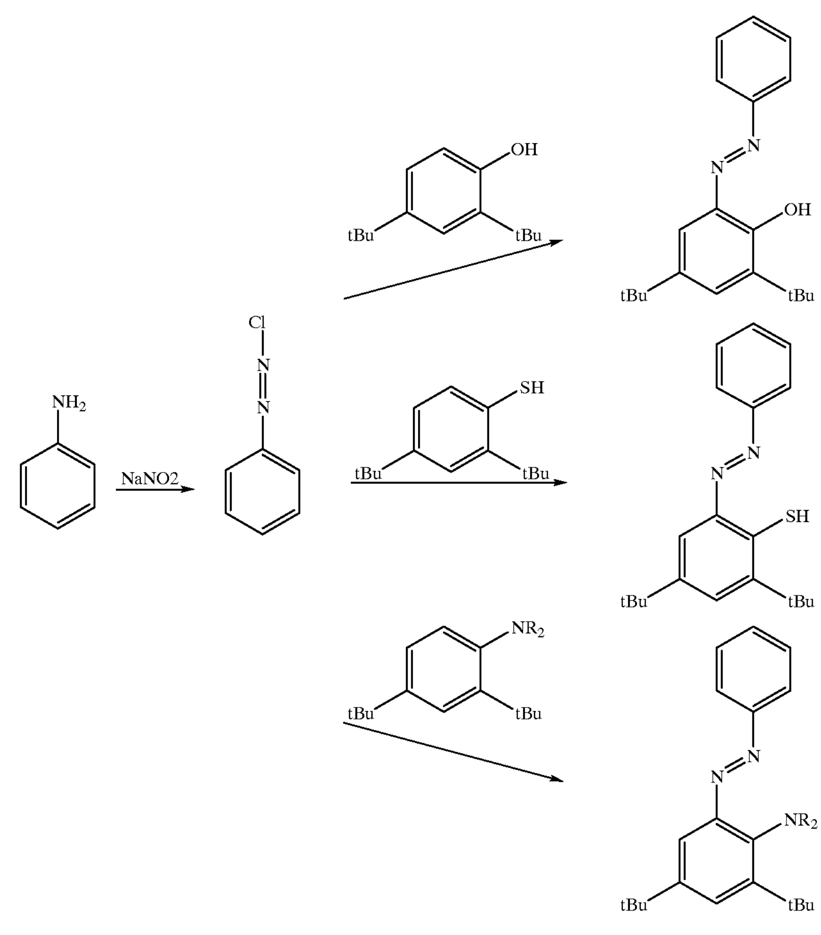

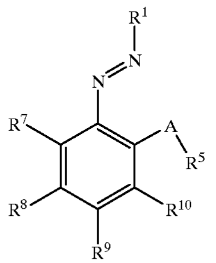

It is also possible to exchange the metal M in the synthesized transition metal compound with another transition metal in a conventional way. When any of $R^1$ and $R^5$ to $R^{10}$ is H, a substituent other than H can be introduced in any stage of the synthesis process.

Next, the other embodiment of the olefin polymerization catalyst of the invention is described.

The other embodiment of the olefin polymerization catalyst of the invention comprises a transition metal compound (A-2) represented by the formula (II).

(II)

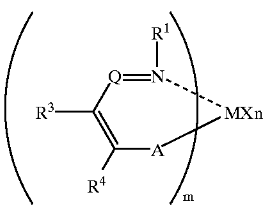

In the above formula, N— — —M generally indicates a coordinate bond, but the invention also includes a compound having no such a coordinate bond.

In the above formula, M is a transition metal atom of Group 3 (including lanthanoid) to Group 11 of the periodic table. Examples of such atoms include scandium, lanthanoid, titanium, zirconium, hafnium, vanadium, niobium, tantalum, cobalt, rhodium, yttrium, chromium, molybdenum, tungsten, manganese, rhenium, iron, ruthenium, nickel and palladium. Of these, preferable are metal atoms of Group 3 (including lanthanoid) to Group 9, such as scandium, lanthanoid, titanium, zirconium, hafnium, vanadium, niobium, tantalum, iron, cobalt and rhodium. More preferable are metal atoms of Group 3 to Group 5 and Group 9, such as titanium, zirconium, hafnium, cobalt, rhodium, vanadium, niobium and tantalum. Still more preferable are metal atoms of Group 4 and Group 5, such as titanium, zirconium, hafnium and vanadium. Particularly preferable are metal atoms of Group 4, such as titanium, zirconium and hafnium.

m is an integer of 1 to 6, preferably an integer of 1 to 4, more preferably an integer of 1 to 2.

Q is a nitrogen atom (—N=) or a carbon atom having a substituent $R^2$ (—C($R^2$)=).

A is an oxygen atom (—O—), a sulfur atom (—S—), a selenium atom (—Se—) or a nitrogen atom having a substituent $R^6$ (—N($R^6$)—).

$R^1$ to $R^4$ and $R^6$ may be the same or different, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, two or more of them may be bonded to each other to form a ring, and when m is 2 or greater, $R^1$s, $R^2$s, $R^3$s, $R^4$s, or $R^6$s may be the same or different, and one group of $R^1$ to $R^4$ and $R^6$ contained in one ligand and one group of $R^1$ to $R^4$ and $R^6$ contained in other ligands may be bonded.

Examples of the atoms and groups indicated by $R^1$ to $R^4$ and $R^6$ include the same atoms and groups as previously described with respect to $R^1$ to $R^6$ in the formula (I).

When A is a nitrogen atom having a substituent $R^6$, $R^6$ is preferably a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group.

When A is an oxygen atom, a sulfur atom or a selenium atom, $R^4$ is preferably a substituent other than hydrogen or halogen. That is, $R^4$ is preferably a hydrocarbon group, a heterocyclic compound residual group, an oxygen-containing group, a sulfur-containing group, a silicon-containing group, a germanium-containing group or a tin-containing group. $R^4$ is particularly preferably a halogen atom, a hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an amino group, an imido group, an imino group, a sulfonato ester group, a sulfonamido group, a cyano group, a nitro group or a hydroxyl group.

When A is an oxygen atom, a sulfur atom or a selenium atom, preferred examples of the hydrocarbon groups indicated by $R^4$ include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, thiopentyl and n-hexyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; aryl groups of 6 to 30 carbon atoms, preferably 6 to 20 carbon atoms, such as phenyl, benzyl, naphthyl, biphenylyl and triphenylyl; the above groups which are further substituted with an alkyl group or alkoxy group of 1 to 30 carbon atoms, preferably 1 to 20 carbon atoms, a halogenated alkyl group of 1 to 30 carbon atoms, preferably 1 to 20 carbon atoms, an aryl group or aryloxy group of 6 to 30 carbon atoms, preferably 6 to 20 carbon atoms, halogen, a cyano group, a nitro group or a hydroxyl group.

When A is an oxygen atom, a sulfur atom or a selenium atom, preferred examples of the hydrocarbon-substituted silyl groups indicated by $R^4$ include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl (pentafluorophenyl)silyl. Of these, particularly preferable are trimethylsilyl, triethylphenyl, diphenylmethylsilyl, isophenylsilyl, dimethylphenylsilyl, dimethyl-t-butylsilyl and dimethyl(pentafluorophenyl)silyl.

When A is an oxygen atom, a sulfur atom or a selenium atom, $R^4$ is particularly preferably a group selected from branched alkyl groups of 3 to 30 carbon atoms, preferably 3 to 20 carbon atoms, such as isopropyl, isobutyl, sec-butyl, tert-butyl and neopentyl; the above groups wherein a hydrogen atom is replaced with an aryl group of 6 to 30 carbon atoms, preferably 6 to 20 carbon atoms (e.g., cumyl group); and cyclic saturated hydrocarbon groups of 3 to 30 carbon atoms, preferably 3 to 20 carbon atoms, such as adamantyl, cyclopropyl, cyclobutyl, cyclopentyl and cyclohexyl. Also preferable is an aryl group of 6 to 30 carbon atoms, preferably 6 to 20 carbon atoms, such as phenyl, naphthyl, fluorenyl, anthranyl or phenanthryl, or a hydrocarbon-substituted silyl group.

n is a number satisfying a valence of M, specifically an integer of 0 to 5, preferably an integer of 1 to 4, more preferably an integer of 1 to 3.

When n is 2 or greater, plural groups X may be the same or different, and may be bonded to each other to form a ring.

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group.

Examples of the atoms and groups indicated by X include the same atoms and groups as previously described with respect to X in the formula (I).

The transition metal compound (A-2) represented by the formula (II) wherein Q is a carbon atom having a substituent $R^2$ is represented by the following formula (II-a):

(II-a)

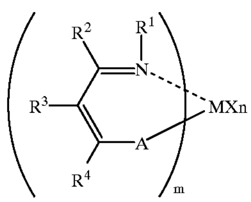

wherein M, m, A, $R^1$ to $R^4$, $R^6$, n and X have the same meanings as those of M, m, A, $R^1$ to $R^4$, $R^6$, n and X in the formula (II).

The transition metal compound (A-2) represented by the formula (II-a) wherein m is 2 and two groups of $R^1$ to $R^4$ and $R^6$ are bonded is, for example, a compound represented by the following formula (II-a').

(II-a')

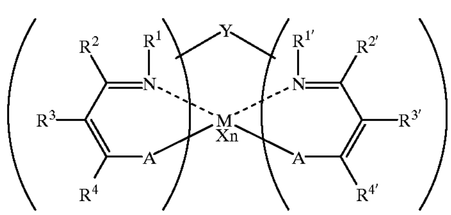

In the formula (II-a'), M, A, $R^1$ to $R^4$, $R^6$, n and X have the same meanings as those of M, A, $R^1$ to $R^4$, $R^6$, n and X in the formula (I), and $R^{1'}$ to $R^{4'}$ and $R^{6'}$ have the same meanings as those of $R^1$ to $R^4$ and $R^6$.

A' may be the same as or different from A and is an oxygen atom, a sulfur atom, a selenium atom or a nitrogen atom having a substituent $R^{6'}$.

Y is a bonding group or a single bond for linking at least one group selected from $R^1$ to $R^4$ and $R^6$ to at least one group selected from $R^{1'}$ to $R^{4'}$ and $R^{6'}$, and has the same meaning as that of Y in the formula (I-a').

Examples of the transition metal compounds represented by the formula (II-a') are given below, but not limited thereto.

In the following examples, M has the same meaning as that of M in the formula (II-a).

X has the same meaning as that of X in the formula (II-a), and is for example halogen such as Cl or Br, or an alkyl group such as methyl, but not limited thereto. When plural X are present, they may be the same or different.

n has the same meaning as that of n in the formula (II-a), and is decided by a valence of the metal M. For example, when two monoanions are bonded to the metal, there can be mentioned n=0 in case of a divalent metal, n=1 in case of a trivalent metal, n=2 in case of a tetravalent metal, and n=3 in case of a pentavalent metal. More specifically, there can be mentioned n=2 in case of Ti(IV), n=2 in case of Zr(IV), and n=2 in case of Hf(IV).

In the following examples, Me denotes methyl, Et denotes ethyl, iPr denotes i-propyl, tBu denotes tert-butyl, and Ph denotes phenyl.

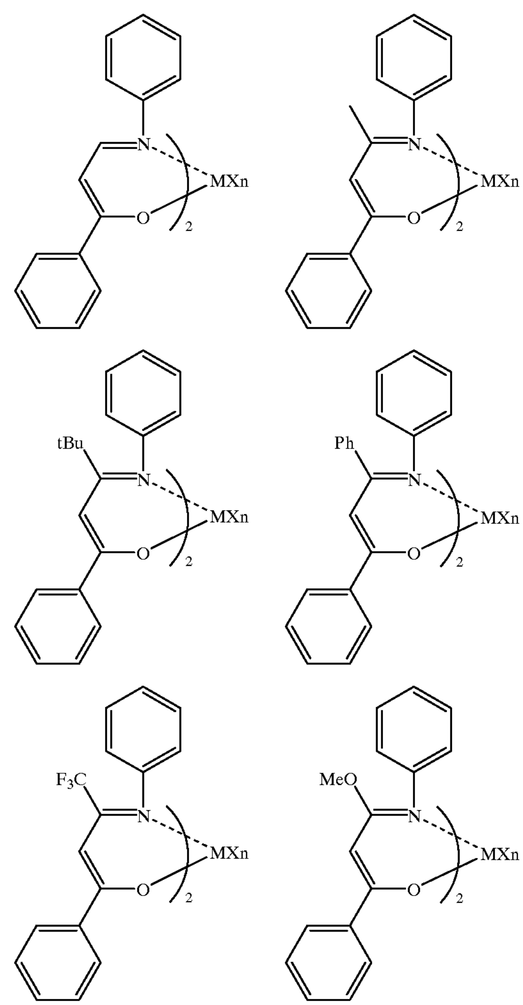

-continued
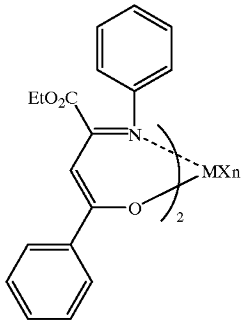
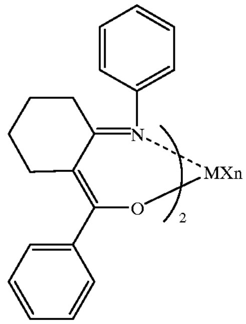
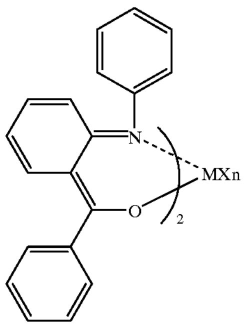
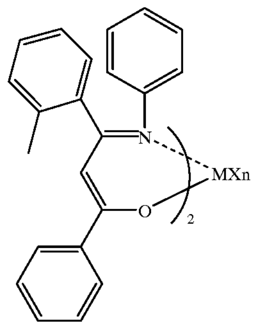
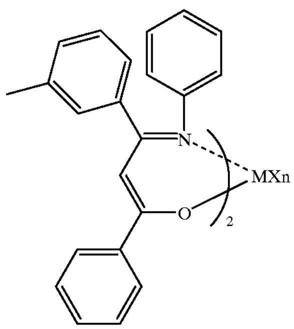
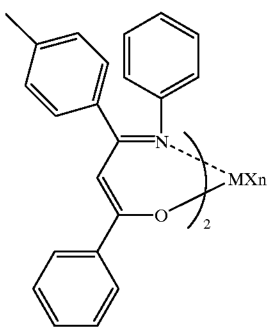
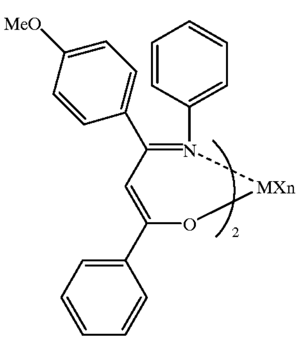
-continued
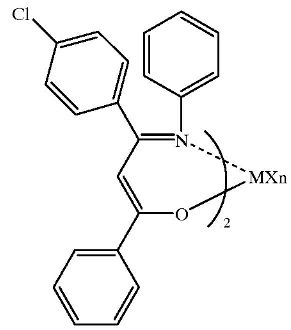
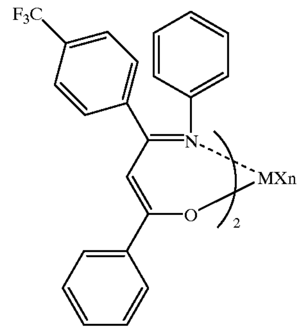
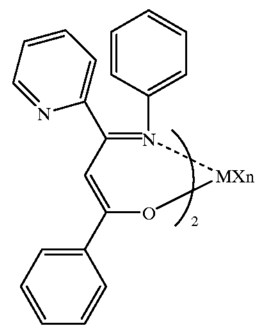
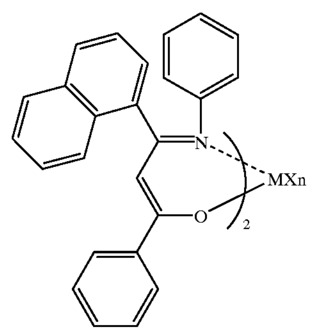
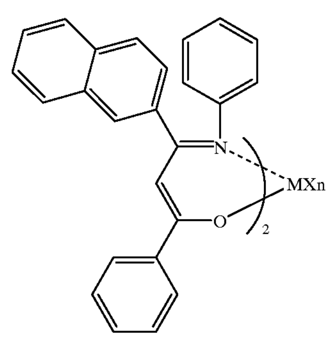

-continued
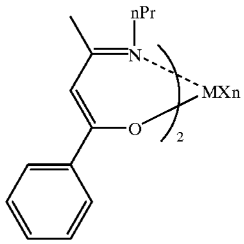
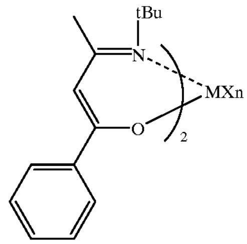
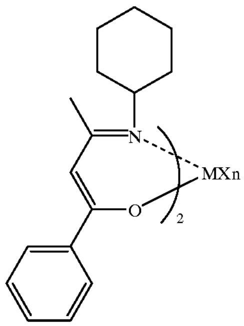
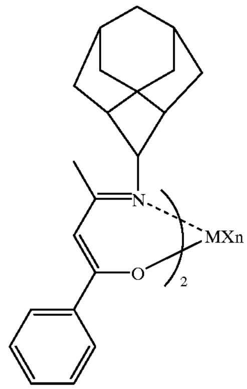
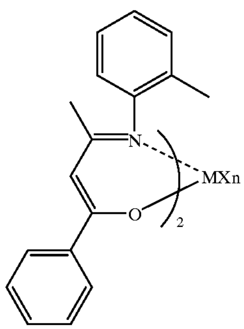
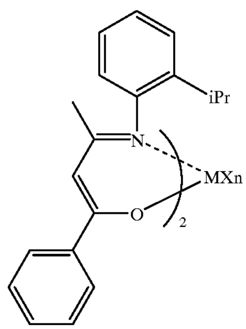
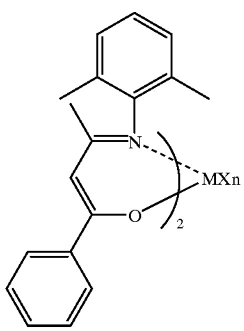
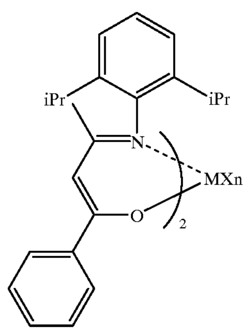
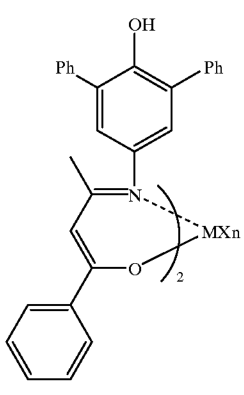
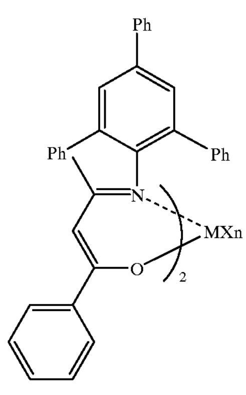
-continued
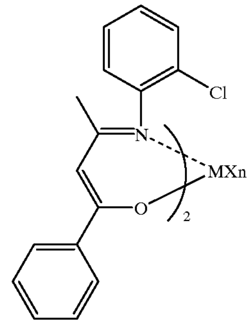
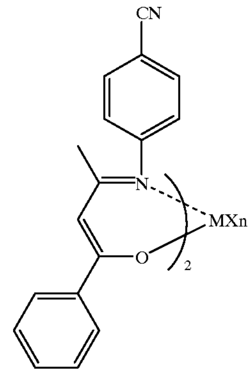
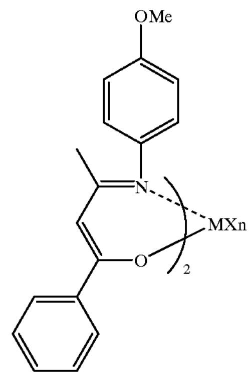
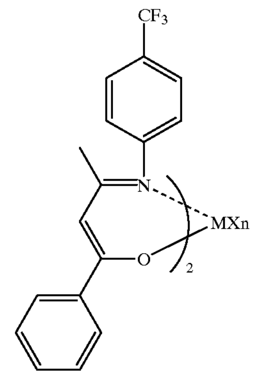
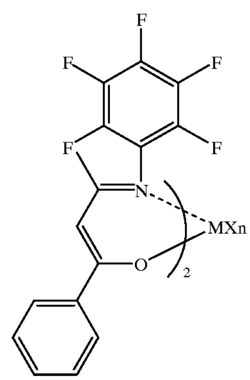
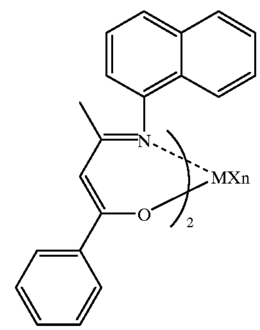
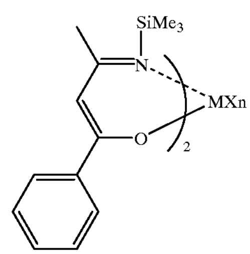
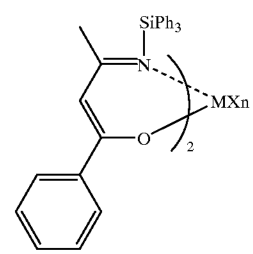
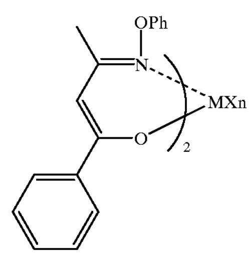
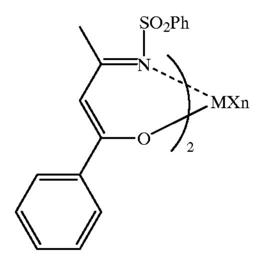

-continued
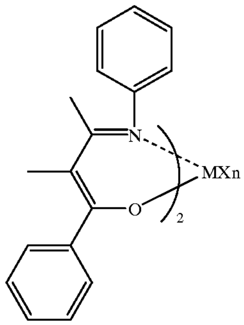
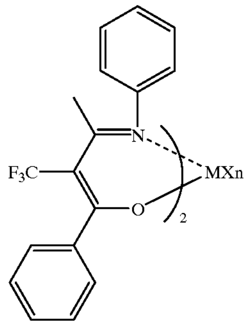
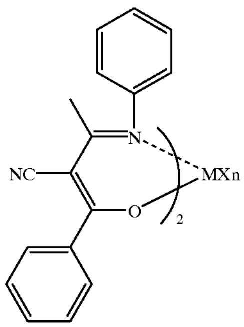
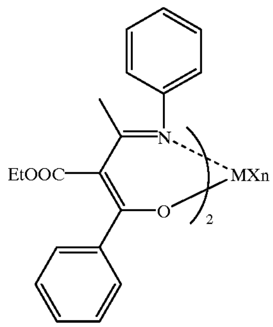
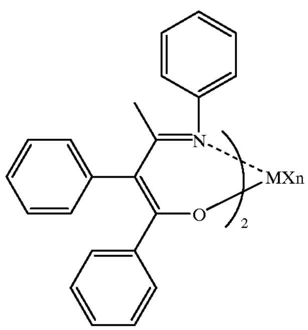
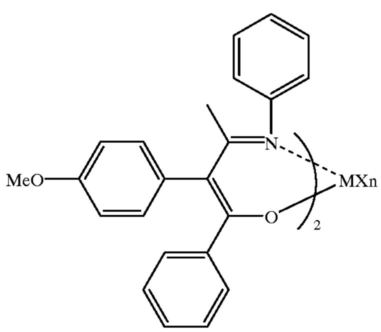
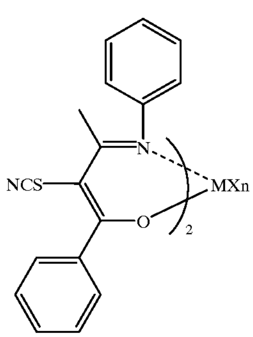
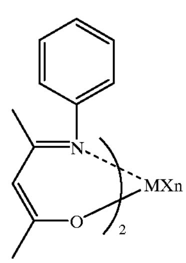
-continued
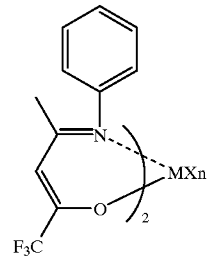
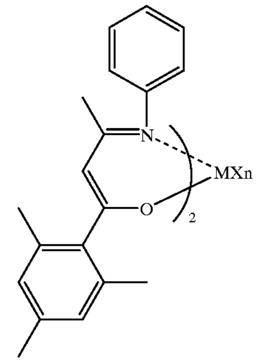
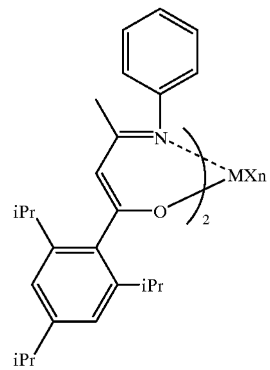
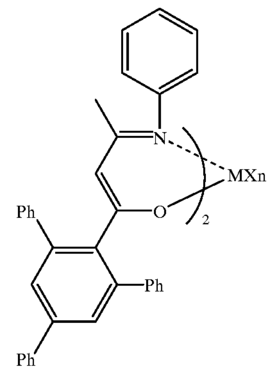
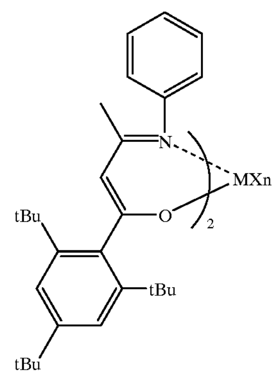
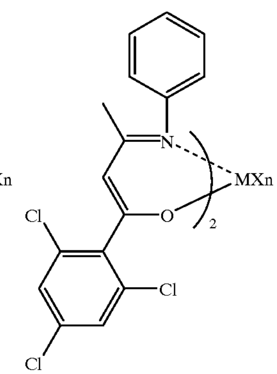
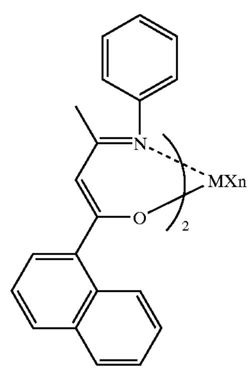
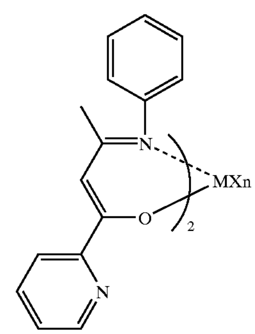

-continued
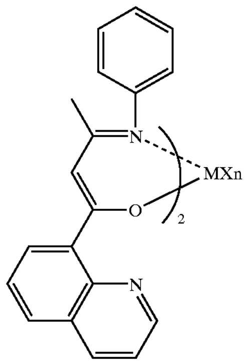
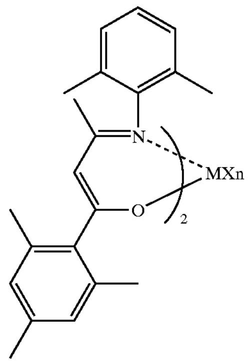
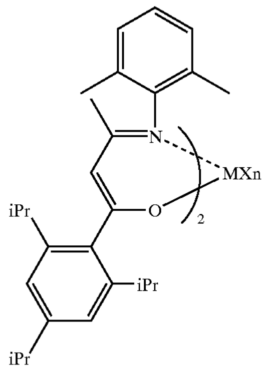
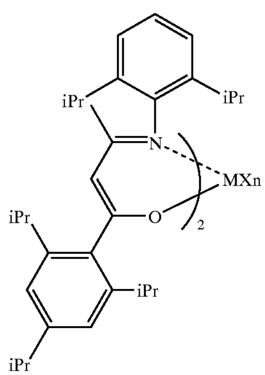
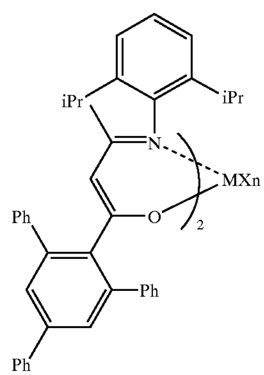
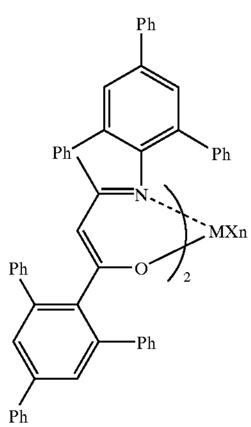
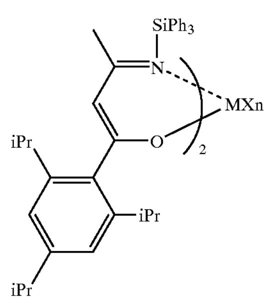
-continued
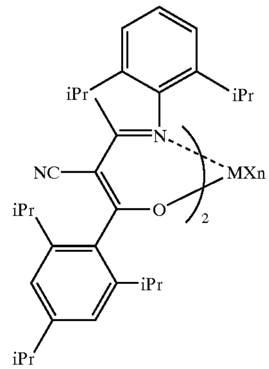
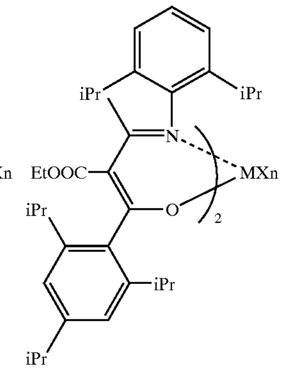
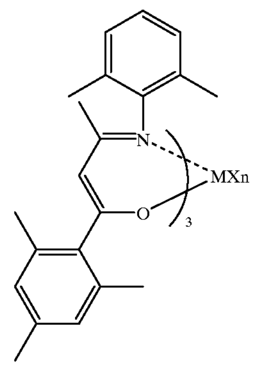
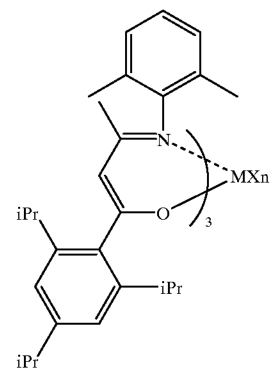
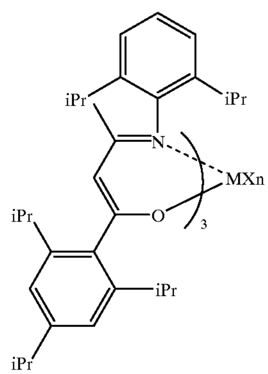
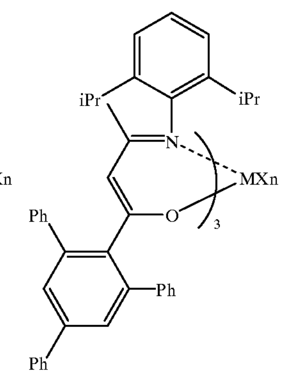
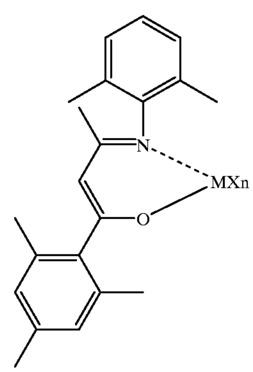
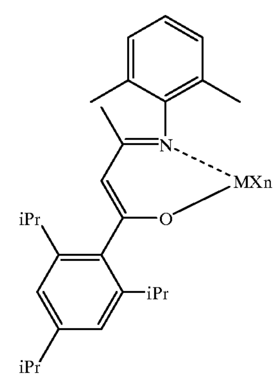

-continued
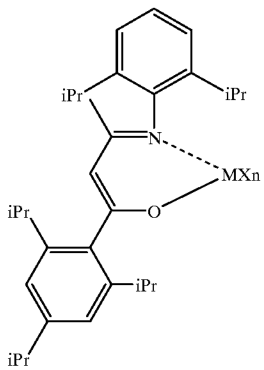
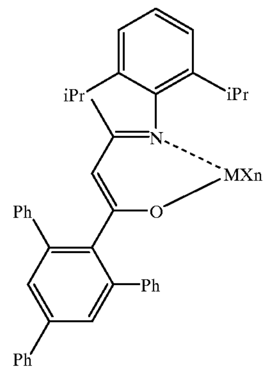
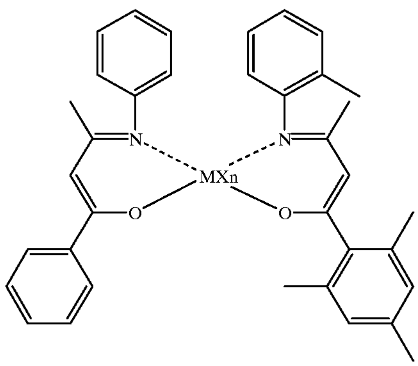
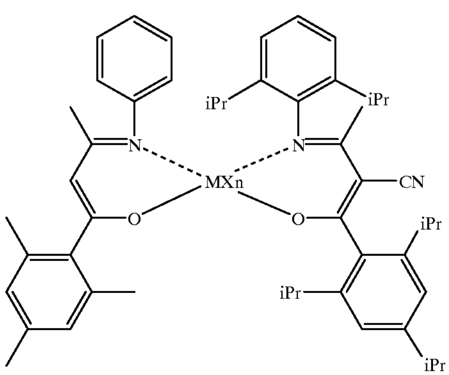
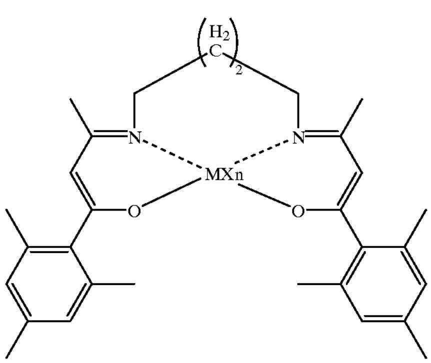
-continued
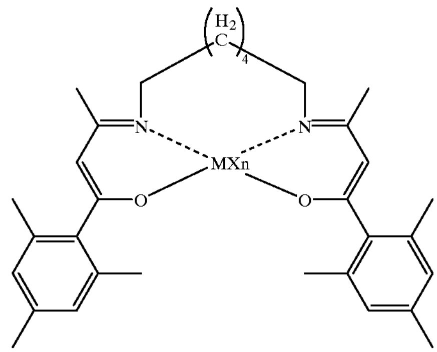
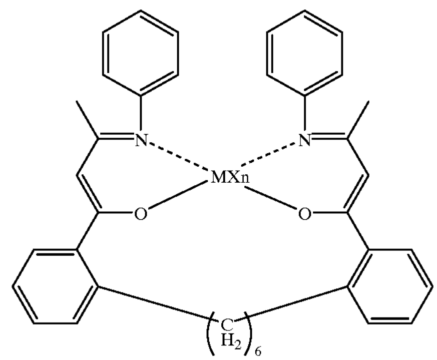
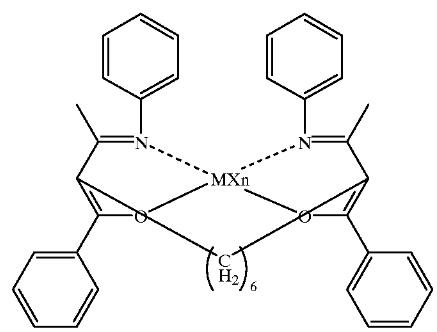
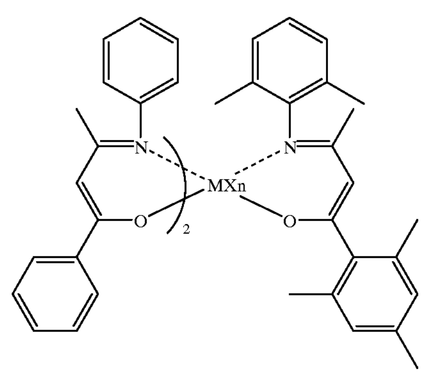

-continued
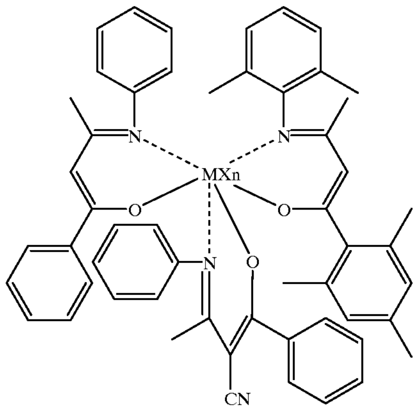
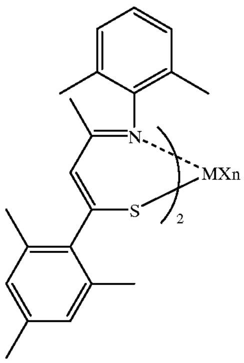
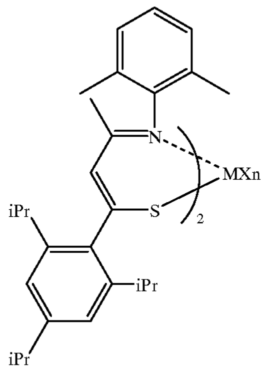
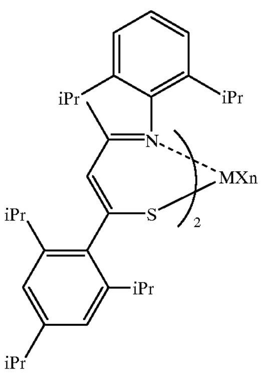
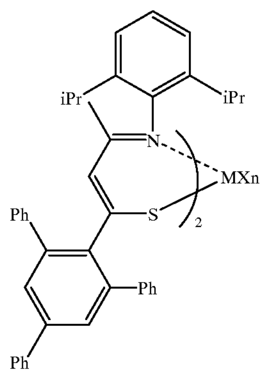
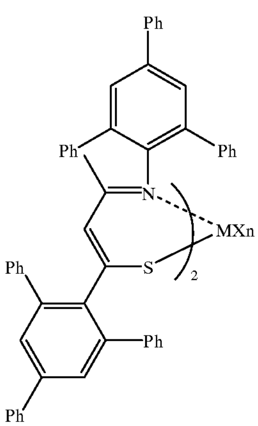
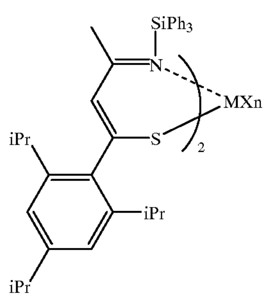
-continued
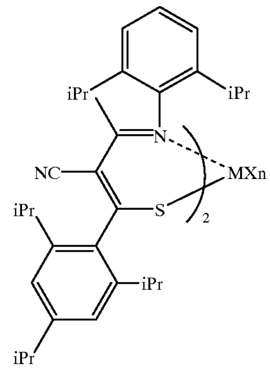
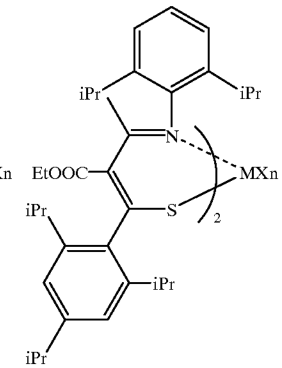
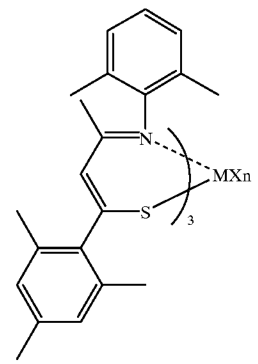
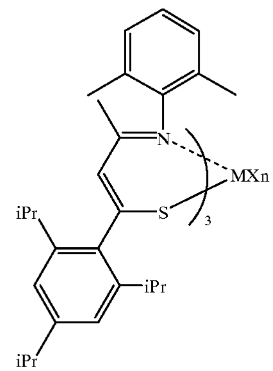
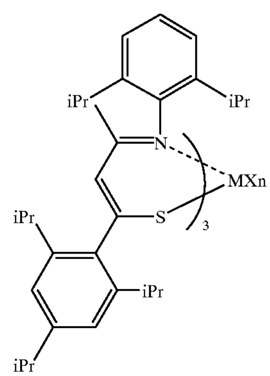
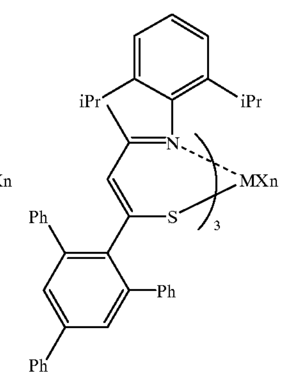
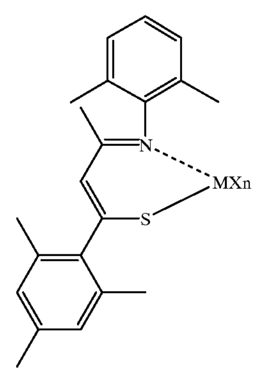
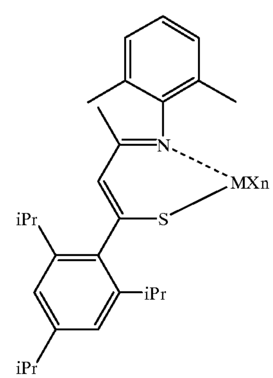

-continued
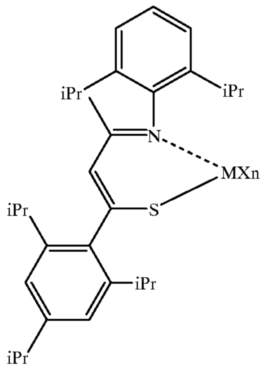
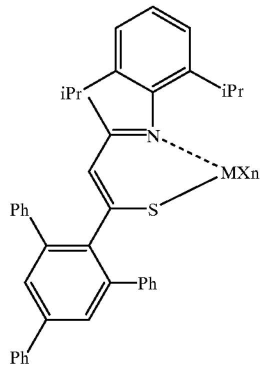
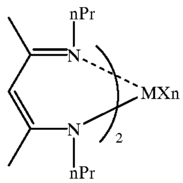
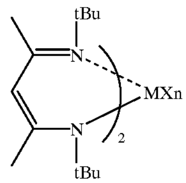
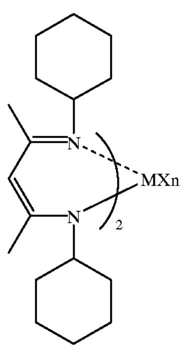
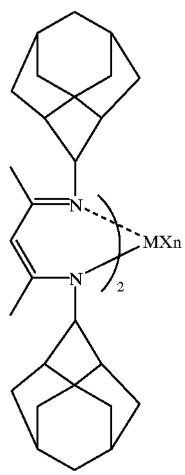
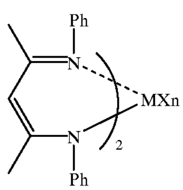
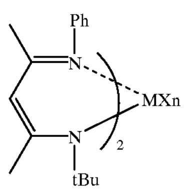
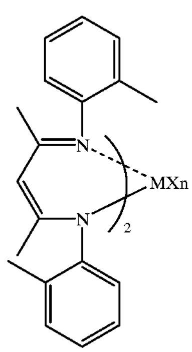
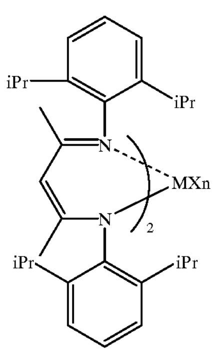
-continued
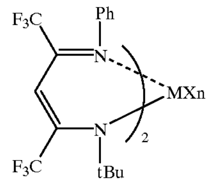
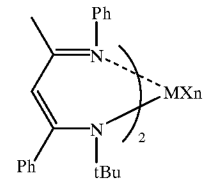
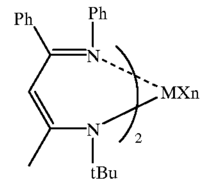
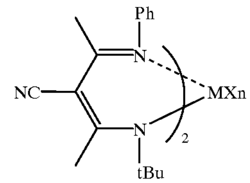
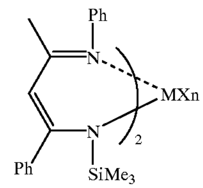
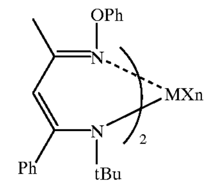
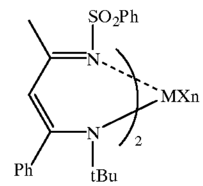
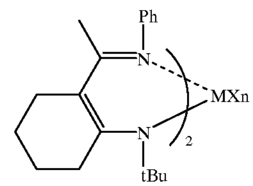
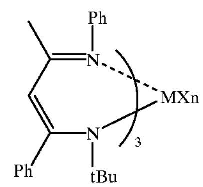
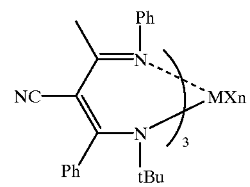
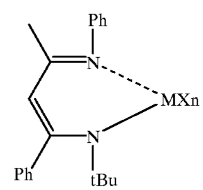
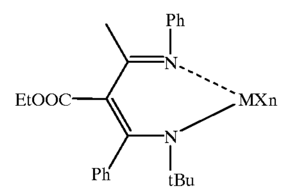
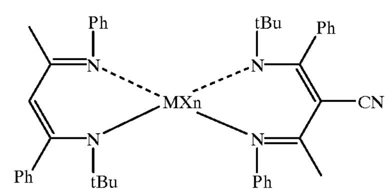
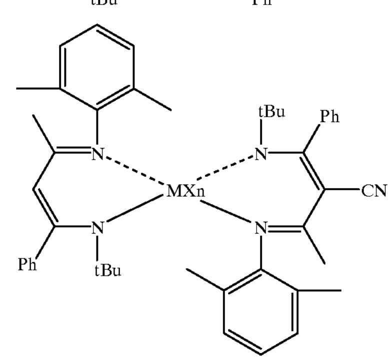

The transition metal compound represented by the formula (II-a) can be prepared without any restriction, for example, by the following process.

A compound (ligand precursor) which becomes a ligand for constituting the transition metal compound, such as a β-diketone compound, a β-ketoester compound (including thioketone and thioketoester) or an acetylacetone compound, is commercially available or obtainable by known processes described in literatures.

The ligand precursor can be obtained by allowing the above-mentioned compound such as an acetylacetone compound to react with a primary amine compound of the formula $R^1$—$NH_2$ ($R^1$ has the same meaning as that of $R^1$ in the formula (II-a)), e.g., an aniline compound or an alkylamine compound. More specifically, both of the starting compounds are dissolved in a solvent. As the solvent, any solvent generally used for such reaction is employable. Above all, an alcohol solvent such as methanol or ethanol or a hydrocarbon solvent such as toluene is preferable. Then, the resulting solution is stirred under the conditions of room temperature to reflux for about 1 to 48 hours, whereby the corresponding ligand is obtained in a high yield.

In the synthesis of the ligand compound, an acid catalyst such as formic acid, acetic acid or toluenesulfonic acid may be used as a catalyst. It is effective for the progress of the reaction to use dehydrating agents such as molecular sieves, magnesium sulfate and sodium sulfate or to perform dehydration by means of Dean and Stark method.

Then, the thus obtained ligand can be allowed to react with a compound containing a transition metal M to synthesize the corresponding transition metal compound. More specifically,the synthesized ligand is dissolved in a solvent. The resulting solution may be contacted with a base to prepare a salt, if necessary. Then, the solution or the salt is mixed with a metallic compound such as a metallic halide or a metallic alkylate at a low temperature and stirred at a temperature of −78° C. to room temperature or under reflux for about 1 to 48 hours. As the solvent, any solvent generally used for such reaction is employable. Above all, a polar solvent such as ether or tetrahydrofuran or a hydrocarbon solvent such as toluene is preferably employed. Examples of the bases used for preparing a phenoxide salt include metallic salts such as lithium salts (e.g., n-butyllithium) and sodium salts (e.g., sodium hydride) and organic bases such as triethylamine and pyridine, but not limited thereto.

According to properties of the compound, the ligand can be directly reacted with the metallic compound without producing a salt, whereby the corresponding transition metal compound can be synthesized.

It is also possible to exchange the metal M in the synthesized transition metal compound with another transition metal in a conventional way. When any of $R^1$ to $R^5$ is H, a substituent other than H can be introduced in any stage of the synthesis process.

In the transition metal compound represented by the formula (II-a), two or more groups of $R^1$ to $R^4$ and $R^6$ may be bonded to form a ring structure. The compound wherein two or more groups of $R^1$ to $R^4$ and $R^6$, e.g., $R^3$ and $R^4$, are bonded to form an aromatic ring is, for example, a compound represented by the following formula (II-b).

(II-b)

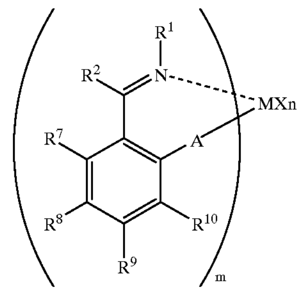

In the formula (II-b), N— — —M generally indicates a coordinate bond, but in the invention, it may indicate a coordinate bond or no coordinate bond.

In the above formula, M, m, A, $R^1$, $R^2$, $R^6$, n and X have the same meanings as those of M, m, A, $R^1$, $R^2$, $R^6$, n and X in the formula (II).

When m is 1, A is a sulfur atom, a selenium atom or a nitrogen atom having a substituent $R^6$, and when m is 2 or greater, plural groups indicated by A may be the same or different, they are each an oxygen atom, a sulfur atom, a selenium atom or a nitrogen atom having a substituent $R^6$, and at least one A is a sulfur atom, a selenium atom or a nitrogen atom having a substituent $R^6$.

In the compound represented by the formula (II-b), when m is 2 or greater, it is preferable that plural groups A are the same as each other and are each a sulfur atom, a selenium atom or a nitrogen atom having a substituent $R^6$.

$R^7$ to $R^{10}$ have the same meanings as those of $R^1$ to $R^4$ and $R^6$ in the formula (II).

$R^1$, $R^2$ and $R^6$ to $R^{10}$ may be the same or different, two or more of them may be bonded to each other to form a ring, and when m is 2 or greater, $R^1$s, $R^2$s, $R^6$s, $R^7$s, $R^8$s, $R^9$s, or $R^{10}$s may be the same or different, and one group of $R^1$, $R^2$ and $R^6$ to $R^{10}$ contained in one ligand and one group of $R^1$, $R^2$ and $R^5$ to $R^{10}$ contained in other ligands may be bonded.

The transition metal compound represented by the formula (II-b) wherein m is 2 and two groups of $R^1$, $R^2$ and $R^7$ to $R^{10}$ (or $R^1$, $R^2$ and $R^6$ to $R^{10}$ when A is —N($R^6$)—) are boned to form a ring is, for example, a compound represented by the following formula (II-b').

(II-b')

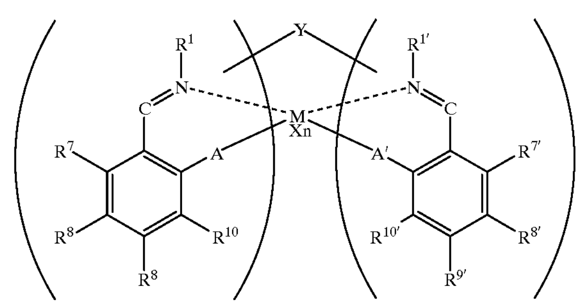

In the above formula, M, $R^1$, $R^2$, $R^6$ to $R^{10}$, n and X have the same meanings as those of M, $R^1$, $R^2$, $R^6$ to $R^{10}$, n and X in the formula (II-b).

A is a sulfur atom, a selenium atom or a nitrogen atom having a substituent $R^6$.

A' may be the same as or different from A and is an oxygen atom, a sulfur atom, a selenium atom or a nitrogen atom having a substituent $R^6$.

$R^{1'}$, $R^{2'}$ and $R^{6'}$ to $R^{10'}$ may be the same or different and have the same meanings as those of $R^1$, $R^2$ and $R^6$ to $R^{10}$. Two or more groups of them, preferably adjacent groups, may be bonded to each other to form an aliphatic ring, an aromatic ring or a hydrocarbon ring containing a hetero atom such as a nitrogen atom.

Y is a bonding group or a single bond for linking at least one group selected from $R^1$, $R^2$ and $R^6$ to $R^{10}$ to at least one group selected from $R^{1'}$, $R^{2'}$ and $R^{6'}$ to $R^{10'}$, and has the same meaning as that of Y in the formula (I-a').

Examples of the transition metal compounds represented by the formula (II-b) are given below, but not limited thereto.

In the following examples, M has the same meaning as that of M in the formula (II-b), and is for example Sc(III), Ti(III), Ti(IV), Zr(III), Zr(IV), Hf(IV), V(IV), Nb(V), Ta(V), Co(II), Co(III), Ni(II), Rh(II), Rh(III), Rh(IV) or Pd(II), Pd(VI), but not limited thereto. Of these, preferable is Ti(IV), Zr(IV) or Hf(IV).

X has the same meaning as that of X in the formula (II-b), and is for example halogen such as Cl or Br, or an alkyl group such as methyl, but not limited thereto. When plural X are present, they may be the same or different.

n has the same meaning as that of n in the formula (II-b), and is decided by a valence of the metal M. For example, when two monoanions are bonded to the metal atom M, there can be mentioned n=0 in case of a divalent metal, n=1 in case of a trivalent metal, n=2 in case of a tetravalent metal, and n=3 in case of a pentavalent metal. More specifically, there can be mentioned n=2 in case of Ti(IV), n=2 in case of Zr(IV), and n=2 in case of Hf(IV).

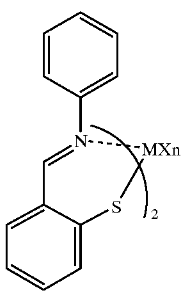

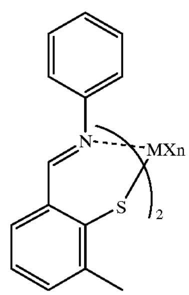

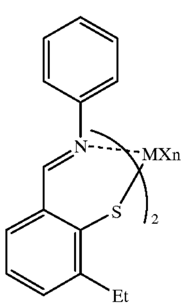

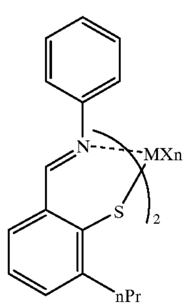

-continued

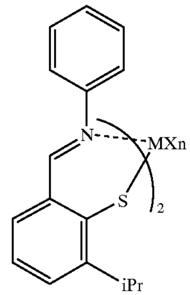

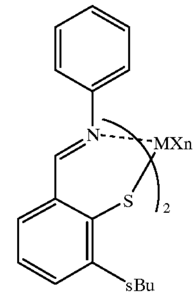

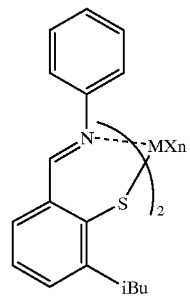

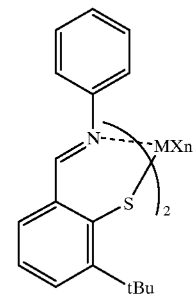

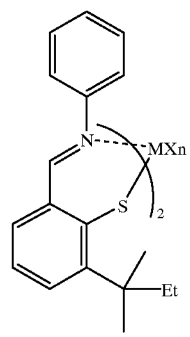

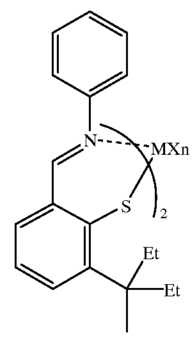

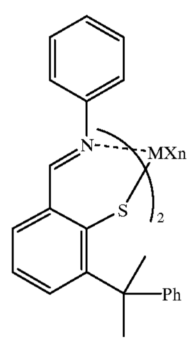

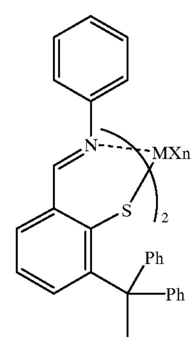

-continued
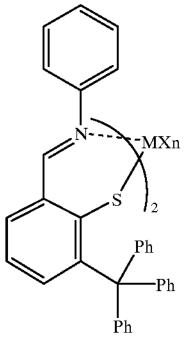
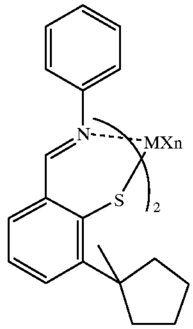
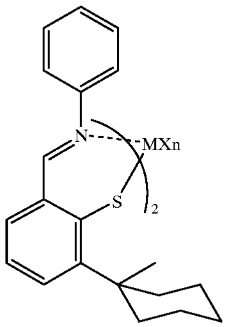
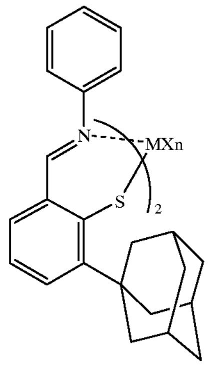
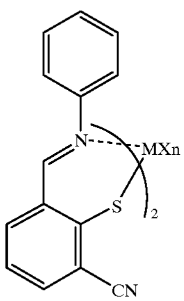
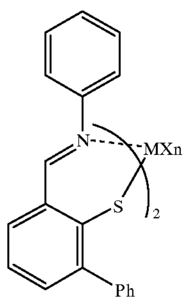
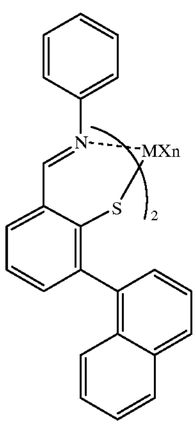
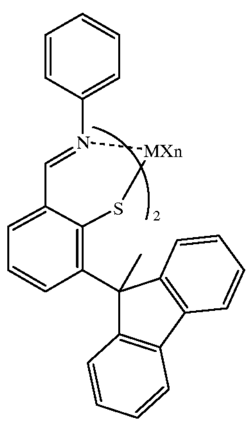
-continued
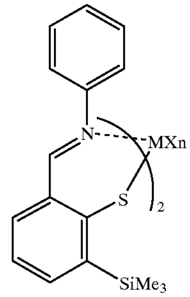
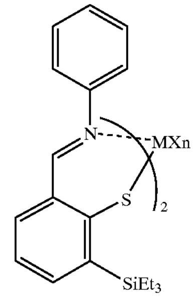
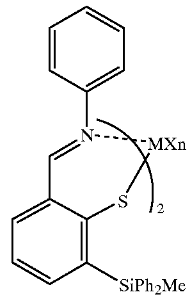
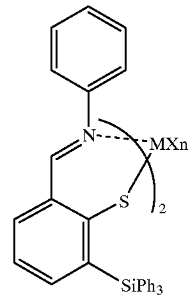
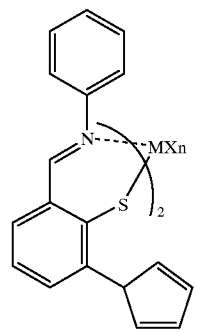
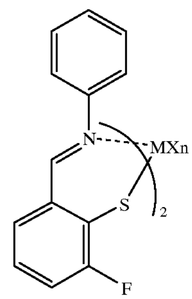
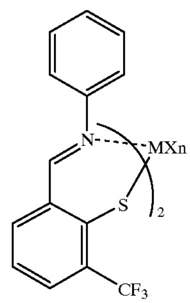
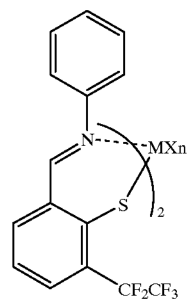
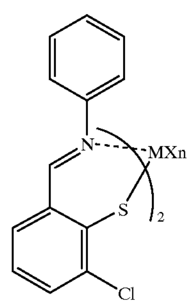
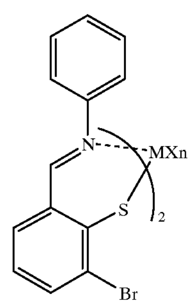

-continued
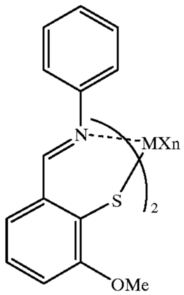
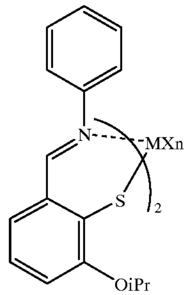
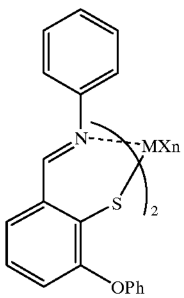
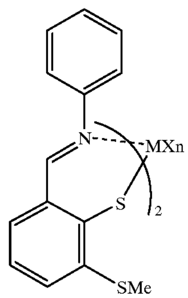
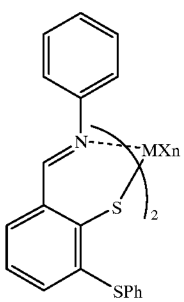
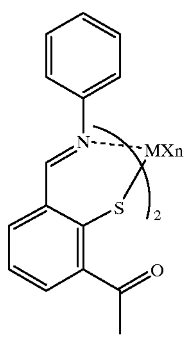
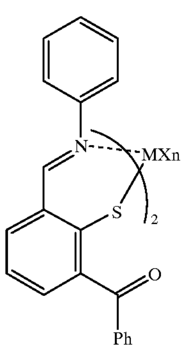
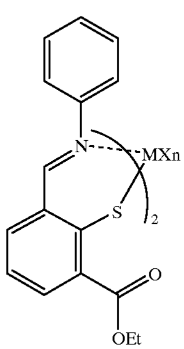
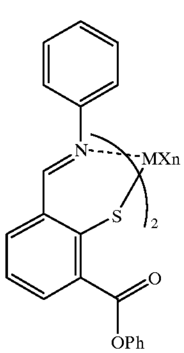
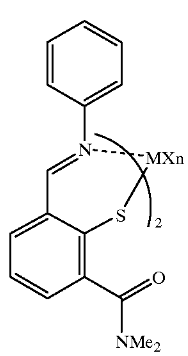
-continued
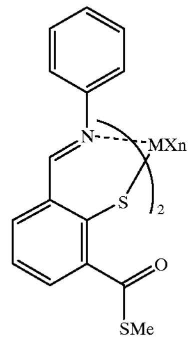
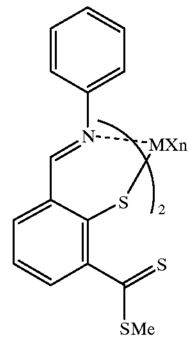
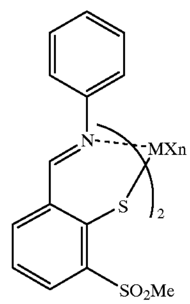
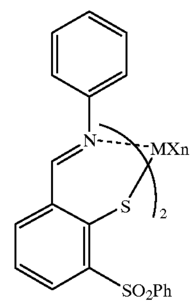
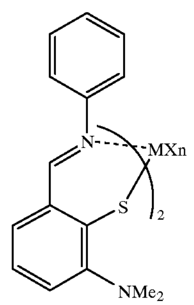
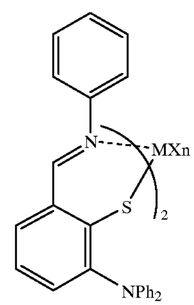
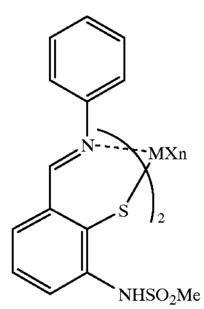
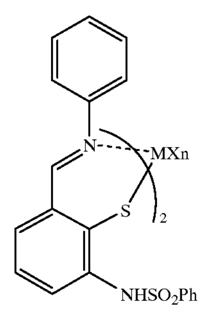
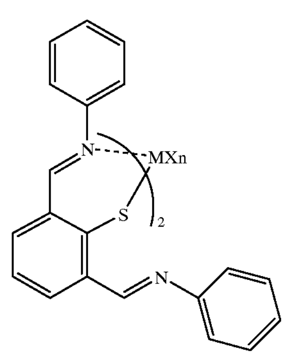

-continued
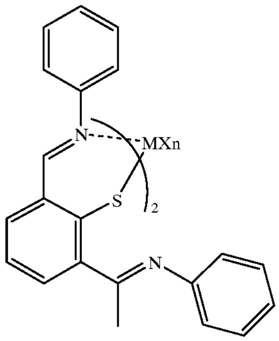
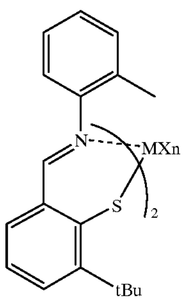
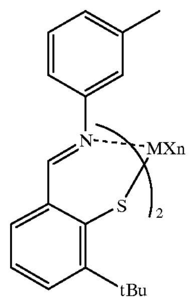
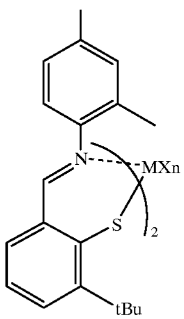
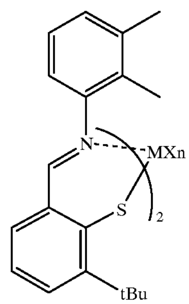
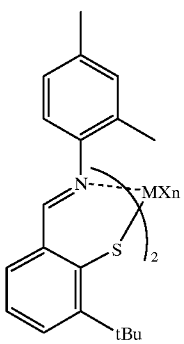
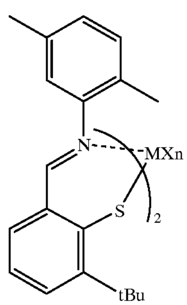
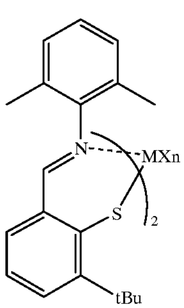
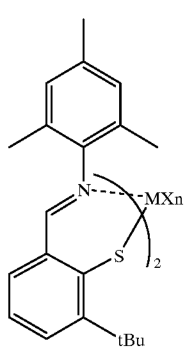
-continued
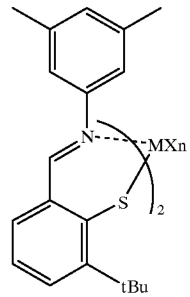
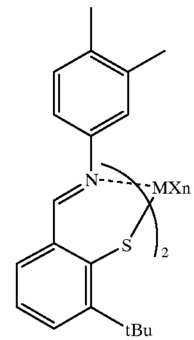
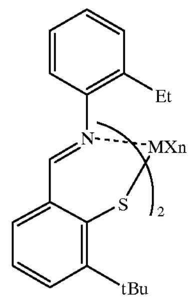
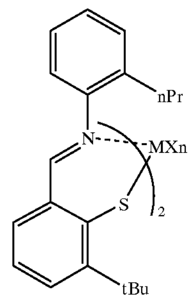
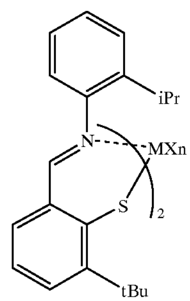
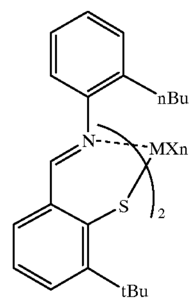
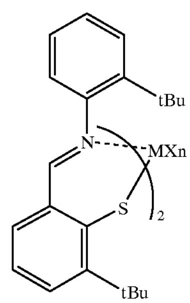
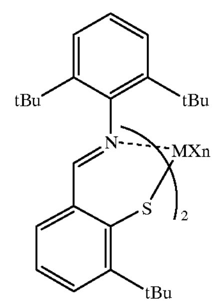
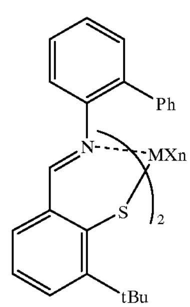
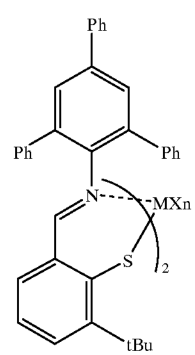

-continued
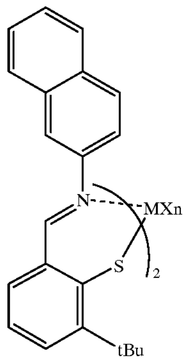
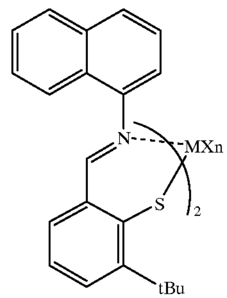
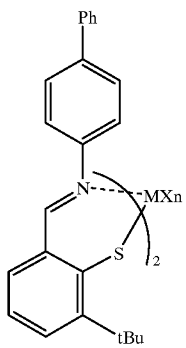
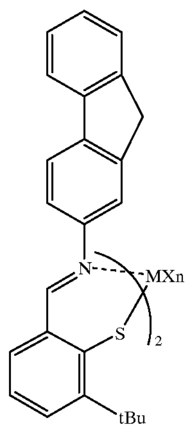
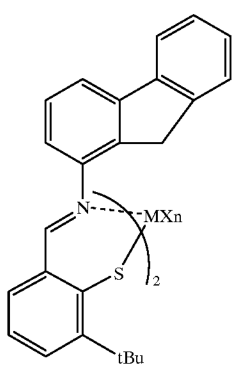
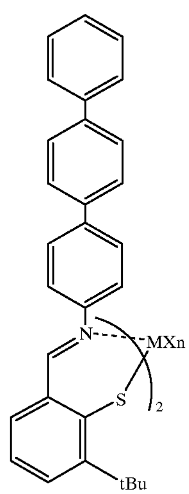
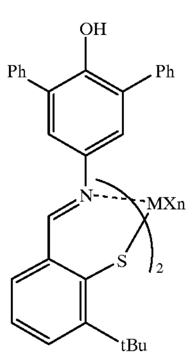
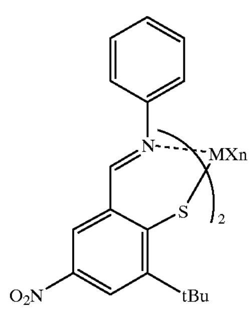
-continued
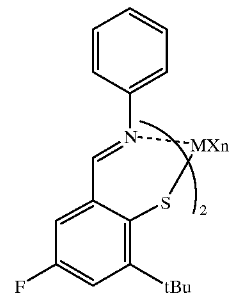
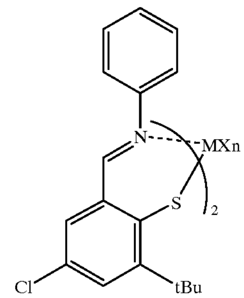
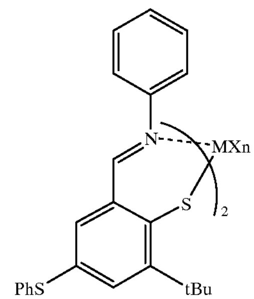
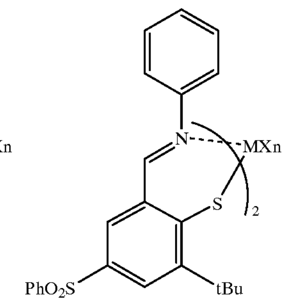
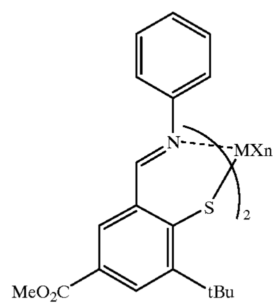
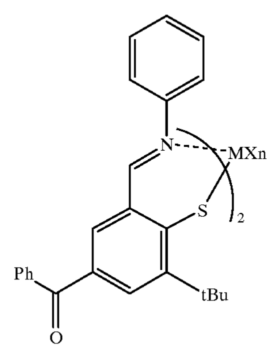
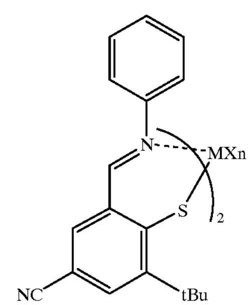
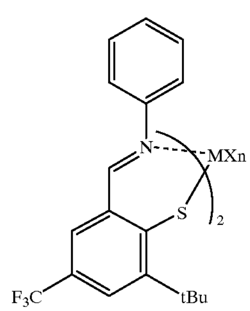
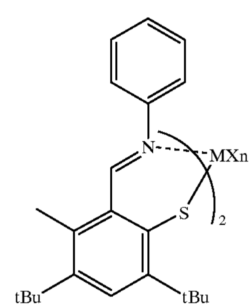

-continued
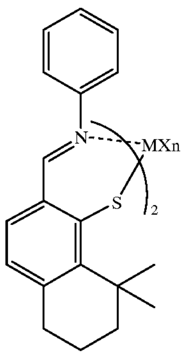
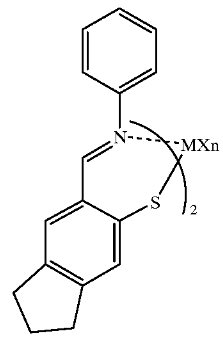
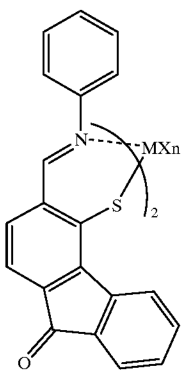
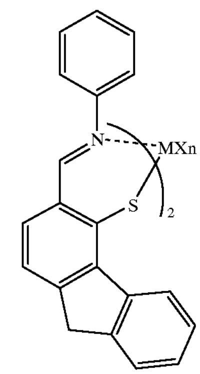
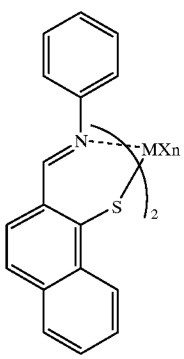
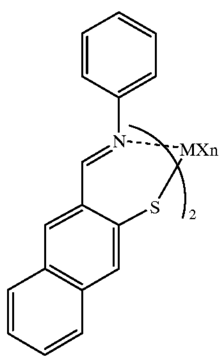
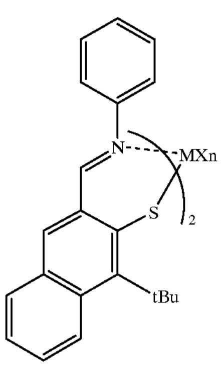
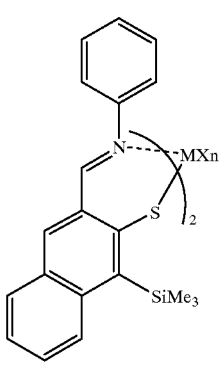
-continued
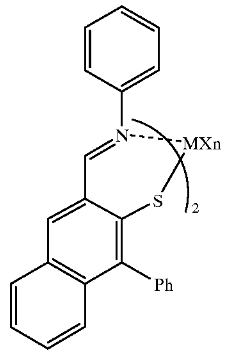
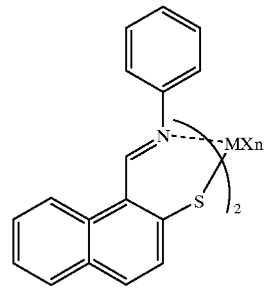
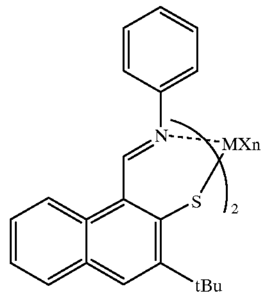
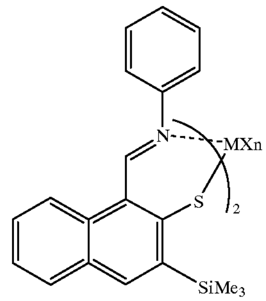
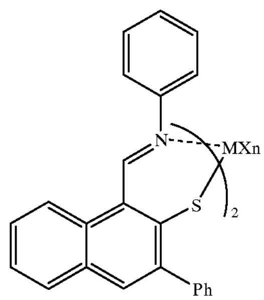
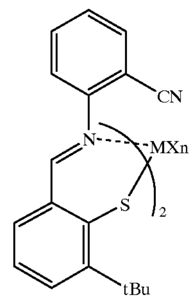
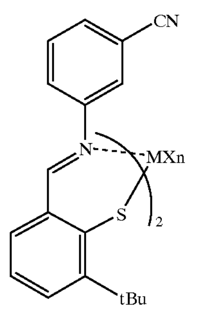
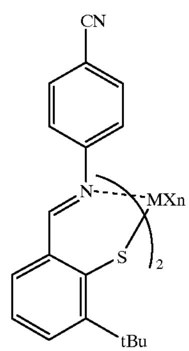
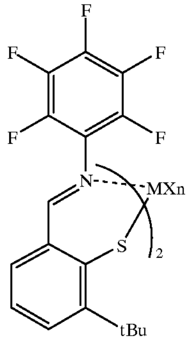
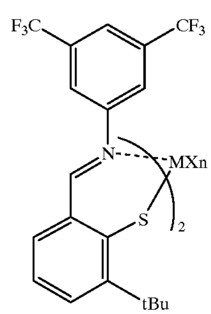

-continued
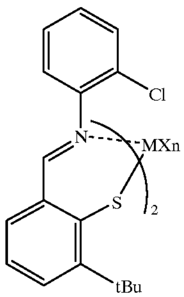
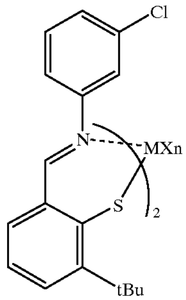
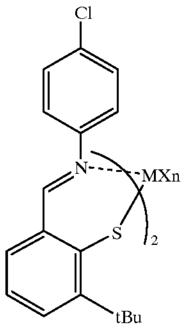
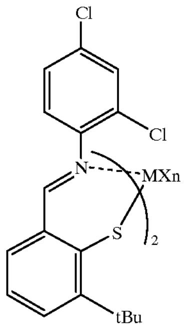
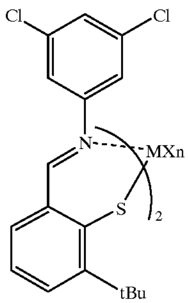
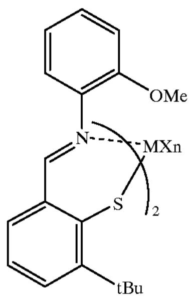
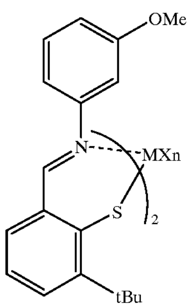
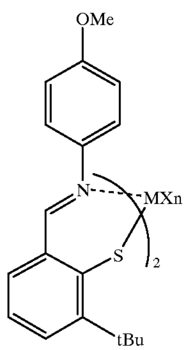
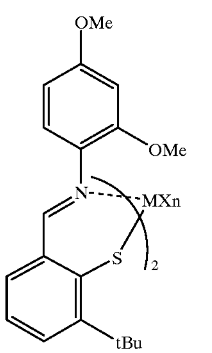
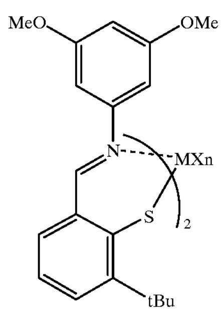
-continued
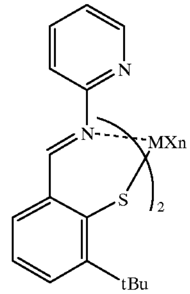
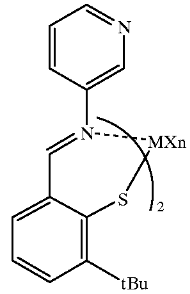
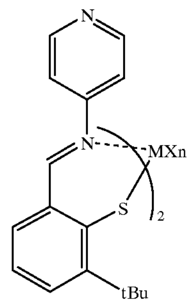
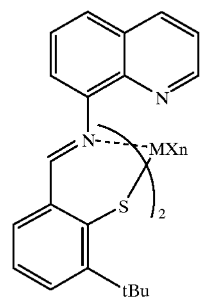
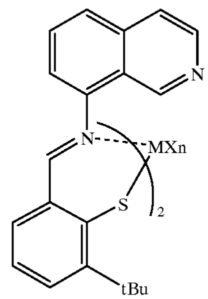
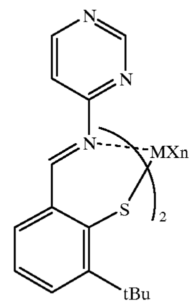
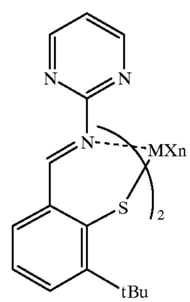
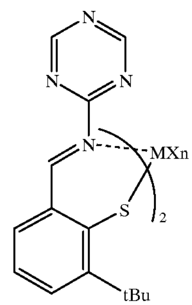
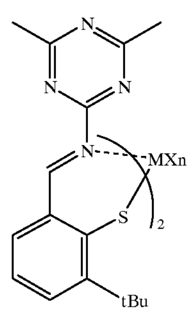
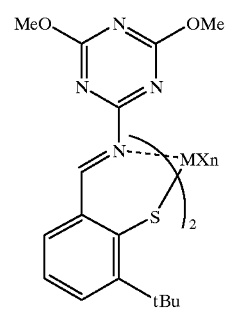

-continued
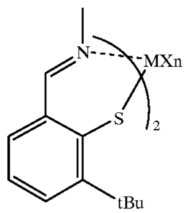
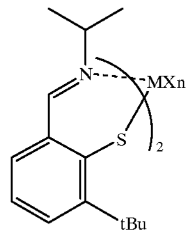
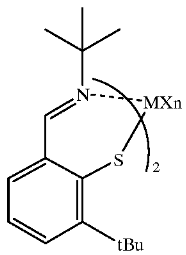
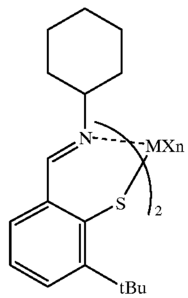
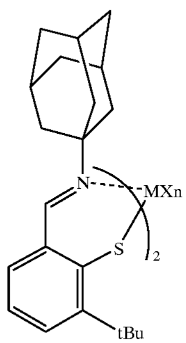
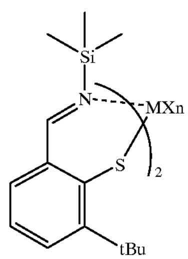
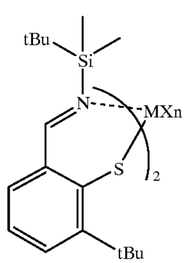
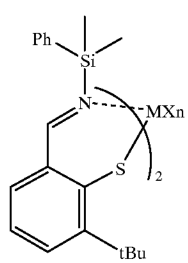
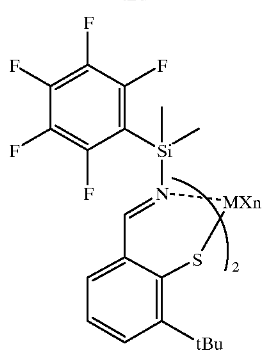
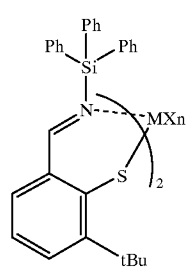
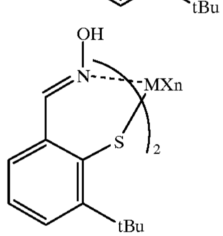
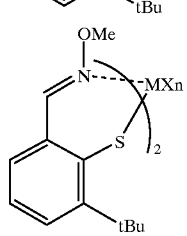
-continued
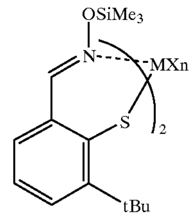
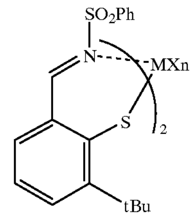
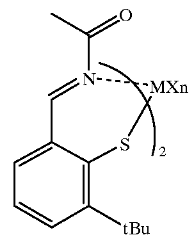
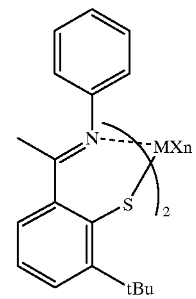
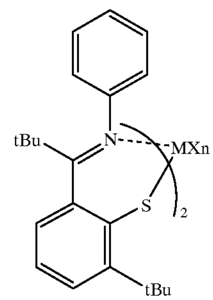
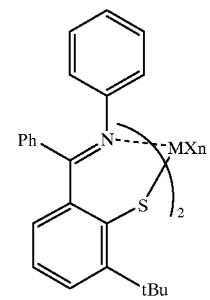
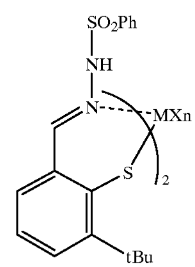
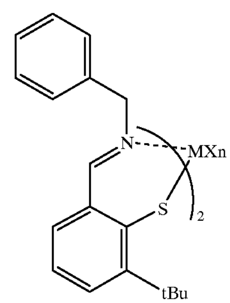
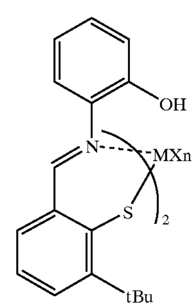
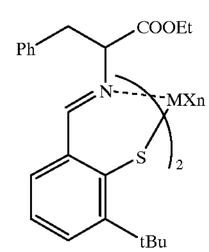
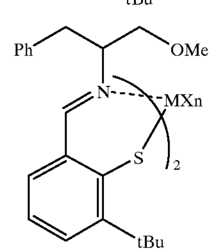
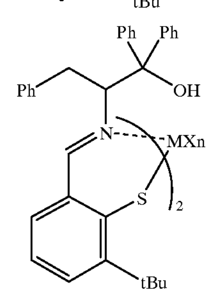

-continued
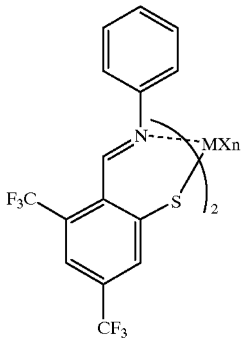
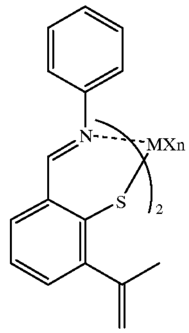
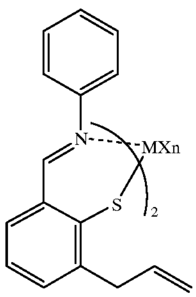
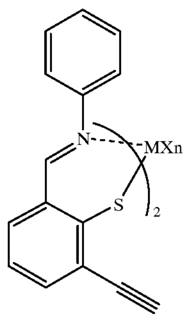
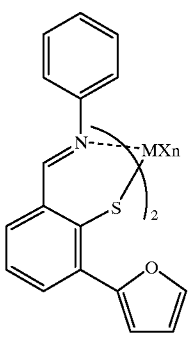
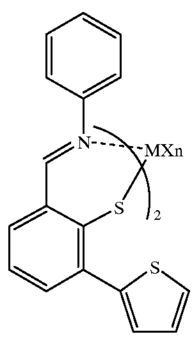
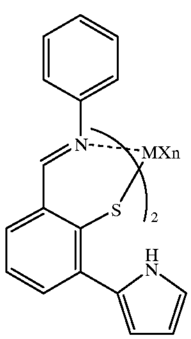
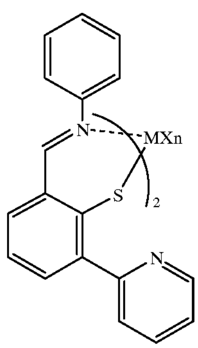
-continued
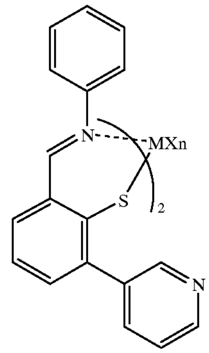
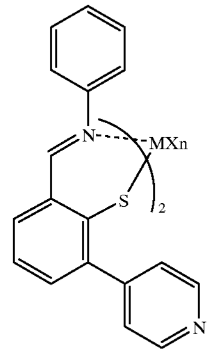
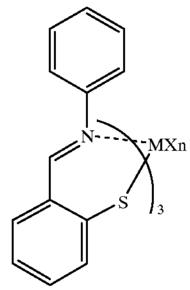
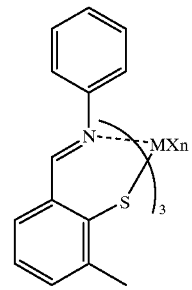
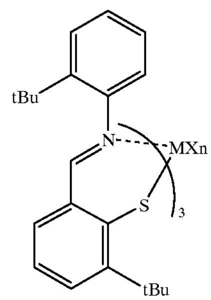
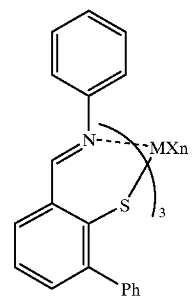
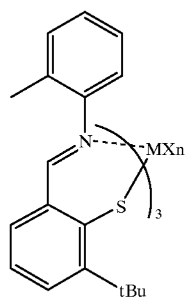
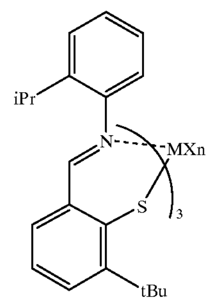
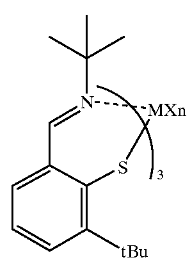
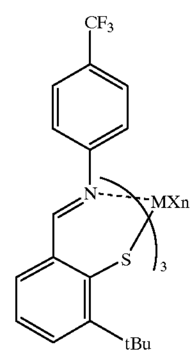

-continued
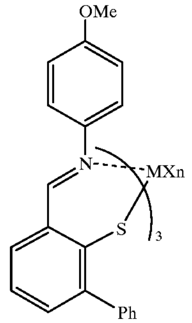
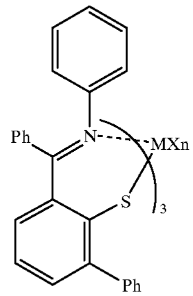
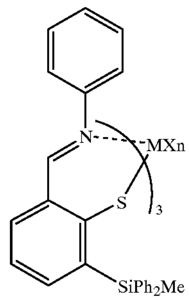
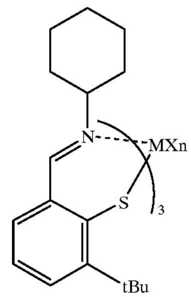
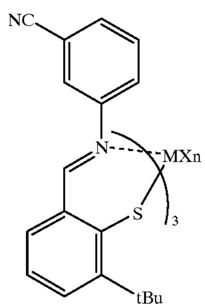
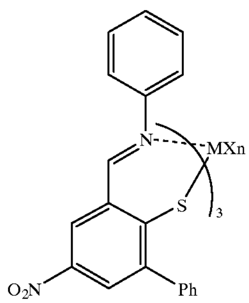
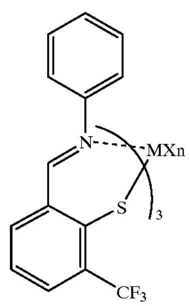
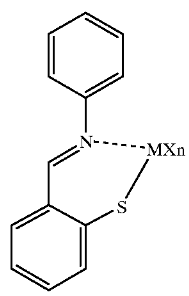
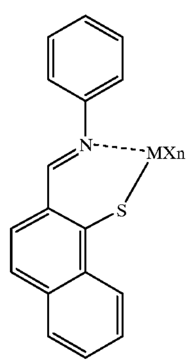
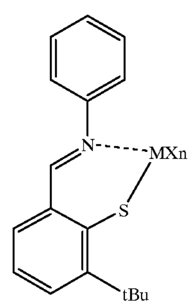
-continued
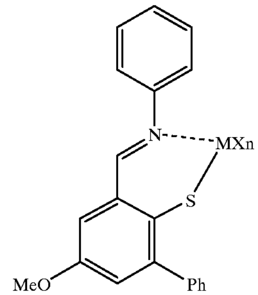
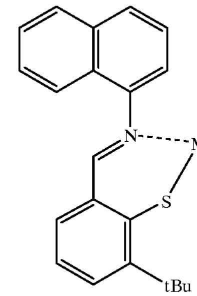
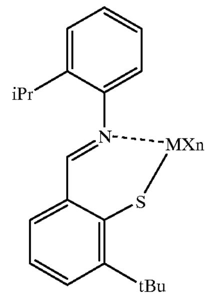
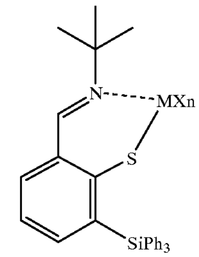
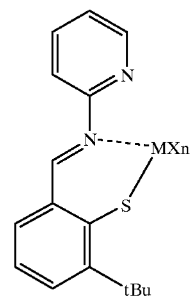
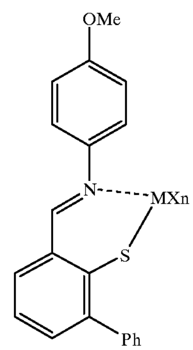
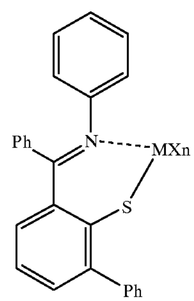
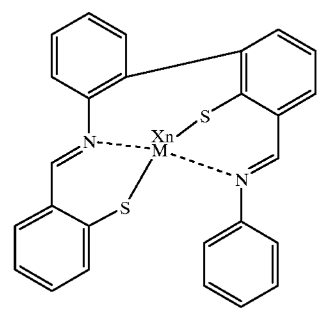
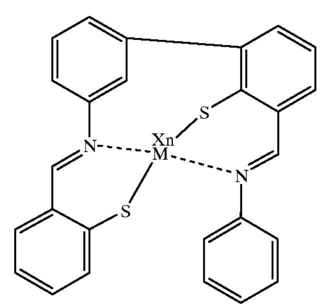

-continued
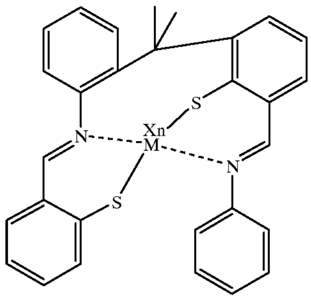
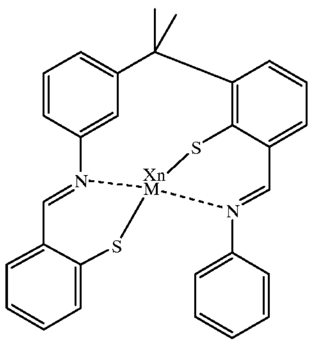
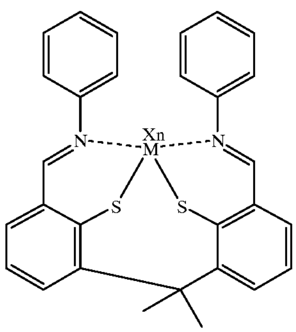
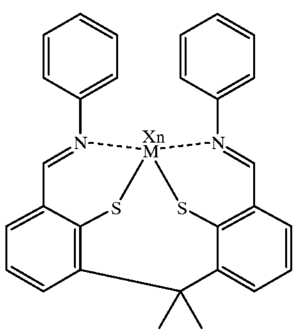
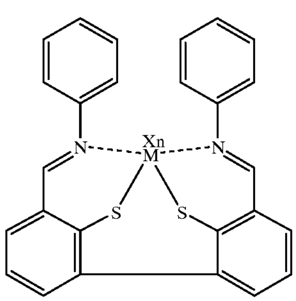
-continued
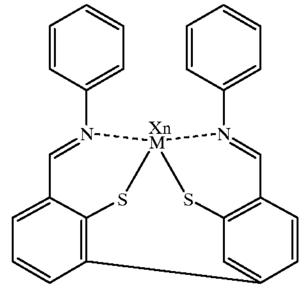
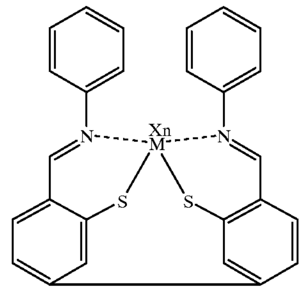
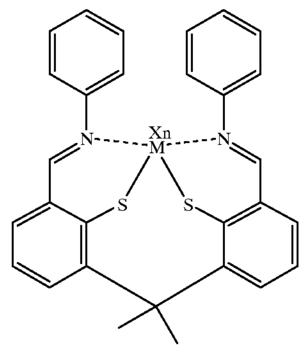
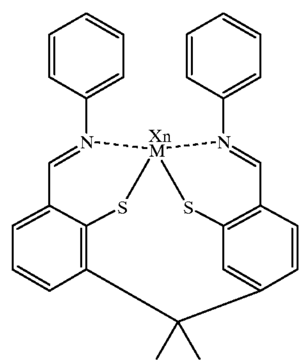
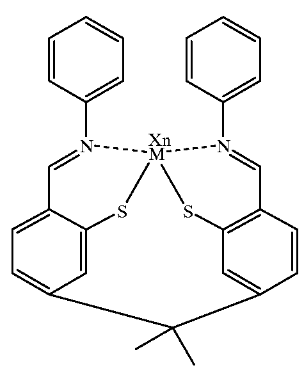

-continued
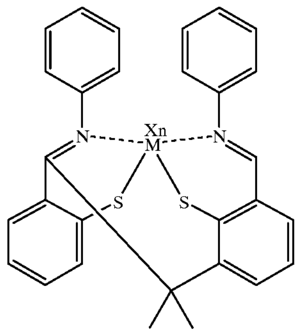
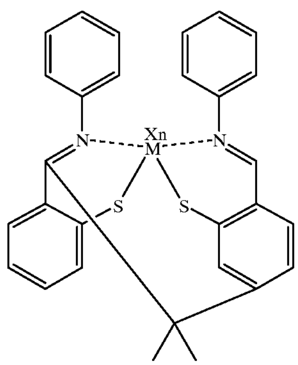
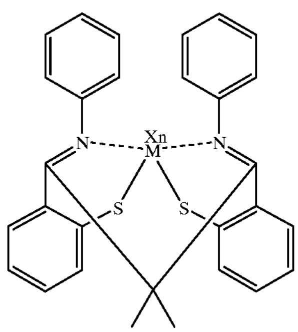
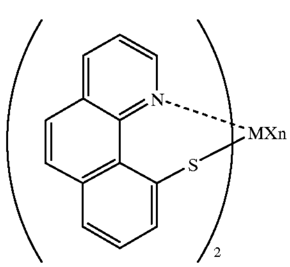
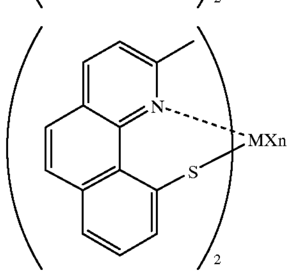
-continued
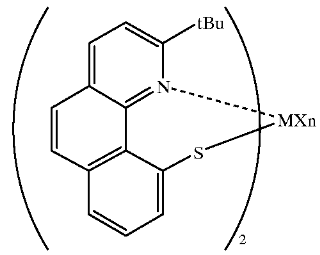
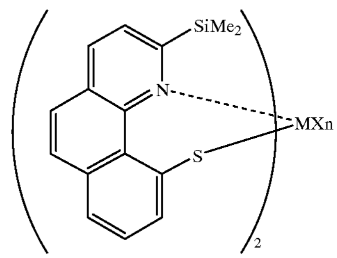
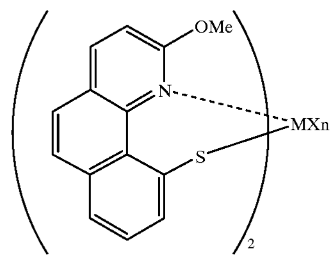
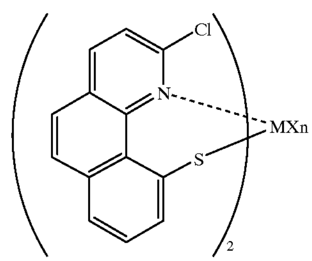
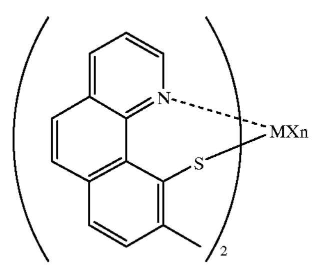
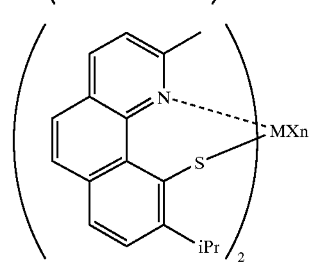

-continued
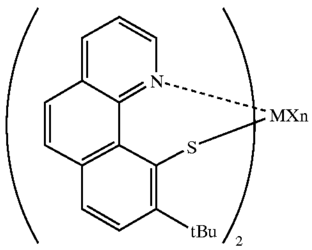
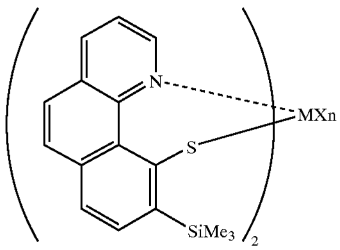
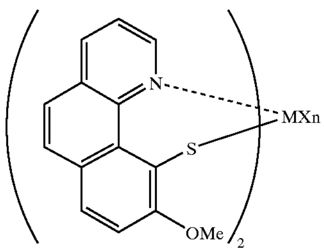
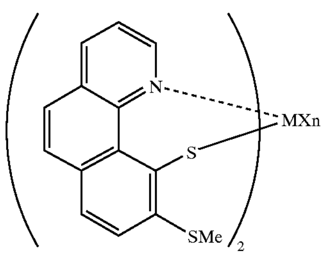
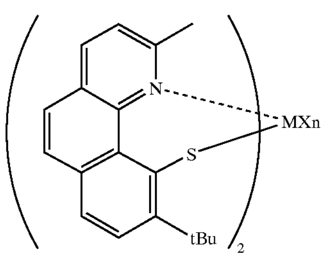
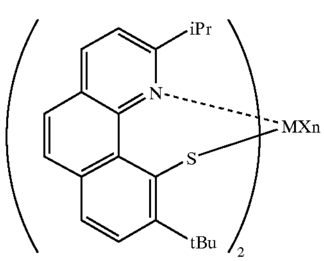
-continued
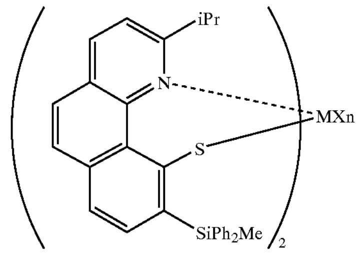
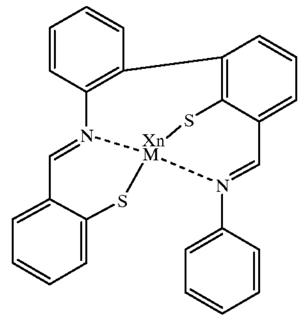
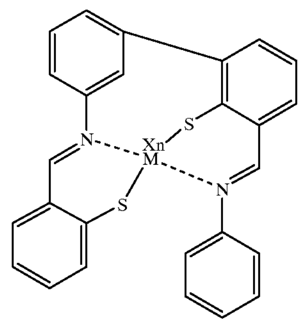
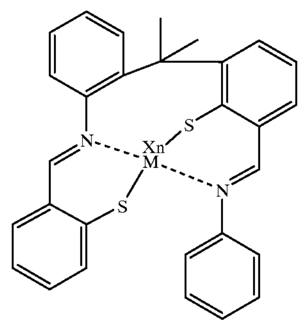
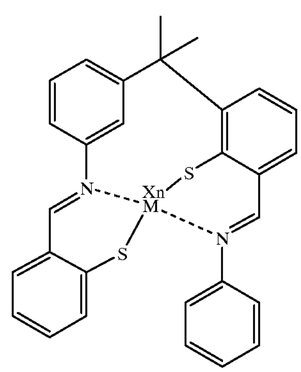

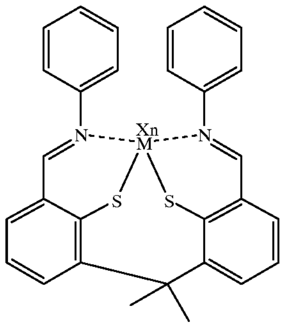
N
Xn
M
N
S
S
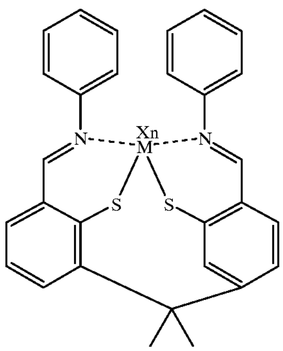
N
Xn
M
N
S
S
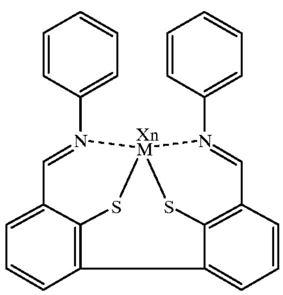
N
Xn
M
N
S
S
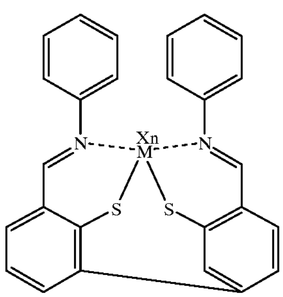
N
Xn
M
N
S
S
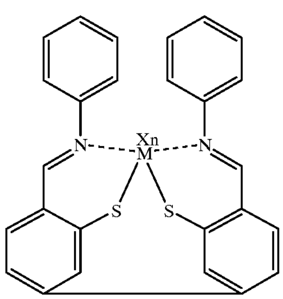
N
Xn
M
N
S
S
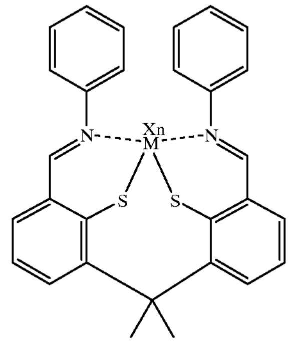
N
Xn
M
N
S
S
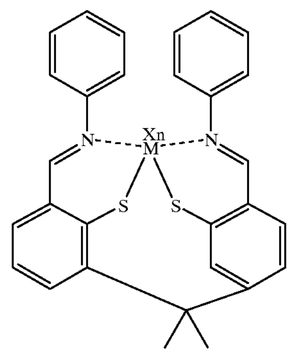
N
Xn
M
N
S
S
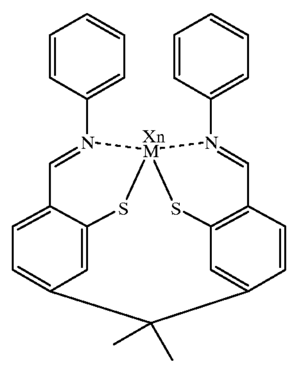
N
Xn
M
N
S
S
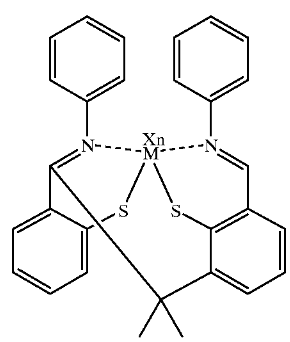
N
Xn
M
N
S
S -continued
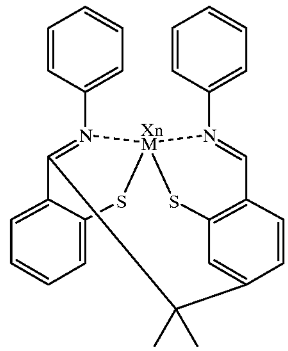
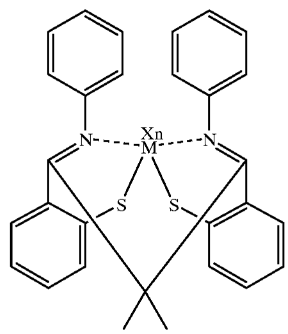
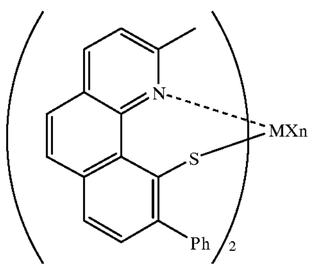
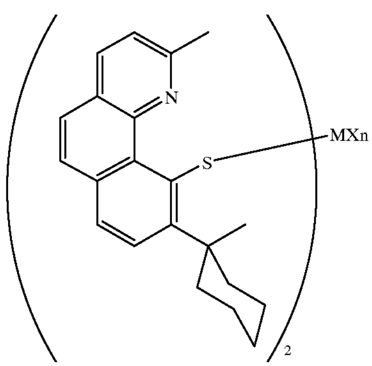
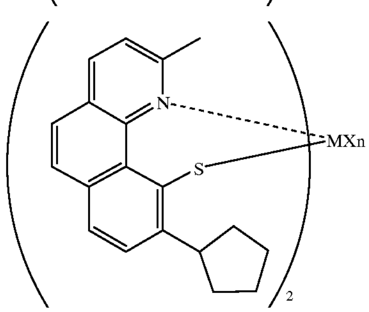
-continued
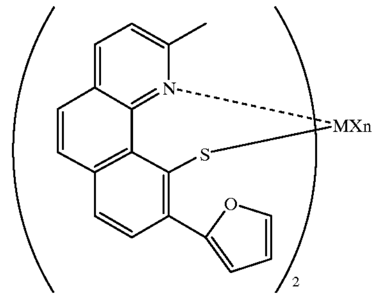
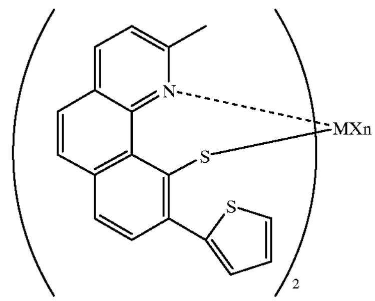
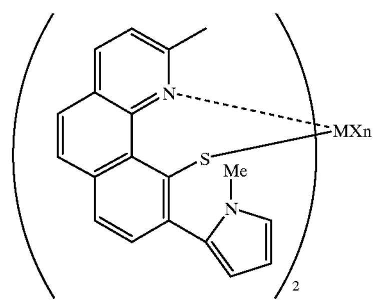
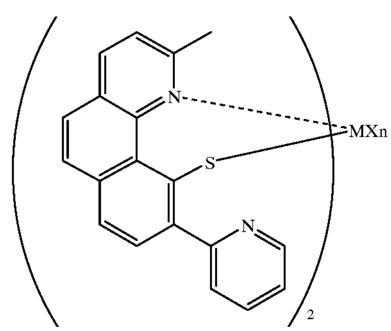
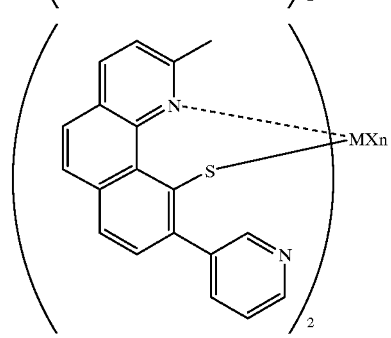

-continued
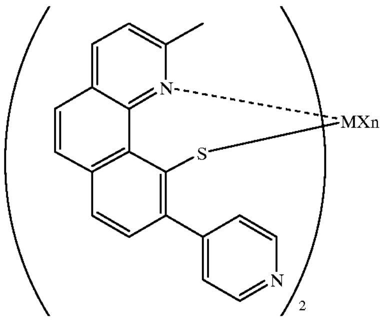
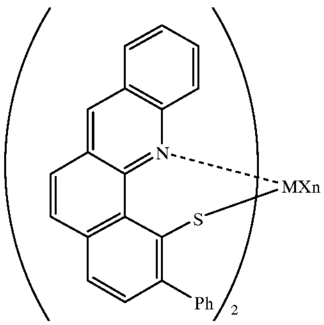
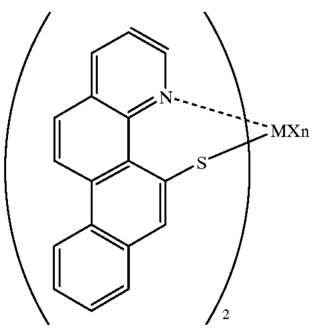
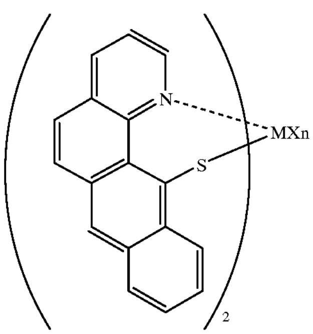
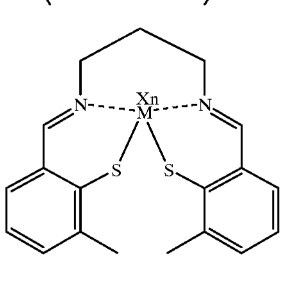
-continued
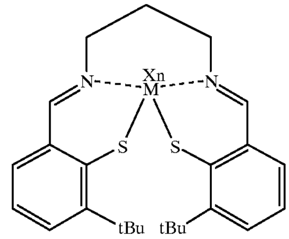
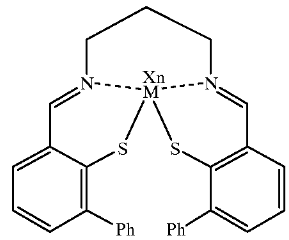
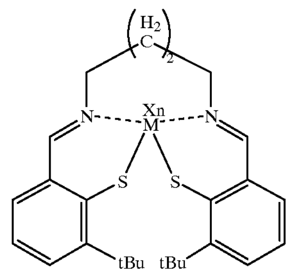
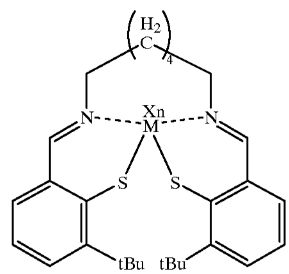
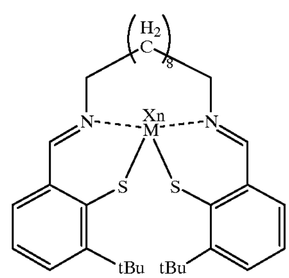
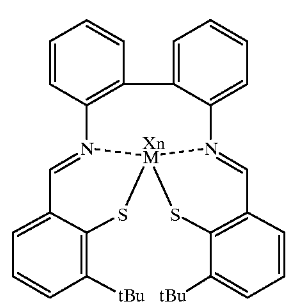

-continued
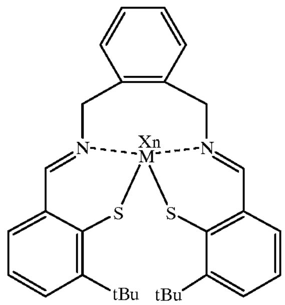
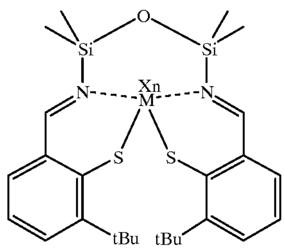
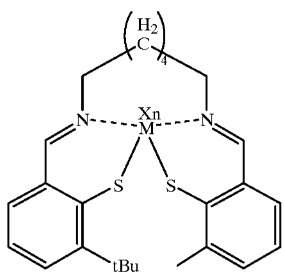
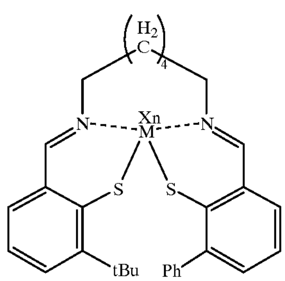
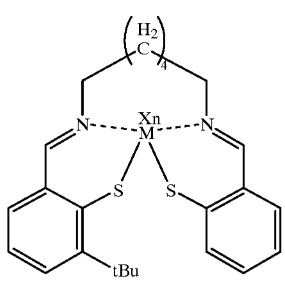
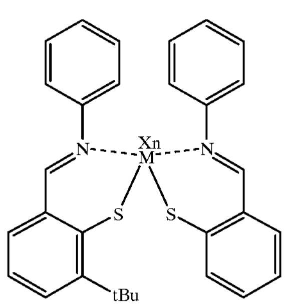
-continued
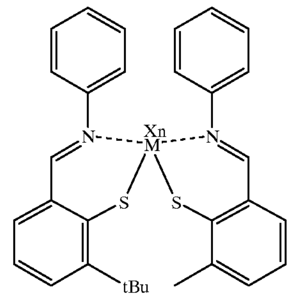
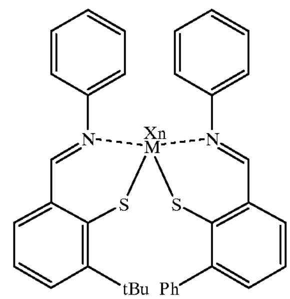
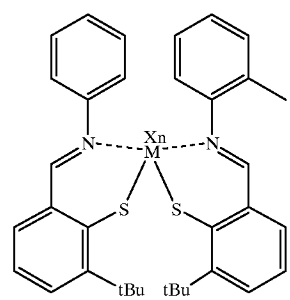
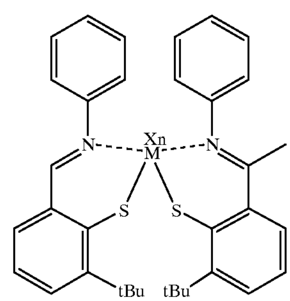
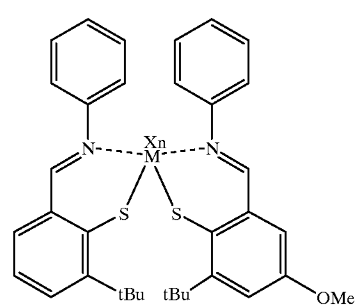

-continued
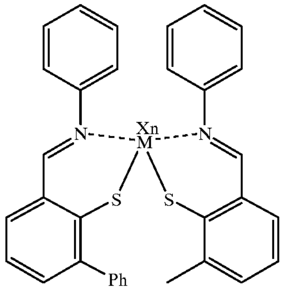
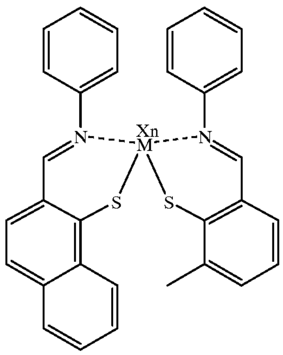
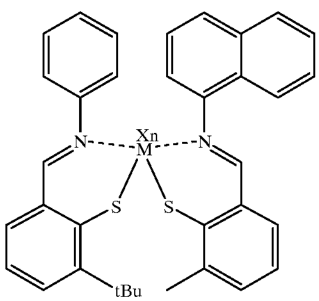
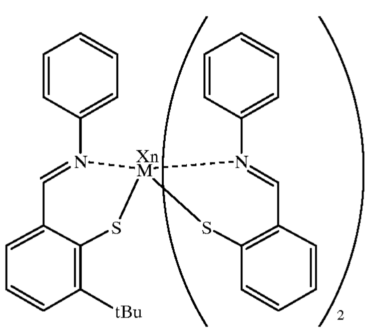
-continued
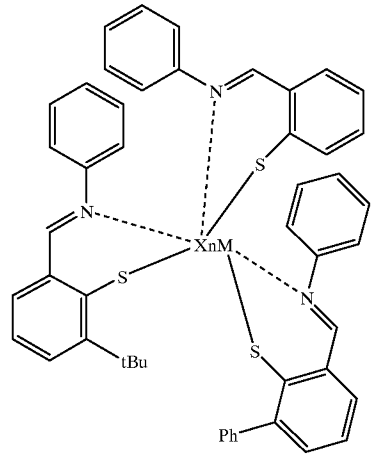
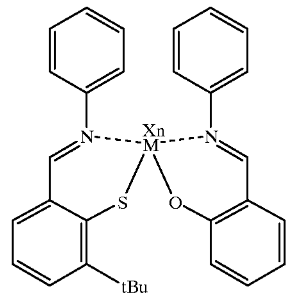
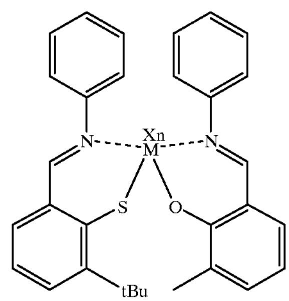
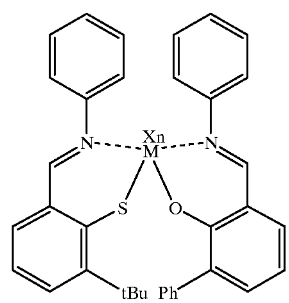
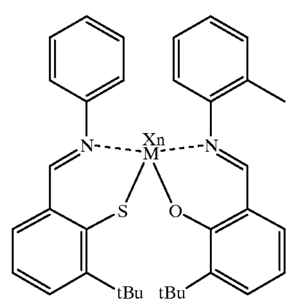

-continued
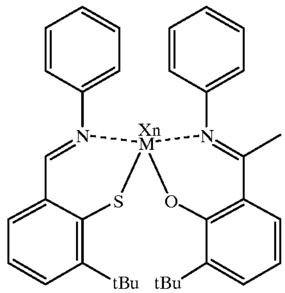
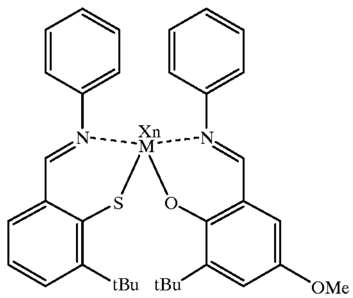
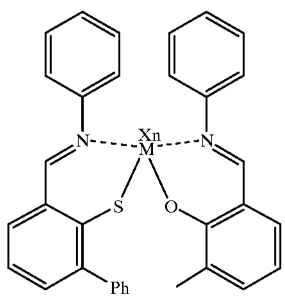
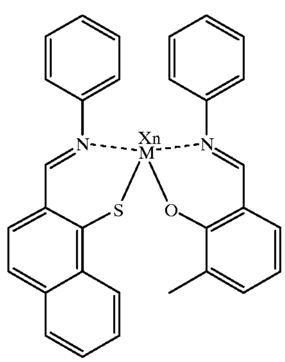
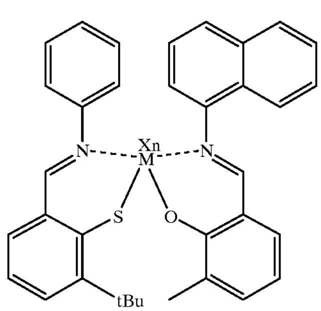
-continued
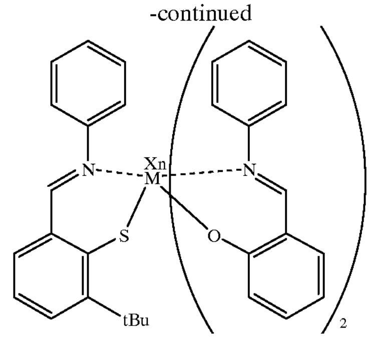
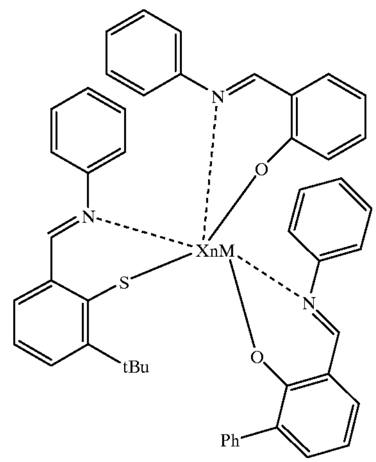
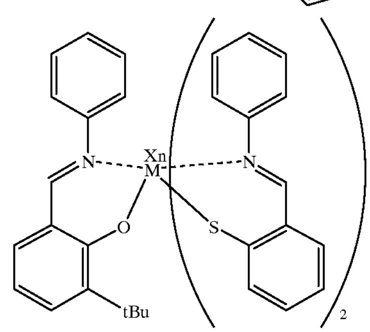
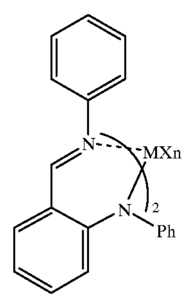
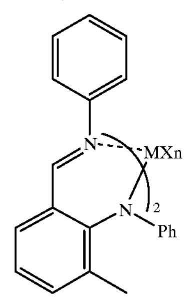
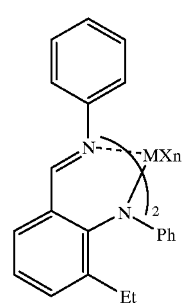
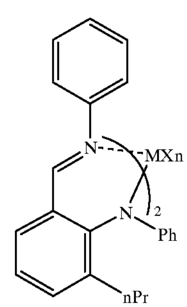

-continued
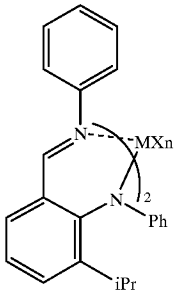
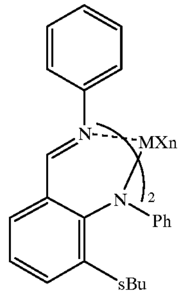
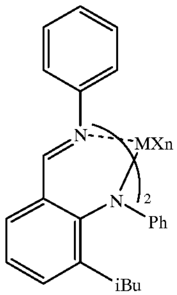
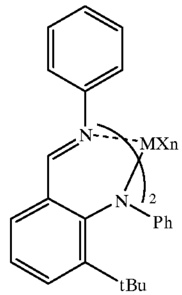
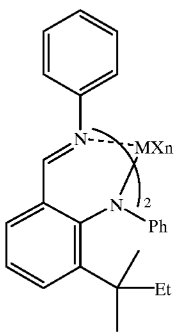
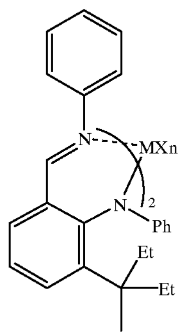
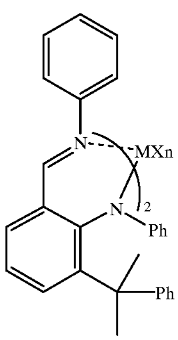
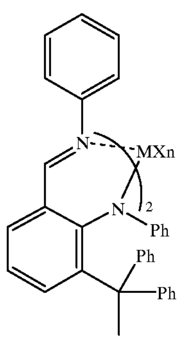
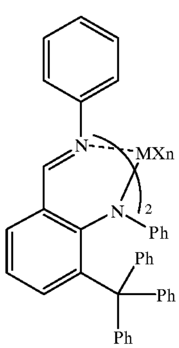
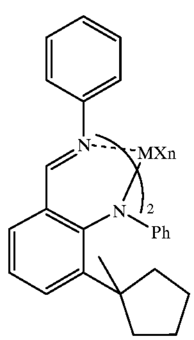
-continued
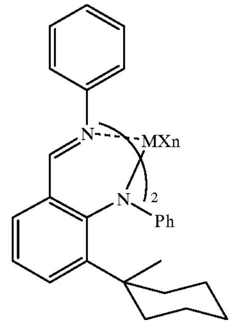
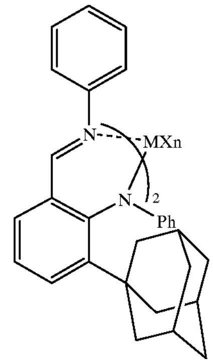
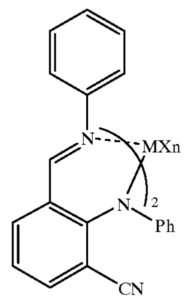
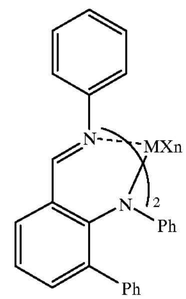
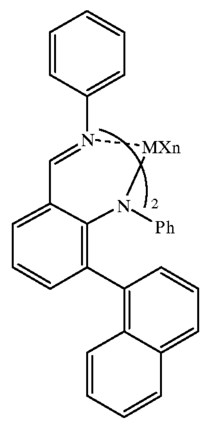
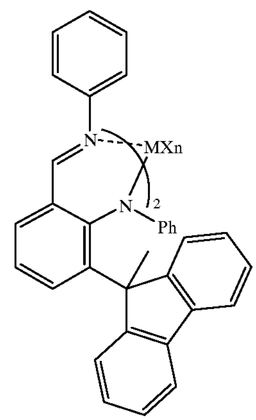
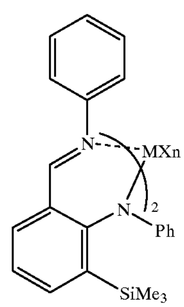
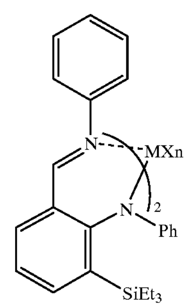
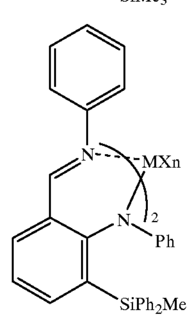
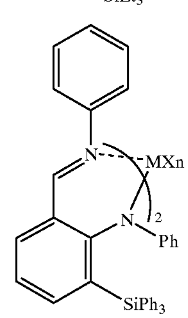

-continued
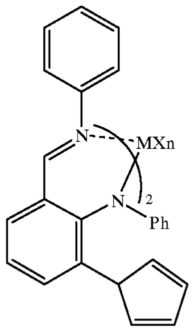
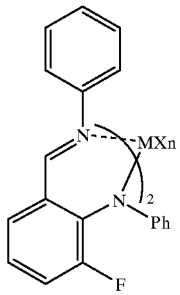
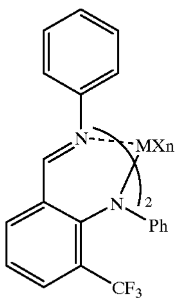
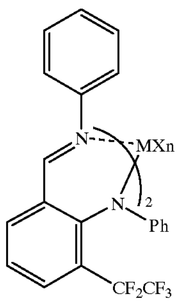
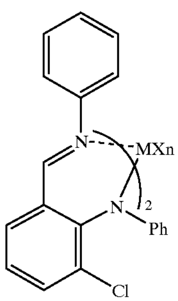
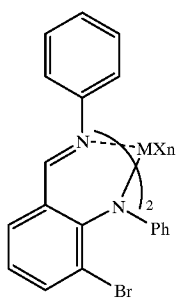
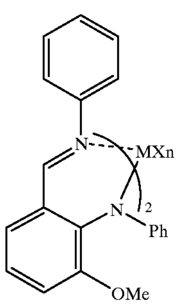
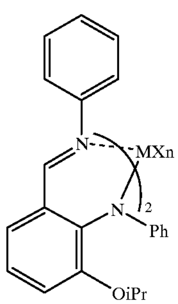
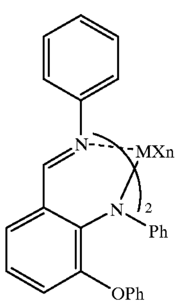
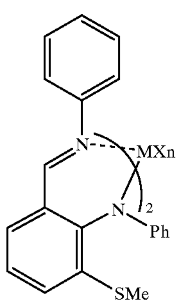
-continued
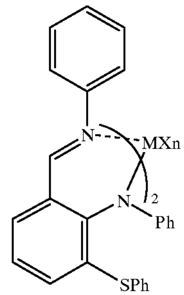
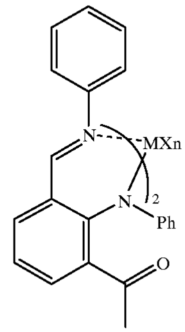
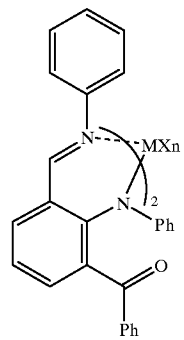
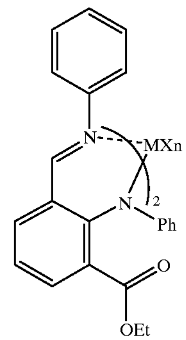
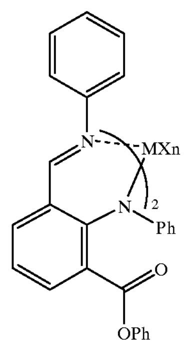
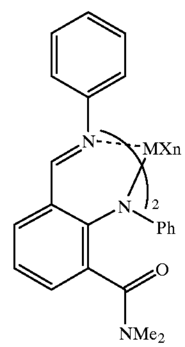
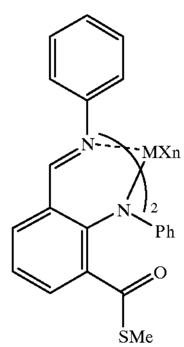
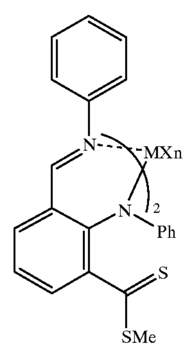
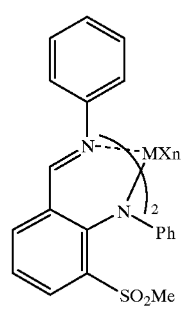

-continued
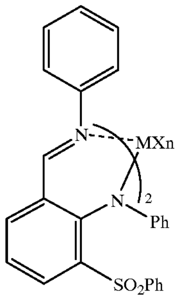
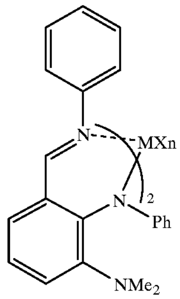
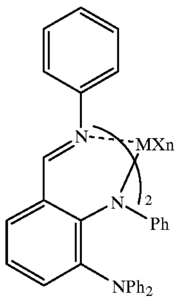
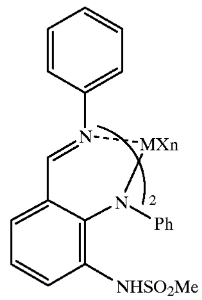
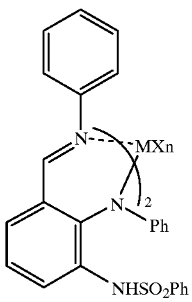
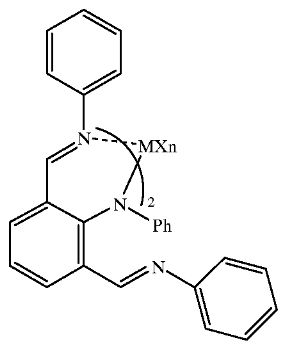
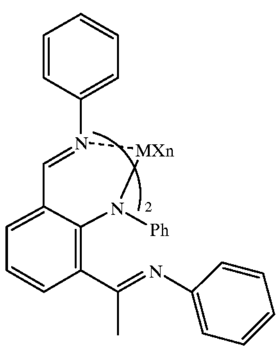
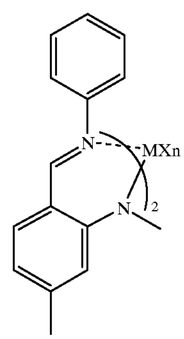
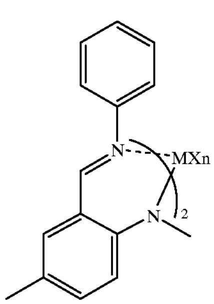
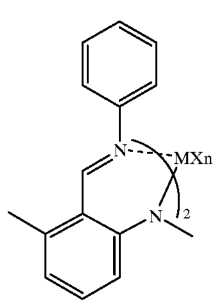
-continued
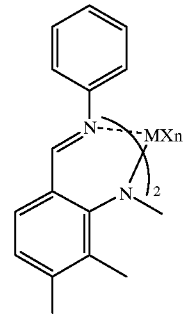
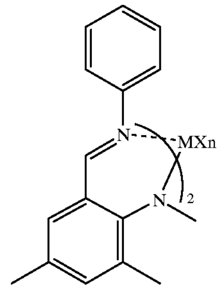
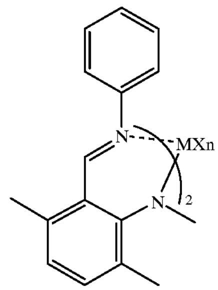
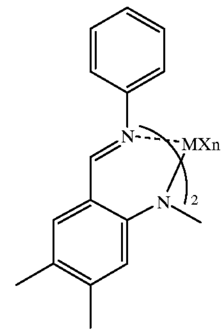
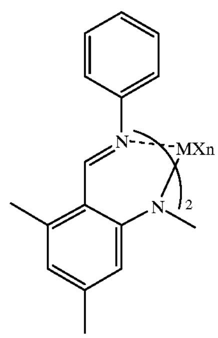
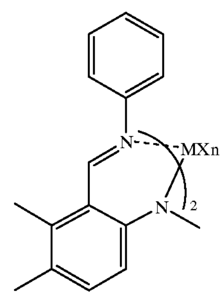
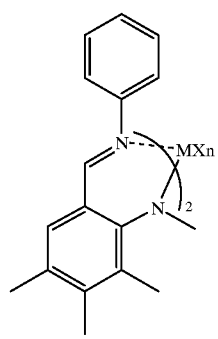
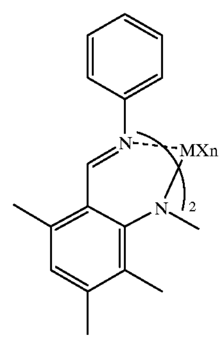
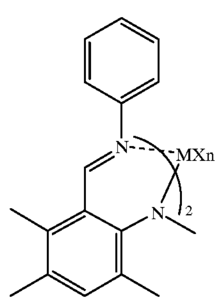
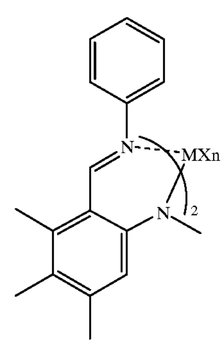

-continued
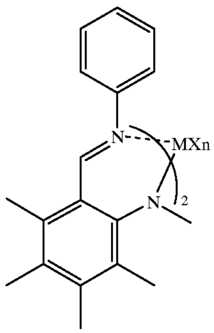
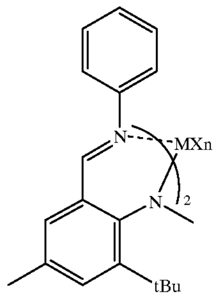
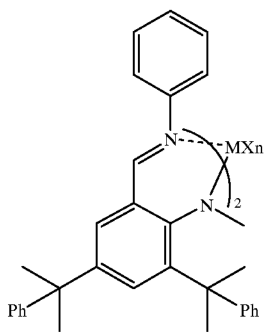
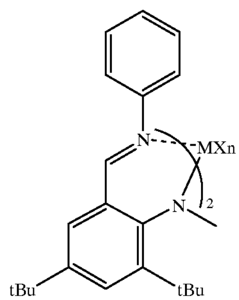
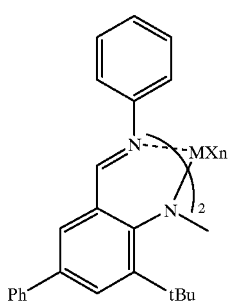
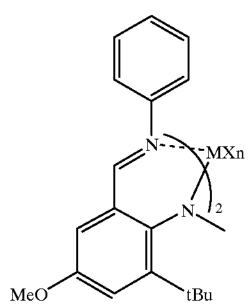
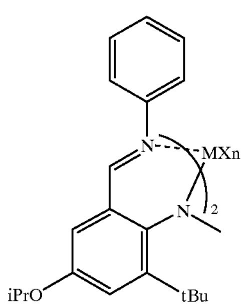
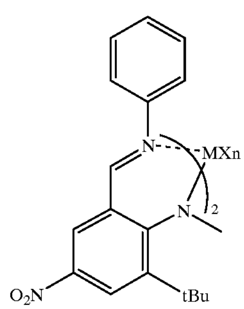
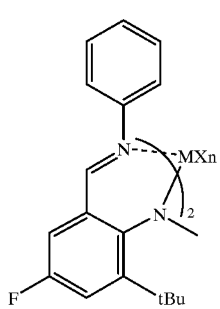
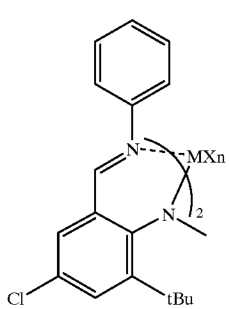
-continued
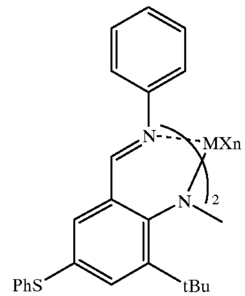
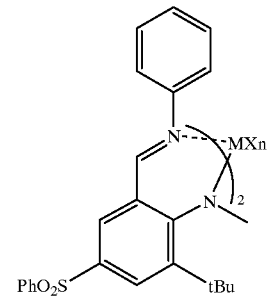
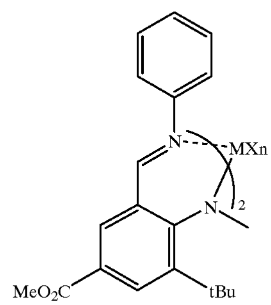
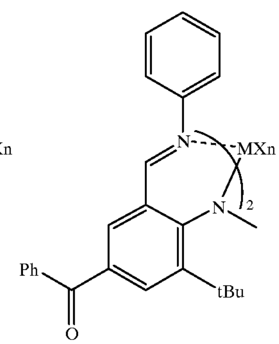
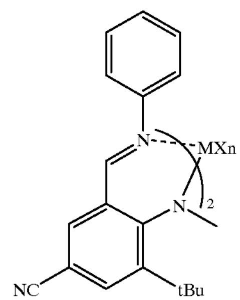
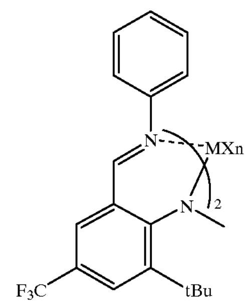
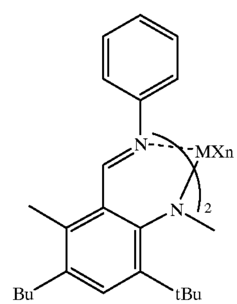
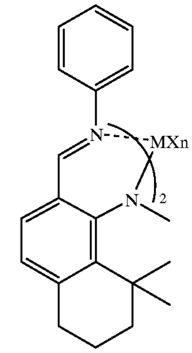
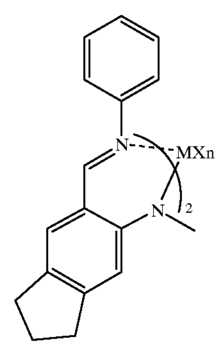
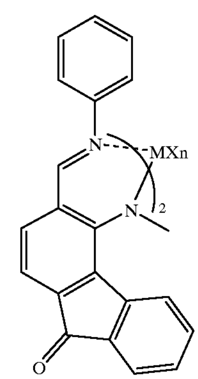

-continued
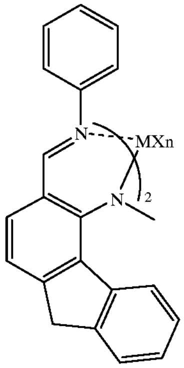
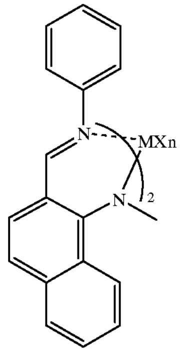
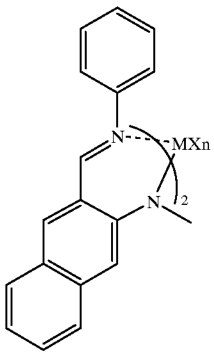
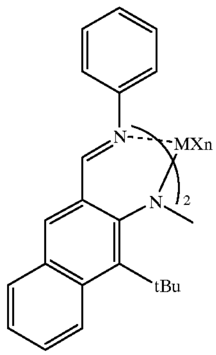
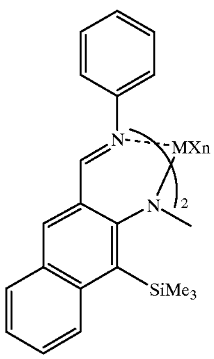
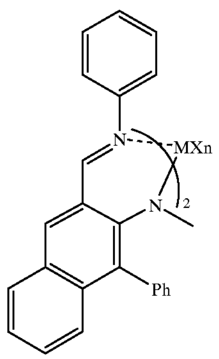
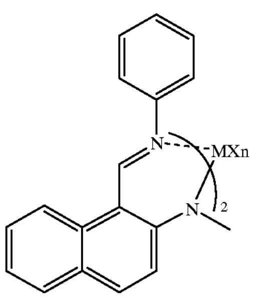
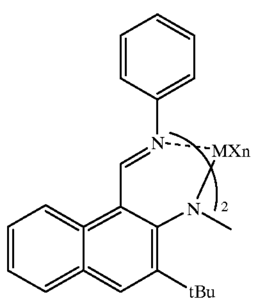
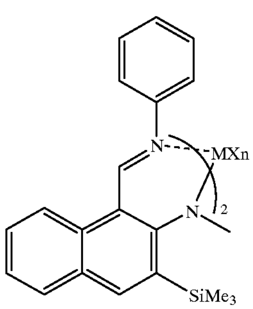
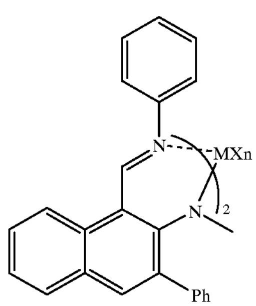
-continued
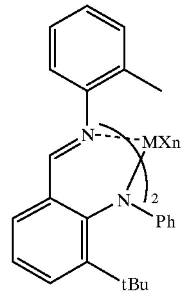
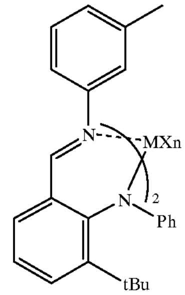
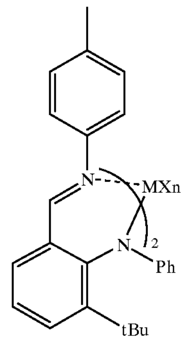
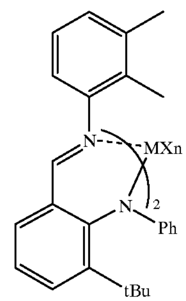
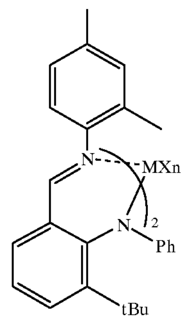
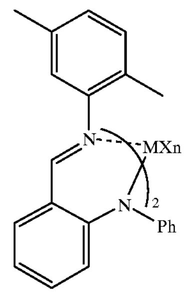
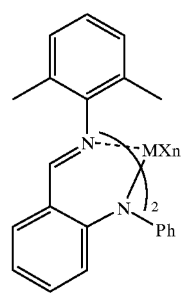
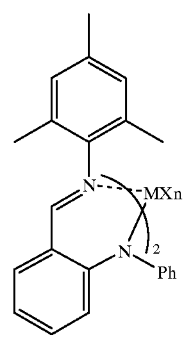
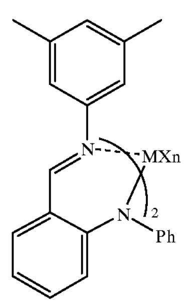
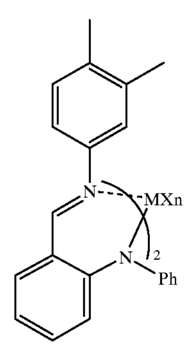

-continued
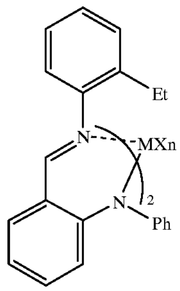
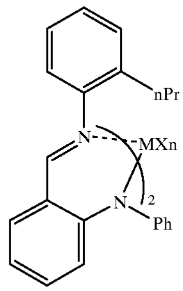
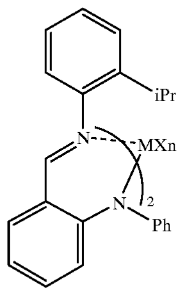
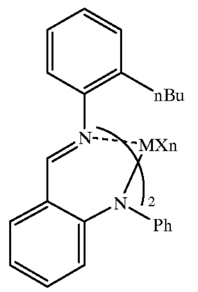
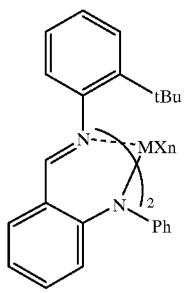
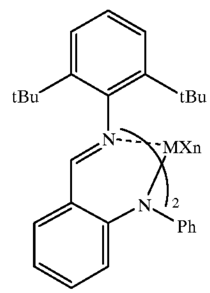
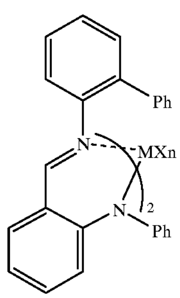
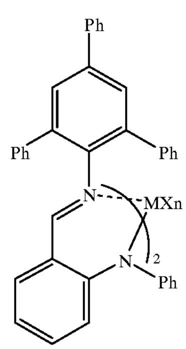
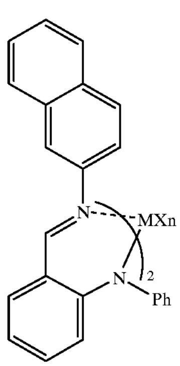
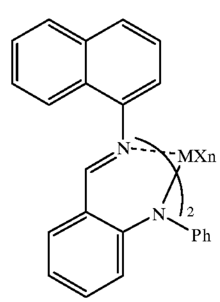
-continued
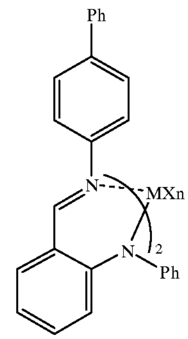
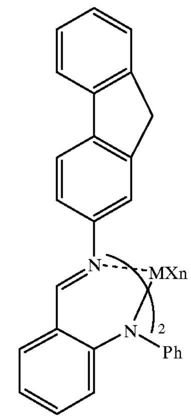
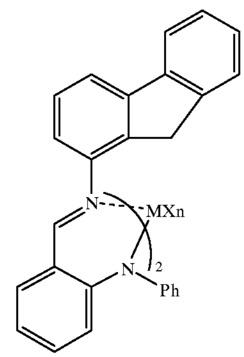
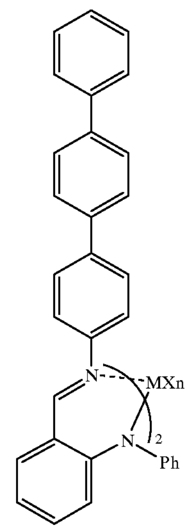
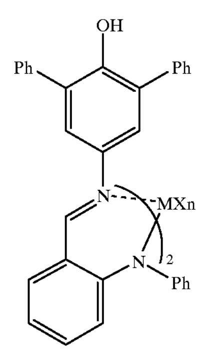
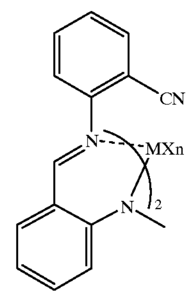
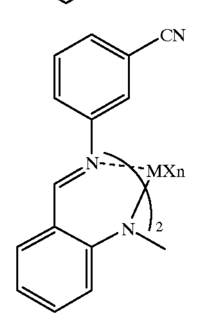
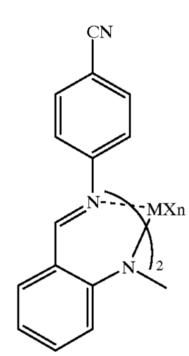

-continued
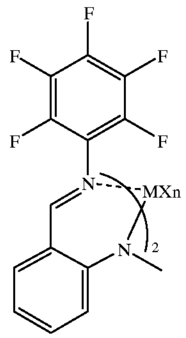
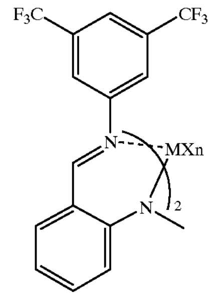
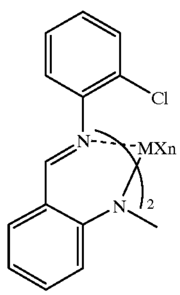
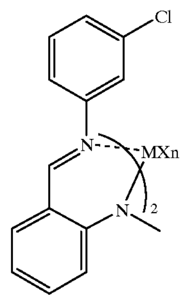
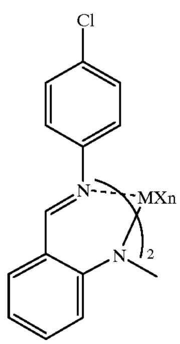
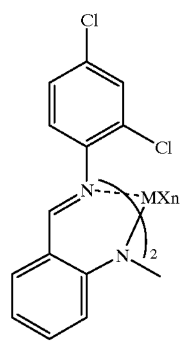
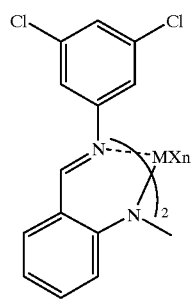
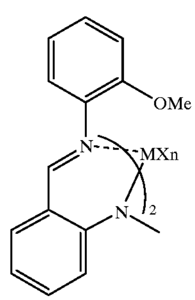
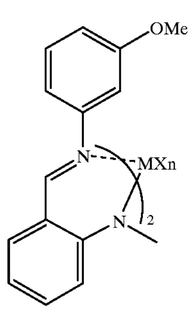
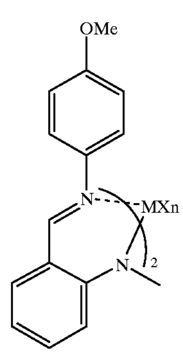
-continued
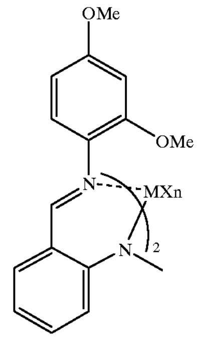
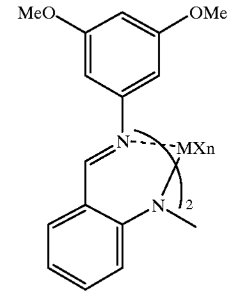
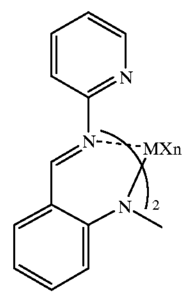
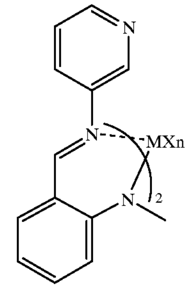
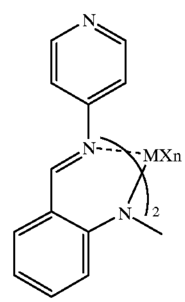
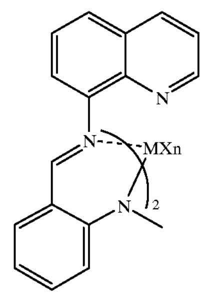
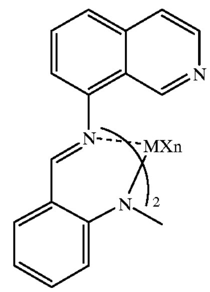
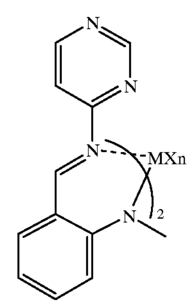
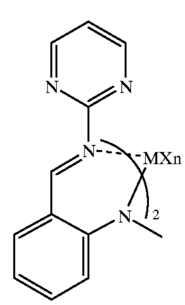
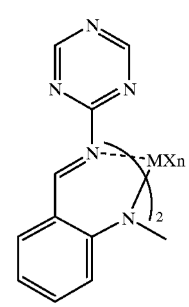

-continued
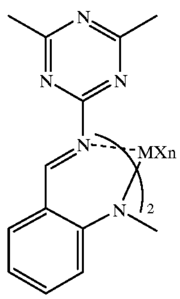
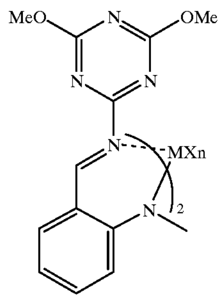
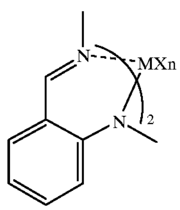
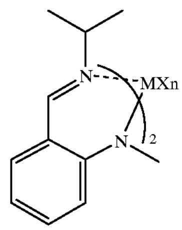
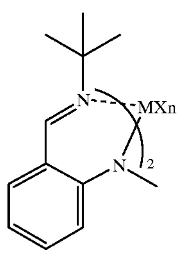
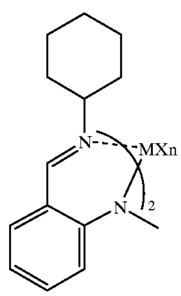
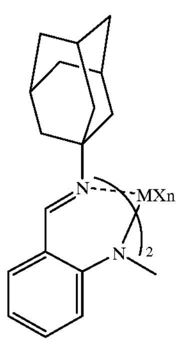
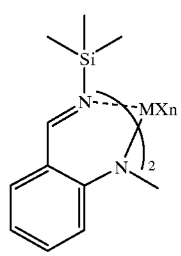
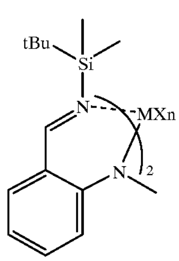
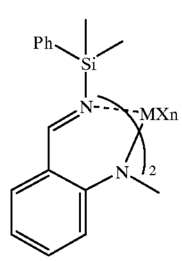
-continued
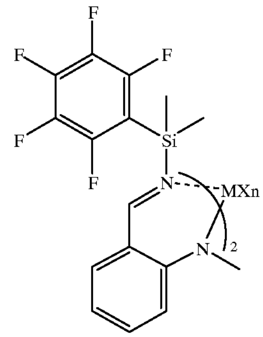
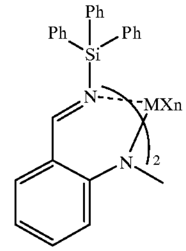
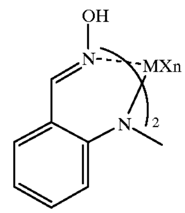
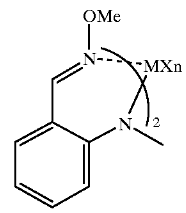
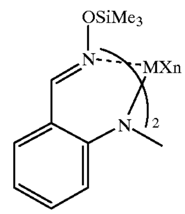
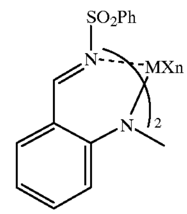
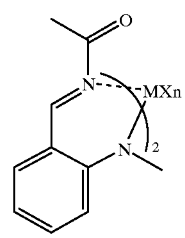
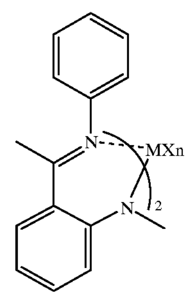
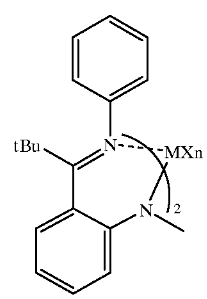
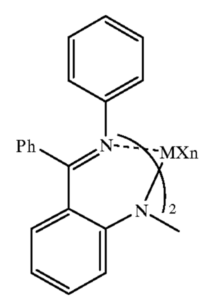
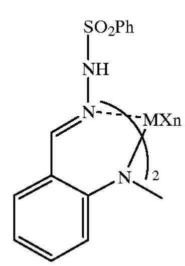
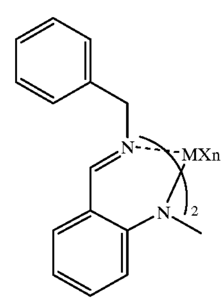

-continued
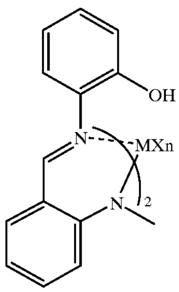
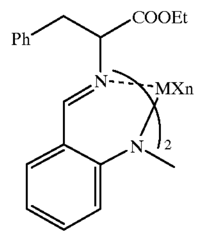
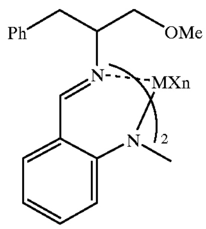
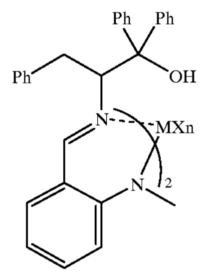
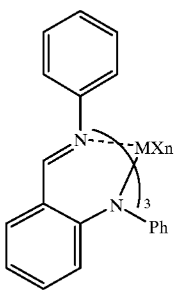
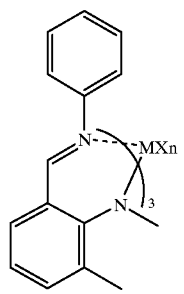
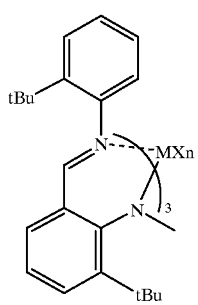
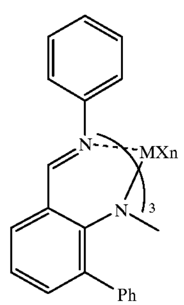
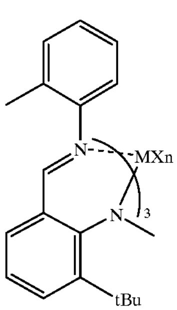
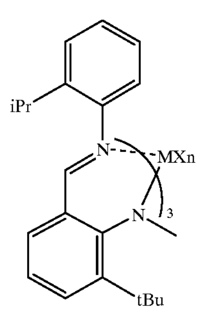
-continued
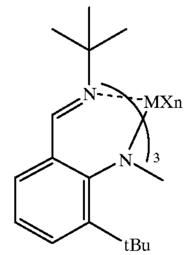
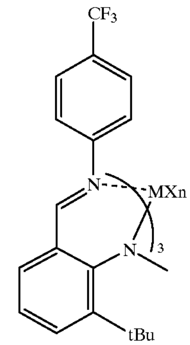
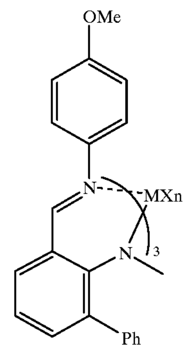
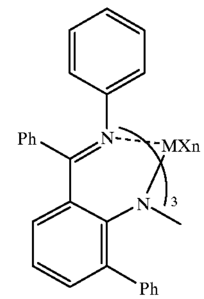
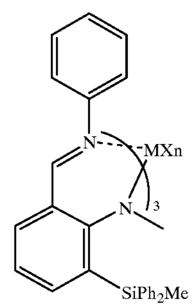
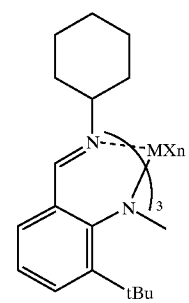
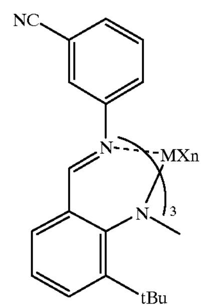
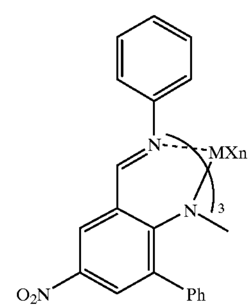
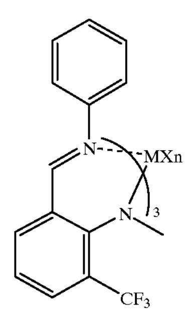
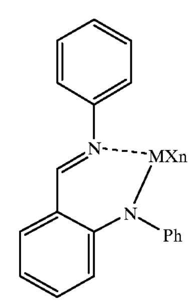

-continued
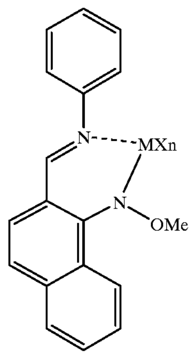
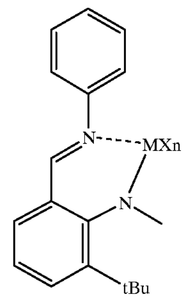
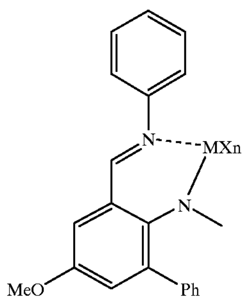
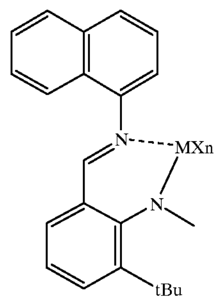
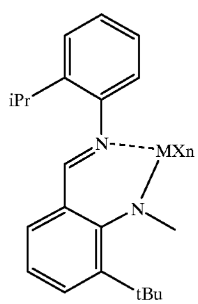
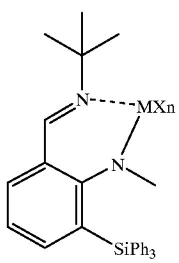
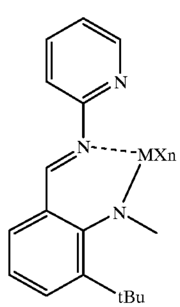
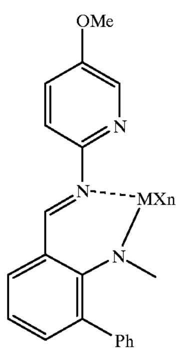
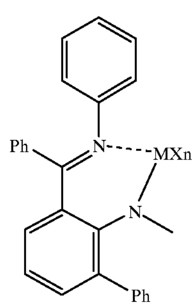
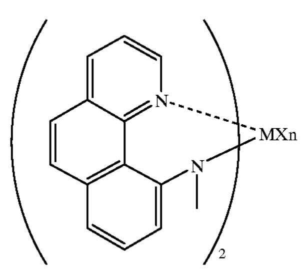
-continued
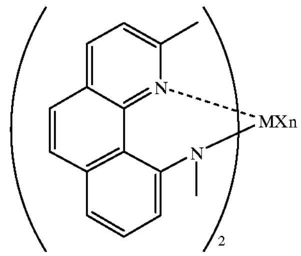
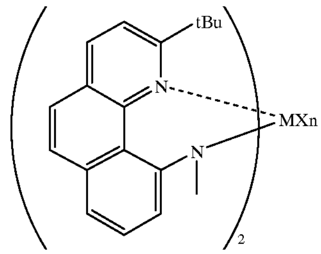
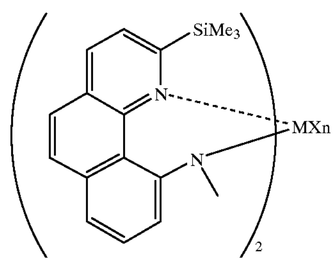
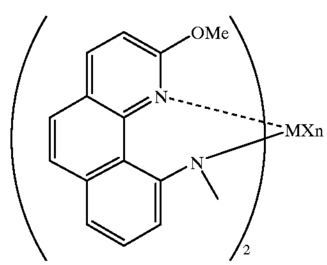
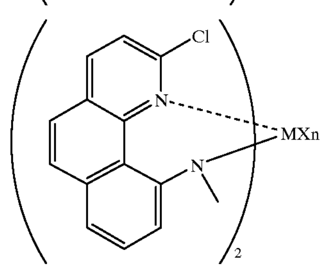
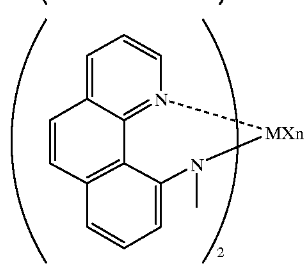

-continued
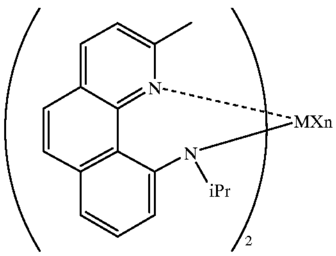
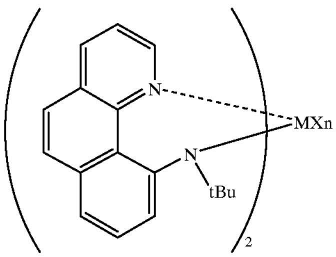
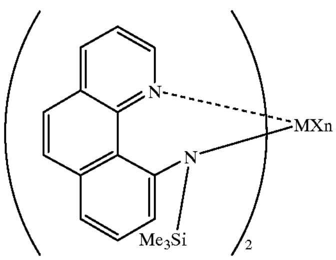
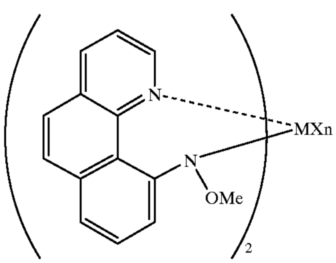
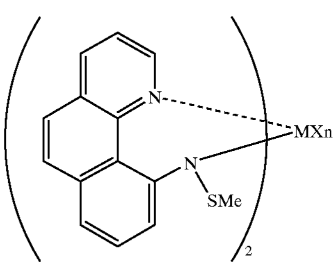
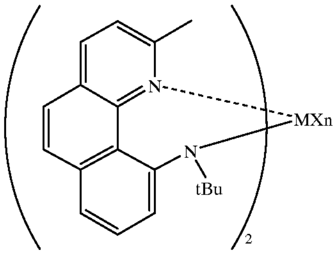
-continued
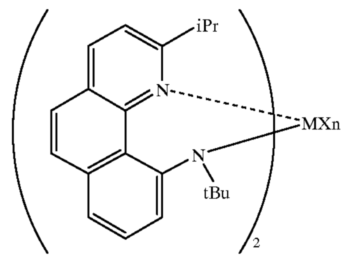
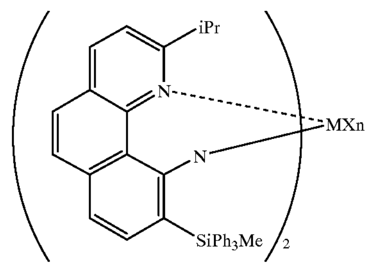
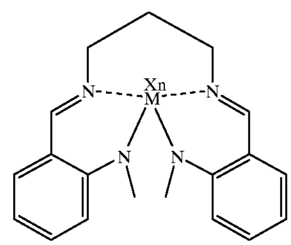
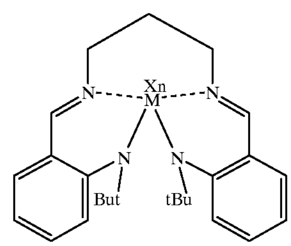
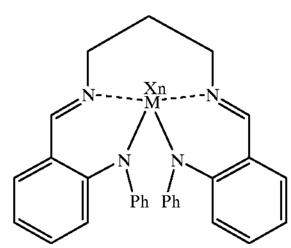
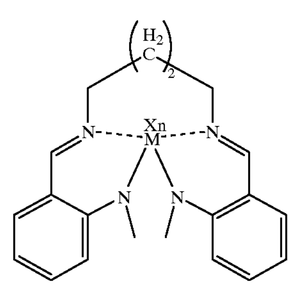

-continued
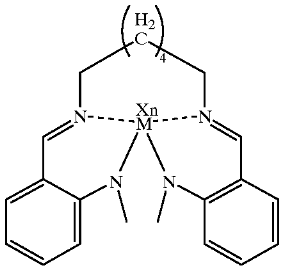
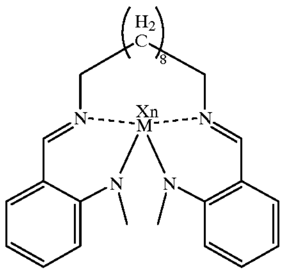
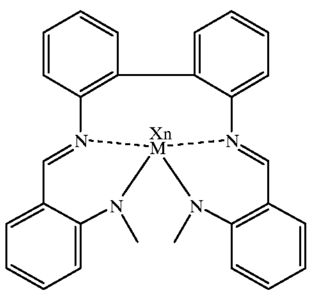
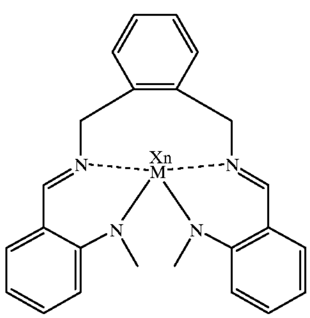
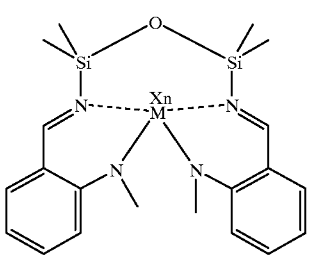
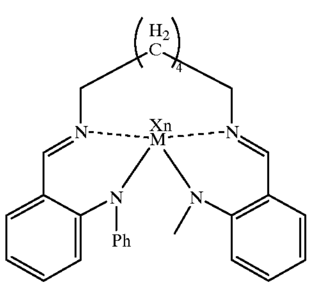
-continued
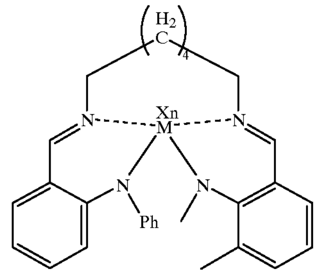
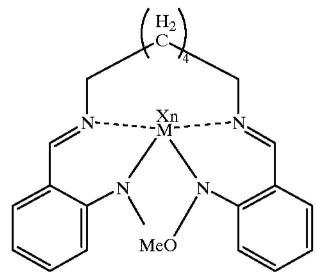
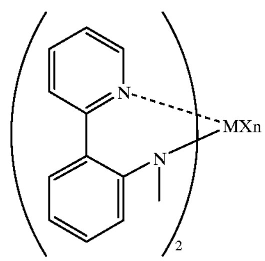
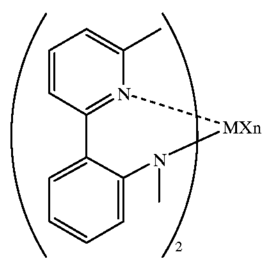
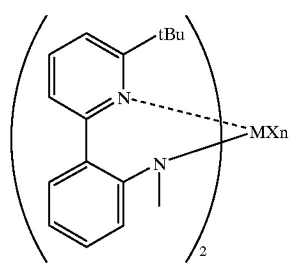
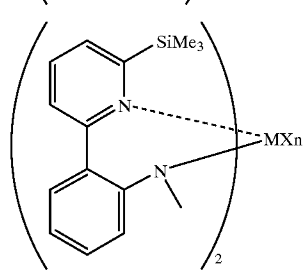

-continued
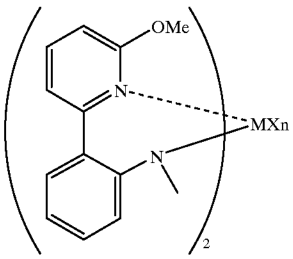
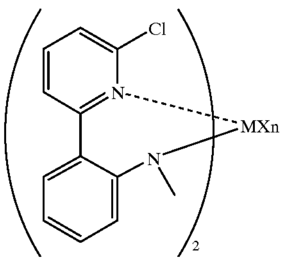
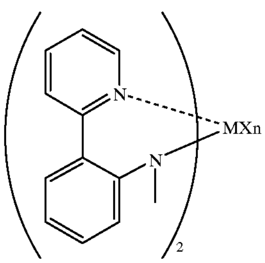
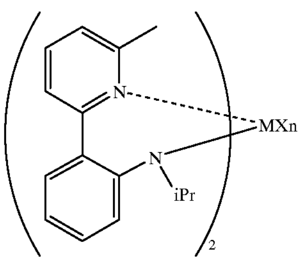
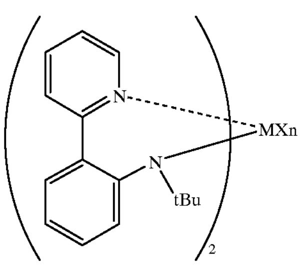
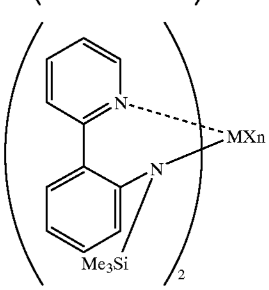
-continued
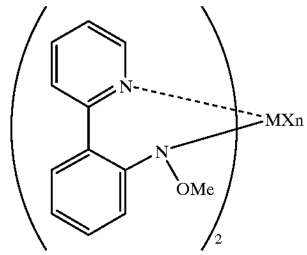
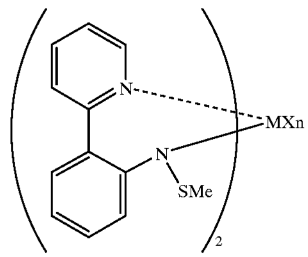
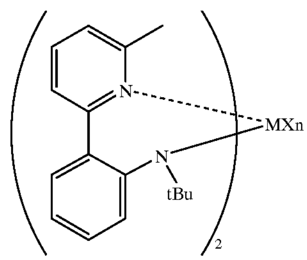
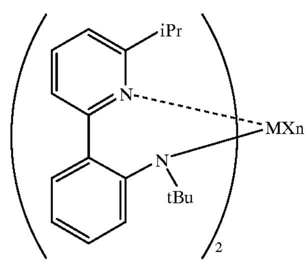
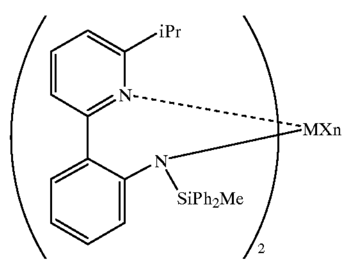
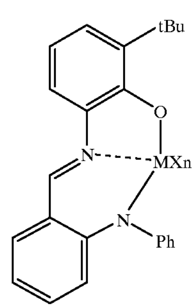
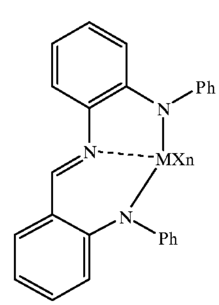

-continued
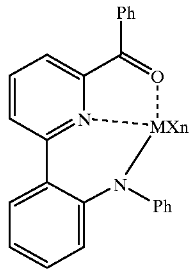
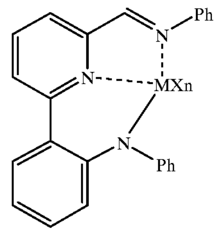
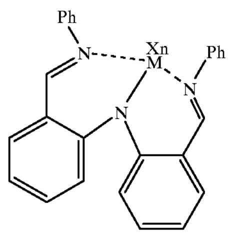
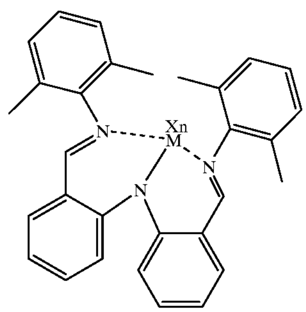
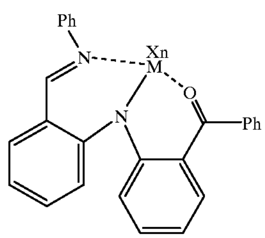
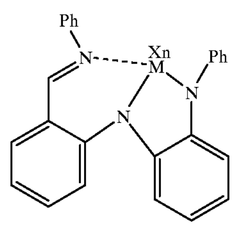
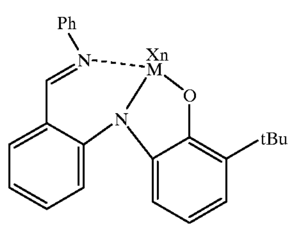
More specifically, there can be mentioned the following compounds.
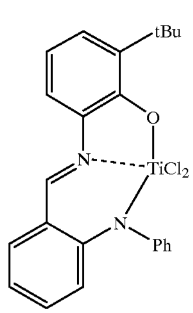
-continued
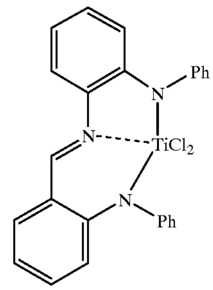
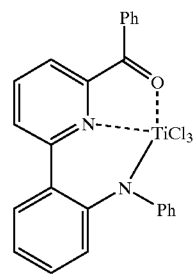
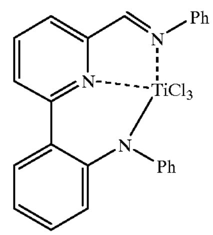
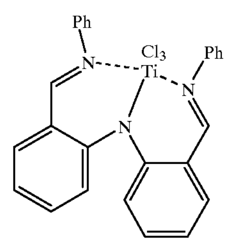
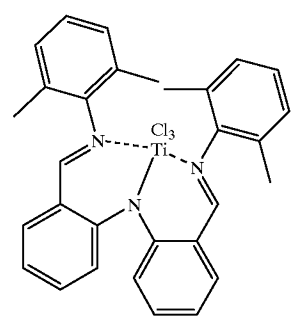
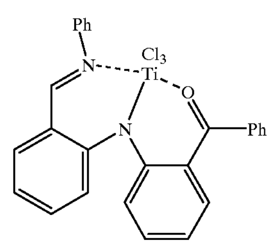

-continued
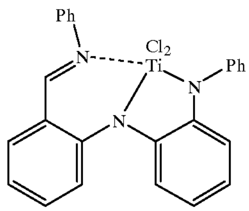
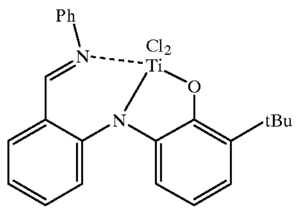
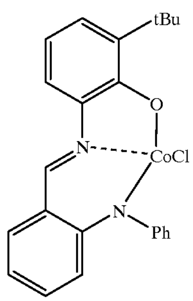
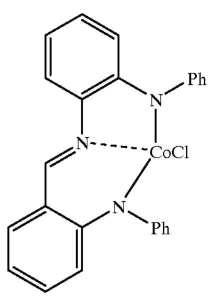
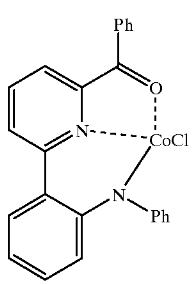
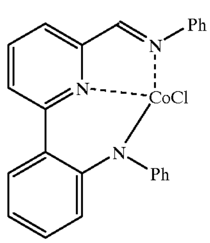
-continued
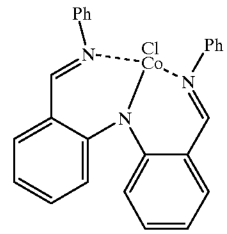
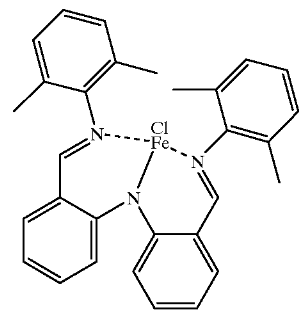
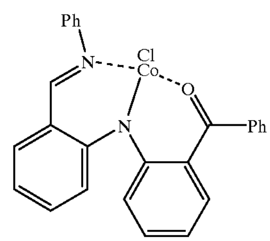
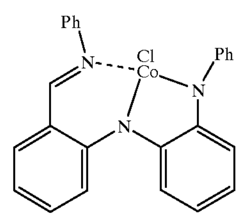
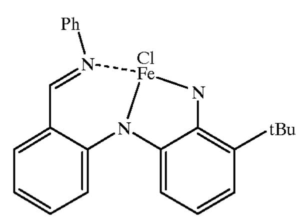
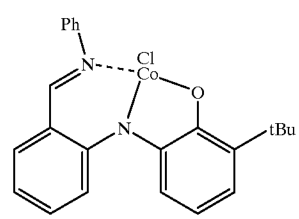
There can also be mentioned the following compounds wherein M, X and n have the same meanings as those of M, X and n in the formula (II-b).

-continued
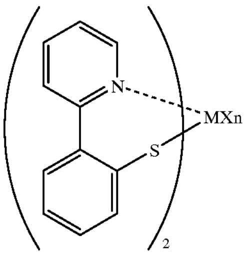
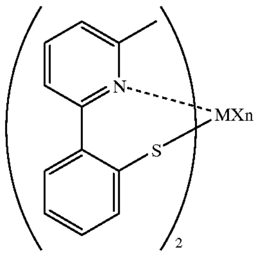
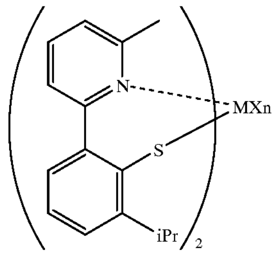
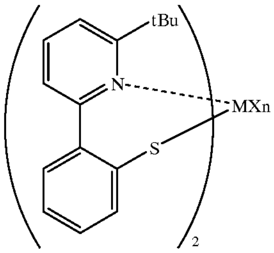
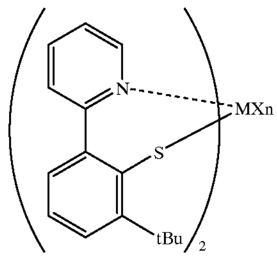
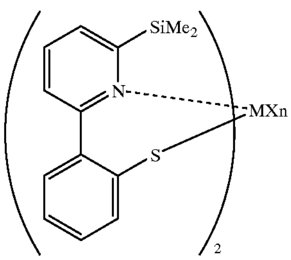
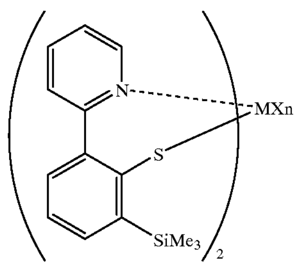
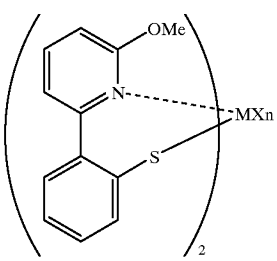
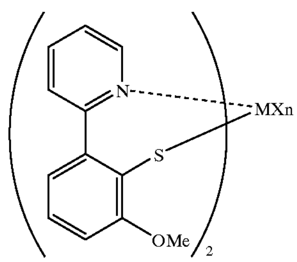
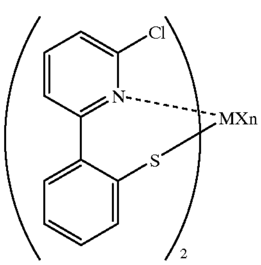
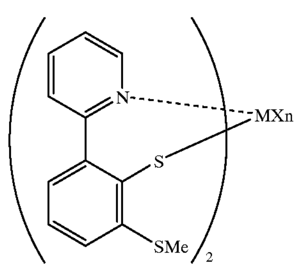
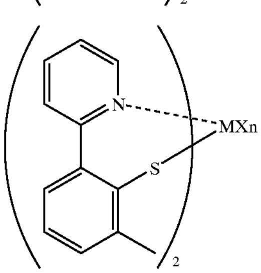
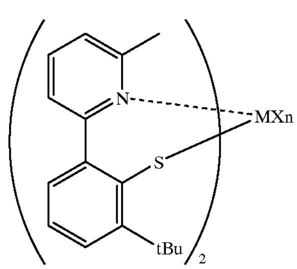

-continued
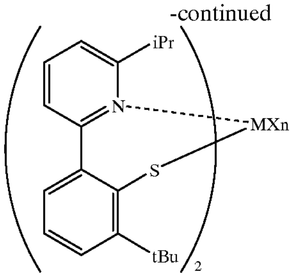
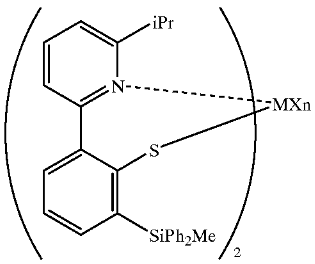
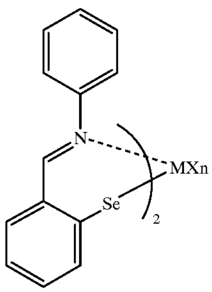
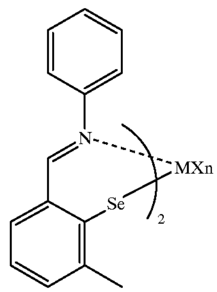
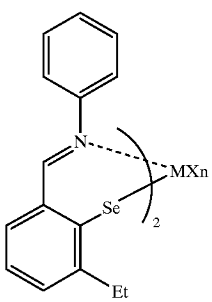
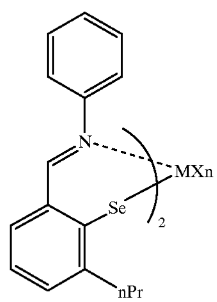
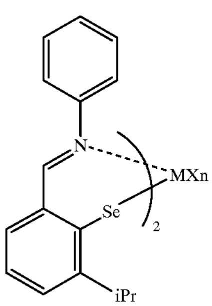
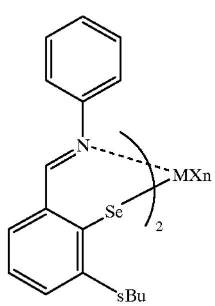
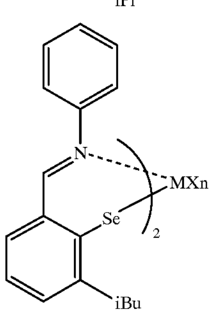
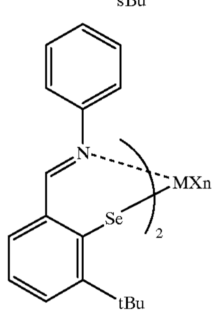
-continued
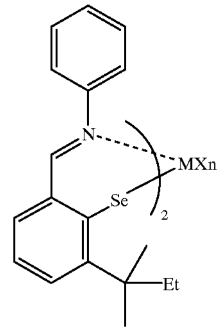
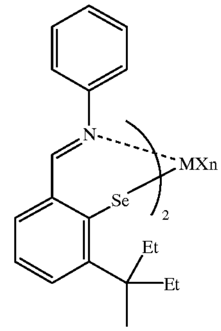
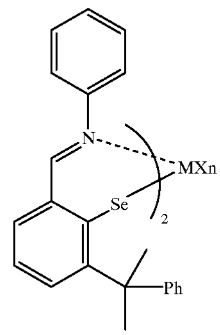
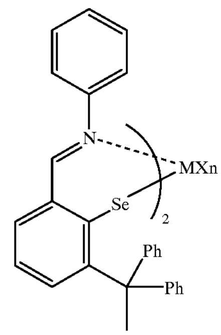
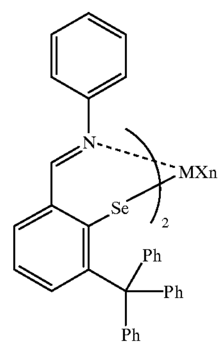
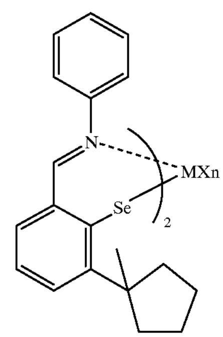
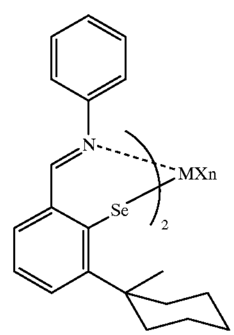
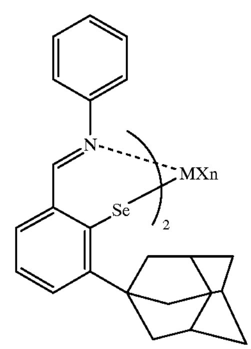
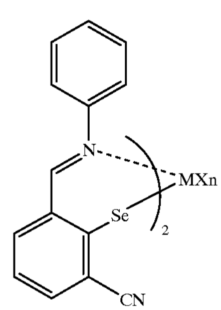
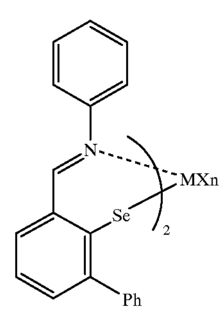

-continued

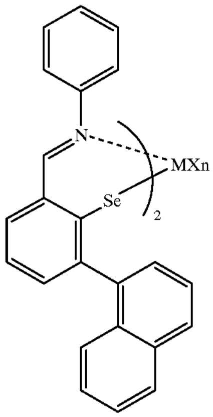

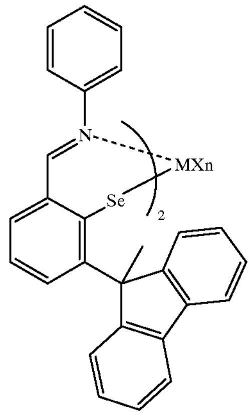

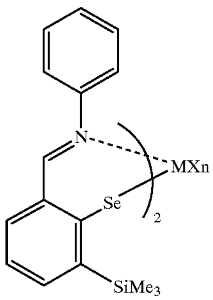

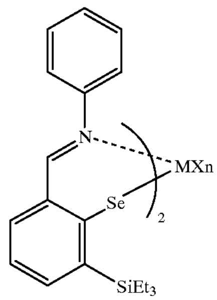

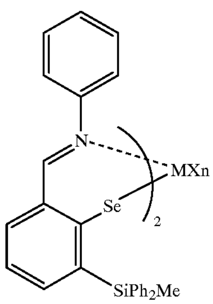

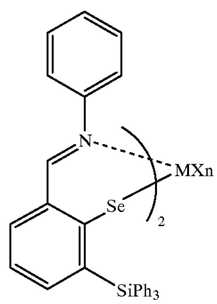

-continued

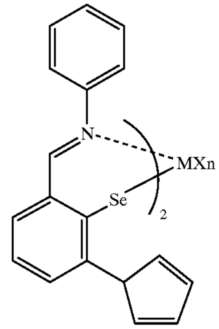

In the above examples, Et denotes ethyl, iPr denotes i-propyl, tBu denotes tert-butyl, and Ph denotes phenyl.

A common process for synthesizing the transition metal compound represented by the formula (II-b) is given below, but the synthesis process is not limited thereto.

The transition metal compound represented by the formula (II-b) can be synthesized by allowing a compound (ligand precursor) for forming a ligand such as a thiosalicylidene ligand or an anilino ligand to react with a metallic compound.

The compound for forming the thiosalicylidene ligand is obtained by allowing, for example, a thiosalicylaldehyde compound to react with an aniline compound or an amine compound.

The ligand precursor can be obtained by allowing o-acylbenzenethiols including the above compounds to react with an aniline compound or an amine compound.

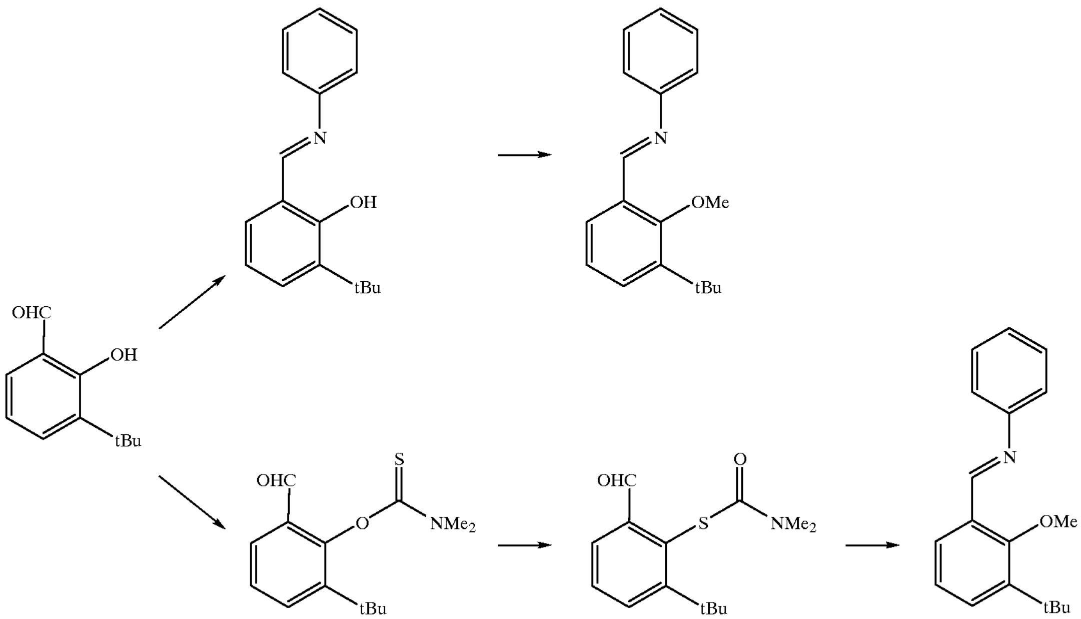

More specifically, the ligand precursor can be obtained by dissolving a thiosalicylaldehyde compound or o-acylbenzenethiol and an aniline compound wherein the nitrogen part has no substituent or a primary amine compound in a solvent, and stirring the solution under the conditions of room temperature to reflux for about 1 to 48 hours. As the solvent, an alcohol solvent such as methanol or ethanol or a hydrocarbon solvent such as toluene is preferably employed, but not limited thereto. As a catalyst, an acid catalyst such as formic acid, acetic acid or toluenesulfonic acid can be employed. It is also effective for the progress of the reaction to remove water from the reaction system by means of Dean and Stark method. It is possible to use dehydrating agents such as molecular sieves, magnesium sulfate and sodium sulfate.

The o-acylbenzenethiol which may be used herein can be obtained, for example, from an o-acylphenol by treating the

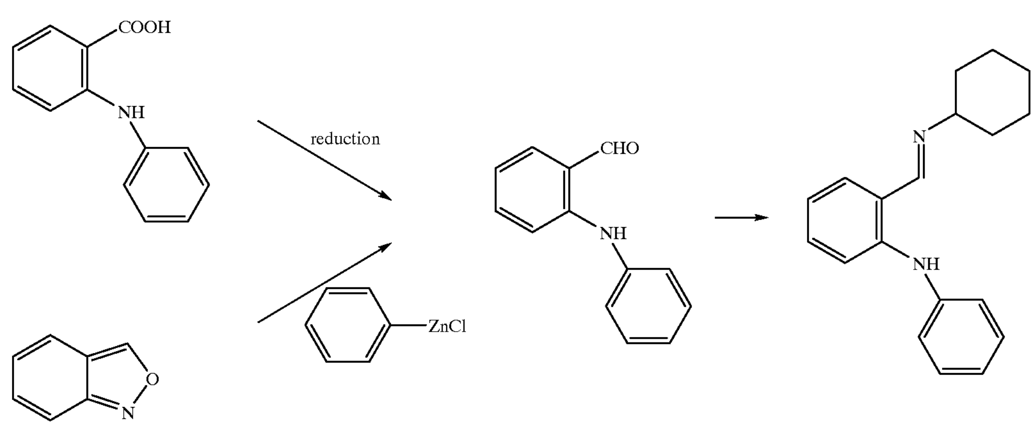

OH group with a dimethyl thiocarbamate to produce a thiocarbamate derivative which is then heated, whereby exchanging oxygen atom for sulfur atom.

The anilino ligand can be obtained by allowing an o-formaniline compound to react with an aniline compound or an amine compound. The ligand precursor can be obtained by allowing o-acylanilines including the above compounds to react with an aniline compound or an amine compound. More specifically, the precursor ligand can be synthesized in the aforesaid manner using an o-formaniline compound wherein the nitrogen part has no substituent or an o-acylaniline wherein the nitrogen part has no substituent and an aniline compound wherein the nitrogen part has no substituent or a primary amine compound.

The o-acylaniline which may be used herein can be obtained by, for example, reducing the carboxylic acid group of an o-aminobenzoic acid compound. An N-alkylation reaction of an anthranyl compound can also be performed to obtain the corresponding N-alkyl-o-acylaniline compound.

Then, the thus obtained ligand precursor can be allowed to react with a metallic compound to synthesize the corresponding transition metal compound. More specifically, the ligand compound is dissolved in a solvent. The resulting solution may be contacted with a base to prepare a thiophenoxide salt or an anilino salt, if necessary. Then, the solution or the salt is mixed with a metallic compound such as a metallic halide or a metallic alkylate at a low temperature and stirred at a temperature of −78° C. to room temperature or under reflux for about 1 to 24 hours to obtain a transition metal compound.

Examples of the solvents preferably used herein include polar solvents such as ether and tetrahydrofuran and hydrocarbon solvents such as toluene, but not limited thereto. Examples of the bases preferably used herein include lithium salts, such as n-butyllithium; sodium salts, such as sodium hydride; and nitrogen-containing compounds, such as pyridine and triethylamine, but not limited thereto.

Depending on the transition metal compound, the ligand compound can be directly reacted with the metallic compound without producing a thiophenoxide salt or an anilino salt, to synthesize the corresponding transition metal compound.

The structure of the transition metal compound obtained can be determined by 270 MHz $^1$H-NMR (Japan Electron Optics Laboratory GSH-270), FT-IR (SHIMADZU FT-IR$^{8200}$D), FD-mass spectrometry (Japan Electron Optics Laboratory SX-102A), metal content analysis (analysis by ICP method after dry ashing and dissolution in dilute nitric acid, device: SHIMADZU ICPS-8000), and carbon, hydrogen and nitrogen content analysis (Helaus CHNO Model).

The transition metal compound (A-2) represented by the formula (II) wherein Q is a nitrogen atom and $R^3$ and $R^4$ are bonded to form an aromatic ring is represented by the following formula (II-c).

(II-c)

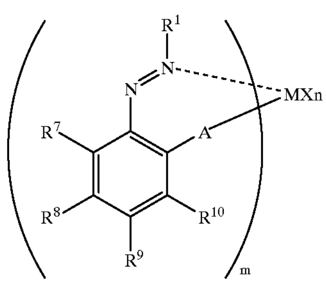

In the above formula, N— — —M generally indicates a coordinate bond, but the invention also includes compounds having no such a coordinate bond.

In the above formula, M, m, A, $R^1$, $R^6$, n and X have the same meanings as those of M, m, A, $R^1$, $R^6$, n and X in the formula (II).

$R^7$ to $R^{10}$ have the same meanings as those of $R^1$ to $R^4$ and $R^6$ in the formula (II).

$R^1$ and $R^6$ to $R^{10}$ may be the same or different, and two or more of them may be bonded to each other to form a ring.

When m is 2 or greater, $R^1$s, $R^6$S, $R^7$s, $R^8$s, $R^9$s, or $R^{10}$s may be the same or different, and one group of $R^1$ and $R^6$ to $R^{10}$ contained in one ligand and one group of $R^1$ and $R^6$ to $R^{10}$ contained in other ligands may be bonded.

The transition metal compound represented by the formula (II-c) wherein m is 2 and one group of $R^1$ and $R^6$ to $R^{10}$ contained in one ligand and one group of $R^1$ and $R^6$ to $R^{10}$ contained in the other ligand are bonded is, for example, a compound represented by the following formula (II-c').

(II-c')

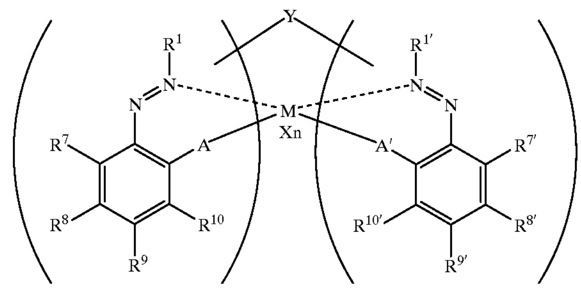

In the formula (II-c'), M, A, $R^1$, $R^6$ to $R^{1}0$ and X have the same meanings as those of M, A, $R^1$, $R^6$ to $R^{10}$ and X in the formula (II-c), and $R^{1'}$ and $R^{6'}$ to $R^{10'}$ have the same meanings as those of $R^1$ and $R^6$ to $R^{10}$.

A' may be the same as or different from A and is an oxygen atom, a sulfur atom, a selenium atom or a nitrogen atom having a substituent $R^{6'}$.

$R^1$, $R^6$ to $R^{10}$, $R^{1'}$ and $R^{6'}$ to $R^{10'}$ maybe the same or different.

Y is a bonding group or a single bond for linking at least one group selected from $R^1$ and $R^6$ to $R^{10}$ to at least one group selected from $R^{1'}$ and $R^{6'}$ to $R^{10'}$, and has the same meaning as that of Y in the formula (I-a').

Examples of the transition metal compounds represented by the formula (II-c) are given below, but not limited thereto.

In the following examples, M has the same meaning as that of M in the formula (II-c).

X has the same meaning as that of X in the formula (II-c), and is for example halogen such as Cl or Br, or an alkyl group such as methyl, but not limited thereto. When plural X are present, they may be the same or different.

n has the same meaning as that of n in the formula (II-c), and is decided by a valence of the metal M. For example, when two monoanions are bonded to the metal, there can be mentioned n=0 in case of a divalent metal, n=1 in case of a trivalent metal, n=2 in case of a tetravalent metal, and n=3 in case of a pentavalent metal. More specifically, there can be mentioned n=2 in case of Ti(IV), n=2 in case of Zr(IV), and n=2 in case of Hf(IV).

In the following examples, Me denotes methyl, Et denotes ethyl, iPr denotes i-propyl, tBu denotes tert-butyl, and Ph denotes phenyl.

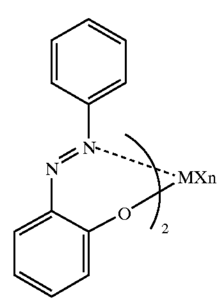

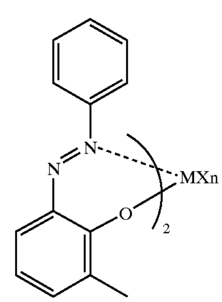

-continued
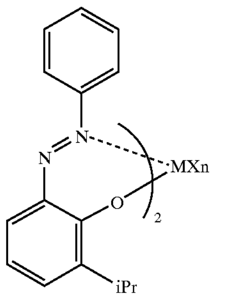
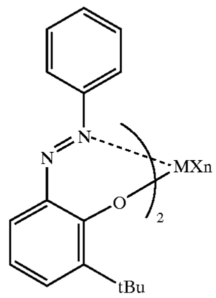
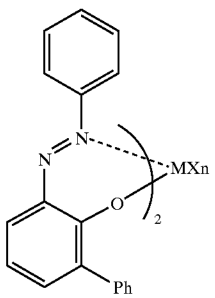
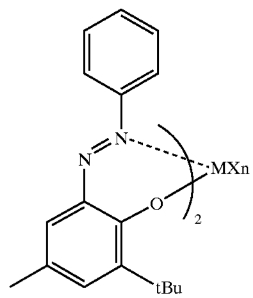
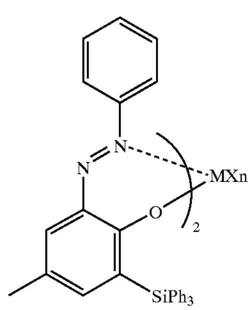
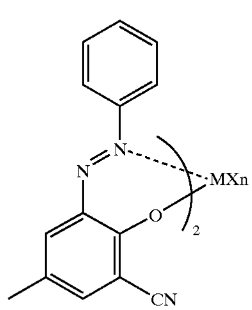
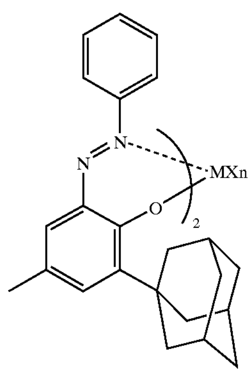
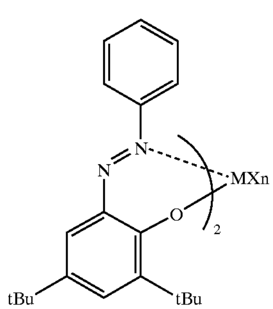
-continued
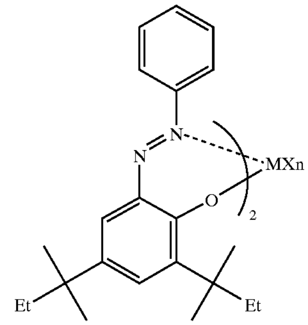
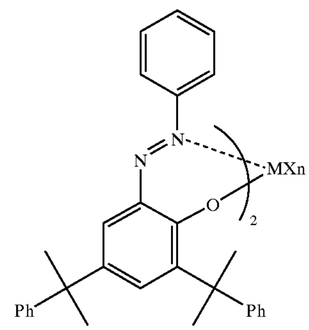
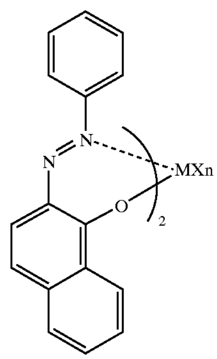
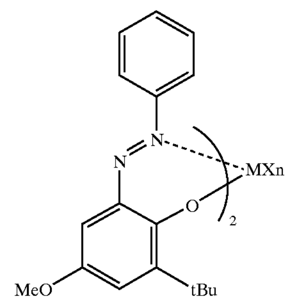
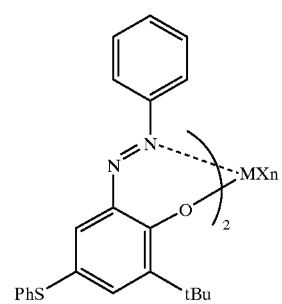
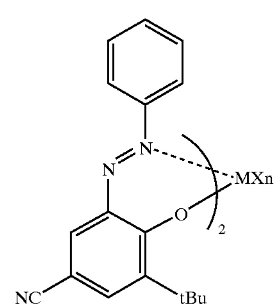

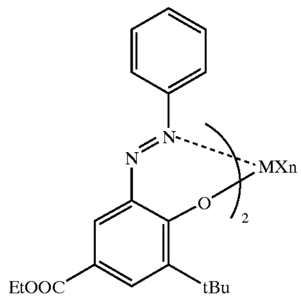
N
N
MXn
O
2
EtOOC
tBu
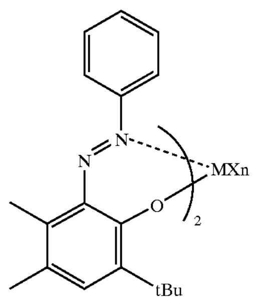
N
N
MXn
O
2
tBu
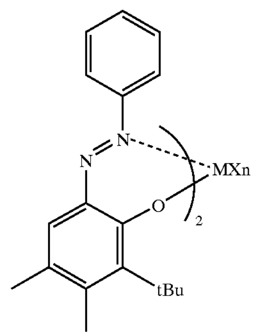
N
N
MXn
O
2
tBu
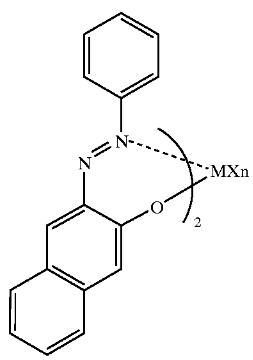
N
N
MXn
O
2
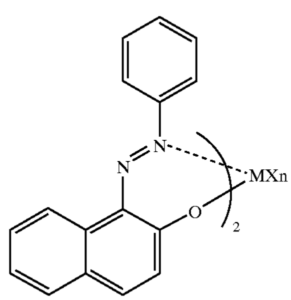
N
N
MXn
O
2
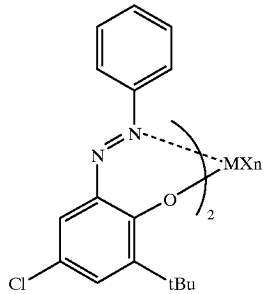
N
N
MXn
O
2
Cl
tBu
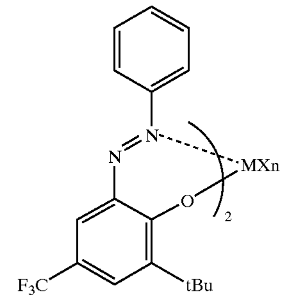
N
N
MXn
O
2
F3C
tBu
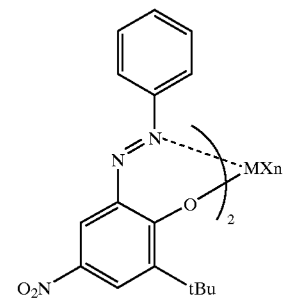
N
N
MXn
O
2
O2N
tBu
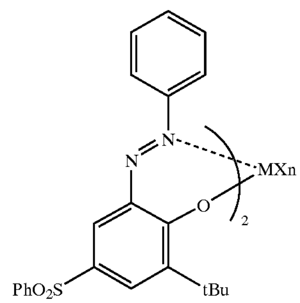
N
N
MXn
O
2
PhO2S
tBu
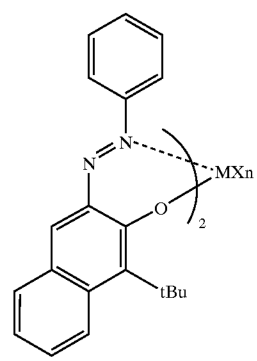
N
N
MXn
O
2
tBu
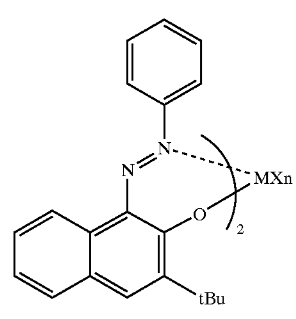
N
N
MXn
O
2
tBu -continued
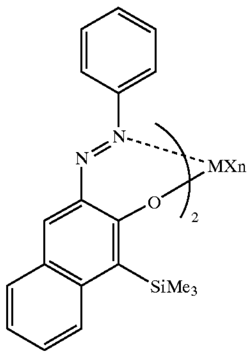
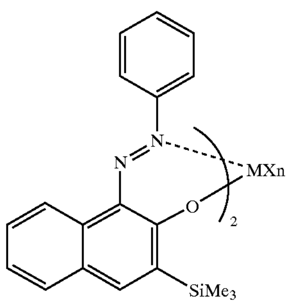
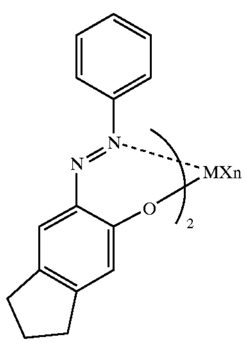
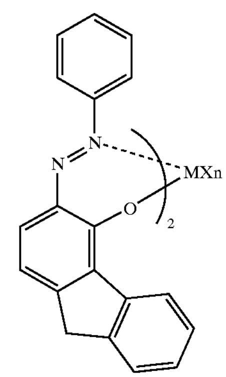
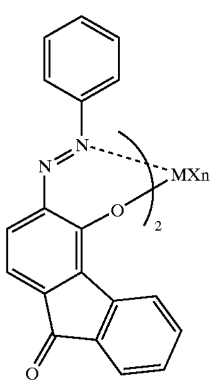
-continued
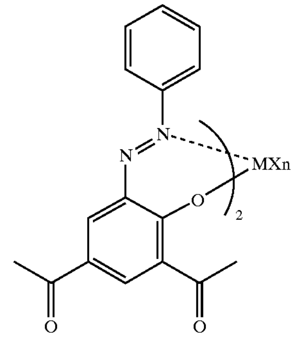
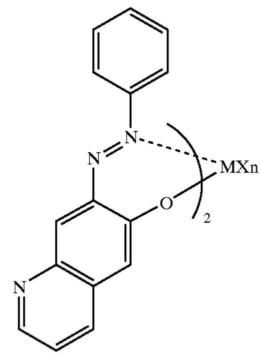
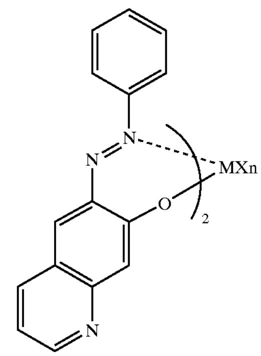
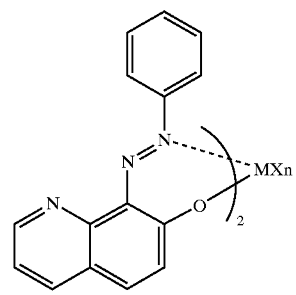
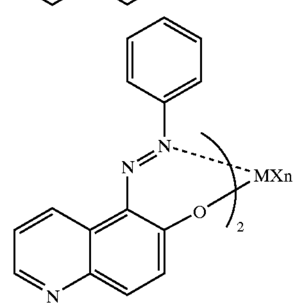
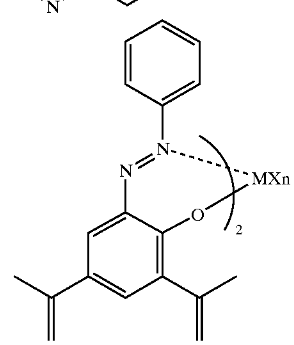

-continued
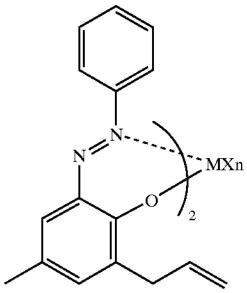
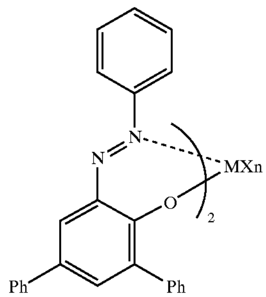
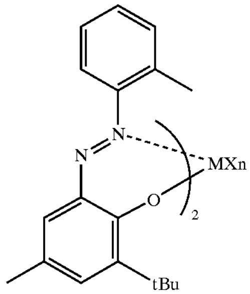
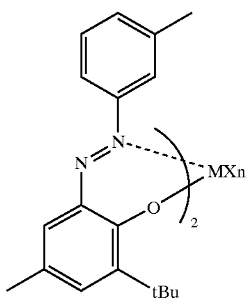
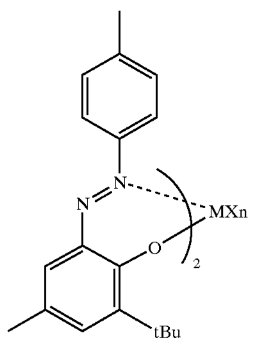
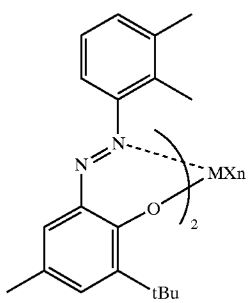
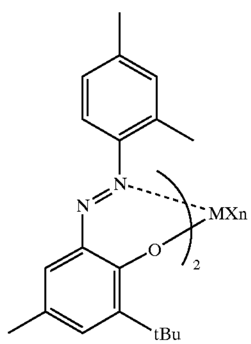
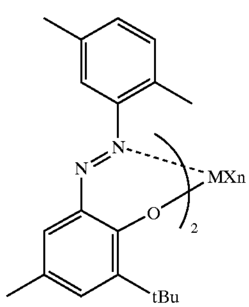
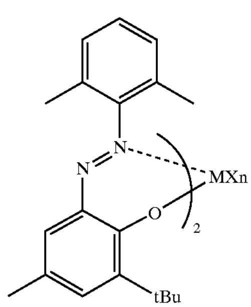
-continued
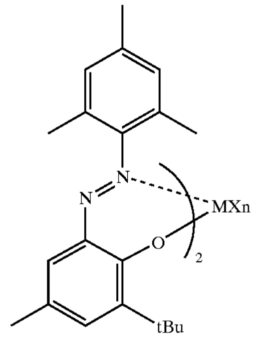
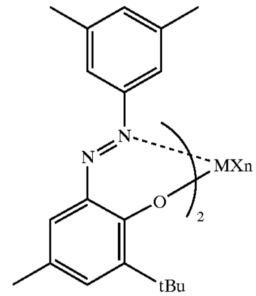
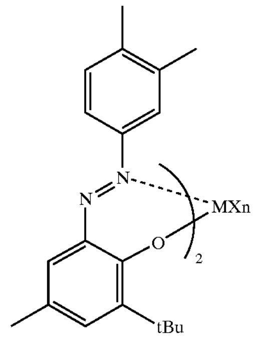
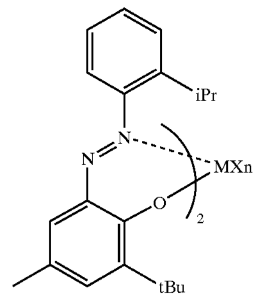
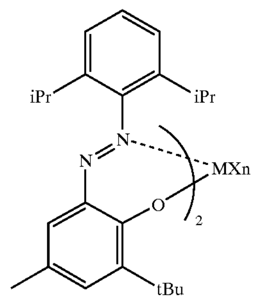
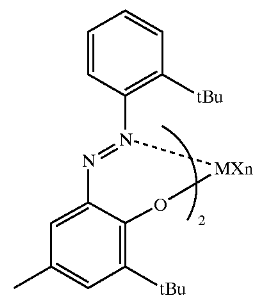
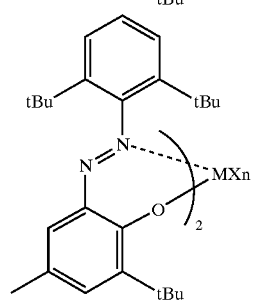
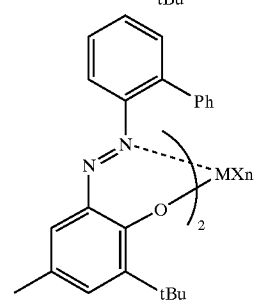
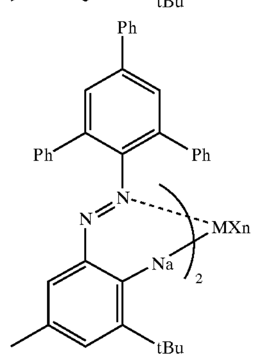
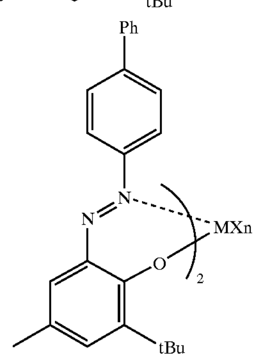

-continued
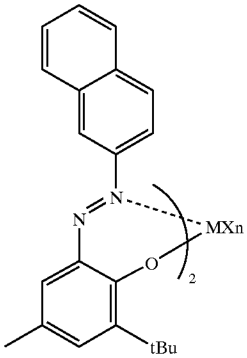
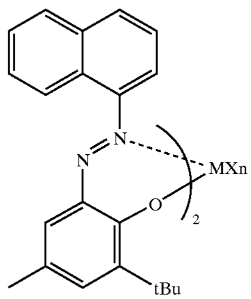
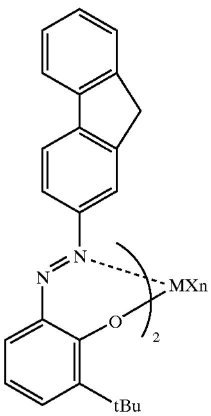
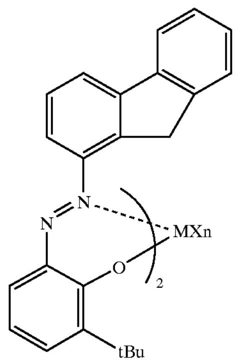
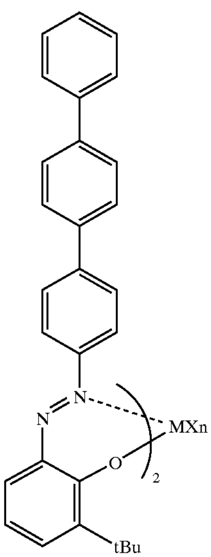
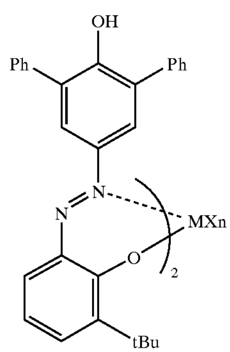
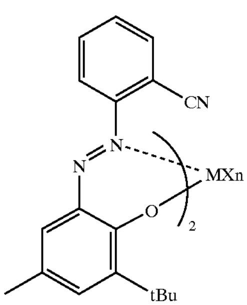
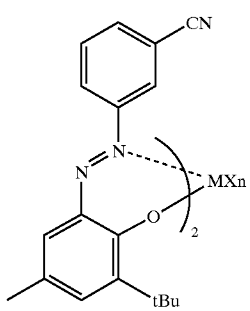
-continued
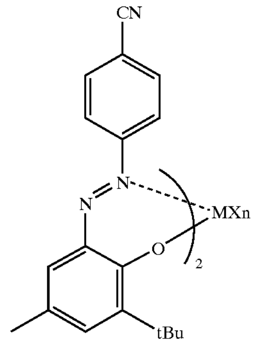
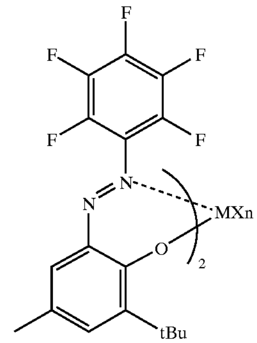
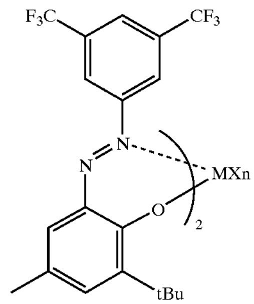
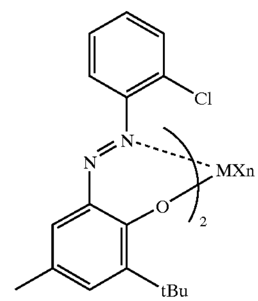
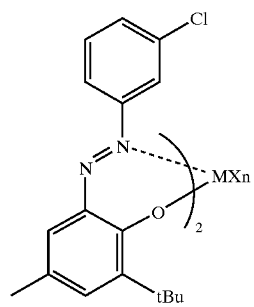
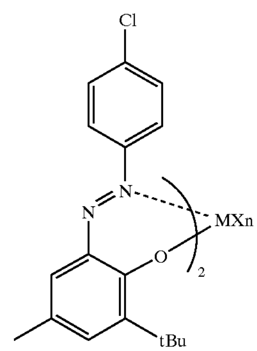
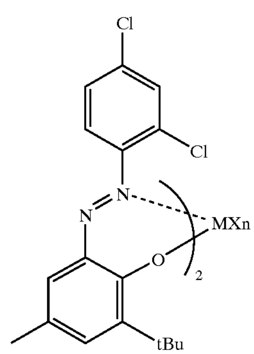
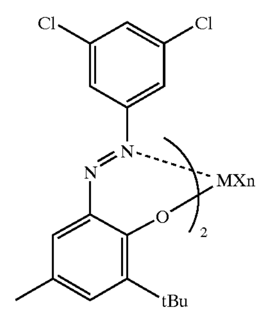
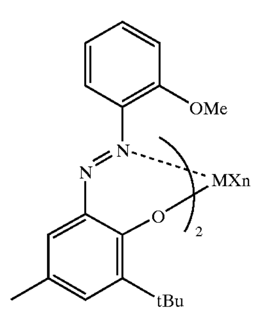
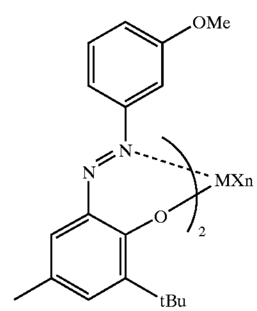

-continued
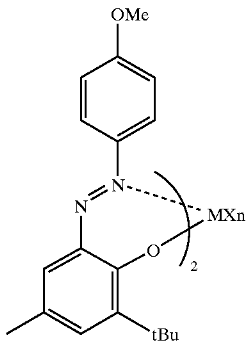
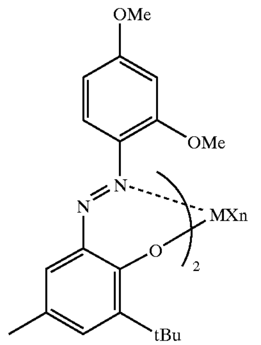
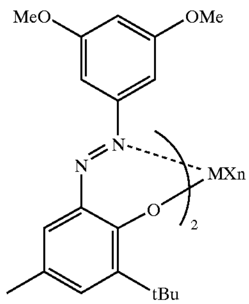
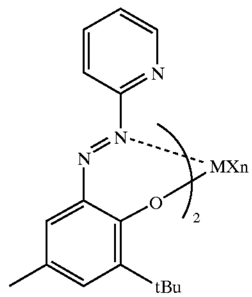
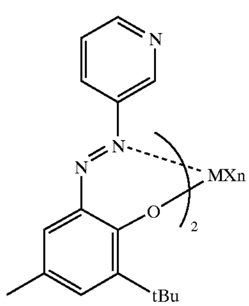
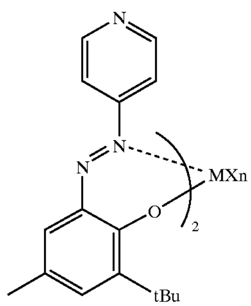
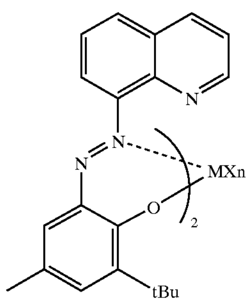
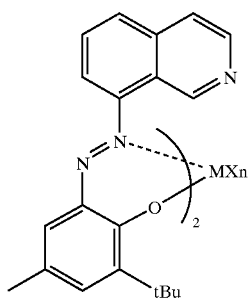
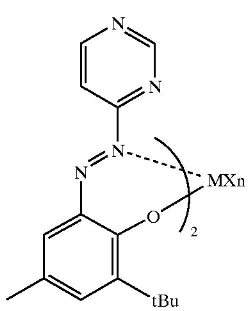
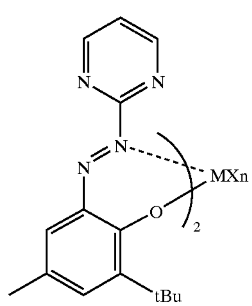
-continued
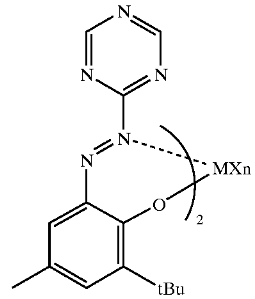
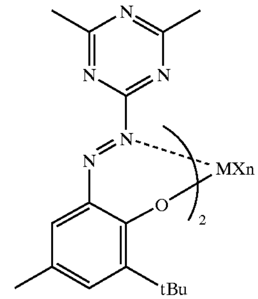
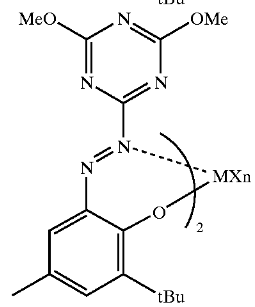
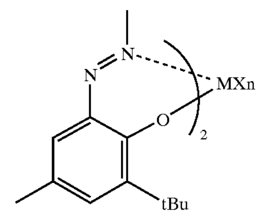
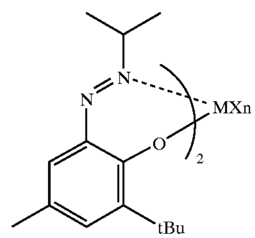
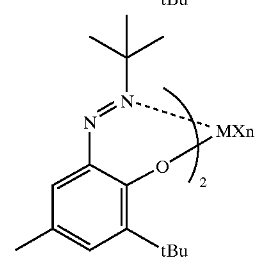
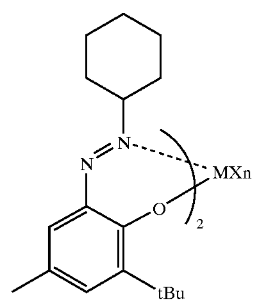
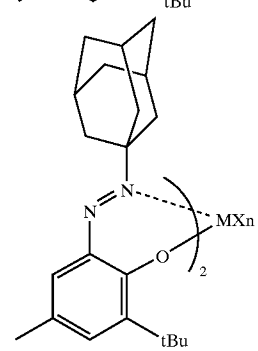
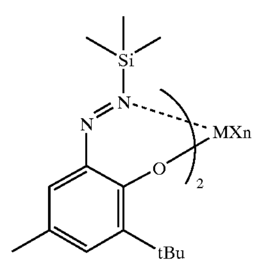
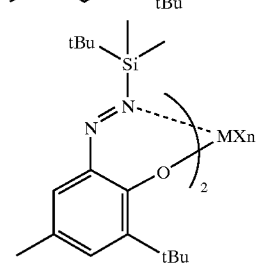
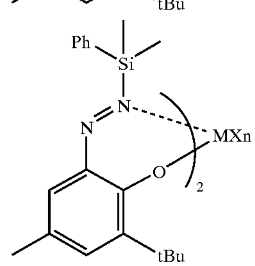

-continued
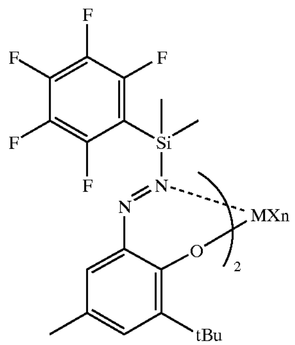
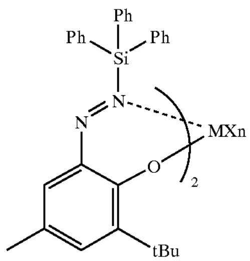
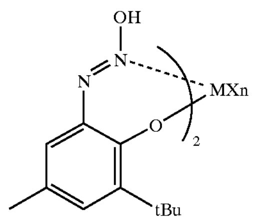
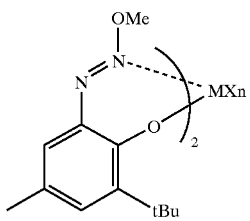
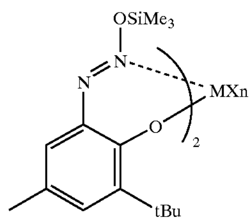
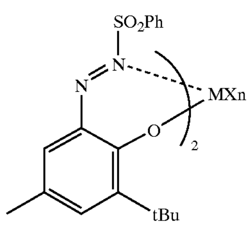
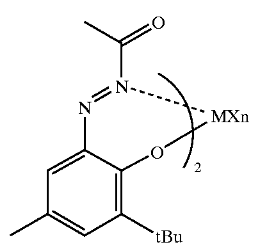
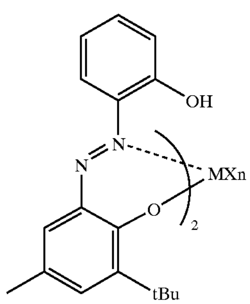
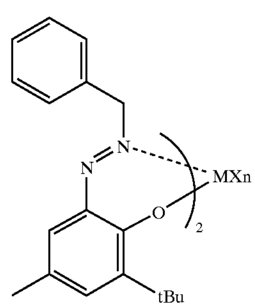
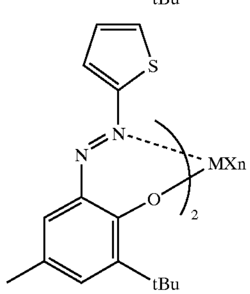
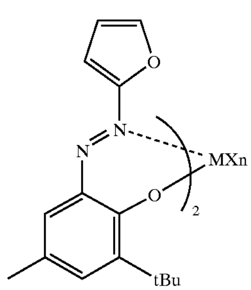
-continued
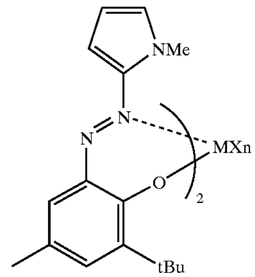
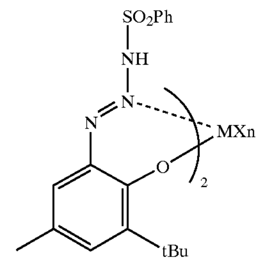
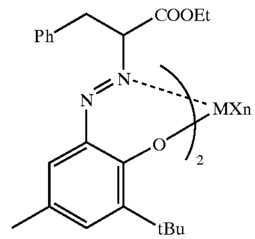
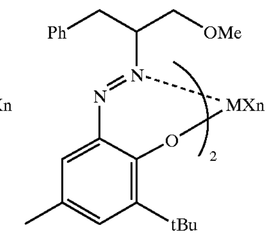
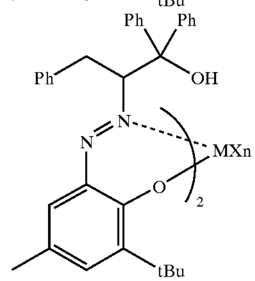
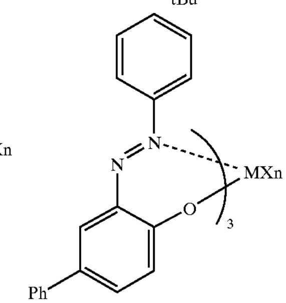
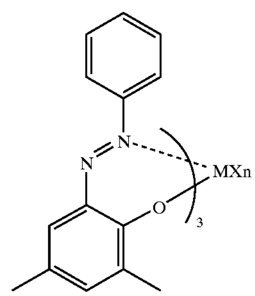
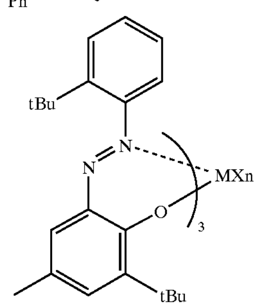
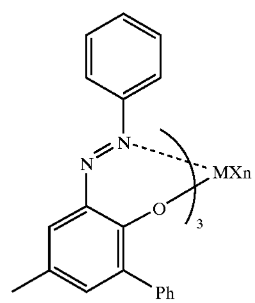
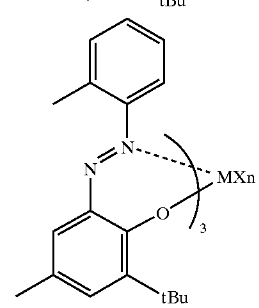
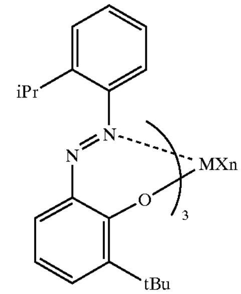
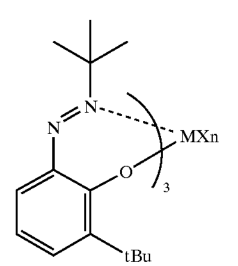

-continued
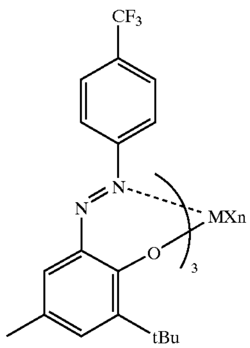
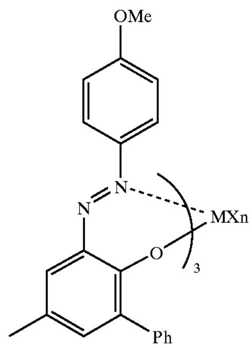
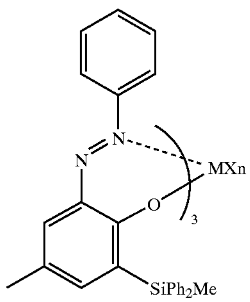
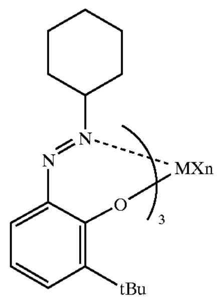
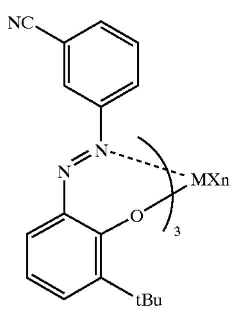
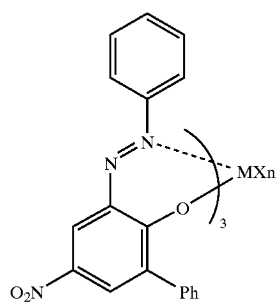
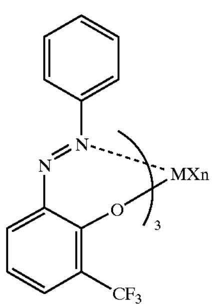
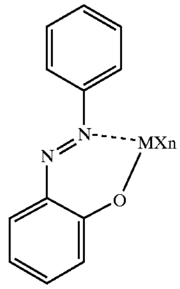
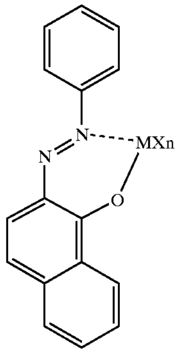
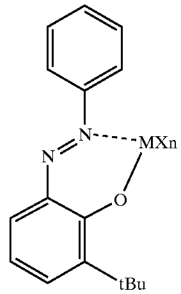
-continued
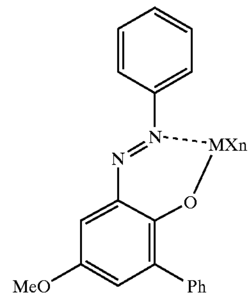
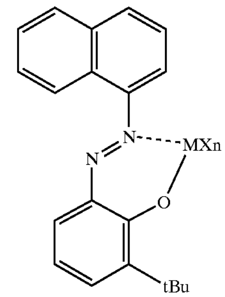
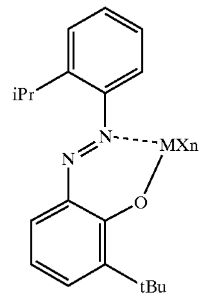
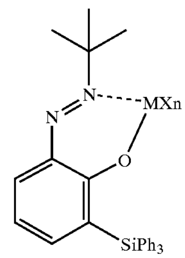
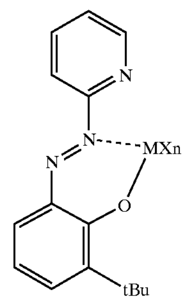
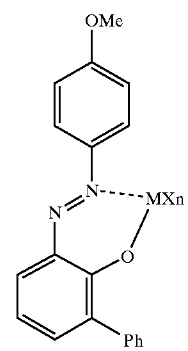
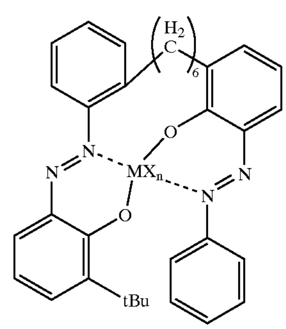
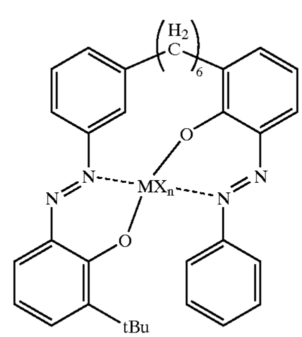

-continued
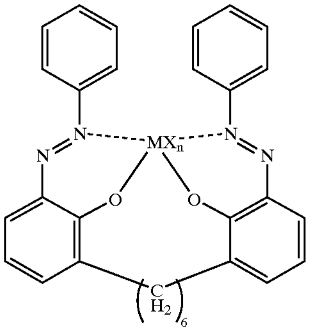
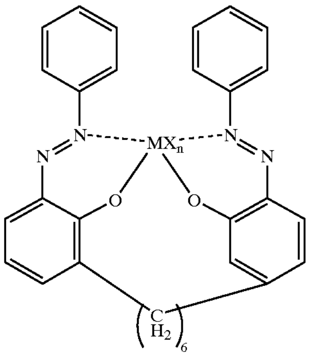
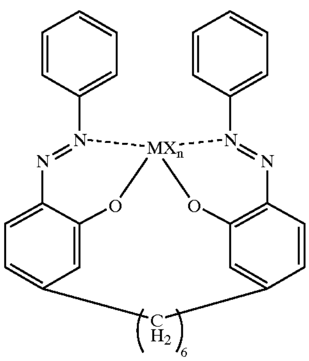
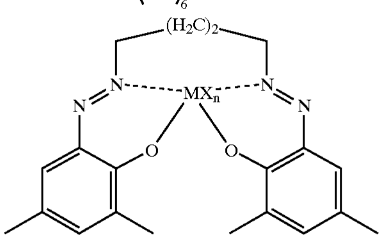
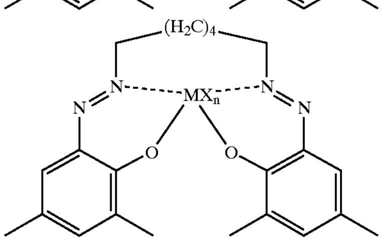
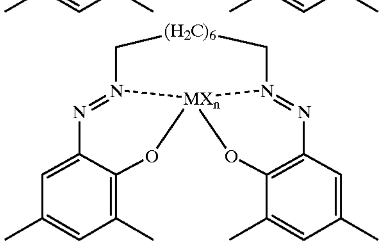
-continued
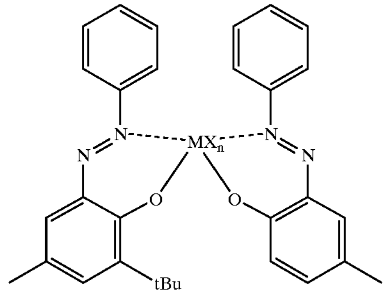
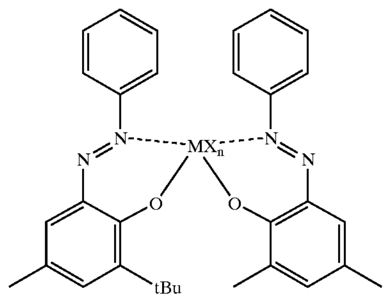
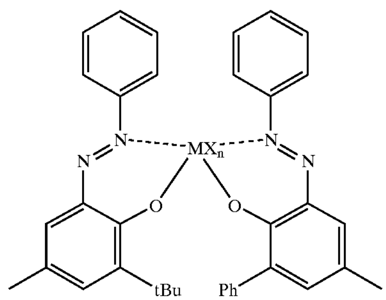
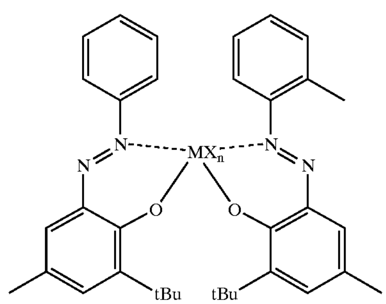
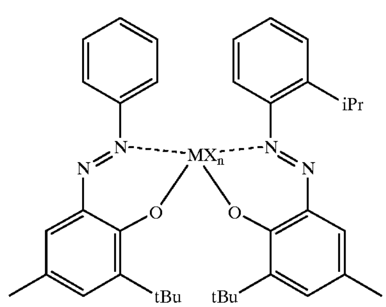

-continued
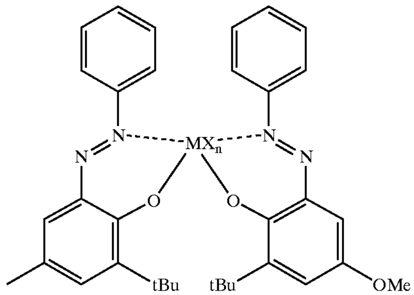
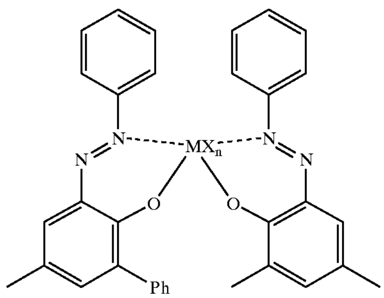
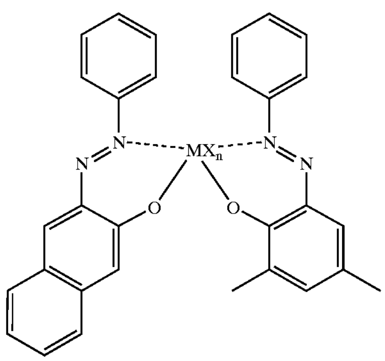
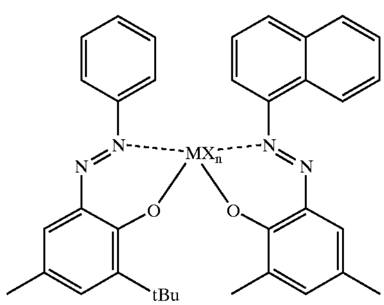
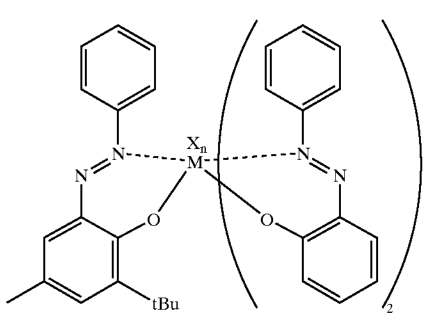
-continued
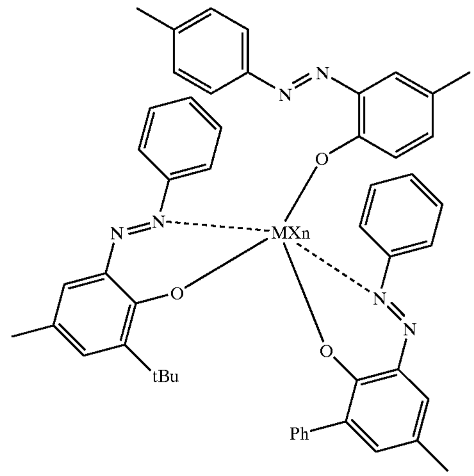
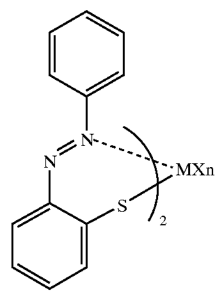
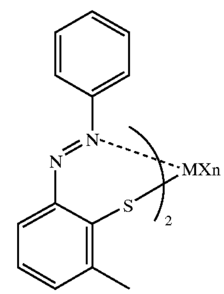
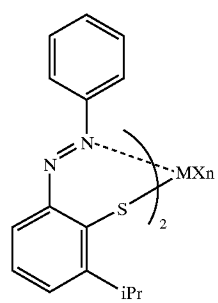
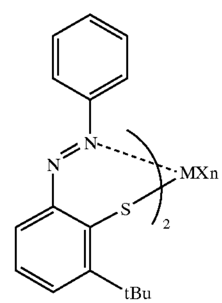
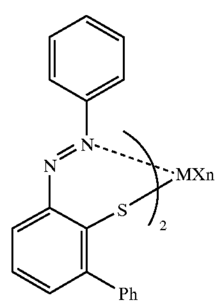
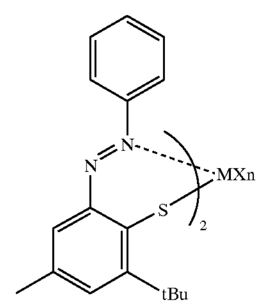
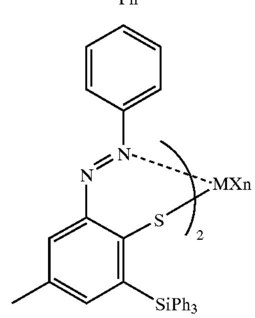
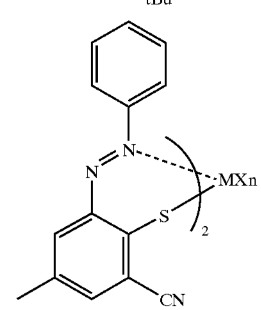

-continued
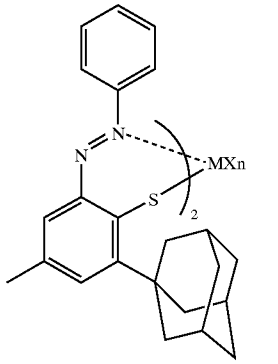
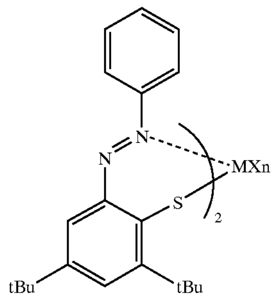
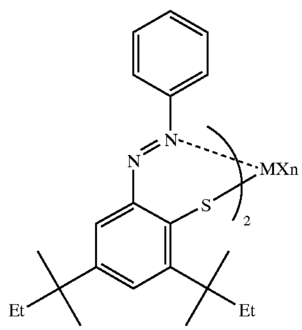
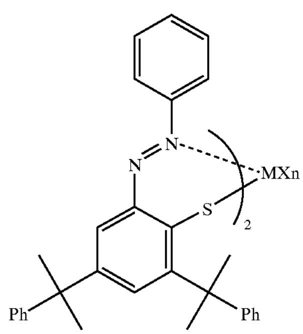
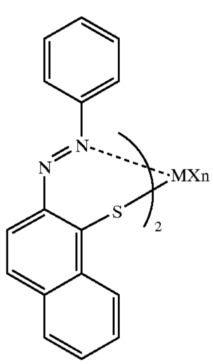
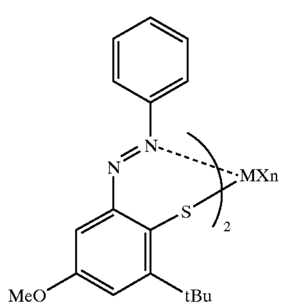
-continued
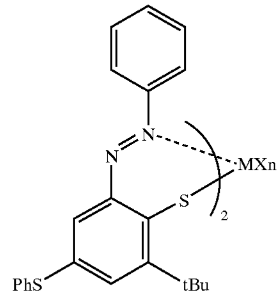
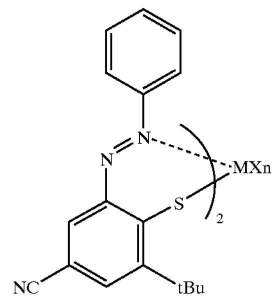
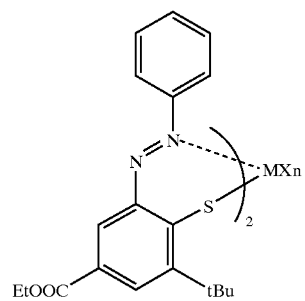
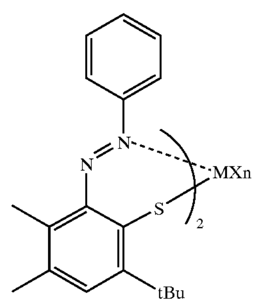
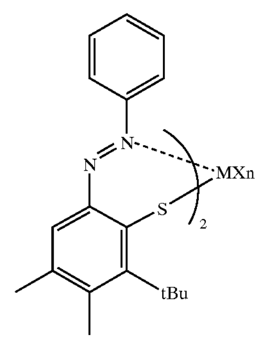
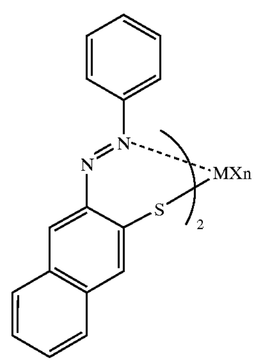

-continued
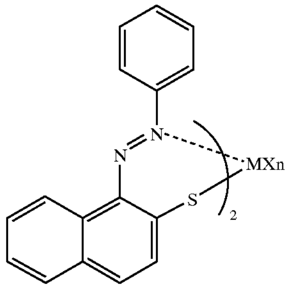
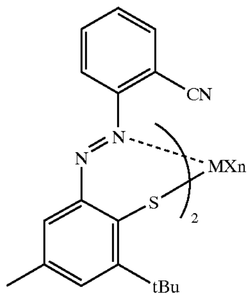
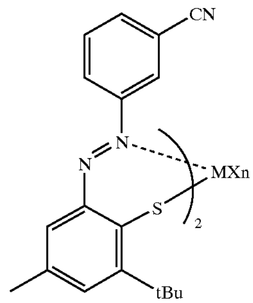
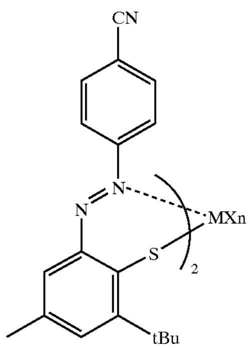
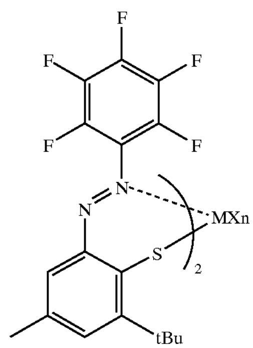
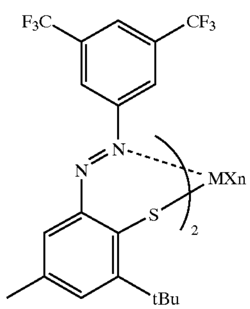
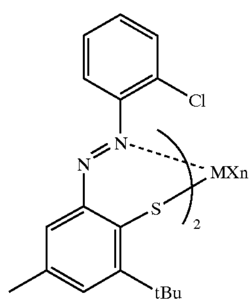
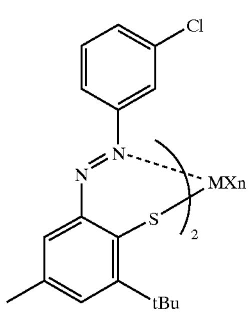
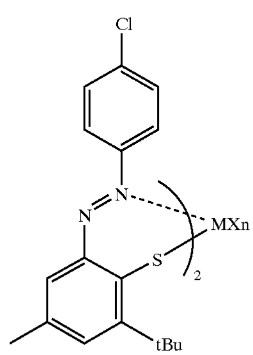
-continued
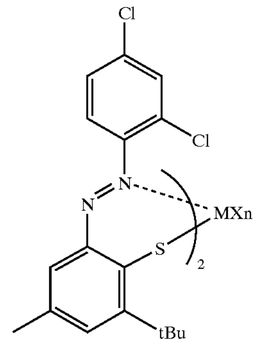
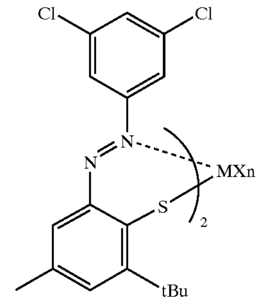
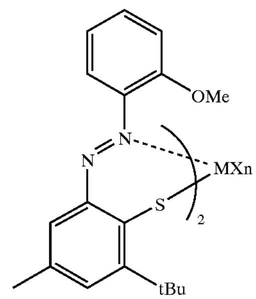
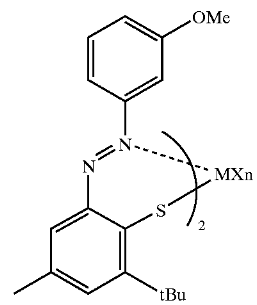
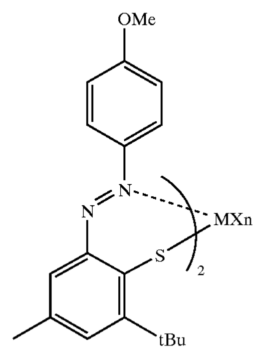
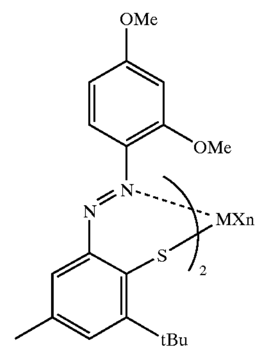
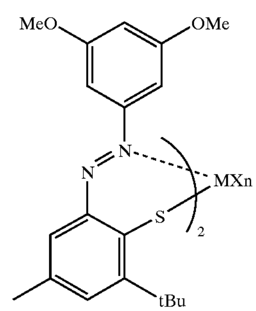
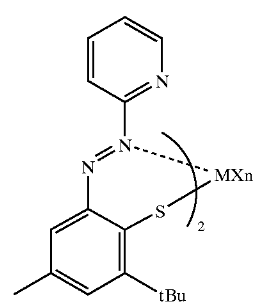
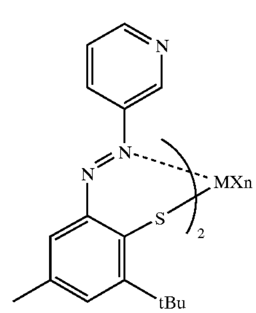
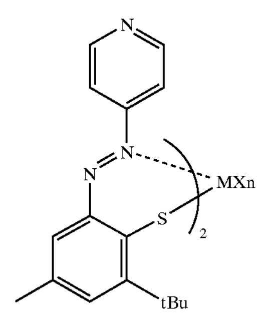

-continued
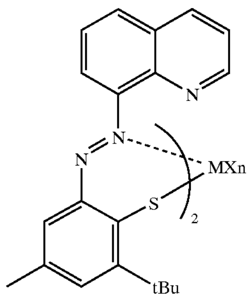
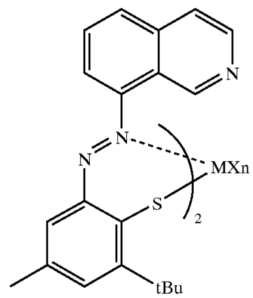
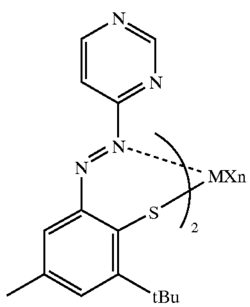
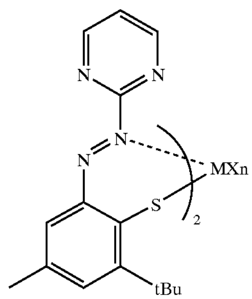
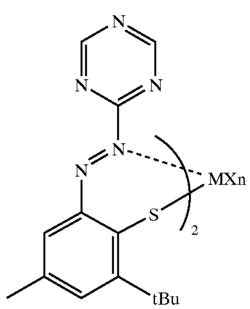
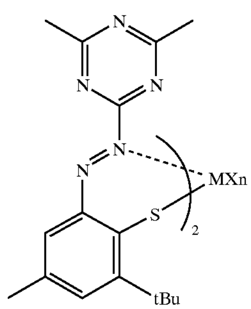
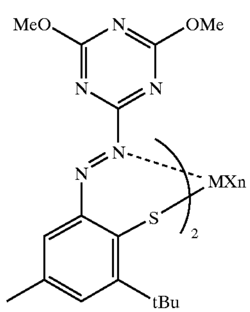
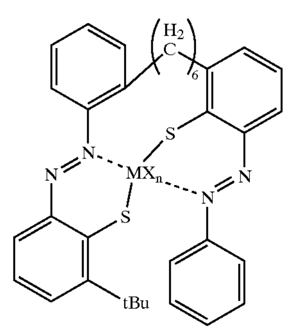
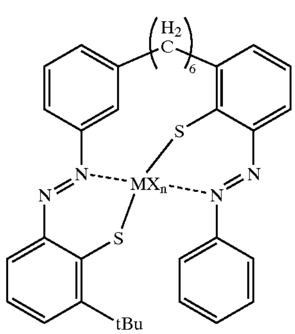
-continued
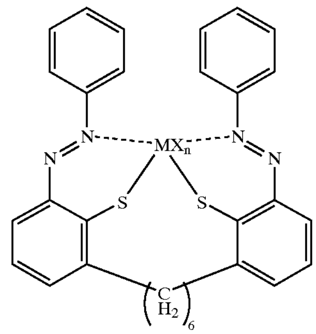
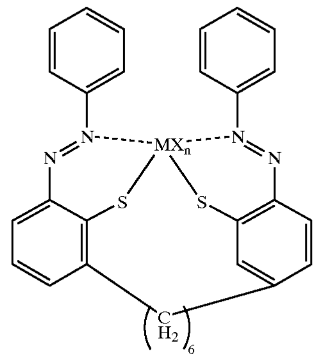
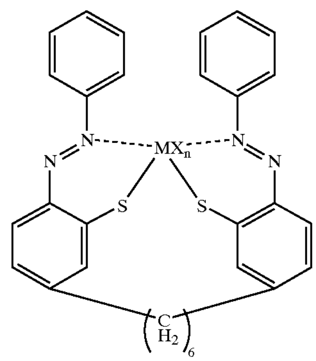
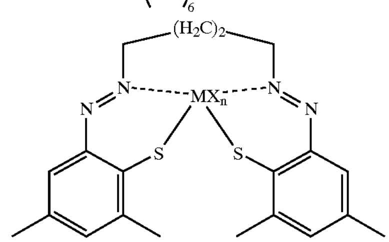
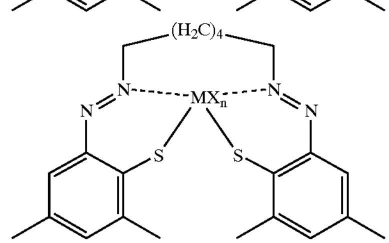
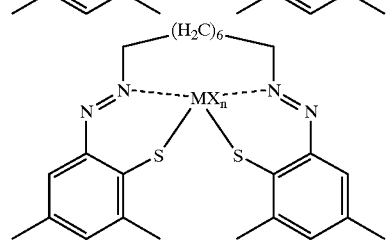

-continued
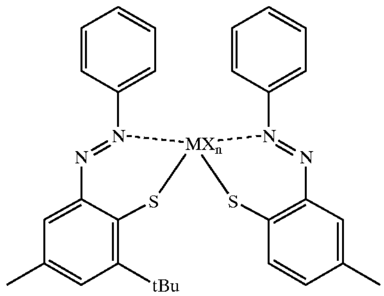
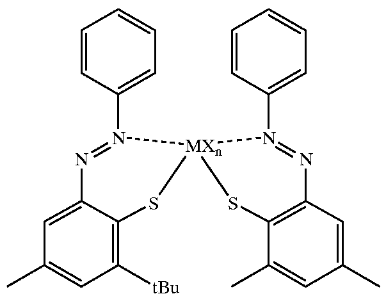
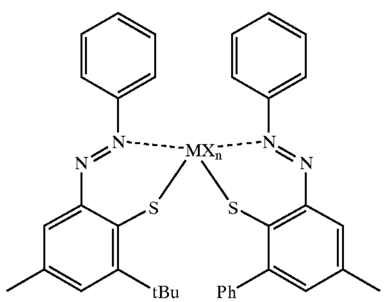
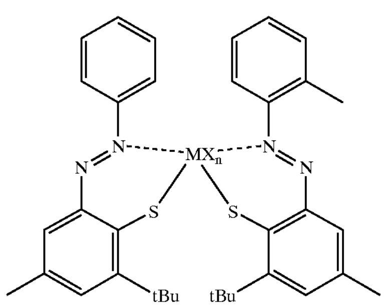
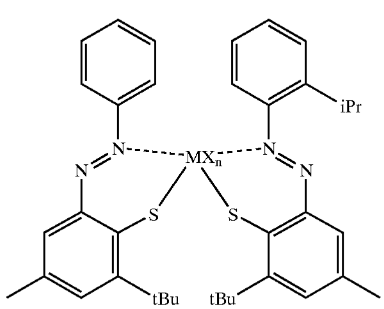
-continued
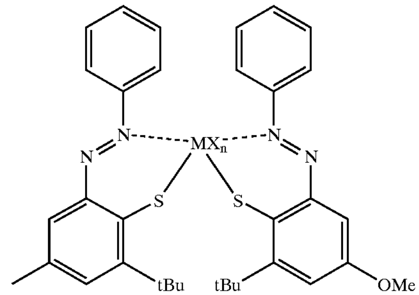
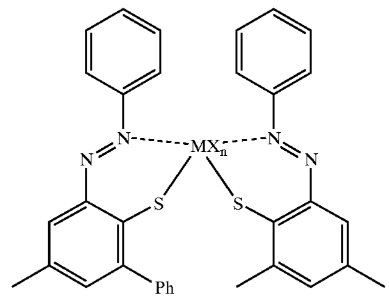
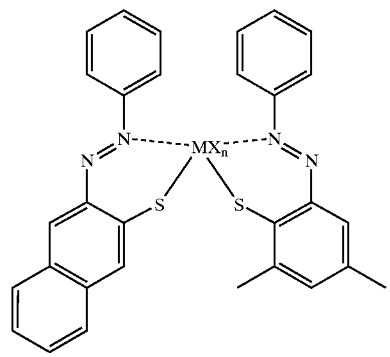
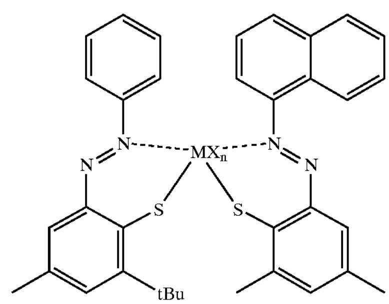
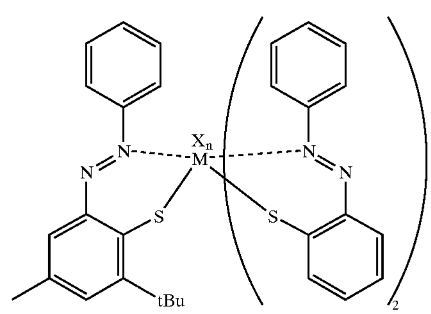

-continued
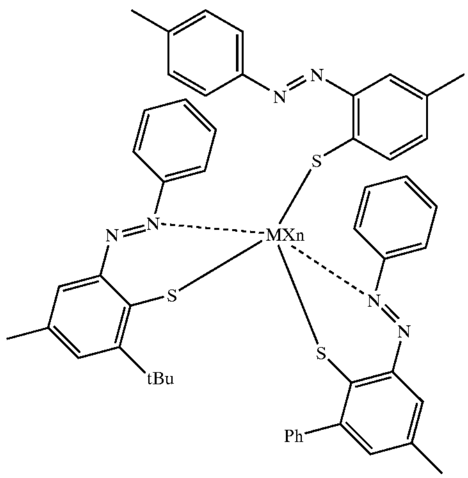
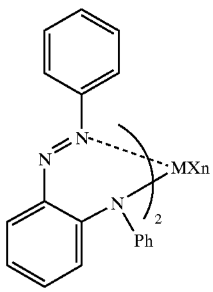
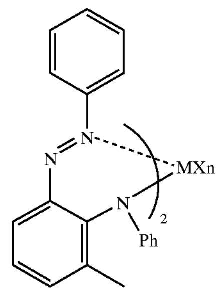
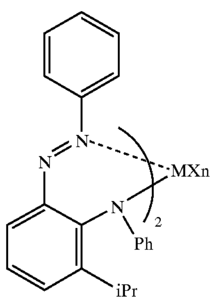
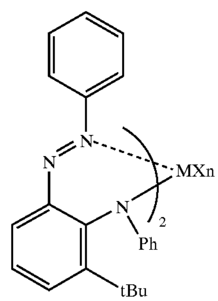
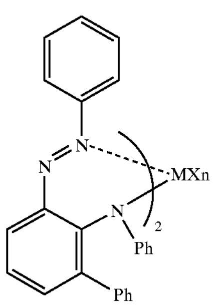
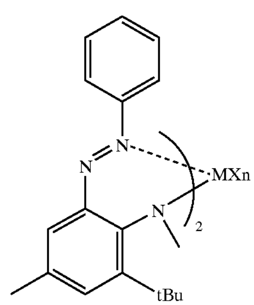
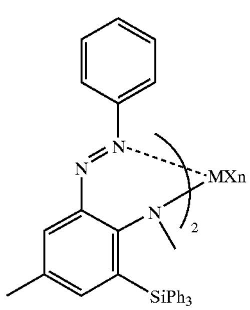
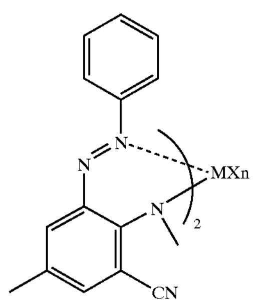
-continued
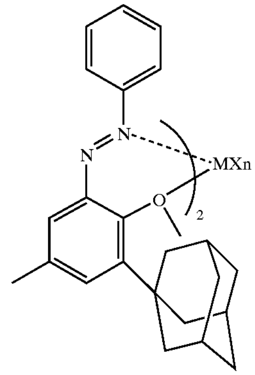
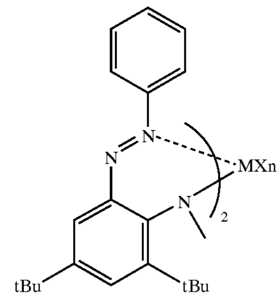
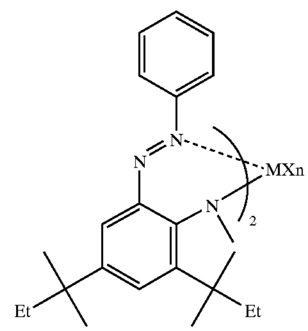
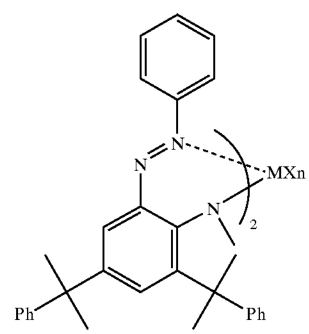
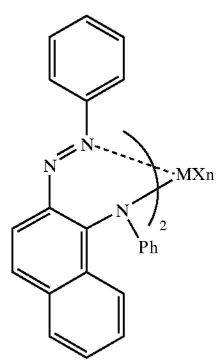
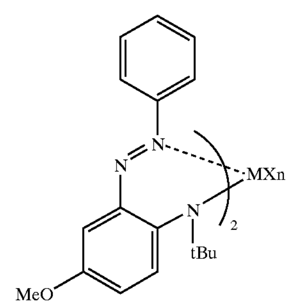

-continued
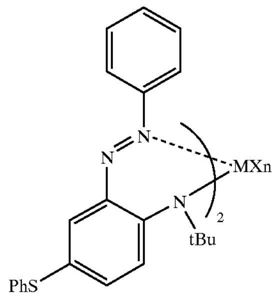
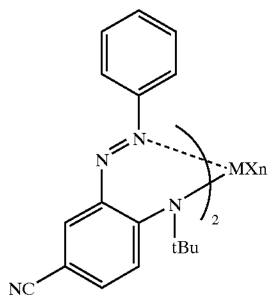
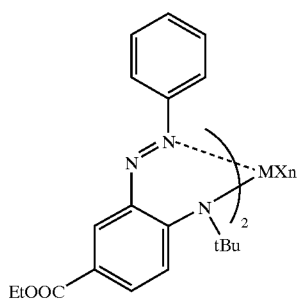
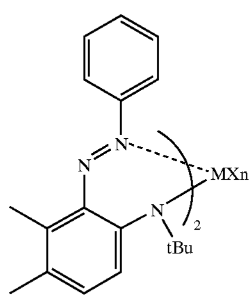
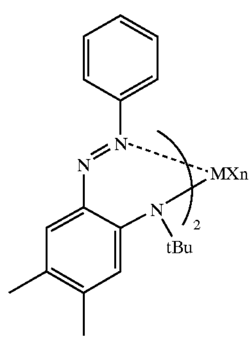
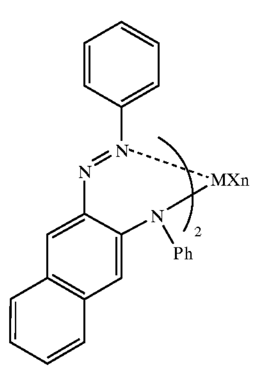
-continued
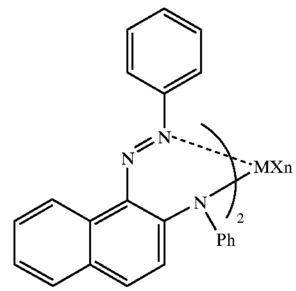
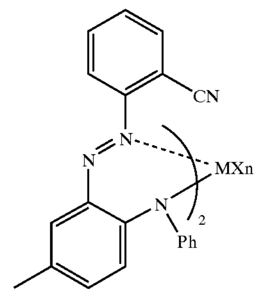
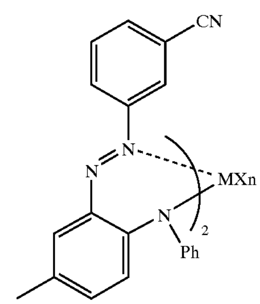
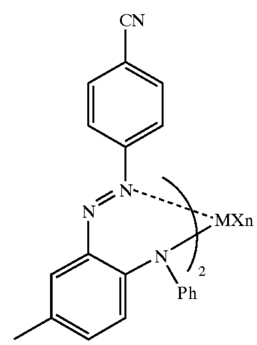
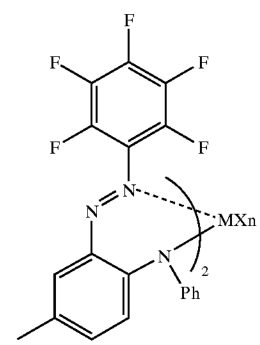
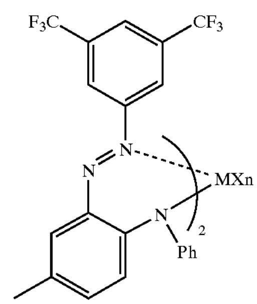
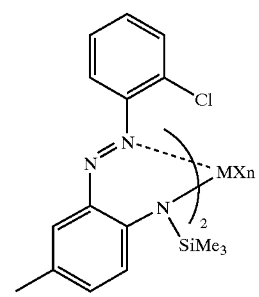
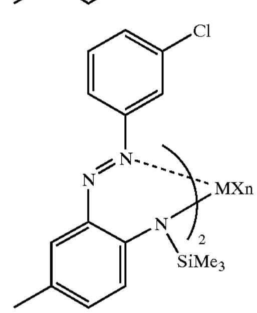
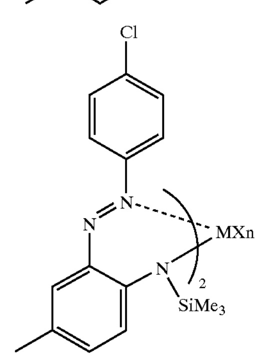

-continued
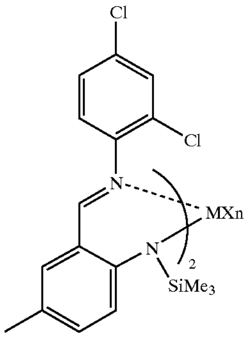
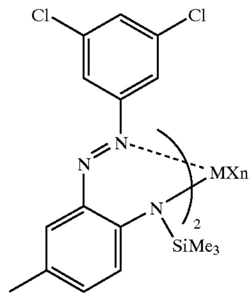
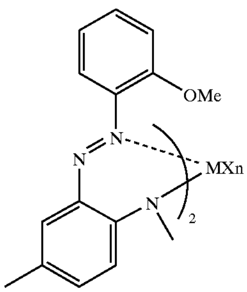
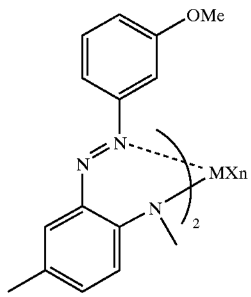
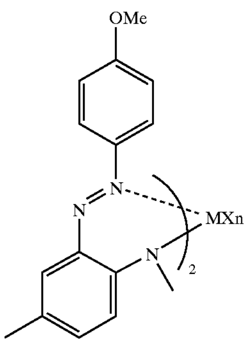
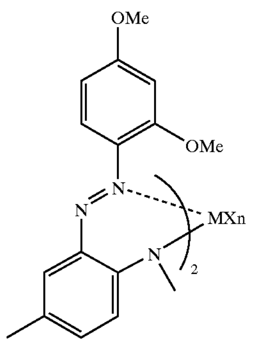
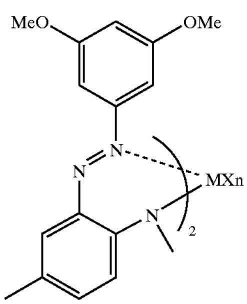
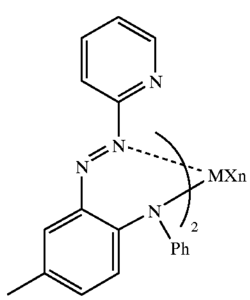
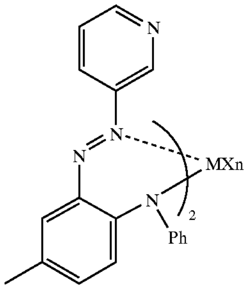
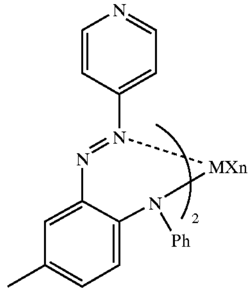
-continued
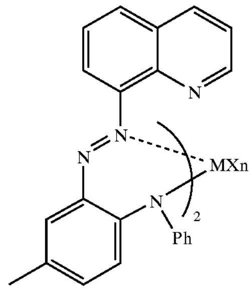
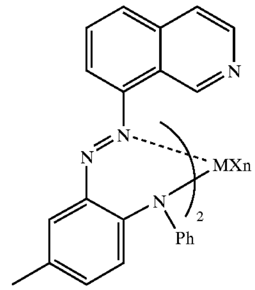
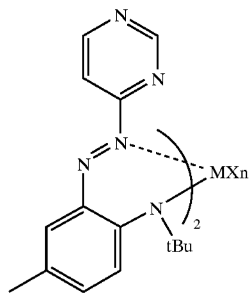
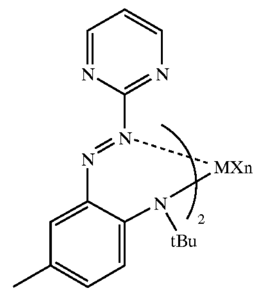
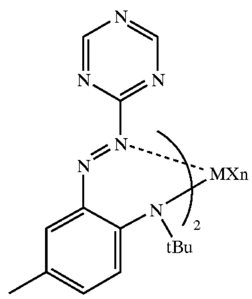
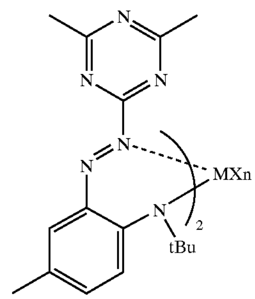
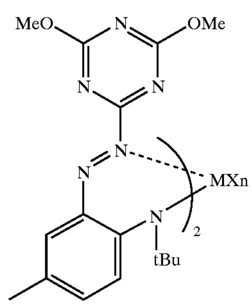
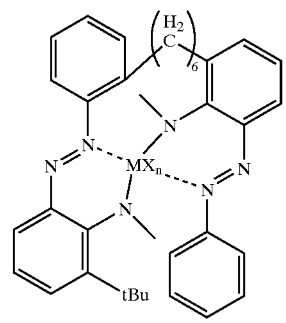
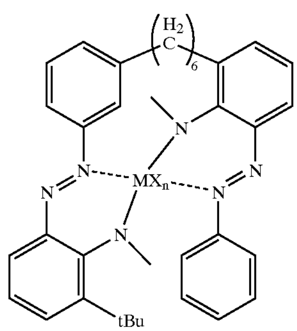

-continued
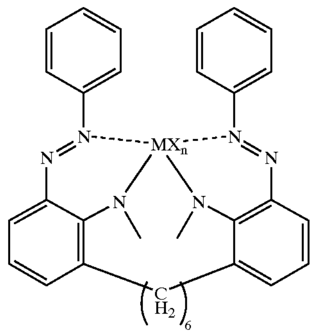
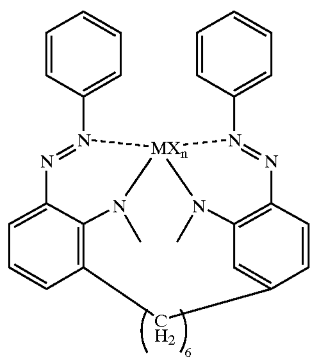
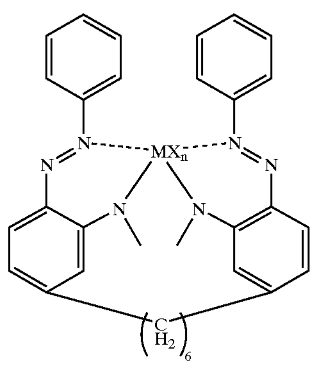
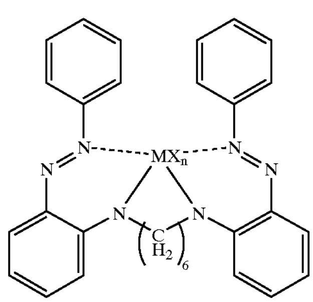
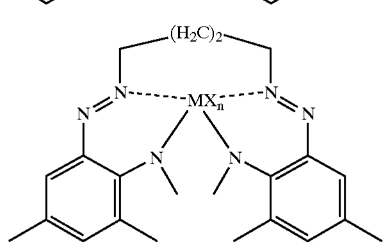
-continued
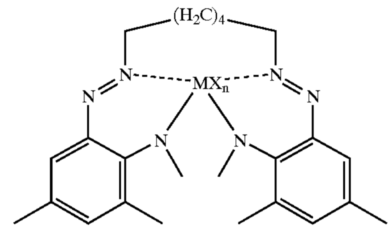
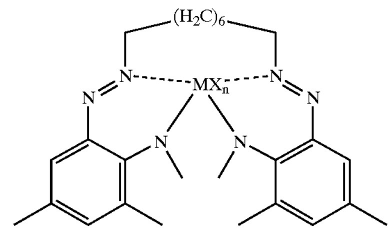
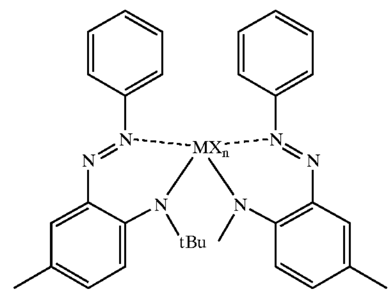
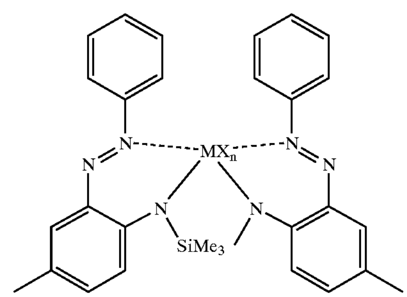
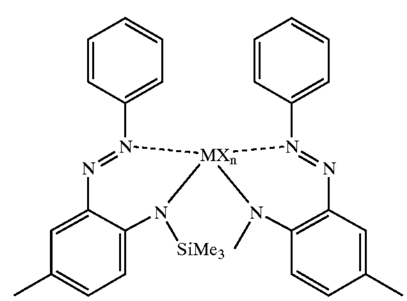
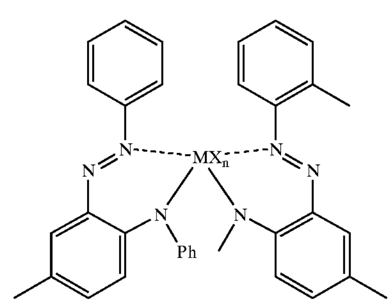

-continued
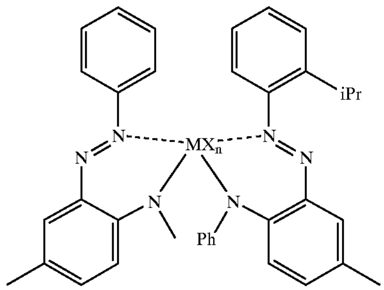
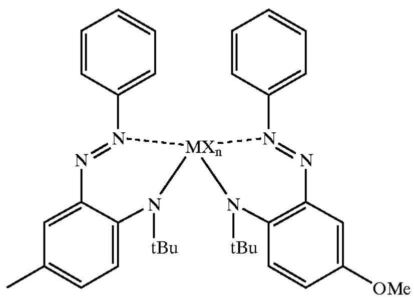
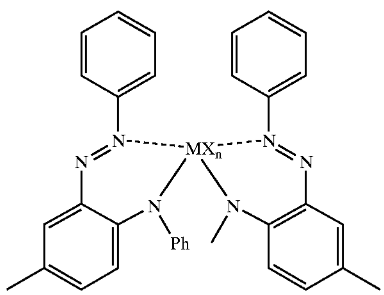
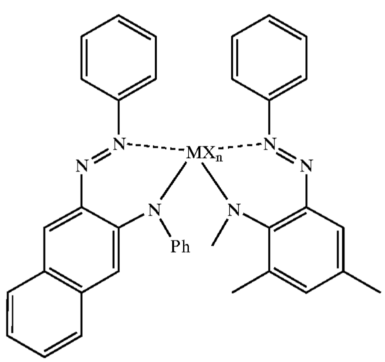
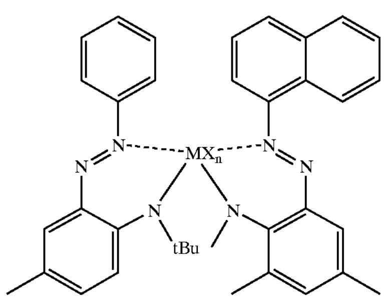
-continued
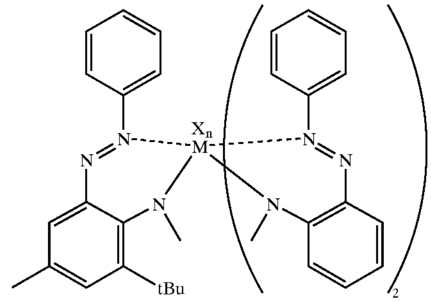
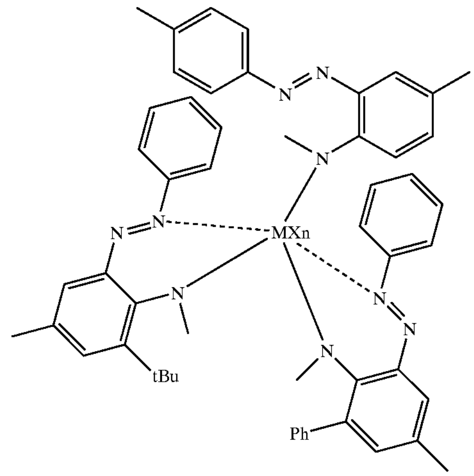
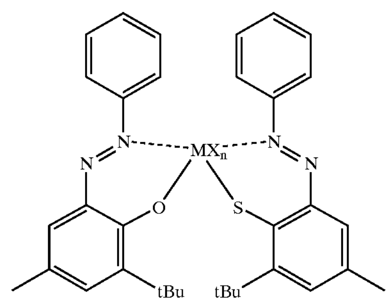
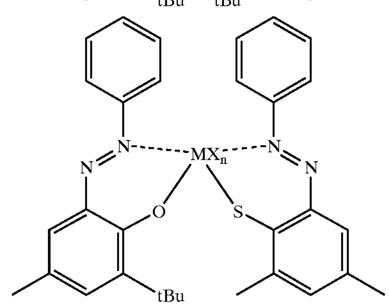
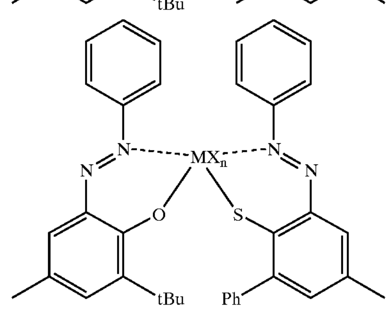

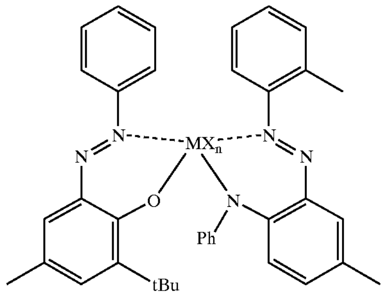

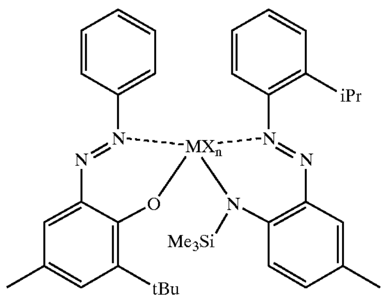

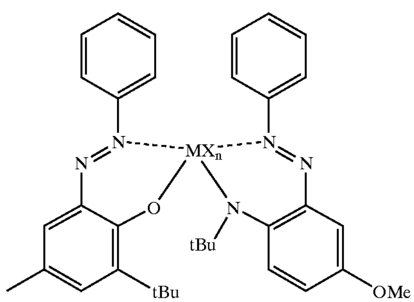

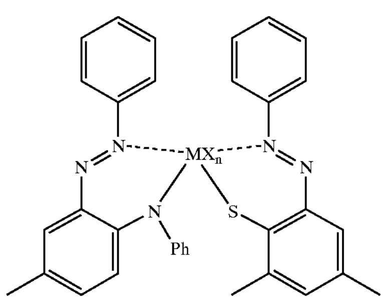

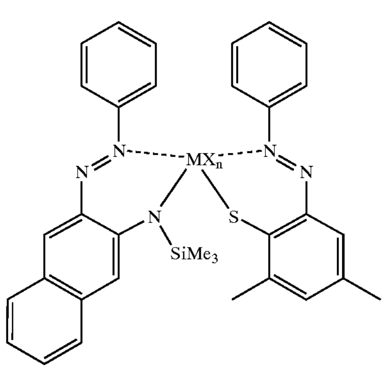

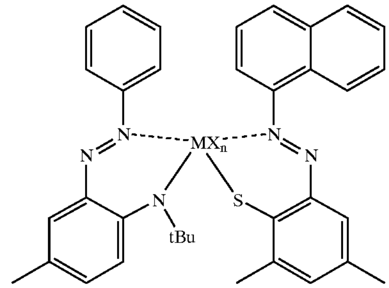

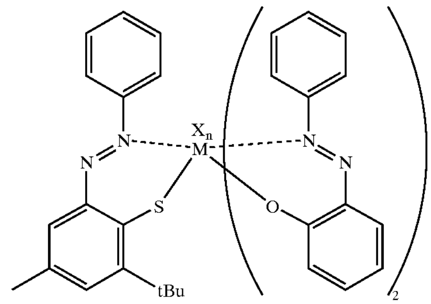

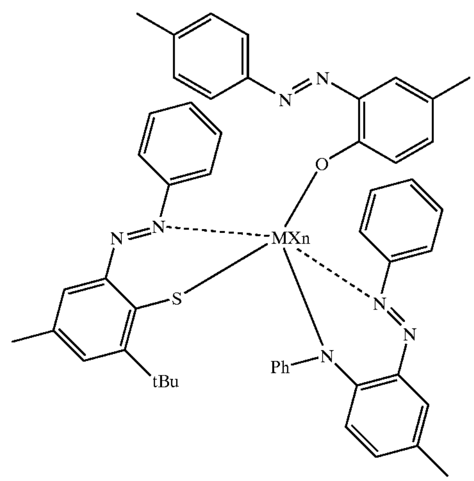

The transition metal compound represented by the formula (II-c) can be prepared without any restriction, for example, by the same process as that for preparing the aforesaid transition metal compound represented by the formula (I-c).

According to properties of the compound, the ligand can be directly reacted with the metallic compound without producing a phenoxide salt, whereby the corresponding transition metal compound can be synthesized. For example, the following compound is reacted with a base to produce a salt, and then the salt is reacted with the transition metal halide to prepare the corresponding transition metal compound.

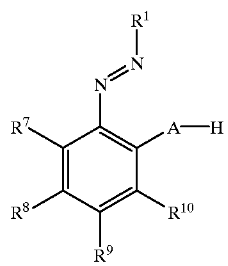

As the olefin polymerization catalyst, the transition metal compounds (A-1) and (A-2) described above can be used singly or in combination of two or more kinds, or further in combination other with transition metal compounds.

Examples of other transition metal compounds include known transition metal compounds comprising ligands containing a hetero atom such as nitrogen, oxygen, sulfur, boron or phosphorus.

Other Transition Metal Compounds

Examples of the transition metal compounds other than the transition metal compounds (A-1) and (A-2), which may be used in the invention, include the following compounds.

(1) Transition metal imide compound represented by the following formula:

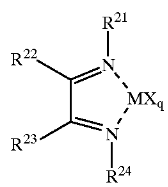

In the above formula, M is a transition metal atom of Group 8 to Group 10 of the periodic table, preferably nickel, palladium or platinum.

$R^{21}$ to $R^{24}$ may be the same or different and are each a hydrocarbon group of 1 to 50 carbon atoms, a halogenated hydrocarbon group of 1 to 50 carbon atoms, a hydrocarbon-substituted silyl group, or a hydrocarbon group substituted with a substituent containing at least one element selected from nitrogen, oxygen, phosphorus, sulfur and silicon.

Two or more of the groups indicated by $R^{21}$ to $R^{24}$, preferably adjacent groups, may be boned to each other to form a ring.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. q is an integer of 0 to 4. When q is 2 or greater, plural groups X may be the same or different.

(2) Transition metal amide compound represented by the following formula:

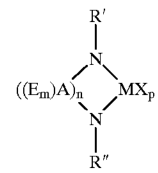

In the above formula, M is a transition metal atom of Group 3 to Group 6 of the periodic table, preferably titanium, zirconium or hafnium.

R' and R" may be the same or different and are each a hydrogen atom, a hydrocarbon group of 1 to 50 carbon atoms, a halogenated hydrocarbon group of 1 to 50 carbon atoms, a hydrocarbon-substituted silyl group, or a substituent having at least one element selected from nitrogen, oxygen, phosphorus, sulfur and silicon.

A is an atom of Group 13 to Group 16 of the periodic table, specifically boron, carbon, nitrogen, oxygen, silicon, phosphorus, sulfur, germanium, selenium, tin or the like, preferably carbon or silicon.

m is an integer of 0 or 2, and n is an integer of 1 to 5. When n is 2 or greater, plural A may be the same or different.

E is a substituent having at least one element selected from carbon, hydrogen, oxygen, halogen, nitrogen, sulfur, phosphorus, boron and silicon. When m is 2, two of E may be the same or different, or may be bonded to each other to form a ring.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. p is an integer of 0 to 4. When p is 2 or greater, plural groups X may be the same or different.

X is preferably a halogen atom, a hydrocarbon grope of 1 to 20 carbon atoms or a sulfonato group.

(3) Transition metal diphenoxy compound represented by the following formula:

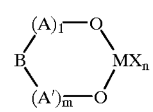

In the above formula, M is a transition metal atom of Group 3 to Group 11 of the periodic table.

l and m are each an integer of 0 or 1.

A and A' are each a hydrocarbon group of 1 to 50 carbon atoms, a halogenated hydrocarbon group of 1 to 50 carbon atoms, or a hydrocarbon group or a halogenated hydrocarbon group of 1 to 50 carbon atoms each having a substituent containing oxygen, sulfur or silicon; and A and A' may be the same or different.

B is a hydrocarbon group of 0 to 50 carbon atoms, a halogenated hydrocarbon group of 1 to 50 carbon atoms, a group represented by $R^1R^2Z$, oxygen or sulfur. $R^1$ and $R^2$ are each a hydrocarbon group of 1 to 20 carbon atoms or a hydrocarbon group of 1 to 20 carbon atoms containing at least one hetero atom, and Z is a carbon atom, a nitrogen atom, a sulfur atom, a phosphorus atom or a silicon atom.

n is a number satisfying a valence of M.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When n is 2 or greater, plural groups X may be the same or different or may be bonded to each other to form a ring.

(4) Transition metal compound represented by the following formula and comprising a ligand having cyclopentadienyl skeleton containing at least one hetero atom:

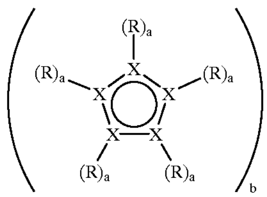

In the above formula, M is a transition metal atom of Group 3 to Group 11 of the periodic table.

X is an atom of Group 13, Group 14 or Group 15 of the periodic table, and at least one X is an element other than carbon.

Each R may be the same or different and is a hydrogen atom, a halogen atom, a hydrocarbon group, a halogenated hydrocarbon group, a hydrocarbon-substituted silyl group, or a hydrocarbon group substituted with a substituent containing at least one element selected from nitrogen, oxygen, phosphorus, sulfur and silicon. Two or more of R may be bonded to each other to form a ring.

a is 0 or 1, and b is an integer of 1 to 4. When b is 2 or greater, groups $[((R)_a)_5\text{-}X_5]$ may be the same or different, and Rs may be bridged to each other.

c is a number satisfying a valence of M.

Y is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When c is 2 or greater, plural groups Y may be the same or different, and may be bonded to each other to form a ring.

(5) Transition metal compound represented by the formula PB $(Pz)_3MXn$.

In the above formula, M is a transition metal atom of Group 3 to Group 11 of the periodic table; R is a hydrogen atom, a hydrocarbon group of 1 to 20 carbon atoms or a halogenated hydrocarbon group of 1 to 20 carbon atoms; and Pz is a pyrazolyl group or a substituted pyrazolyl group.

n is a number satisfying a valence of M.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When n is 2 or greater, plural groups may be the same or different or may be bonded to each other to form a ring.

(6) Transition metal compound represented by the following formula:

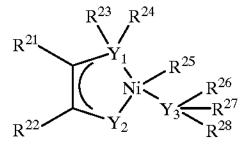

In the above formula, $Y^1$ and $Y^3$ may be the same or different and are each an element of Group 15 of the periodic table, and $Y^2$ is an element of Group 16 of the periodic table.

$R^{21}$ to $R^{28}$ may be the same or different, they are each a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group, and two or more of them may be bonded to each other to form a ring.

(7) Compound comprising a compound represented by the following formula and a transition metal atom of Group 8 to Group 10 of the periodic table:

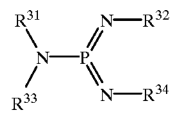

In the above formula, $R^{31}$ to $R^{34}$ maybe the same or different, they are each a hydrogen atom, a halogen atom, a hydrocarbon group of 1 to 20 carbon atoms or a halogenated hydrocarbon group of 1 to 20 carbon atoms, and two or more of them may be bonded to each other to form a ring.

(8) Transition metal compound represented by the following formula:

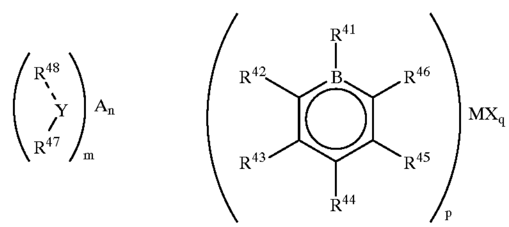

In the above formula, M is a transition metal atom of Group 3 to Group 11 of the periodic table.

m is an integer of 0 to 3, n is an integer of 0 or 1, p is an integer of 1 to 3, and q is a number satisfying a valence of M.

$R^{41}$ to $R^{48}$ may be the same or different, they are each a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group, and two or more of them may be bonded to each other to form a ring.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When q is 2 or greater, plural groups X may be the same or different or may be bonded to each other to form a ring.

Y is a group to bridge a boratabenzene ring and is carbon, silicon or germanium.

A is an element of Group 14, Group 15 or Group 16 of the periodic table.

(9) Transition metal compound other than the aforesaid compound (4) and containing a ligand having cyclopentadienyl skeleton.

(10) Compound containing magnesium, titanium and halogen as essential ingredients.

The olefin polymerization catalyst according to the invention comprises the transition metal compound (A-1) or (A-2), and optionally, it may further comprise at least one compound (B) selected from the group consisting of:

(B-1) an organometallic compound, (B-2) an organoaluminum oxy-compound, and (B-3) a compound which reacts with the transition metal compound (A-1) or (A-2) to form an ion pair.

Next, each compound as the component (B) is described.

(B-1) Organometallic Compound

Examples of the organometallic compounds (B-1) which are optionally used in the invention include organometallic compounds containing metals of Group 1, Group 2, Group 12 and Group 13 of the periodic table, such as those described below.

(B-1a) Organoaluminum compound represented by the following formula:

$$R^a_mAl(OR^b)_nH_pX_q$$

wherein $R^a$ and $R^b$ may be the same or different and are each a hydrocarbon group of 1 to 15 carbon atoms, preferably 1 to 4 carbon atoms; X is a halogen atom; and m, n, p and q are numbers satisfying the conditions of $0<m\leqq 3$, $0\leqq n<3$, $0\leqq p<3$, $0\leqq q<3$ and $m+n+p+q=3$.

(B-1b) Alkyl complex compound comprising a metal of Group 1 and aluminum and represented by the following formula:

$$M^2AlR^a_4$$

wherein $M^2$ is Li, Na or K; and $R^a$ is a hydrocarbon group of 1 to 15 carbon atoms, preferably 1 to 4 carbon atoms.

(B-1c) Dialkyl compound containing a metal of Group 2 or Group 12 and represented by the following formula:

$$R^aR^bM^3$$

wherein $R^a$ and $R^b$ may be the same or different and are each a hydrocarbon group of 1 to 15 carbon atoms, preferably 1 to 4 carbon atoms; and $M^3$ is Mg, Zn or Cd.

Examples of the organoaluminum compounds (B-1a) include:

an organoaluminum compound represented by the following formula:

$$R^a_mAl(OR^b)_{3-m}$$

wherein $R^a$ and $R^b$ may be the same or different and are each a hydrocarbon group of 1 to 15 carbon atoms, preferably 1 to 4 carbon atoms, and m is preferably a number satisfying the condition of $1.5\leqq m\leqq 3$;

an organoaluminum compound represented by the following formula:

$$R^a_mAlX_{3-m}$$

wherein $R^a$ is a hydrocarbon group of 1 to 15 carbon atoms, preferably 1 to 4 carbon atoms, X is a halogen atom, and m is preferably a number satisfying the condition of $0<m<3$;

an organoaluminum compound represented by the following formula:

$$R^a_mAlH_{3-m}$$

wherein $R^a$ is a hydrocarbon group of 1 to 15 carbon atoms, preferably 1 to 4 carbon atoms, and m is preferably a number satisfying the condition of $2\leqq m<3$; and an organoaluminum compound represented by the following formula:

$$R^a_mAl(OR^b)_nX_q$$

wherein $R^a$ and $R^b$ may be the same or different and are each a hydrocarbon group of 1 to 15 carbon atoms, preferably 1 to 4 carbon atoms, X is a halogen atom, and m, n and q are numbers satisfying the conditions of $0<m\leqq 3$, $0\leqq n<3$, $0\leqq q<3$ and $m+n+q=3$.

Particular examples of the organoaluminum compounds (B-1a) include:

tri-n-alkylaluminums, such as trimethylaluminum, triethylaluminum, tri-n-butylaluminum, tripropylaluminum, tripentylaluminum, trihexylaluminum, trioctylaluminum and tridecylaluminum;

branched-chain trialkylaluminums, such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum;

tricycloalkylaluminums, such as tricyclohexylaluminum and tricyclooctylaluminum;

triarylaluminums, such as triphenylaluminum and tritolylaluminum;

dialkylaluminum hydrides, such as diisobutylaluminum hydride and diisobutylaluminum hydride;

trialkenylaluminums, e.g., those represented by the formula $(i\text{-}C_4H_9)_xAl_y(C_5H_{10})_z$ (wherein x, y and z are each a positive number, and $z\geqq x$), such as isoprenylaluminum;

alkylaluminum alkoxides, such as isobutylaluminum methoxide, isobutylaluminum ethoxide and isobutylaluminum isopropoxide;

dialkylaluminum alkoxides, such as dimethylaluminum methoxide, diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums, such as those having an average composition represented by $R^a_{2.5}Al(OR^b)_{0.5}$;

dialkylaluminum aryloxides, such as diethylaluminum phenoxide, diethylaluminum(2,6-di-t-butyl-4-methylphenoxide), ethylaluminumbis(2,6-di-t-butyl-4-methylphenoxide), diisobutylalumium(2,6-di-t-butyl-4-methylphenoxide) and isobutylaluminumbis(2,6-di-t-butyl-4-methylphenoxide);

dialkylaluminum halides, such as dimethylaluminum chloride, diethylaluminum chloride, dibutylaluminum chloride, diethylaluminum bromide and diisobutylaluminum chloride;

alkylaluminum sesquihalides, such as ethylaluminum sesquichloride, butylaluminum sesquichloride and ethylaluminum sesquibromide, partially halogenated alkylaluminums, such as ethylaluminum dichloride, propylaluminum dichloride and butylaluminum dibromide;

dialkylaluminum hydrides, such as diethylaluminum hydride and dibutylaluminum hydride;

partially hydrogenated alkylaluminums, e.g., alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Also employable are compounds analogous to the organoaluminum compound (B-1a). For example, there can be mentioned organoaluminum compounds wherein two or more aluminum compounds are combined through a nitrogen atom, such as $(C_2H_5)_2AlN(C_2H_5)Al(C_2H_5)_2$.

Examples of the compounds (B-1b) include $LiAl(C_2H_5)_4$ and $LiAl(C_7H_{15})_4$.

Other compounds, also employable as the organometallic compounds (B-1) include methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium.

Combinations of compounds capable of producing the above-mentioned organoaluminum compounds in the polymerization system, e.g., a combination of halogenated aluminum and alkyllithium and a combination of halogenated aluminum and alkylmagnesium, are also employable.

Of the organometallic compounds (B-1), the organoaluminum compounds are preferable.

The organometallic compounds (B-1) mentioned above are used singly or in combination of two or more kinds.

(B-2) Organoaluminum Oxy-compound

The organoaluminum oxy-compound (B-2) which is optionally used in the invention may be conventional aluminoxane or a benzene-insoluble organoaluminum oxy-compound such as exemplified in Japanese Patent Laid-Open Publication No. 78687/1990.

The conventional aluminoxane can be prepared by, for example, the following processes, and is generally obtained as a hydrocarbon solvent solution.

(1) An organoaluminum compound such as trialkylaluminum is added to a hydrocarbon medium suspension of a compound containing adsorption water or a salt containing water of crystallization, e.g., magnesium chloride hydrate copper sulfate hydrate, aluminum sulfate hydrate, nickel sulfate hydrate or cerous chloride hydrate, to allow the organoaluminum compound to react with the adsorption water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and the remainder is redissolved in a solvent or suspended in a poor solvent for aluminoxane.

Examples of the organoaluminum compounds used for preparing the aluminoxane include the same organoaluminum compounds as previously described with respect to the organoaluminum compound (B-1a). Of these, preferable are trialkylaluminums and tricycloalkylaluminums. Particularly preferable is trimethylaluminum.

The organoaluminum compounds are used singly or in combination of two or more kinds.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated products of these aromatic, aliphatic and alicyclic hydrocarbons (e.g., chlorinated or brominated products thereof). Also employable are ethers such as ethyl ether and tetrahydrofuran. Of the solvents, particularly preferable are aromatic hydrocarbons and aliphatic hydrocarbons.

The benzene-insoluble organoaluminum oxy-compound for use in the invention is preferably an organoaluminum oxy-compound containing an Al component which is soluble in benzene at 60° C., in an amount of usually not more than 10%, preferably not more than 5%, particularly preferably not more than 2%, in terms of Al atom. That is, the benzene-insoluble organoaluminum oxy-compound is preferably insoluble or sparingly soluble in benzene.

The organoaluminum oxy-compound for use in the invention is, for example, an organoaluminum oxy-compound containing boron and represented by the following formula (IV):

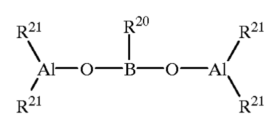

(IV)

wherein $R^{20}$ is a hydrocarbon group of 1 to 10 carbon atoms; and each $R^{21}$ may be the same or different and is a hydrogen atom, a halogen atom or a hydrocarbon group of 1 to 10 carbon atoms.

The organoaluminum compound containing boron and represented by the formula (IV) can be prepared by allowing an alkylboronic acid represented by the following formula (V):

$$R^{20}—B—(OH)_2 \quad (V)$$

wherein $R^{20}$ is the same group as described above, to react with an organoaluminum compound in an inert solvent at a temperature of −80° C. to room temperature for 1 minute to 24 hours under an inert gas atmosphere.

Examples of the alkylboronic acids represented by the formula (V) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluorophenylboronic acid, pentafluorophenylboronic acid and 3,5-bis(trifluoromethyl)phenylboronic acid. Of these, preferable are methylboronic acid, n-butylboronic acid, isobutylboronic acid, 3,5-difluorophenylboronic acid and pentafluorophenylboronic acid.

These alkylboronic acids are used singly or in combination of two or more kinds.

Examples of the organoaluminum compounds to be reacted with the alkylboronic acid include the same organoaluminum compounds as previously described with respect to the organoaluminum compound (B-1a). Of these, preferable are trialkylaluminums and tricycloalkylaluminums. Particularly preferable are trimethylaluminum, triethylaluminum and triisobutylaluminum. These organoaluminum compounds are used singly or in combination of two or more kinds.

The organoaluminum oxy-compounds (B-2) mentioned above are used singly or in combination of two or more kinds.

(B-3) Compound which Reacts with the Transition Metal Compound to Form Ion Pair

The compound (B-3) which reacts with a transition metal compound to form an ion pair (referred to as "ionizing ionic compound" hereinafter), that is optionally used in the invention, is a compound which reacts with the aforesaid transition metal compound (A-1) or (A-2) to form an ion pair, so that any compound which forms an ion pair by the contact with the transitionmetal compound (A-1) or (A-2) is employable as the compound (B-3).

Examples of such compounds includes Lewis acids, an ionic compounds, borane compounds and carborane compounds described in Japanese Patent Laid-Open Publications No. 501950/1989, No. 502036/1989, No. 179005/1991, No. 179006/1991, No. 207703/1991 and No. 207704/1991, and U.S. Pat. No. 5,321,106. A heteropoly compound and an isopoly compound may also be employed.

The Lewis acids are, for example, compounds represented by $BR_3$ (R is fluorine or a phenyl group which may have a substituent such as fluorine, methyl or trifluoromethyl). Examples of such compounds include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

The ionic compounds are, for example, compounds represented by the following formula (VI):

(VI)

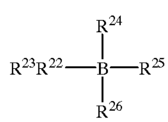

In the above formula, $R^{22}$ is $H^+$, carbonium cation, oxonium cation, ammonium cation, phosphonium cation, cycloheptyltrienyl cation, ferrocenium cation having a transition metal, or the like.

$R^{23}$ to $R^{26}$ may be the same or different and are each an organic group, preferably an aryl group or a substituted aryl group.

Examples of the carbonium cat ions include tri-substituted carbonium cations, such as triphenylcarbonium cation, tri(methylphenyl)carbonium cation and tri(dimethylphenyl)carbonium cation.

Examples of the ammonium cations include trialkylammonium cations, such as trimethylammonium cation, triethylammonium cation, tripropylammonium cation, tributylammonium cation and tri(n-butyl)ammonium cation; N,N-dialkylanilinium cations, such as N,N-dimethylanilinium cation, N,N-diethylanilinium cation and N,N-2,4,6-pentamethylanilinium cation; and dialkylammonium cations, such as di(isopropyl)ammonium cation and dicyclohexylammonium cation.

Examples of the phosphonium cations include triarylphosphonium cations, such as triphenylphosphonium cation, tri(methylphenyl)phosphonium cation and tri(dimethylphenyl)phosphonium cation.

$R^{22}$ is preferably carbonium cation or ammonium cation, particularly preferably triphenylcarbonium cation, N,N-dimethylanilinium cation or N,N-diethylanilinium cation.

Also employable as the ionic compound is a trialkyl-substituted ammonium salt, a N,N-dialkylanilinium salt, a dialkylammonium salt or a triarylphosphonium salt.

Examples of the trialkyl-substituted ammonium salts include triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tri(n-butyl)ammoniumtetra(pentafluorophenyl)boron, tripropylammoniumtetra(o,p-dimethylphenyl)boron, tri(n-butyl)ammoniumtetra(m,m-dimethylphenyl)boron, tri(n-butyl)ammoniumtetra(p-trifluoromethylphenyl)boron, tri(n-butyl)ammoniumtetra(3,5-ditrifluoromethylphenyl)boron and tri(n-butyl)ammoniumtetra(o-tolyl)boron.

Examples of the N,N-dialkylanilinium salts include N,N-dimethylaniliniumtetra(phenyl)boron, N,N-diethylaniliniumtetra(phenyl)boron and N,N-2,4,6-pentamethylaniliniumtetra(phenyl)boron.

Examples of the dialkylammonium salts include di(1-propyl)ammoniumtetra(pentafluorophenyl)boron and dicyclohexylammoniumtetra(phenyl)boron.

Further employable as the ionic compounds are triphenylcarbeniumtetrakis(pentafluorophenyl)borate, N,N-dimethylaniliniumtetrakis(pentafluorophenyl)borate, ferroceniumtetra(pentafluorophenyl)borate, triphenylcarbeniumpentaphenylcyclopentadienyl complex, N,N-diethylaniliniumpentaphenylcyclopentadienyl complex and a boron compound represented by the formula (VII):

(VII)

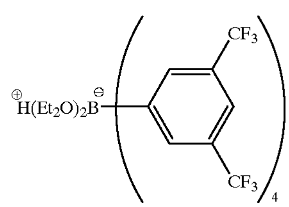

wherein Et is an ethyl group, or the formula (VIII):

(VIII)

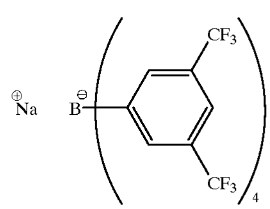

Examples of the borane compounds include:

decaborane(14);

salts of anions, such as bis[tri(n-butyl)ammonium]nonaborate, bis[tri(n-butyl)ammonium]decaborate, bis

[tri(n-butyl)ammonium]undecaborate, bis[tri(n-butyl) ammonium]dodecaborate, bis[tri(n-butyl)ammonium] decachlorodecaborate and bis[tri(n-butyl)ammonium] dodecachlorododecaborate; and salts of metallic borane anions, such as tri(n-butyl) ammoniumbis(dodecahydridododecaborate)cobalt ate (III) and bis[tri(n-butyl)ammonium]bis-(dodecahydridododecaborate)nickelate (III).

Examples of the carborane compounds include:

salts of anions, such as 4-carbanonaborane(14), 1,3-dicarbanonaborane(13), 6,9-dicarbadecaborane(14), dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane(13), 2,7-dicarbaundecaborane(13), undecahydrido-7,8-dimethyl-7,8-dicarbaundecaborane, dodecahydrido-11-methyl-2,7-dicarbaundecaborane, tri(n-butyl) ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, tri(n-butyl) ammoniumbromo-1-carbadodecaborate, tri(n-butyl) ammonium-6-carbadecaborate(14), tri(n-butyl) ammonium-6-carbadecaborate(12), tri(n-butyl) ammonium-7-carbaundecaborate(13), tri(n-butyl) ammonium-7,8-dicarbaundecaborate(12), tri(n-butyl) ammonium-2,9-dicarbaundecaborate(12), tri(n-butyl) ammoniumdodecahydrido-8-methyl-7,9-dicarbaundecaborate, tri(n-butyl) ammoniumundecahydrido-8-ethyl-7,9-dicarbaundecaborate, tri(n-butyl) ammoniumundecahydrido-8-butyl-7,9-dicarbaundecaborate, tri(n-butyl) ammoniumundecahydrido-8-allyl-7,9-dicarbaundecaborate, tri(n-butyl) ammoniumundecahydrido-9-trimethylsilyl-7,8-dicarbaundecaborate and tri(n-butyl) ammoniumundecahydrido-4,6-dibromo-7-carbaundecaborate; and salts of metallic carborane anions, such as tri(n-butyl) ammoniumbis(nonahydrido-1,3-dicarbanonaborate) cobaltate(III), tri(n-butyl)ammoniumbis (undecahydrido-7,8 -dicarbaundecaborate) ferrate(III), tri(n-butyl)ammoniumbis(undecahydrido-7,8-dicarbaundecaborate)cobaltate(III), tri(n-butyl) ammoniumbis(undecahydrido-7,8-dicarbaundecaborate)nickelate(III), tri(n-butyl) ammoniumbis(undecahydrido-7,8-dicarbaundecaborate)cuprate(III), tri(n-butyl) ammoniumbis(undecahydrido-7,8-dicarbaundecaborate)aurate(III), tri(n-butyl) ammoniumbis(nonahydrido-7,8-dimethyl-7,8-dicarbaundecaborate)ferrate(III), tri(n-butyl) ammoniumbis(nonahydrido-7,8-dimethyl-7,8-dicarbaundecaborate)chromate(III), tri(n-butyl) ammoniumbis(tribromooctahydrido-7,8-dicarbaundecaborate)cobaltate(III), tris[tri(n-butyl) ammonium]bis(undecahydrido-7-carbaundecaborate) chromate(III), bis[tri(n-butyl)ammonium]bis (undecahydrido-7-carbaundecaborate)manganate(IV), bis[tri(n-butyl)ammonium]bis(undecahydrido-7-carbaundecaborate)cobaltate(III) and bis[tri(n-butyl) ammonium]bis(undecahydrido-7-carbaundecaborate) nickelate(IV).

The heteropoly compound comprises an atom of silicon, phosphorus, titanium, germanium, arsenic or tin and one or more atoms selected from vanadium, niobium, molybdenum and tungsten. Examples of such compounds include phosphovanadic acid, germanovanadic acid, arsenovanadic acid, phosphoniobic acid, germanoniobic acid, silicomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotaungstovanadic acid, phosphomolybdotungstovanadic acid, germanomolybdotungstovanadic acid, phosphomolybdotungstic acid, phosphomolybdoniobic acid, metallic salts of these acids, specifically, salts of these acids, for example with metals of Group 1 or 2 of the periodic table such as lithium, sodium, potassium, rubidium, cesium, beryllium, magnesium, calcium, strontium and barium, organic salts of the above acids such as triphenylethyl salt, and isopoly compounds, but not limited thereto.

These heteropoly compounds and isopoly compounds may be used singly or in combination of two or more kinds.

The ionizing ionic compounds (B-3) mentioned above may be used singly or in combination of two or more kinds.

When the transition metal compound (A-1) or (A-2) is used as a catalyst, an olefin polymer having a high molecular weight can be obtained with a high polymerization activity. If the organoaluminum oxy-compound (B-2) such as methylaluminoxane is used as a cocatalyst component in combination, the catalyst exhibits an extremely high polymerization activity for the olefins. If the ionizing ionic compound (B-3) such as triphenylcarboniumtetrakis (pentafluorophenyl)borate is used as a cocatalyst component, an olefin polymer having an extremely high molecular weight can be obtained with an excellent activity.

In the olefin polymerization catalyst of the invention, the below-described carrier (C) can optionally be used, in addition to the above-mentioned transition metal compound (A-1) or (A-2) and at least one compound (B) selected from the organometallic compound (B-1), the organoaluminum oxy-compound (B-2) and the ionizing ionic compound (B-3).

(C) Carrier

The carrier (C) optionally used in the invention is an inorganic or organic compound in the form of granular or particulate solid. As the inorganic compounds, porous oxides, inorganic chlorides, clay, clay minerals or ion-exchange layered compounds are preferable.

Examples of the porous oxides include $SiO_2$, $Al_2O_3$, MgO, ZrO, $TiO_2$, $B_2O_3$, CaO, ZnO, BaO, $ThO_2$, and complex compounds or mixtures containing these oxides, such as natural or synthetic zeolite, $SiO_2$—MgO, $SiO_2$—$Al_2O_3$, $SiO_2$—$TiO_2$, $SiO_2$—, $V_2O_5$, $SiO_2$— $Cr_2O_3$ and $SiO_2$—$TiO_2$—MgO. Of these, preferable are compounds containing $SiO_2$ and/or $Al_2O_3$ as the main component.

The inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $Mg(NO_3)_2$, $Al(NO_3)_3$, $Na_2O$, $K_2O$ and $Li_2O$.

Although the porous oxides differ in their properties depending upon the type and the preparation process thereof, the carrier preferably used in the invention has a particle diameter of 10 to 300 μm, preferably 20 to 200 μm, a specific surface area of 50 to 1,000 $m^2/g$, preferably 100 to 700 $m^2/g$, and a pore volume of 0.3 to 3.0 $cm^3/g$. If necessary, the carrier may be calcined at 100 to 1,000° C., preferably 150 to 700° C., prior to use.

Examples of the inorganic chlorides employable in the invention include $MgCl_2$, $MgBr_2$, $MnCl_2$ and $MnBr_2$. The inorganic chloride may be used as it is, or may be used after pulverized by, for example, a ball mill or an oscillating mill. The inorganic chloride may also be used as fine particles of a obtained by dissolving the inorganic chloride in a solvent such as alcohol and then precipitating using a precipitant.

The clay employable as a carrier in the invention is generally composed mainly of clay minerals. The ion-exchange layered-compounds employable as a carrier in the invention is compounds having a crystal structure wherein planes formed by ionic bonding or the like are laminated in parallel to one another with a weak bond strength, and the ions contained therein are exchangeable. Most of clay minerals are ion-exchange layered compounds. The clay, the clay minerals and the ion-exchange layered compounds employable in the invention are not limited to natural ones but include synthetic ones.

Examples of such clay, clay minerals and ion-exchange layered compounds include clay, clay minerals and ion crystalline compounds having layered crystal structures such as hexagonal closest packing type, antimony type, $CdCl_2$ type and $CdI_2$ type.

Particular examples of the clay and the clay minerals include kaolin, bentonite, kibushi clay, gairome clay, allophane, hisingerite, pyrophyllite, mica, montmorillonite, vermiculite, chlorite, palygorskite, kaolinite, nacrite, dickite and halloysite. Particular examples of the ion-exchange layered compounds include crystalline acid salts of polyvalent metals, such as $\alpha$-$Zr(HAsO_4)_2.H_2O$, $\alpha$-$Zr(HPO_4)_2$, $\alpha$-$Zr(KPO_4)_2.3H_2O$, $\alpha$-$Ti(HPO_4)_2$, $\alpha$-$Ti(HAsO_4)_2.H_2O$, $\alpha$-$Sn(HPO_4)_2.H_2O$, $\gamma$-$Zr(HPO_4)_2$, $\gamma$-$Ti(HPO_4)_2$ and $\gamma$-$Ti(NH_4PO_4)_2.H_2O$, The clay, the clay minerals and the ion-exchange layered compounds are preferably those having a pore volume, as measured on pores having a radius of not less than 20 Å by a mercury penetration method, of not less than 0.1 cc/g, and are particularly preferably those having a pore volume of 0.3 to 5 cc/g. The pore volume is measured on the pores having a radius of 20 to $3\times10^4$ Å by a mercury penetration method using a mercury porosimeter.

If a compound having a pore volume, as measured on pores having a radius of not less than 20 Å, of less than 0.1 cc/g is used as the carrier, high polymerization activity tends to be hardly obtained.

It is also preferable that the clay and the clay minerals to be used in the invention are subjected to chemical treatments. Any of surface treatments, for example, to remove impurities attached to the surface and to influence on the crystal structure of the clay, are employable. Examples of such chemical treatments include acid treatment, alkali treatment, salt treatment and organic substance treatment. The acid treatment can contribute to not only removing impurities from the surface but also eluting cations such as Al, Fe and Mg present in the crystal structure to increase the surface area. The alkali treatment can destroy crystal structure of clay to bring about change in the structure of the clay. The salt treatment and the organic substance treatment can produce, for example, ionic composites, molecular composites, or organic derivative to change the surface area or the distance between layers.

The ion-exchange layered compound for use in the invention may be a layered compound in which the exchangeable ions between layers have been exchanged with other large and bulky ions utilizing ion exchange properties to enlarge the distance between the layers. The bulky ion plays a pillar-like roll to support the layer structure and is generally called a "pillar". Introduction of other substances between layers of a layered compound is called "intercalation". Examples of the guest compounds to be intercalated include cationic inorganic compounds, such as $TiCl_4$ and $ZrCl_4$; metallic alkoxides, such as $Ti(OR)_4$, $Zr(OR)_4$, $PO(OR)_3$ and $B(OR)_3$ (R is a hydrocarbon group or the like); and metallic hydroxide ions, such as $[Al_{13}O_4(OH)_{24}]^{7+}$, $[Zr_4(OH)_{14}]^{2+}$ and $[Fe_3O(OCOCH_3)_6]^+$.

The compounds mentioned above may be used singly or in combination of two or more kinds.

The intercalation of the compounds may be carried out in the presence of polymers obtained by hydrolysis of metallic alkoxides such as $Si(OR)_4$, $Al(OR)_3$ and $Ge(OR)_4$ (R is a hydrocarbon group or the like) or in the presence of colloidal inorganic compounds such as $SiO_2$. Examples of the pillars include oxides produced by intercalation of the above-mentioned metallic hydroxide ions between layers, followed by dehydration under heating.

The clay, clay minerals and ion-exchange layered compounds mentioned above may be used as they are, or may be used after they are subjected to a treatment of ball milling, sieving or the like. Moreover, they may be used after they are subjected to water adsorption or dehydration under heating. The clay, clay minerals and ion-exchange layered compounds may be used singly or in combination of two or more kinds.

Of the above-mentioned materials, preferable are clay and clay minerals, and particularly preferable are montmorillonite, vermiculite, hectorite, tenorite and synthetic mica.

The organic compound is, for example, a granular or particulate solid compound having a particle diameter of 10 to 300 μm. Examples of such compounds include (co) polymers produced using an □-olefin of 2 to 14 carbon atoms such as ethylene, propylene, 1-butene or 4-methyl-1-pentene as a main ingredient, (co)polymers produced using vinylcyclohexane-or styrene as a main ingredient, and modified products thereof.

The olefin polymerization catalyst of the invention may further comprise the below-described specific organic compound (D), if necessary, in addition to the transition metal compound (A-1) or (A-2), at least one compound (B) selected from the organometallic compound (B-1), the organoaluminum oxy-compound (B-2) and the ionizing ionic compound (B-3), and the optionally used carrier (C).

(D) Organic Compound Component

In the present invention, the organic compound component (D) is optionally used to improve polymerizability and properties of the resulting polymer. Examples of the organic compounds include alcohols, phenolic compounds, carboxylic acids, phosphorus compounds and sulfonates, but not limited thereto.

As the alcohols and the phenolic compounds, those represented by $R^{31}$—OH ($R^{31}$ is a hydrocarbon group of 1 to 50 carbon atoms or a halogenated hydrocarbon group of 1 to 50 carbon atoms) are generally employed. Preferable alcohols are those wherein $R^{31}$ is a halogenated hydrocarbon group. Preferable phenolic compounds are preferably those wherein the $\alpha,\alpha'$-positions to the hydroxyl group are substituted with hydrocarbon groups of 1 to 20 carbon atoms.

As the carboxylic acids, those represented by $R^{32}$—COOH ($R^{32}$ is a hydrocarbon group of 1 to 50 carbon atoms or a halogenated hydrocarbon group of 1 to 50 carbon atoms, preferably a halogenated hydrocarbon group of 1 to 50 carbon atoms) are generally employed.

As the phosphorus compounds, phosphoric acids having P—O—H bond, phosphates having P—OR bond or P═O bond and phosphine oxide compounds are preferably employed.

The sulfonates used in the invention are those represented by the following formula (IX):

(IX)

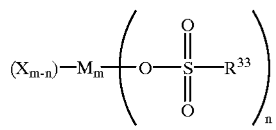

In the above formula, M is an element of Group 1 to Group 14 of the periodic table.

$R^{33}$ is hydrogen, a hydrocarbon group of 1 to 20 carbon atoms or a halogenated hydrocarbon group of 1 to 20 carbon atoms.

X is a hydrogen atom, a halogen atom, a hydrocarbon group of 1 to 20 carbon atoms or a halogenated hydrocarbon group of 1 to 20 carbon atoms.

m is an integer of 1 to 7, and $1 \leqq n \leqq 7$.

Figure 2:
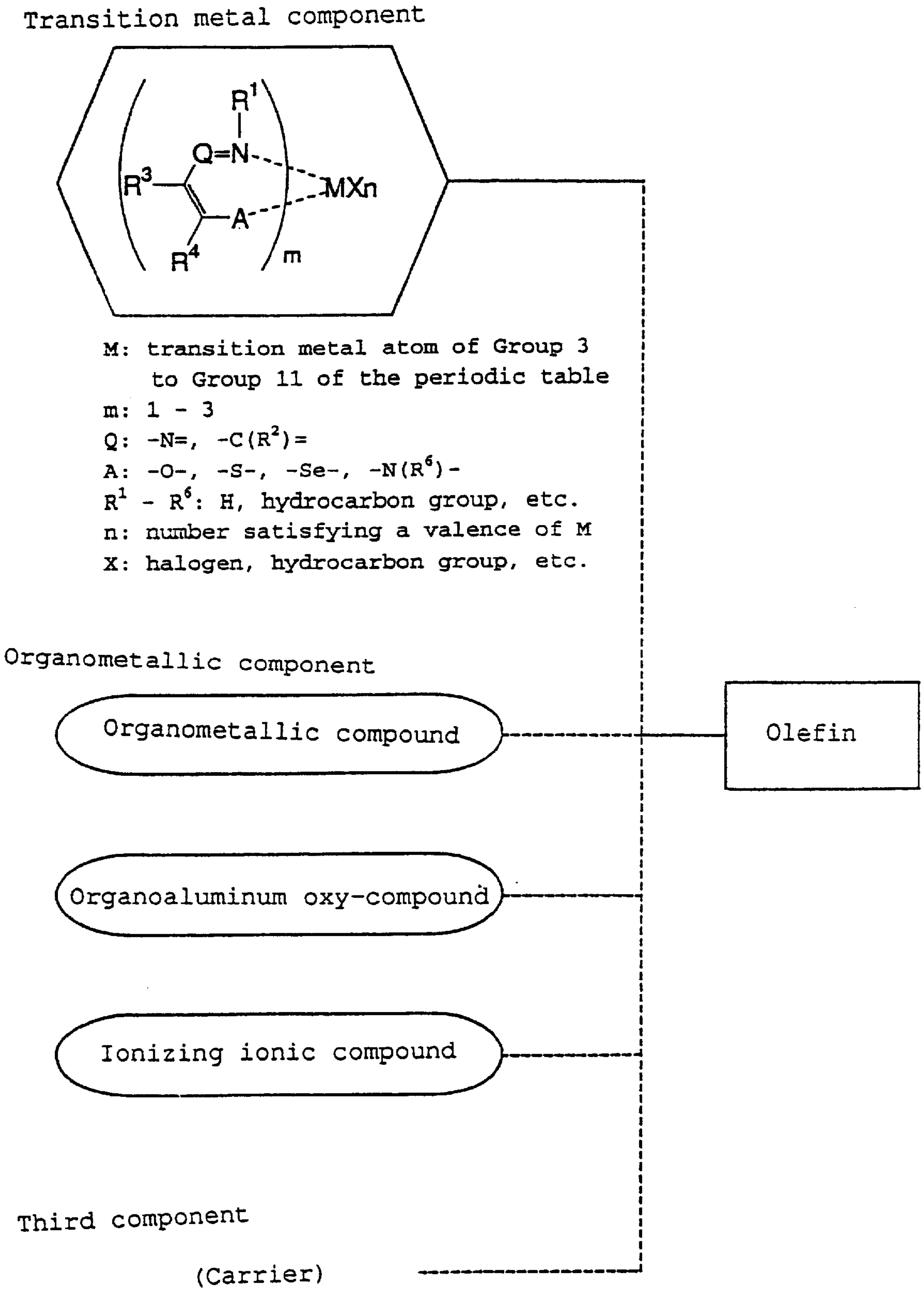

In each of FIG. 1 and FIG. 2, a process for preparing the olefin polymerization catalyst of the invention is shown.

Next, the process for olefin polymerization is described.

The process for olefin polymerization according to the invention comprises (co)polymerizing an olefin in the presence of the catalyst described above.

In the polymerization, any method of using and feeding and any order of feeding of the components can be selected, and, some examples are given below.

(1) The transition metal compound (A-1) or (A-2) (simply referred to as "component (A)" hereinafter) is fed to the polymerization reactor.

(2) The component (A) and at least one compound (B) selected from the organometallic compound (B-1), the organoaluminum oxy-compound (B-2) and the ionizing ionic compound (B-3) (simply referred to as "component (B)" hereinafter) are fed to the polymerization reactor in an arbitrary order.

(3) A catalyst obtained by previously contacting the component (A) with the component (B) is fed to the polymerization reactor.

(4) A catalyst component obtained by previously contacting the component (A) with the component (B), and the component (B) are fed to the polymerization reactor in an arbitrary order. In this case, the components (B) may be the same or different.

(5) A catalyst component wherein the component (A) is supported on the carrier (C), and the component (B) are fed to the polymerization reactor in an arbitrary. order.

(6) A catalyst wherein the component (A) and the component (B) are supported on the carrier (C) is fed to the polymerization reactor.

(7) A catalyst component wherein the component (A) and the component (B) are supported on the carrier (C), and the component (B) are fed to the polymerization reactor in an arbitrary order. In this case, the components (B) may be the same or different.

(8) A catalyst component wherein the component (B) is supported on the carrier (C), and the component (A) are fed to the polymerization reactor in an arbitrary order.

(9) A catalyst component wherein the component (B) is supported on the carrier (C), the component (A) and the component (B) are fed to the polymerization reactor in an arbitrary order. In this case, the components (B) may be the same or different.

(10) A component wherein the component (A) is supported on the carrier (C), and a component wherein the component (B) is supported on the carrier (C) are fed to the polymerization reactor in an arbitrary order.

(11) A component wherein the component (A) is supported on the carrier (C), a component wherein the component (B) is supported on the carrier (C), and the component (B) are fed to the polymerization reactor in an arbitrary order. In this case, the components (B) may be the same or different.

(12) The component (A), the component (B) and the organic compound component (D) are fed to the polymerization reactor in an arbitrary order.

(13) A component obtained by previously contacting the component (B) with the component (D), and the component (A) are fed to the polymerization reactor in an arbitrary order.

(14) A component wherein the component (B) and the component (D) are supported on the carrier (C), and the component (A) are fed to the polymerization reactor in an arbitrary order.

(15) A catalyst component obtained by previously contacting the component (A) with the component (B), and the component (D) are fed to the polymerization reactor in an arbitrary order.

(16) A catalyst component obtained by previously contacting the component (A) with the component (B), the component (B) and the component (D) are fed to the polymerization reactor in an arbitrary order.

(17) A catalyst component obtained by previously contacting the component (A) with the component (B), and a component obtained by previously contacting the component (B) with the component (D) are fed to the polymerization reactor in an arbitrary order.

(18) A component wherein the component (A) is supported on the carrier (C), the component (B) and the component (D) are fed to the polymerization reactor in an arbitrary order.

(19) A component wherein the component (A) is supported on the carrier (C), and a component obtained by previously contacting the component (B) with the component (D) are fed to the polymerization reactor in an arbitrary order.

(20) A catalyst component obtained by previously contacting the component (A), the component (B) and the component (D) with one another is fed to the polymerization reactor.

(21) A catalyst component obtained by previously contacting the component (A), the component (B) and the component (D) with one another, and the component (B) are fed to the polymerization reactor in an arbitrary order. In this case, the components (B) may be the same or different.

(22) A catalyst wherein the component (A), the component (B) and the component (D) are supported on the carrier (C) is fed to the polymerization reactor.

(23) A catalyst component wherein the component (A), the component (B) and the component (D) are supported on the carrier (C), and the component (B) are fed to the polymerization reactor in an arbitrary order. In this case, the components (B) may be the same or different.

An olefin may be prepolymerized onto a solid catalyst component wherein the component (A) and the component (B) are supported on the carrier (C).

In the process for olefin polymerization according to the invention, an olefin is polymerized or copolymerized in the presence of the olefin polymerization catalyst described above to obtain an olefin polymer.

In the present invention, the polymerization can be carried out as any of liquid phase polymerization, such as solution polymerization or suspension polymerization, and gas phase polymerization.

Examples of inert hydrocarbon media for use in the liquid phase polymerization include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons. The olefin itself can be used as the solvent.

In the polymerization of an olefin using the olefin polymerization catalyst, the component (A) may be used in an amount of usually $10^{-12}$ to $10^{-2}$ mol, preferably $10^{-10}$ to $10^{-3}$ mol, based on 1 liter of the reaction volume. In the present invention, even if the component (A) is used in a relatively low concentration, an olefin can be polymerized with a high polymerization activity.

The component (B-1) may used in such an amount that the molar ratio of the component (B-1) to the transition metal atom (M) in the component (A) ((B-1)/(M)) becomes usually 0.01 to 100,000, preferably 0.05 to 50,000.

The component (B-2) may be used in such an amount that the molar ratio of the aluminum atom in the component (B-2) to the transition metal atom (M) in the component (A) ((B- 2)/(M)) becomes usually 10 to 500,000, preferably 20 to 100,000.

The component (B-3) may be used in such an amount that the molar ratio of the component (B-3) to the transition metal atom (M) in the component (A) ((B-3)/(M)) becomes usually 1 to 10, preferably 1 to 5.

The component (D) may be used relative to the component (B) in such an amount that for the component (B-1) the molar ratio of (D)/(B-1) becomes usually 0.01 to 10, preferably 0.1 to 5; for the component (B-2) the molar ratio of the component (D) to the aluminum atom in the component (B-2) ((D)/(B-2)) becomes usually 0.00l to 2, preferably 0.005 to 1; and for the component (B-3) the molar ratio of (D) (B-3) becomes usually 0.01 to 10, preferably 0.1 to 5.

In the olefin polymerization using the olefin polymerization catalyst, the polymerization temperature may be in the range of usually −50 to 200° C., preferably 0 to 170° C. The polymerization pressure may be in the range of usually atmospheric pressure to 100 kg/cm$^2$, preferably atmospheric pressure to 50 kg/cm$^2$. The polymerization reaction can be carried out by any of batchwise, semi-continuous and continuous processes. The polymerization can also be conducted in two or more stages under different reaction conditions.

The molecular weight of the resulting polymer can be regulated by allowing hydrogen to be present in the polymerization system or by changing the polymerization temperature. The molecular weight can also be regulated also by changing the type of the component (B).

Examples of the olefins which can be polymerized by the use of the olefin polymerization catalyst include:

- α-olefins of 2 to 20 carbon atoms, such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene;
- cycloolefins of 3 to 20 carbon atoms, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene;
- polar monomers, e.g., unsaturated carboxylic acids including α,β-unsaturated carboxylic acids, such as acrylic acid, methacrylic acid, fumaric acid, maleic anhydride, itaconic acid, itaconic anhydride and bicyclo[2,2,1]-5-heptene-2, 3-dicarboxylic acid; metallic salts of these acids, such as sodium salts, potassium salts, lithium salts, zinc salts, magnesium salts and calcium salts; unsaturated carboxylic esters including α,β-unsaturated carboxylic esters, such as methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate; vinyl esters, such as vinyl acetate, vinyl propionate, vinyl caproate, vinyl caprate, vinyl laurate, vinyl stearate and vinyl trifluoroacetate; and unsaturated glycidyl esters, such as glycidyl acrylate, glycidyl methacrylate and monoglycidyl itaconate.

Vinylcyclohexane, dienes and polyenes are also employable.

The dienes and the polyenes are cyclic or chain compounds having 4 to 30 carbon atoms, preferably 4 to 20 carbon atoms, and having two or more double bonds. Examples of such compounds include butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene and dicyclopentadiene;

- 7-methyl-1,6-octadiene, 4-ethylidene-8-methyl-1,7-nonadiene and 5,9-dimethyl-1,4,8-decatriene;
- aromatic vinyl compounds including mono- or polyalkylstyrenes, such as styrene, o-methylstyrene, m-methylstyrene, p-methylstyrene, o,p-dimethylstyrene, o-ethylstyrene, m-ethylstyrene and p-ethylstyrene;
- functional group-containing styrene derivatives, such as methoxystyrene, ethoxystyrene, vinylbenzoic acid, methyl vinylbenzoate, vinylbenzyl acetate, hydroxystyrene, o-chlorostyrene, p-chlorostyrene and divnylbenzene; and further,
- 3-phenylpropylene, 4-phenylpropylene and α-methylstyrene.

The olefin polymerization catalyst of the invention exhibits a high polymerization activity, and by the use of the catalyst, a polymer having a narrow molecular weight distribution can be obtained. When two or more kinds of olefins are copolymerized, an olefin copolymer having a narrow composition distribution can be obtained.

The olefin polymerization catalyst of the invention can also be used for copolymerization of an α-olefin and a polar monomer. Examples of the α-olefins employable herein include the same straight-chain or branched α-olefins of 2 to 30 carbon atoms, preferably 2 to 20 carbon atoms, as previously described. Examples of the polar monomers employable herein include the same monomers as previously described.

The olefin polymerization catalyst of the invention can also be used for copolymerization of an α-olefin and a conjugated diene.

Examples of the α-olefins employable herein include the same straight-chain or branched α-olefins of 2 to 30 carbon atoms, preferably 2 to 20 carbon atoms, as previously described. Of these, preferable are ethylene, propylene, 1-butene, 1-pentene, 1-hexene, 4-methyl-1-pentene and 1-octene. Particularly preferable are ethylene and propylene. These α-olefins can be used singly or in combination or two or more kinds.

Examples of the conjugated dienes include aliphatic conjugated dienes of 4 to 30 carbon atoms, preferably 4 to 20 carbon atoms, such as 1,3-butadiene, isoprene, chloroprene, 1,3-cyclohexadiene, 1,3-pentadiene, 4-methyl-1,3-pentadiene, 1,3-hexadiene and 1,3-octadiene. These conjugated dienes can be used singly or in combination of two or more kinds.

According to the invention, a non-conjugated diene or polyene can also be used in the copolymerization of the α-olefin and the conjugated diene. Examples of the non-conjugated dienes and polyenes include 1,4-pentadiene, 1,5-hexadiene, 1,4-hexadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene and 5,9-dimethyl-1,4,8-decatriene.

EXAMPLE

The present invention is further described with reference to the following examples, but it should be construed that the invention is in no way limited to those examples.

The structures of the compounds obtained in the synthesis examples were determined by 270 MHz $^1$H-NMR (Japan Electron Optics Laboratory GSH-270 Model), FT-IR (SHIMADZU FT-IR-8200D Model), FD-mass spectrometry (Japan Electron Optics Laboratory SX-102A Model), metal content analysis (analysis by ICP method after dry ashing and dissolution in dilute nitric acid, device: SHIMADZU ICPS-8000 Model), and elemental analysis for carbon, hydrogen and nitrogen (Helaus CHNO Model). The intrinsic viscosity (η) was measured in decalin at 135° C.

Synthesis Example 1

Synthesis of Compound Represented by the Formula (L1)

In a 100-ml reactor, 1.0 g (10.7 mmol) of aniline, 3.3 g (32.2 mmol) of concentrated hydrochloric acid and 5.4 ml of water were vigorously stirred to give a solution, and the solution was cooled to 0° C. with ice. To the solution, a solution obtained by dissolving 0.75 g (10.7 mmol) of sodium nitrite (purity: 98.5%) in 2.6 ml of water was slowly added with stirring so as to maintain the temperature at not higher than 5° C. After the dropwise addition was completed, the resulting mixture was stirred at 0° C. for 1 hour to prepare a benzenediazonium chloride aqueous solution. In a different 100-ml reactor, 2.22 g (10.7 mmol) of 2,4-di-t-butylphenol was dissolved in 3 ml of tetrahydrofuran. To the solution, an aqueous solution obtained by dissolving 2.22 g (53 mmol) of sodium hydroxide in 22 ml of water was added, and the resulting mixture was cooled to 0° C. with ice. Then, the benzenediazonium chloride aqueous solution prepared above was dropwise added slowly with stirring, and the mixture was further stirred at 0° C. for 1.5 hours. After the temperature of the reaction solution was raised to room temperature, to the solution was added 30 ml of diethyl ether to separate the solution into two phases. Then, the oil phase was washed with dilute hydrochloric acid and dehydrated on sodium sulfate. The solvent was distilled off from the solution, and the remainder was purified by a silica gel column to obtain 2.56 g (yield: 77%) of a compound represented by the following formula (L1) as a deep red solid.

(L1)

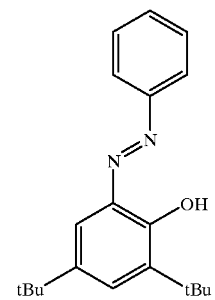

FD-mass spectrometry: ($M^+$) 310

$^1$H-NMR ($CDCl_3$): 1.38 (s, 9H), 1.47 (s, 9H), 7.40–7.95 (m, 7H), 13.71 (s, 1H)

Synthesis of Compound Represented by the Formula (a-1)

To a 100-ml reactor thoroughly dried and purged with argon, 1.07 g (3.45 mmol) of the compound represented by the formula (L1) and 21 ml of diethyl ether were introduced, and they were cooled to −78° C. and stirred. To the resulting mixture, 2.25 ml of n-butyllithium (1.60 mmol/ml-n-hexane solution, 3.45 mmol) was dropwise added over a period of 5 minutes, and they were slowly heated to room temperature and stirred at room temperature for 3 hours to prepare a lithium salt solution. The solution was dropwise added slowly to a mixture of 3.40 ml of a titanium tetrachloride solution (0.5 mmol/ml-heptane solution, 1.70 mmol) and 21 ml of diethyl ether, said mixture having been cooled to −78° C.

After the dropwise addition was completed, the reaction solution was slowly heated to room temperature with stirring. The reaction solution was further stirred for another 4 hours at room temperature, and then the solution was filtered through a glass filter to remove insolubles. The filtrate was concentrated under reduced pressure to precipitate a solid. The solid was dissolved in 2 ml of pentane and allowed to stand at −20° C. to precipitate crystals. The crystals were vacuum dried to obtain 0.80 g (1.01 mmol, yield: 59%) of a compound represented by the following formula (a-1) as red black crystals.

(a-1)

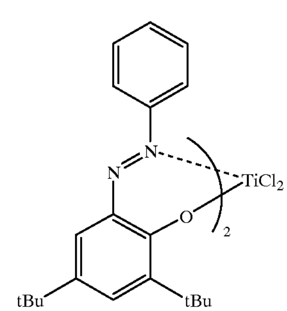

FD-mass spectrometry: ($M^+$) 736

$^1$H-NMR ($CDCl_3$): 1.31 (s, 18H), 1.49 (s, 18H), 7.00–7.95 (m, 14H)

Elemental analysis: Ti: 6.7% (calculated value: 6.5%)

Synthesis Example 2

Synthesis of Compound Represented by the Formula (b-1)

To a 100-ml reactor thoroughly dried and purged with argon, 1.07 g (3.45 mmol) of the compound represented by the formula (L1) and 21 ml of diethyl ether were introduced, and they were cooled to −78° C. and stirred. To the resulting mixture, 2.25 ml of n-butyllithium (1.61 mmol/ml-n-hexane solution, 3.45 mmol) was dropwise added over a period of 5 minutes, and they were slowly heated to room temperature and stirred at room temperature for 3 hours to prepare a lithium salt solution. The solution was dropwise added slowly to a mixture of 0.40 g (1.71 mmol) of zirconium tetrachloride and 21 ml of diethyl ether, said mixture having been cooled to −78° C.

After the dropwise addition was completed, the reaction solution was slowly heated to room temperature with stirring. The reaction solution was further stirred for another 8 hours at room temperature, and then the solution was filtered through a glass filter to remove insolubles. The filtrate was concentrated under reduced pressure to precipitate a solid. The solid was dissolved in 2 ml of pentane and allowed to stand at −20° C. to precipitate crystals. The crystals were vacuum dried to obtain 1.30 g (1.66 mmol, yield: 97%) of a compound represented by the following formula (b-1) as red black crystals.

(b-1)

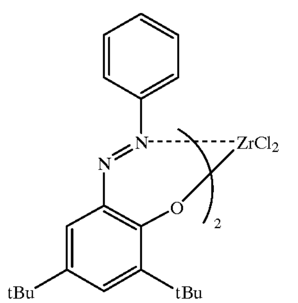

FD-mass spectrometry: ($M^+$) 780

$^1$H-NMR ($CDCl_3$): 1.37 (s, 18H), 1.47 (s, 18H), 6.75–7.95 (m, 14H)

Elemental analysis: Zr: 11.4% (calculated value: 11.7%)

Synthesis Example 3

Synthesis of Compound Represented by the Formula (L2)

Using 2.0 g (21.6 mmol) of aniline and 3.6 g (21.5 mmol) of 2-t-butyl-4-methylphenol as starting materials, in the same manner as in the synthesis of the compound represented by the formula (L1) in Synthesis Example 1, 4.98 g (18.6 mmol, yield: 86%) of a compound represented by the following formula (L2) as a vermilion solid, was synthesized.

(L2)

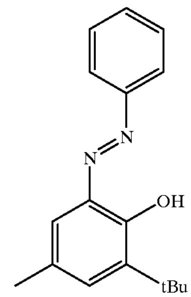

FD-mass spectrometry: ($M^+$) 268

$^1$H-NMR ($CDCl_3$) : 1.46 (s, 9H) , 2.37 (s, 3H) , 7.15–7.95 (m, 7H), 13.62 (s, 1H)

Synthesis of Compound Represented by the Formula (a-2)

Using 1.02 g (3.82 mmol) of the compound represented by the formula (L2), in the same manner as in the synthesis of the compound represented by the formula (a-1) in Synthesis Example 1, 0.34 g (0.52 mmol, yield: 27%) of a compound represented by the following formula (a-2) was synthesized as dark brown powder.

(a-2)

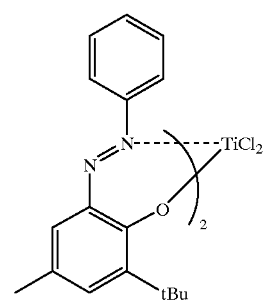

FD-mass spectrometry: ($M^+$) 653

$^1$H-NMR ($CDCl_3$): 1.46 (s, 18H), 2.30–2.40 (m, 6H), 7.00–7.90 (m, 14H)

Elemental analysis: Ti: 7.3% (calculated value: 7.3%)

Synthesis Example 4

Synthesis of Compound Represented by the Formula (b-2)

Using 1.02 g (3.8 mmol) of the compound represented by the formula (L2), in the same manner as in the synthesis of the compound represented by the formula (b-1) in Synthesis Example 2, 0.22 g (0.32 mmol, yield: 17%) of a compound represented by the following formula (b-2) was synthesized as red brown crystals.

(b-2)

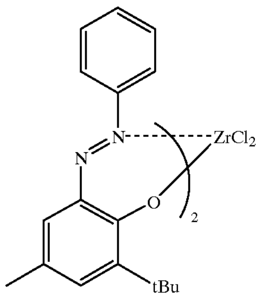

FD-mass spectrometry: ($M^+$) 696

$^1$H-NMR ($CDCl_3$): 1.47 (s, 18H), 2.38 (s, 6H), 6.95–7.90 (m, 14H)

Elemental analysis: Zr: 13.2% (calculated value: 13.1%)

Synthesis Example 5

Synthesis of Compound Represented by the Formula (L3)

Using 1.77 g (10.0 mmol) of 2,6-diisopropylaniline and 1.94 g (10.0 mmol) of 2,4-dimethylphenyltrimethylsilyl ether as starting materials, in the same manner as in the synthesis of the compound represented by the formula (L1) in Synthesis Example 1, 1.83 g (5.3 mmol, yield: 53%) of a compound represented by the following formula (L3) was synthesized as a deep red solid.

(L3)

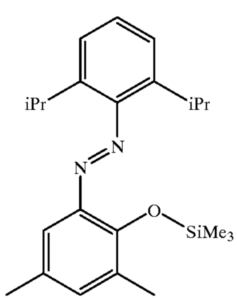

FD-mass spectrometry: ($M^+$) 346

$^1$H-NMR ($CDCl_3$): 0.03 (s, 9H), 1.15 (d, 12H), 2.36 (s, 3H), 2.50 (s, 3H), 2.79 (dq, 2H), 7.05–7.95 (m, 5H)

Synthesis of Compound Represented by the Formula (c-3)

To a 100-ml reactor thoroughly purged with argon, 0.47 g (3.6 mmol) of cobalt dichloride and 15 ml of THF were introduced, and a solution of 1.21 g (3.5 mmol) the compound represented by the formula (L3) in 10 ml of THF was added to precipitate a yellow substance. The mixture was stirred for 1 hour and filtered through a glass filter to separate the precipitate. The resulting solid was subjected to reprecipitation with a diethyl ether/methylene chloride solution, then washed with 50 ml of hexane and vacuum dried to obtain 1.13 g (yield: 68%) of a compound represented by the following formula (c-3) as brown powder.

(c-3)

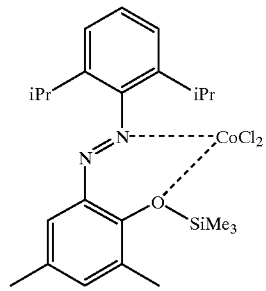

FD-mass spectrometry: ($M^+$) 476

Elemental analysis: Co: 12.5% (calculated value: 12.4%)

Example 1

To a 500-ml glass autoclave thoroughly purged with nitrogen, 250 ml of toluene was introduced, and the liquid phase and the gas phase were saturated with 100 l/hr of ethylene. Thereafter, 1.1875 mmol (in terms of aluminum atom) of methylaluminoxane was added, and then 0.005 mmol of the compound represented by the formula (a-1) obtained in Synthesis Example 1 was added to initiate polymerization. The reaction was conducted at 25° C. for 30 minutes in an ethylene gas atmosphere at atmospheric pressure. Then, a small amount of isobutanol was added to terminate the polymerization. After the polymerization was completed, the reaction mixture was introduced into a large amount of methanol to precipitate total amount of a polymer. Then, hydrochloric acid was added, and the mixture was filtered through a glass filter. The resulting polymer was vacuum dried at 80° C. for 10 hours to obtain 0.10 g of polyethylene.

The polymerization activity was 42 kg/mol-Ti.hr, and the intrinsic viscosity (η) of the polyethylene was 19.7 dl/g.

Example 2

To a 500-ml glass autoclave thoroughly purged with nitrogen, 250 ml of toluene was introduced, and the liquid phase and the gas phase were saturated with 100 l/hr of ethylene. Thereafter, 0.25 mmol of triisobutylaluminum was added, and then 0.005 mmol of the compound represented by the formula (a-1) and 0.006 mmol of triphenylcarbeniumtetrakis(pentafluorophenyl)borate were successively added to initiate polymerization. The reaction was conducted at 25° C. for 1 hour in an ethylene gas atmosphere at atmospheric pressure. Then, a small amount of isobutanol was added to terminate the polymerization. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.39 g of polyethylene.

The polymerization activity was 155 kg/mol-Ti.hr, and the intrinsic viscosity (η) of the polyethylene was 25.9 dl/g.

Example 3

Using the compound represented by the formula (b-1), polymerization reaction was conducted under the same conditions as in Example 1. As a result, 0.07 g of polyethylene was obtained. The polymerization activity was 29 kg/mol-Zr.hr, and the intrinsic viscosity (η) of the polyethylene was 9.5 dl/g.

Example 4

Using the compound represented by the formula (b-1), polymerization reaction was conducted under the same conditions as in Example 2. As a result, 0.32 g of polyethylene was obtained. The polymerization activity was 128 kg/mol-Zr.hr, and the intrinsic viscosity (η) of the polyethylene was 11.2 dl/g.

Example 5

Using the compound represented by the formula (a-2), polymerization reaction was conducted under the same conditions as in Example 1. As a result, 0.10 g of polyethylene was obtained. The polymerization activity was 40 kg/mol-Ti.hr, and the intrinsic viscosity (η) of the polyethylene was 16.9 dl/g.

Example 6

Using the compound represented by the formula (a-2), polymerization reaction was conducted under the same conditions as in Example 2. As a result, 0.70 g of polyethylene was obtained. The polymerization activity was 280 kg/mol-Ti.hr, and the intrinsic viscosity (η) of the polyethylene was 26.3 dl/g.

Example 7

Using the compound represented by the formula (b-2), polymerization reaction was conducted under the same conditions as in Example 1. As a result, 0.06 g of polyethylene was obtained. The polymerization activity was 24 kg/mol-Zr.hr, and the intrinsic viscosity (η) of the polyethylene was 9.7 dl/g.

Example 8

Using the compound represented by the formula (b-2), polymerization reaction was conducted under the same conditions as in Example 2. As a result, 0.50 g of polyethylene was obtained. The polymerization activity was 200 kg/mol-Zr.hr, and the intrinsic viscosity (η) of the polyethylene was 5.6 dl/g.

Example 9

To a 500-ml glass autoclave thoroughly purged with nitrogen, 250 ml of toluene was introduced, and the liquid phase and the gas phase were saturated with 100 l/hr of ethylene. Thereafter, 0.25 mmol of triisobutylaluminum was added, and then 0.005 mmol of the compound represented by the formula (c-3) was added to initiate polymerization. The reaction was conducted at 250° C. for 1 hour in an ethylene gas atmosphere at atmospheric pressure. Then, a small amount of isobutanol was added to terminate the polymerization. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.03 g of polyethylene. The polymerization activity was 12 kg/mol-Co.hr, and the intrinsic viscosity (η) of the polyethylene was 3.9 dl/g.

Synthesis Example 6

Synthesis of Compound Represented by the Formula (L4)

To a 100-ml reactor thoroughly purged with nitrogen, 10 ml of ethanol, 0. 61 g (6.52 mmol) of aniline and 0. 95 g (5.43 mmol) of 1-(2,4, 6-triisopropylphenyl)-1,3-butanedione were introduced, and 5 g of molecular sieves 3A and 1 ml of acetic acid were added. Then, the mixture was heated to 80° C. and stirred for 3 hours. The reaction solution was concentrated under reduced pressure, and the concentrate was purified by a silica gel column to obtain 0.60 g (1.53 mmol, yield: 47%) of a compound represented by the following formula (L4) as grayish white crystals.

(L4)

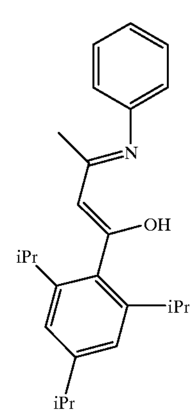

FD-mass spectrometry: ($M^+$) 391

$^1$H-NMR ($CDCl_3$): 1.2–1.4 (m, 18H), 1.59 (s, 1H), 2.09 (s, 3H), 2.90 (dt, 1H), 3.11 (dt, 2H), 5.38 (s, 1H), 7.00 (s, 2H), 7.1–7.5 (m, 5H)

Synthesis of Compound Represented by the Formula (a-4)

To a 100-ml reactor thoroughly dried and purged with argon, 0.31 g (0.85 mmol) of the compound represented by the formula (L4) and 10 ml of diethyl ether were introduced, and they were cooled to −78° C. and stirred. To the resulting mixture, 0.53 ml of n-butyllithium (1.61 mmol/ml-n-hexane solution, 0.85 mmol) was dropwise added over a period of 5 minutes, and they were slowly heated to room temperature and stirred at room temperature for 3 hours to prepare a lithium salt solution. The solution was dropwise added slowly to a mixture of 0.84 ml of a titanium tetrachloride solution (0.5 mmol/ml-heptane solution, 0.42 mmol) and 6 ml of tetrahydrofuran, said mixture having been cooled to −78° C. After the dropwise addition was completed, the reaction solution was slowly heated to room temperature with stirring. The reaction solution was further stirred for another 8 hours at room temperature, and the solvent was distilled off from the solution under reduced pressure. The remainder was dissolved in 10 ml of methylene chloride, and the solution was filtered through a glass filter to remove insolubles. The filtrate was concentrated under reduced pressure to precipitate a solid. The solid was recrystallized from hexane and vacuum dried to obtain 0.17 g (0.20 mmol, yield: 48%) of a compound represented by the following formula (a-4) as blackish brown powder.

(a-4)

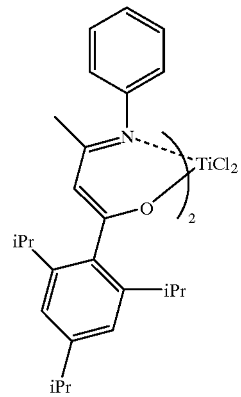

FD-mass spectrometry: $(M^+)$ 842

Elemental analysis: Ti: 6.0%

Synthesis Example 7

Synthesis of Compound Represented by the Formula (b-4)

To a 100-ml reactor thoroughly dried and purged with argon, 0.49 g (1.35 mmol) of the compound represented by the formula (L4), 12 ml of diethyl ether and 18 ml of tetrahydrofuran were introduced, and they were cooled to −78° C. and stirred. To the resulting mixture, 0.84 ml of n-butyllithium (1.61 mmol/ml-n-hexane solution, 1.35 mmol) was dropwise added over a period of 5 minutes, and they were slowly heated to room temperature and stirred at room temperature for 3 hours to prepare a lithium salt solution. The solution was dropwise added slowly to a mixture of 0.25 g (0.67.mmol) of a zirconium tetrachloride-THF complex and 10 ml of tetrahydrofuran, said mixture having been cooled to −78° C. After the dropwise addition was completed, the reaction solution was slowly heated to room temperature with stirring. The reaction solution was further stirred for another 8 hours at room temperature, and the solvent was distilled off from the solution under reduced pressure. The remainder was dissolved in 10 ml of methylene chloride, and the solution was filtered through a glass filter to remove insolubles. The filtrate was concentrated under reduced pressure to precipitate a solid. The solid was recrystallized from hexane and vacuum dried to obtain 0.36g (0.4 mmol, yield: 61%) of a compound represented by the following formula (b-4) as yellow powder.

(b-4)

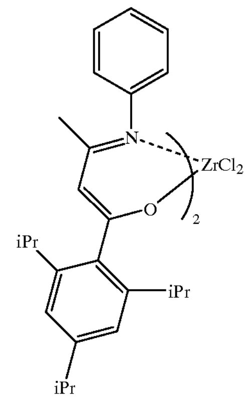

FD-mass spectrometry: $(M^+)$ 887

Elemental analysis: Zr: 10.5%

Synthesis Example 8

Synthesis of Compound Represented by the Formula (L5)

To a 100-ml reactor thoroughly purged with nitrogen, 10 ml of ethanol, 0.61 g (6.52 mmol) of aniline and 1.11 g (5.43 mmol) of 1-(2,4,6-trimethylphenyl)-1,3-butanedione were introduced, and 5 g of molecular sieves 3A and 1 ml of acetic acid were added. Then, the mixture was heated to 80° C. and stirred for 3 hours. The reaction solution was concentrated under reduced pressure, and the concentrate was purified by a silica gel column to obtain 1.29 g (4.62 mmol, yield: 85%) of a compound represented by the following formula (L5) as an orange oil.

(L5)

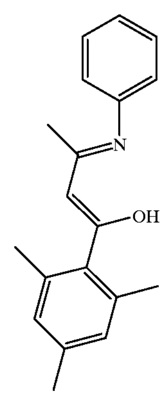

FD-mass spectrometry: $(M^+)$ 279

Synthesis of Compound Represented by the Formula (b-5)

To a 100-ml reactor thoroughly dried and purged with argon, 0.67 g (2.40 mmol) of the compound represented by the formula (L5), 10 ml of diethyl ether and 5 ml of tetrahydrofuran were introduced, and they were cooled to −78° C. and stirred. To the resulting mixture, 1.61 ml of n-butyllithium (1.55 mmol/ml-n-hexane solution, 2.50 mmol) was dropwise added over a period of 5 minutes, and they were slowly heated to room temperature and stirred at room temperature for 3 hours to prepare a lithium salt solution. The solution was dropwise added slowly to a mixture of 0.25 g (0.67 mmol) of zirconium tetrachloride and 10 ml of tetrahydrofuran, said mixture having been cooled to −78° C. After the dropwise addition was completed, the reaction solution was slowly heated to room temperature with stirring. The reaction solution was further stirred for another 8 hours at room temperature, and the solvent was distilled off from the solution under reduced pressure. The remainder was dissolved in 10 ml of methylene chloride, and the solution was filtered through a glass filter to remove insolubles. The filtrate was concentrated under reduced pressure to precipitate a solid. The solid was recrystallized from hexane and vacuum dried to obtain 0.47 g (0.65 mmol, yield: 54%) of a compound represented by the following formula (b-5) as yellow powder.

(b-5)

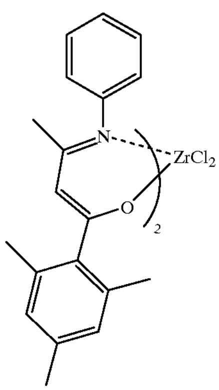

FD-mass spectrometry: $(M^+)$ 718

$^1$H-NMR ($CDCl_3$): 2.00–2.50 (m, 24H), 5.20–5.60 (m, 2H), 6.75–6.95 (m, 4H), 7.10–7.50 (m, 10H)

Elemental analysis: Zr: 12.5%

Example 10

To a 500-ml glass autoclave thoroughly purged with nitrogen, 250ml of toluene was introduced, and the liquid phase and the gas phase were saturated with 100 l/hr of ethylene. Thereafter, 1.1875 mmol (in terms of aluminum atom) of methylaluminoxane was added, and then 0.005 mmol of the compound represented by the formula (a-4) obtained in Synthesis Example 6 was added to initiate polymerization. The reaction was conducted at 25° C. for 30 minutes in an ethylene gas atmosphere at atmospheric pressure. Then, a small amount of isobutanol was added to terminate the polymerization. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.10 g of polyethylene.

The polymerization activity was 40 kg/mol-Ti.hr, and the intrinsic viscosity (η) of the polyethylene was 6.5 dl/g.

Example 11

To a 500-ml glass autoclave thoroughly purged with nitrogen, 250 ml of toluene was introduced, and the liquid phase and the gas phase were saturated with 100 l/hr of ethylene. Thereafter, 0.25 mmol of triisobutylaluminum was added, and then 0.005 mmol of the compound represented by the formula (a-4) and 0.006 mmol of triphenylcarbeniumtetrakis(pentafluorophenyl)borate were added to initiate polymerization. The reaction was conducted at 25° C. for 1 hour in an ethylene gas atmosphere at atmospheric pressure. Then, a small amount of isobutanol was added to terminate the polymerization. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.30 g of polyethylene.

The polymerization activity was 120 kg/mol-Ti.hr, and the intrinsic viscosity (η) of the polyethylene was 4.1 dl/g.

Example 12

To a 500-ml glass autoclave thoroughly purged with nitrogen, 250 ml of toluene was introduced, and the liquid phase and the gas phase were saturated with 100 l/hr of ethylene. Thereafter, 1.1875 mmol (in terms of aluminum atom) of methylaluminoxane was added, and then 0.005 mmol of the compound represented by the formula (b-4) obtained in Synthesis Example 7 was added to initiate polymerization. The reaction was conducted at 25° C. for 30 minutes in an ethylene gas atmosphere at atmospheric pressure. Then, a small amount of isobutanol was added to terminate the polymerization. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.60 g of polyethylene.

The polymerization activity was 60 kg/mol-Zr.hr, and the intrinsic viscosity (η) of the polyethylene was 6.8 dl/g.

Example 13

To a 500-ml glass autoclave thoroughly purged with nitrogen, 250 ml of toluene was introduced, and the liquid phase and the gas phase were saturated with 100 l/hr of ethylene. Thereafter, 0.25 mmol of triisobutylaluminum was added, and then 0.005 mmol of the compound represented by the formula (b-4) and 0.006 mmol of triphenylcarbeniumtetrakis(pentafluorophenyl)borate were added to initiate polymerization. The reaction was conducted at 25° C. for 1 hour in an ethylene gas atmosphere at ordinary pressure. Then, a small amount of isobutanol was added to terminate the polymerization. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.30 g of polyethylene.

The polymerization activity was 120 kg/mol-Zr.hr, and the intrinsic viscosity (η) of the polyethylene was 6.8 dl/g.

Example 14

To a 500-ml glass autoclave thoroughly purged with nitrogen, 250 ml of toluene was introduced, and the liquid phase and the gas phase were saturated with 100 l/hr of ethylene. Thereafter, 0.25 mmol of triisobutylaluminum was added, and then 0.005 mmol of the compound represented by the formula (b-5) and 0.006 mmol of triphenylcarbeniumtetrakis(pentafluorophenyl)borate were added to initiate polymerization. The reaction was conducted at 25° C. for 1 hour in an ethylene gas atmosphere at atmospheric pressure. Then, a small amount of isobutanol was added to terminate the polymerization. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.20 g of polyethylene.

The polymerization activity was 80 kg/mol-Zr.hr, and the intrinsic viscosity (η) of the polyethylene was 7.5 dl/g.

Synthesis Example 9

Synthesis of Compound Represented by the Formula (L6)

To a 500-ml reactor thoroughly dried and purged with argon, 2.3 g (8.94 mmol) of 2,2'-iminodibenzoic acid and 50 ml of THF were introduced, and they were cooled to −20° C. At that temperature, 90 ml of a THF solution (0.3 M) of bis(1-methylpiperazine-4-yl)aluminum hydride was dropwise added with stirring. Then, the temperature of the system was raised, and the reaction was conducted for 24 hours under reflux. The reaction solution was allowed to stand for cooling to room temperature. To the solution, 100 ml of diethyl ether was added, and 150 ml of water was further added slowly with ice cooling. The oil layer obtained by phase separation was concentrated and subjected to isolation by means of silica gel column chromatography to obtain 673 mg of 2,2'-iminodibenzaldehyde. To a 100-ml reactor thoroughly dried and purged with argon, 650 mg (2.89 mmol) of the 2,2'-iminodibenzaldehyde, 699 mg (5.77 mmol) of 2,6-dimethylaniline, 50 ml of dehydrated methanol and 0.2 ml of acetic acid were introduced, and they were reacted at room temperature for 12 hours. From the reaction solution, the solvent was distilled off, and the remainder was subjected to isolation by means of silica gel column chromatography to obtain 237 mg (yield: 6.1%) of a compound represented by the following formula (L6).

(L6)

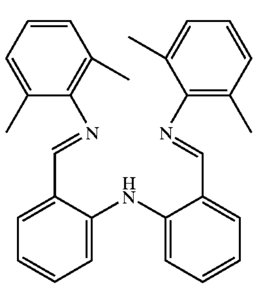

$^1$H-NMR ($CDCl_3$, δ): 2.21 (s, 12H), 4.96 (s, 1H), 6.37–7.74 (m, 14H), 8.21 (2H)

Synthesis of Compound Represented by the Formula (d-6)

To a 30-ml reactor thoroughly dried and purged with argon, 200 mg (0.46 mmol) of the compound represented by the formula (L6) and 20 ml of THF were introduced, and they were cooled to −78° C. and stirred. To the resulting mixture, 2.9 ml of an n-butyllithium-hexane-THF solution (0.16 M) was dropwise added, and they were slowly heated to room temperature and stirred for 1 hour to prepare a lithium salt solution. To a 30-ml reactor thoroughly dried and purged with argon, 58.7 mg (0.46 mmol) of ferrous chloride and 20 ml of THF were introduced, and they were stirred at room temperature for 2 hours and cooled to −78° C. Then, the lithium salt solution previously prepared was dropwise added. After the dropwise addition was completed, the reaction solution was slowly heated to room temperature, and the solution was stirred at that temperature for 3 hours. Then, the solution was filtered through a glass filter. The filtrate was concentrated to give 5 ml of a concentrate, and thereto was added 5 ml of n-pentane. The resulting precipitate was filtered, then washed with 10 ml of n-pentane and dried under reduced pressure to obtain 203 mg (yield: 85%) of a compound represented by the following formula (d-6).

(d-6)

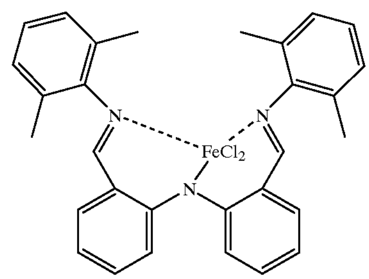

FD-mass spectrometry: ($M^+$) 521

Example 15

To a 500-ml glass autoclave thoroughly purged with nitrogen, 250 ml of toluene was introduced, and the liquid phase and the gas phase were saturated with 100 l/hr of ethylene. Thereafter, 1.1875 mmol (in terms of aluminum atom) of methylaluminoxane was added, and then 0.005 mmol of the compound represented by the formula (d-6) was added to initiate polymerization. The reaction was conducted at 25° C. for 30 minutes in an ethylene gas atmosphere at ordinary pressure. Then, a small amount of isobutanol was added to terminate the polymerization. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.01 g of polyethylene. The polymerization activity was 4 kg/mol-Fe.hr.

Synthesis Example 10

Synthesis of Compound Represented by the Formula (a-6)

To a 30-ml reactor thoroughly dried and purged with argon, 100 mg (0.23 mmol) of the compound represented by the formula (L6) and 20 ml of THF were introduced, and they were cooled to −78° C. and stirred. To the resulting mixture, 1.5 ml of an n-butyllithium-hexane-THF solution (0.16 M) was dropwise added, and they were slowly heated to room temperature and stirred for 1 hour to prepare a lithium salt solution. To a 30-ml reactor thoroughly dried and purged with argon, 43.6 mg (0.23 mmol) of titanium tetrachloride and 20 ml of THF were introduced, and they were stirred at room temperature for 2 hours and cooled to −78° C. Then, the lithium salt solution previously prepared was dropwise added. After the dropwise addition was completed, the reaction solution was slowly heated to room temperature, and the solution was stirred at that temperature for 3 hours. Then, the solution was filtered through a glass filter. The filtrate was concentrated to give 5 ml of a concentrate, and thereto was added 5 ml of n-pentane. The resulting precipitate was filtered, then washed with 10 ml of n-pentane and dried under reduced pressure to obtain 83 mg (yield: 62%) of a compound represented by the following formula (a-6).

FD-mass spectrometry: ($M^+$) 584

(a-6)

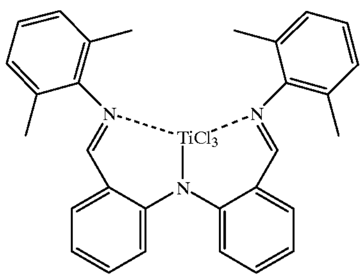

Example 16

To a 500-m 1 glass autoclave thoroughly purged with nitrogen, 250 ml of toluene was introduced, and the liquid phase and the gas phase were saturated with 100 l/hr of ethylene. Thereafter, 1.1875 mmol (in terms of aluminum atom) of methylaluminoxane was added, and then 0.005 mmol of the compound represented by the formula (a-6) was added to initiate polymerization. The reaction was conducted at 25° C. for 30 minutes in an ethylene gas atmosphere at ordinary pressure. Then, a small amount of isobutanol was added to terminate the polymerization. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.05 g of polyethylene. The polymerization activity was 21 kg/mol-Ti.hr.

Synthesis Example 11

Synthesis of Compound Represented by the Formula (b-6)

To a 30-ml reactor thoroughly dried and purged with argon, 200 mg (0.23 mmol) of the compound represented by the formula (L6) and 20 ml of THF were introduced, and they were cooled to −78° C. and stirred. To the resulting mixture, 1.5 ml of an n-butyllithium-hexane-THF solution (0.16 M) was dropwise added, and they were slowly heated to room temperature and stirred for .1 hour to prepare a lithium salt solution. To a 30-ml reactor thoroughly dried and purged with argon, 53.6 mg (0.23 mmol) of zirconium tetrachloride and 20 ml of THF were introduced, and they were stirred at room temperature for 2 hours and cooled to −78° C. Then, the lithium salt solution previously prepared was dropwise added. After the dropwise addition was completed, the reaction solution was slowly heated to room temperature, and the solution was stirred at that temperature for 3 hours. Then, the solution was filtered through a glass filter. The filtrate was concentrated to give 5 ml of a concentrate, and thereto was added 5 ml of n-pentane. The resulting precipitate was filtered, then washed with 10 ml of n-pentane and dried under reduced pressure to obtain 53 mg (yield: 37%) of a compound represented by the following formula (b-6).

FD-mass spectrometry: ($M^+$) 626

(b-6)

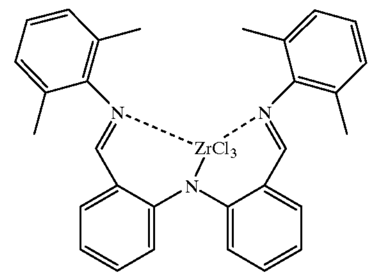

Example 17

To a 500-ml glass autoclave thoroughly purged with nitrogen, 250 ml of toluene was introduced, and the liquid phase and the gas phase were saturated with 100 l/hr of ethylene. Thereafter, 1.1875 mmol (in terms of aluminum atom) of methylaluminoxane was added, and then 0.005 mmol of the compound represented by the formula (d-6) was added to initiate polymerization. The reaction was conducted at 25° C. for 30 minutes in an ethylene gas atmosphere at atmospheric pressure. Then, a small amount of isobutanol was added to terminate the polymerization. After the polymerization was completed, the reaction product was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.12 g of polyethylene. The polymerization activity was 42 kg/mol-Zr.hr.

Synthesis Example 12

Synthesis of Compound Represented by the Formula (L7)

In argon, a solution of 2.0 g (16.8 mmol) of anthranil in 10 ml of THF was dropwise added at room temperature to 100 ml of a THF solution of phenylzinc chloride prepared from 36 ml (33.8 mmol) of a phenyllithium solution (0.94 mmol/ml) and 4.63 g (34 mmol) of zinc chloride. After stirring for 12 hours, 5 ml of 6N hydrochloric acid and then 50 ml of a 10% $Na_2CO_3$ aqueous solution were added to terminate the reaction. Separation of the organic phase, removal of solvent by distillation and column purification were carried out to obtain 2.20 g (11.2 mmol, yield: 67%) of the corresponding formyl compound as yellow crystals.

0.79 g (4.0 mmol) of the formyl compound obtained above was dissolved in 1.0 g (10.0 mmol) of cyclohexylamine and the solution was stirred at room temperature for 12 hours. The mixture liquid was vacuum dried to remove the excessive cyclohexylamine, whereby 1.13 g (4.0 mmol, yield: 100%) of a compound represented by the following formula (L7) was obtained as yellow oil.

(L7)

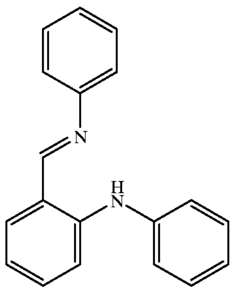

$^1$H-NMR ($CDCl_3$): 1.2–2.0 (m, 10H), 3.19 (dt, 1H), 6.7–7.4 (m, 9H), 8.43 (s. 1H), 11.47 (brs, 1H)

Synthesis of Compound Represented by the Formula (a-7)

To a 100-ml reactor thoroughly dried and purged with argon, 0.56 g (2.0 mmol) of the compound represented by the formula (L7) and 10 ml of diethyl ether were introduced, and they were cooled to −78° C. and stirred. To the resulting mixture, 1.24 ml of n-butyllithium (1.61N hexane solution, 2.0 mmol) was dropwise added over a period of 5 minutes, and they were slowly heated to room temperature to prepare a lithium salt solution. The solution was dropwise added to a mixture of 2.0 ml of a 0. 5N titanium tetrachloride-decane solution and diethyl ether, said mixture having been cooled to −78° C. The solution was slowly heated to room temperature and stirred for 12 hours. Then, the reaction solution was filtered and washed with methylene chloride. The solvent was distilled off from the filtrate. The resulting solid was subjected to reprecipitation with diethyl ether/hexane to obtain 0.21 g (yield: 31%) of a compound represented by the following formula (a-7) as red brown powder.

(a-7)

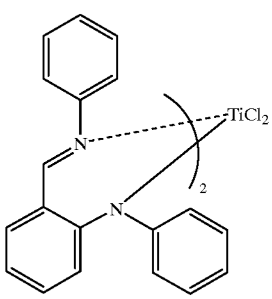

$^1$H-NMR ($CDCl_3$): 0.9–2.4 (m, 20H), 3.3–3.6 (m, 2H), 6.8–7.8 (m, 18H), 8.60 (brs, 2H)

Synthesis Example 13

Synthesis of Compound Represented by the Formula (b-7)

To a 100-ml reactor thoroughly dried and purged with argon, 0.56 g (2.0 mmol) of the compound represented by the formula (L7) and 5 ml of diethyl ether were introduced, and they were cooled to −78° C. and stirred. To the resulting mixture, 1.24 ml of n-butyllithium (1.61N hexane solution, 2.0 mmol) was dropwise added over a period of 5 minutes, and they were slowly heated to room temperature to prepare a lithium salt solution. The solution was dropwise added to a THF solution of 0.38 g (1.0 mmol) of a zirconium tetrachloride/2THF complex, said THF solution having been cooled to −78° C. The resulting solution was slowly heated to room temperature and stirred for 12 hours. Then, the solvent was distilled off, and the resulting solid was washed with methylene chloride and filtered. The solvent was distilled off from the filtrate, and the resulting solid was reslurried in hexane to obtain 0.37 g (yield: 52%) of a compound represented by the following formula (b-7) as orange powder.

(b-7)

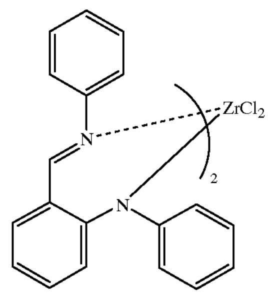

$^1$H-NMR ($CDCl_3$): 1.0–2.0 (m, 20H), 3.7–3.98 (m, 2H), 6.8–7.5 (m, 18H), 8.1–8.3 (m, 2H)

FD-MS($M^+$): 716

Example 18

To a 500-ml glass autoclave thoroughly purged with nitrogen, 250 ml of toluene was introduced, and the liquid phase and the gas phase were saturated with ethylene. Thereafter, 1.25 mmol (in terms of aluminum atom) of methylaluminoxane was added, and then 0.005 mmol of the compound represented by the formula (a-7) was added to initiate polymerization. The reaction was conducted at 25° C. for 30 minutes in an ethylene gas atmosphere at atmospheric pressure. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.09 g of polyethylene (PE).

The polymerization activity was 40 kg/mol-Ti.hr, and the intrinsic viscosity (η) of the polyethylene was 11.0 dl/g.

Example 19

To a 500-ml glass autoclave thoroughly purged with nitrogen, 250 ml of toluene was introduced, and the liquid phase and the gas phase were saturated with ethylene. Thereafter, 0.25 mmol of triisobutylaluminum was added, and then 0.005 mmol of the compound represented by the formula (a-7) and 0.006 mmol of triphenylcarbeniumtetrakis (pentafluorophenyl)borate were added to initiate polymerization. The reaction was conducted at 25° C. for 15 minutes in an ethylene gas atmosphere at atmospheric pressure. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.15 g of polyethylene (PE).

The polymerization activity was 120 kg/mol-Ti.hr, and the intrinsic viscosity (η) of the polyethylene was 30.2 dl/g.

Example 20

To a 500-ml glass autoclave thoroughly purged with nitrogen, 250 ml of toluene was introduced, and the liquid phase and the gas phase were saturated with ethylene. Thereafter, 1.25 mmol (in terms of aluminum atom) of methylaluminoxane was added, and then 0.005 mmol of the compound represented by the formula (b-7) was added to initiate polymerization. The reaction was conducted at 25° C. for 30 minutes in an ethylene gas atmosphere at atmospheric pressure. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.08 g of polyethylene (PE).

The polymerization activity was 30 kg/mol-Zr.hr, and the intrinsic viscosity (η) of the polyethylene was 16.9 dl/g.

Example 21

To a 500-ml glass autoclave thoroughly purged with nitrogen, 250 ml of toluene was introduced, and the liquid phase and the gas phase were saturated with ethylene. Thereafter, 0.25 mmol of triisobutylaluminum was added, and then 0.005 mmol of the compound represented by the formula (b-7) and 0.006 mmol of triphenylcarbeniumtetrakis (pentafluorophenyl)borate were added to initiate polymerization.

The reaction was conducted at 25° C. for 20 minutes in an ethylene gas atmosphere at atmospheric pressure. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.33 g of polyethylene (PE).

The polymerization activity was 200 kg/mol-Zr.hr, and the intrinsic viscosity (η) of the polyethylene was 9.44 dl/g.

Synthesis Example 14

Synthesis of Compound Represented by the Formula (L8)

To a 50-ml reactor purged with nitrogen, 1.32 g (60% in oil, 33.0 mmol) of sodium hydride and 10 ml of DMF were introduced, and a solution of 5.63 g (30.0 mmol) of 3-t-butylsalicylaldehyde in 5 ml of DMF was dropwise added slowly with ice cooling. The mixture was stirred at room temperature for 30 minutes, and then a DMF solution of 4.82 g (39.0 mmol) of dimethylthiocarbamoyl chloride was dropwise added. The resulting mixture was stirred at room temperature overnight, then treated with water and subjected to column purification to obtain 5.39 g of a yellow solid.

In nitrogen, 4.50 g of the yellow solid was heat treated at 130° C., whereby exchange reaction of oxygen atom for sulfur atom proceeded. The resulting solid was subjected to column purification and dissolved in 30 ml of ethanol. The solution was reacted with 0.90 g (9.68 mmol) of aniline at room temperature for 5.5 hours in the presence of 0.1 ml of acetic acid and then subjected to column purification to obtain 0.21 g (0.62 mmol, yield: 13%) of a compound represented by the following formula (L8) as white crystals.

(L8)

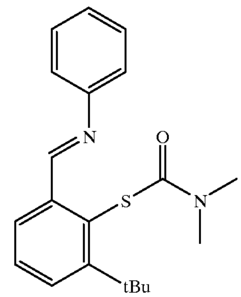

$^1$H-NMR ($CDCl_3$,): 1.40 (s, 9H), 3.01 (s, 3H), 3.22 (s, 3H), 6.6–8.0 (m, 8H), 8.38 (s. 1H)

Synthesis of Compound Represented by the Formula (b-8)

In a 100-ml reactor thoroughly dried and purged with argon, 0.04 g (0. 11 mmol) of a zirconium tetrachloride/2THF complex was dissolved in 5 ml of THF, and the solution was cooled to −78° C. To the solution, a solution of 0.11 g (0.22 mmol) of the compound represented by the formula (L8) in 5 ml of THF was dropwise added, and they were heated to room temperature and stirred for 4 days. After the solvent was distilled off, the resulting solid was washed with methylene chloride and filtered. From the filtrate, the solvent was distilled off, and the resulting solid was reslurried in hexane to obtain a compound represented by the following formula (b-8) as yellow powder.

(b-8)

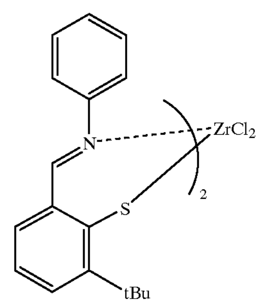

FD-MS(M+): 698

Example 22

To a 500-ml glass autoclave thoroughly purged with nitrogen, 250 ml of toluene was introduced, and the liquid phase and the gas phase were saturated with ethylene. Thereafter, 1.25 mmol (in terms of aluminum atom) of methylaluminoxane was added, and then 0.005 mmol of the compound represented by the formula (b-8) was added to initiate polymerization. The reaction was conducted at 25° C. for 30 minutes in an ethylene gas atmosphere at atmospheric pressure. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.35 g of polyethylene.

The polymerization activity was 140 kg/mol-Zr.hr, and the intrinsic viscosity (η) of the polyethylene was 4.2 dl/g.

Example 23

To a 500-ml glass autoclave thoroughly purged with nitrogen, 250 ml of toluene was introduced, and the liquid phase and the gas phase were saturated with ethylene. Thereafter, 0.25 mmol of triisobutylaluminum was added, and then 0.005 mmol of the compound represented by the formula (b-8) and 0.006 mmol of triphenylcarbeniumtetrakis (pentafluorophenyl)borate were added to initiate polymerization. The reaction was conducted at 25° C. for 1 hour in an ethylene gas atmosphere at atmospheric pressure. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.30 g of polyethylene (PE).

The polymerization activity was 60 kg/mol-Zr.hr, and the intrinsic viscosity (η) of the polyethylene was 9.2 dl/g.

Synthesis Example 15

Synthesis of Compound Represented by the Formula (L9)

To a 100-ml reactor thoroughly purged with nitrogen, 10 ml of ethanol, 0.61 g (5.00 mmol) of 2,6-dimethylaniline and 0.95 g (3.3 mmol) of 1-(2,4,6-triisopropylphenyl)-1,3-butanedione were introduced, and 5 g of molecular sieves 3A and 1 ml of acetic acid were added. Then, the mixture was heated to 80° C. and stirred for 3 hours. The reaction solution was concentrated under reduced pressure, and the concentrate was purified by a silica gel column to obtain a compound as grayish white crystals. This compound was dissolved in diethyl ether and reacted with diazomethane to obtain 0.60 g (1.48 mmol, yield: 43%) of a compound represented by the following formula (L9).

(L9)

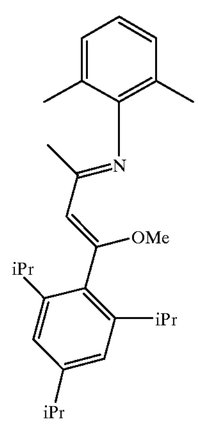

$^1$H-NMR ($CDCl_3$): 1.2–1.4 (m, 18H), 1.62 (s, 1H), 2.11 (s, 3H), 2.30 (s, 3H), 2.35 (s, 3H), 2.92 (dt, 1H), 3.14 (dt, 2H), 3.76 (s, 3H), 5.40 (s, 1H), 7.00 (s, 2H), 7.3–7.5 (m, 3H)

Synthesis of Compound Represented by the Formula (c-9)

To a 100-ml reactor thoroughly purged with argon, 0.19 g (1.50 mmol) of cobalt dichloride and 15 ml of THF were introduced, and thereto was added a solution of 0.60 g (1.48 mmol) of the compound represented by the formula (L9) in 10 ml of THF at room temperature, followed by stirring for 1 hour. The precipitate was separated by filtration, and the resulting solid was washed with methylene chloride/diethyl ether to obtain 0.18 g (yield: 23%) a brown powder represented by the following formula (c-9).

(c-9)

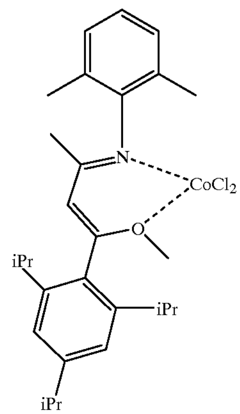

FD-MS(M$^+$): 535

Example 24

To a 500-ml glass autoclave thoroughly purged with nitrogen, 250 ml of toluene is introduced, and the liquid phase and the gas phase are saturated with 100 l/hr of ethylene. Thereafter, 1.1875 mmol (in terms of aluminum atom) of methylaluminoxane is added, and then 0.005 mmol of the compound represented by the formula (c-9) is added to initiate polymerization. The reaction is conducted at 25° C. for 60 minutes in an ethylene gas atmosphere at atmospheric pressure. Then, a small amount of isobutanol is added to terminate the polymerization. After the polymerization is completed, the reaction mixture is introduced into a large amount of methanol to precipitate a total amount of a polymer. Then, hydrochloric acid is added, and the mixture is filtered through a glass filter to obtain polyethylene.

Synthesis Example 10

Synthesis of Compound Represented by the Formula (L10)

To a 200-ml reactor thoroughly purged with nitrogen, 100 ml of ethanol, 5.32 g (30.0 mmol) of 2,6-dimethylaniline and 3.75 g (20.0 mmol) of 3-t-butylsalicylaldehyde were introduced, and thereto was added 0.5 ml of acetic acid. Then, the mixture was stirred at room temperature for 14 hours. The reaction solution was concentrated under reduced pressure and purified by a silica gel column to obtain a compound as yellow oil. This compound was dissolved in methanol and reacted with dimethyl sulfuric acid to obtain 5.95 g (16.9 mmol, yield: 85%) of a compound represented by the following formula (L10).

(L10)

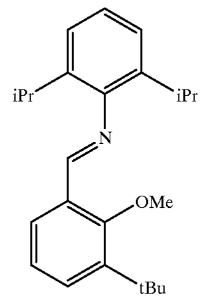

$^{1}$H-NMR ($CDCl_3$,): 1.18 (d, 12H), 1.49 (s, 9H), 3.01 (dt, 1H), 3.95 (s, 3H), 6.9–7.5 (m, 6H), 8.29 (s, 1H)

Synthesis of Compound Represented by the Formula (d-10)

In a 100-ml reactor thoroughly purged with argon, 0.25 g (2.0 mmol) of iron dichloride and 15 ml of THF were introduced, and thereto was added a solution of 0.70 g (2.0 mmol) of the compound represented by the formula (L10) in 10 ml of THF at room temperature, followed by stirring for 1 hour. The precipitate was separated by filtration, and the resulting solid was washed with methylene chloride/diethyl ether to obtain 0.09 g (yield: 9%) of a brown powder represented by the following formula (c-9).

(d-10)

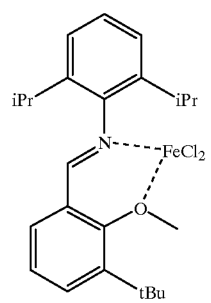

FD-MS ($M^+$): 478

Example 25

To a 500-ml glass autoclave thoroughly purged with nitrogen, 250 ml of toluene is introduced, and the liquid phase and the gas phase are saturated with 100 l/hr of ethylene. Thereafter, 0.25 mmol of triisobutylaluminum (TIBA) is added, and then 0.0005 mmol of the compound represented by the formula (d-10) and 0.006 mmol of triphenylcarbeniumtetrakis(pentafluorophenyl)borate are added to initiate polymerization. The reaction is conducted at 25° C. for 1 hour in an ethylene gas atmosphere at atmospheric pressure. Then, a small amount of isobutanol is added to terminate the polymerization. After the polymerization is completed, the reaction mixture is introduced into a large amount of methanol to precipitate a total amount of a polymer. Then, hydrochloric acid is added, and the mixture is filtered through a glass filter to obtain polyethylene.

What is claimed is:

1. An olefin polymerization catalyst comprising a transition metal compound (A-1) represented by the following formula (I):

(I)

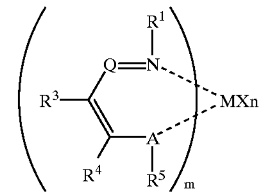

wherein

M is a transition metal atom of Group 3 to Group 11 of the periodic table, m is an integer of 1 to 3, Q is a nitrogen atom or a carbon atom having a substituent $R^2$, A is an oxygen atom, a sulfur atom, a selenium atom or a nitrogen atom having a substituent $R^6$, $R^1$ to $R^6$ may be the same or different, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, two or more of them may be bonded to each other to form a ring, and when m is 2 or greater, each of $R^1$, $R^2$, $R^3$, $R^4$, $R^5$, or $R^6$ may be the same or different, and one group of $R^1$ to $R^6$ contained in one ligand and one group of $R^1$ to $R^6$ contained in other ligands may be bonded, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, Xs may be the same or different, and Xs may be bonded to each other to form a ring.

2. The olefin polymerization catalyst as claimed in claim 1, wherein the transition metal compound (A-1) is a transition metal compound in which Q in the formula (I) is a carbon atom having a substituent $R^2$ and which is represented by the following formula (I-a):

(I-a)

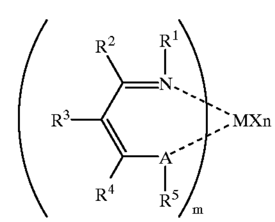

wherein M, m, A, $R^1$ to $R^6$, n and X have the same meanings as those of M, m, A, $R^1$ to $R^6$, n and X in the formula (I).

3. The olefin polymerization catalyst as claimed in claim 2, wherein the transition metal compound (A-1) is a transition metal compound in which $R^3$ and $R^4$ in the formula (I-a) are bonded to form an aromatic ring and which is represented by the following formula (I-b):

(I-b)

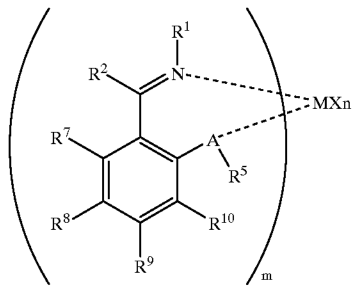

wherein M, m, A, $R^1$, $R^2$, $R^5$, $R^6$, n and X have the same meanings as those of M, m, A, $R^1$, $R^2$, $R^5$, $R^6$, n and X in the formula (I), $R^7$ to $R^{10}$ have the same meanings as those of $R^1$ to $R^6$ in the formula (I), and $R^1$, $R^2$ and $R^5$ to $R^{10}$ may be the same or different, two or more of them may be bonded to each other to form a ring, and when m is 2 or greater, each of $R^1$, $R^2$, $R^5$, $R^6$, $R^7$, $R^8$, $R^9$ or $R^{10}$ may be the same or different, and one group of $R^1$, $R^2$ and $R^5$ to $R^{10}$ contained in one ligand and one croup of $R^1$, $R^2$ and $R^5$ to $R^{10}$ contained in other ligands may be bonded.

4. The olefin polymerization catalyst as claimed in claim 1, wherein the transition metal compound (A-1) is a transition metal compound in which Q in the formula (I) is a nitrogen atom and $R^3$ and $R^4$ in the formula (I) are bonded to form an aromatic ring, and which is represented by the following formula (I-c):

(I-c)

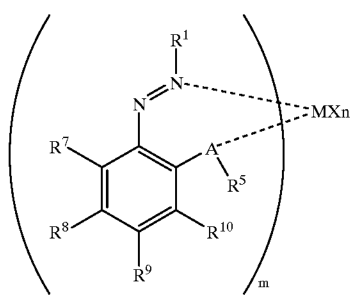

wherein M, m, A, $R^1$, $R^5$, $R^6$, n and X have the same meanings as those of M, m, A, $R^1$, $R^5$, $R^6$, n and X in the formula (I), $R^7$ to $R^{10}$ have the same meanings as those of $R^1$ to $R^6$ in the formula (I), and $R^1$ and $R^5$ to $R^{10}$ may be the same or different, two or more of them may be bonded to each other to form a ring, and when m is 2 or greater, each of $R^1$, $R^5$, $R^6$, $R^7$, $R^8$, $R^9$, or $R^{10}$ may be the same or different, and one group of $R^1$ and $R^5$ to $R^{10}$ contained in one ligand and one group of $R^1$ and $R^5$ to $R^{10}$ contained in other ligands may be bonded.

5. An olefin polymerization catalyst comprising a transition metal compound (A-2) represented by the following formula (II):

(II)

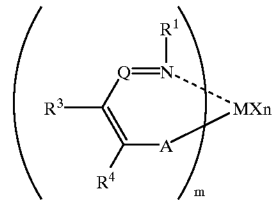

wherein

M is a transition metal atom of Group 3 to Group 11 of the periodic table, m is an integer of 1 to 6, Q is a nitrogen atom or a carbon atom having a substituent $R^2$, A is an oxygen atom, a sulfur atom, a selenium atom or a nitrogen atom having a substituent $R^6$, $R^1$ to $R^4$ and $R^6$ may be the same or different, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, two or more of them may be bonded to each other to form a ring, and when m is 2 or greater, each of $R^1$, $R^2$, $R^3$, $R^4$, or $R^6$ may be the same or different, and one group of $R^1$ to $R^4$ and $R^6$ contained in one ligand and one group of $R^1$ to $R^4$ and $R^6$ contained in other ligands may be bonded, and when A is oxygen and Q is carbon, $R^3$ and $R^4$ are not bonded to form an aromatic ring, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, Xs may be the same or different, and Xs may be bonded to each other to form a ring.

6. The olefin polymerization catalyst as claimed in claim 5, wherein the transition metal compound (A-2) is a transition metal compound in which Q in the formula (II) is a carbon atom having a substituent $R^2$ and which is represented by the following formula (II-a):

(II-a)

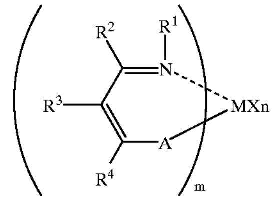

wherein M, m, A, $R^1$ to $R^4$, $R^6$, n and X have the same meanings as those of M, m, A, $R^1$ to $R^4$, $R^6$, n and X in the formula (II), and when A is oxygen, $R^3$ and $R^4$ are not bonded to form an aromatic ring.

7. An olefin polymerization catalyst comprising a transition metal compound represented by the following formula (II-b):

(II-b)

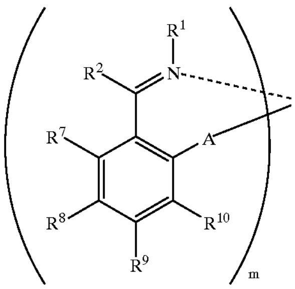

wherein

M is a transition metal atom of Group 3 to Group 11 of the periodic table, m is an integer of 1 to 6, A is an oxygen atom, a sulfur atom, a selenium atom or a nitrogen atom having a substituent $R^6$, $R^1$, $R^2$ and $R^6$–$R^{10}$ may be the same or different, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, two or more of them may be bonded to each other to form a ring, and when m is 2 or greater, $R^1$, $R^2$, $R^6$, $R^7$, $R^8$, $R^9$ or $R^{10}$ may be the same or different, and one group of $R^1$, $R^2$ and $R^6$ to $R^{10}$ contained in one ligand and one group of $R^1$, $R^2$, and $R^6$ to $R^{10}$ contained in other ligands may be bonded, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, Xs may be the same or different, and Xs may be bonded to each other to form a ring, when m is 1, A is a sulfur atom, a selenium atom or a nitrogen atom having a substituent $R^6$, and when m is 2 or greater, As may be the same or different, they are each an oxygen atom, a sulfur atom, a selenium atom or a nitrogen atom having a substituent $R^6$, and at least one A is a sulfur atom, a selenium atom or a nitrogen atom having a substituent $R^6$.

8. The olefin polymerization catalyst as claimed in claim 5, wherein the transition metal compound (A-2) is a transition metal compound in which Q in the formula (II) is a nitrogen atom and $R^3$ and $R^4$ in the formula (II) are bonded to form an aromatic ring, and which is represented by the following formula (II-c):

(II-c)

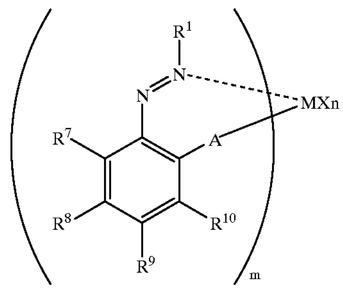

wherein M, m, A, $R^1$, $R^6$, n and X have the same meanings as those of M, m, A, $R^1$, $R^6$, n and X in the formula (II), $R^7$ to $R^{10}$ have the same meanings as those of $R^1$ to $R^4$ and $R^6$ in the formula (II), and $R^1$ and $R^6$ to $R^{10}$ may be the same or different, two or more of them may be bonded to each other to form a ring, and when m is 2 or greater, each of $R^1$, $R^6$, $R^7$, $R^8$, $R^9$, or $R^{10}$ may be the same or different, and one group of $R^1$ and $R^6$ to $R^{10}$ contained in one ligand and one group of $R^1$ and $R^6$ to $R^{10}$ contained in other ligands may be bonded.

9. The olefin polymerization catalyst as claimed in any one of claims 1 to 8, further comprising at least one compound (B) selected from the group consisting of:

(B-1) an organometallic compound, (B-2) an organoaluminum oxy-compound, and (B-3) a compound which reacts with the transition metal compound (A-1) or (A-2) to form an ion pair.

10. The olefin polymerization catalyst as claimed in claim 9, further comprising a carrier (C).

11. A process for olefin polymerization, comprising polymerizing or copolymerizing an olefin in the presence of the olefin polymerization catalyst as claimed in claim 1.

* * * * *